(12) United States Patent
Soskind

(10) Patent No.: US 6,462,874 B1
(45) Date of Patent: *Oct. 8, 2002

(54) OPTICAL SYSTEMS EMPLOYING STEPPED DIFFRACTIVE SURFACES

(75) Inventor: Yakov G. Soskind, Columbus, IN (US)

(73) Assignee: KSM Associates, Inc., Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/384,746

(22) Filed: Aug. 27, 1999

Related U.S. Application Data

(60) Provisional application No. 60/098,268, filed on Aug. 28, 1998.

(51) Int. Cl.[7] ................................. G02B 27/44
(52) U.S. Cl. ............... 359/565; 359/569; 359/570; 359/900
(58) Field of Search ................ 359/565, 569, 570, 900

(56) References Cited

U.S. PATENT DOCUMENTS

| | | | |
|---|---|---|---|
| 5,044,706 A | | 9/1991 | Chen |
| 5,153,778 A | * | 10/1992 | Sasian-Alvarado ......... 359/742 |
| 5,260,828 A | | 11/1993 | Londono et al. |
| 5,446,588 A | | 8/1995 | Missig et al. |
| 5,581,405 A | | 12/1996 | Meyers et al. |
| 5,589,982 A | | 12/1996 | Faklis et al. |
| 5,629,799 A | | 5/1997 | Maruyama et al. |
| 5,631,779 A | * | 5/1997 | Kashima ..................... 359/570 |
| 5,691,847 A | | 11/1997 | Chen |
| 5,726,436 A | | 3/1998 | Oka et al. |
| 5,737,120 A | | 4/1998 | Arriola |
| 5,745,289 A | | 4/1998 | Hamblen |
| 5,745,301 A | | 4/1998 | Betensky et al. |
| 5,768,030 A | | 6/1998 | Estelle et al. |
| 5,796,520 A | | 8/1998 | Maruyama |
| 5,822,127 A | * | 10/1998 | Chen et al. ................. 359/631 |
| 5,883,774 A | | 3/1999 | Maruyama |
| 5,978,159 A | * | 11/1999 | Kamo ......................... 359/570 |
| 5,982,543 A | * | 11/1999 | Fiala .......................... 359/565 |

OTHER PUBLICATIONS

M. W. Farn, et al., "Binary Optics", Handbook of Optics, Second Ed., vol. II, Chapter 8, Michael Bass, editor. McGraw–Hill, Inc., New York, Dec. 1995.*

Buralli, D. A., "Optical design with diffractive lenses," Sinclair Optics Design Notes, V. 2, No. 4, 1991.

*Code V Reference Manual*, Version 8.20, Optical Research Associates, Pasadena, California, vol. 1, pp. 2A–433—2A–434, 1998.

Faklis et al., "Spectral properties of multiorder diffractive lenses," *Appl. Opt.*, V. 34 (14), pp. 2462–2468, May 10, 1995.

Johnson et al., "Rigorous Electromagnetic Modeling of Diffractive Optical Elements," *Proceedings SPIE*, V. 1545, 1991, pp. 209–216.

Londono et al., "Modeling diffraction efficiency effects when designing hybrid diffractive lens systems," Appl. Opt., V. 31 (13), pp. 2248–2252, May 1, 1992.

Londono et al., "Athermalization of a single–component lens with diffractive optics," *Appl. Opt.*, 1993, 32:2295–2302 vol. 32, No. 12, May 1, 1993.

(List continued on next page.)

Primary Examiner—Cassandra Spyrou
Assistant Examiner—John Juba, Jr.
(74) Attorney, Agent, or Firm—Maurice M. Klee

(57) ABSTRACT

Optical systems employing stepped diffractive surfaces (13) are provided. Ray tracing through such systems is performed using the grating equation to represent the stepped diffractive surface (SDS). In this way, the SDS can be used to correct a variety of monochromatic and chromatic aberrations by balancing the aberrations of the SDS against the aberrations of non-stepped optical surfaces in the system.

119 Claims, 81 Drawing Sheets-

OTHER PUBLICATIONS

Londono et al., "The design of achromatized hybrid diffractive lens system," *Proceedings SPIE*, V. 1354, pp. 30–37, 1990.

Moharam, et al., "Diffraction Analysis of Dielectric Surface–Relief Grating," *JOSA*, V. 72, No. 10, pp. 1385–1392, Oct. 1982.

*OSLO Version 5, Optics Reference*, Sinclair Optics, Inc., Fairport, New York, pp. 359–361, 1996.

Sasian–Alvarado et al., "Staircase lens: a binary and diffractive field curvature corrector," *Applied Optics*, vol. 32, No. 1, Jan. 1, 1993, pp. 60–66.

Sinclair, D. C., "Designing Diffractive Optics Using The Sweatt Model", *Sinclair Optics Design Notes*, Fairport, New York, vol. 1, No. 1, Winter 1990.

Spencer et al., "General Ray–Tracing Procedure," *JOSA*, V. 52, pp. 672–678, Jun. 1962 vol. 52, No. 6.

Southwell, W.H., Ray Tracing Kinoform Lens Surfaces, *Applied Optics*, May 1, 1992, 31: 2244–2247 No. 13.

Stone et al., "Hybrid diffractive–refractive lenses and achromats," *Appl. Opt.*, V. 27(14), pp. 2960–2971, Jul. 15, 1988.

Swanson et al., "Binary lenses for use at 10.6 micrometers," *Opt. Eng.*, V. 24 (5), pp. 791–795, 1985.

Swanson et al., "Diffractive optical elements for use in infrared systems," *Opt. Eng.*, V. 28 (6), pp. 605–608, Jun. 1989.

Swanson, G. J., *Binary Optics Technology: Theoretical Limits on the Diffraction Efficiency of Multilevel Diffractive Optical Elements*, Massachusetts Institute of Technology Lincoln Laboratory, Technical Report 914, Lexington, Massachusetts, Mar. 1, 1991.

Swanson, G. J., "Binary optics technology: the theory and design of multi–level diffractive optical elements," MIT Lincoln Laboratory Tech. Rep. 854, Lexington, Massachusetts, Aug. 14, 1989.

Sweatt, W. C., "Describing Holographic Optical Elements As Lenses," *JOSA*, V. 67, pp. 803–808, Jun. 1977 No. 6.

Sweatt, W. C., "Mathematical Equivalence Between A Holographic Optical Element And An Ultra–High Index Lens," *JOSA*, V. 69, pp. 486–487, No. 3, Mar. 1979.

Sweeney et al., "Harmonic diffractive lenses," *Appl. Opt.*, V. 34 (14), pp. 2469–2475, May 10, 1995.

Tudorovskii, A. I., "An Objective with a Phase Plate," *Optics and Spectroscopy*, vol. 6(2), pp. 126–133 (Feb. 1959).

Welch, H.,"Fabrication Issues for DOE Design," *CODE V News Supplement*, Summer 1996 pp. 1–4.

Welford, W.T., "Vector Raytracing Equation For Hologram Lenses of Arbitrary Shape," *Opt. Commun.*, V. 14, 322–323, No. 3, Jul. 1975.

*Zemax Optical Design Program, User's Guide*, Version 7.0, pp. 13–23, 13–24, Focus Software Inc., Tucson, Arixona, 1998.

* cited by examiner

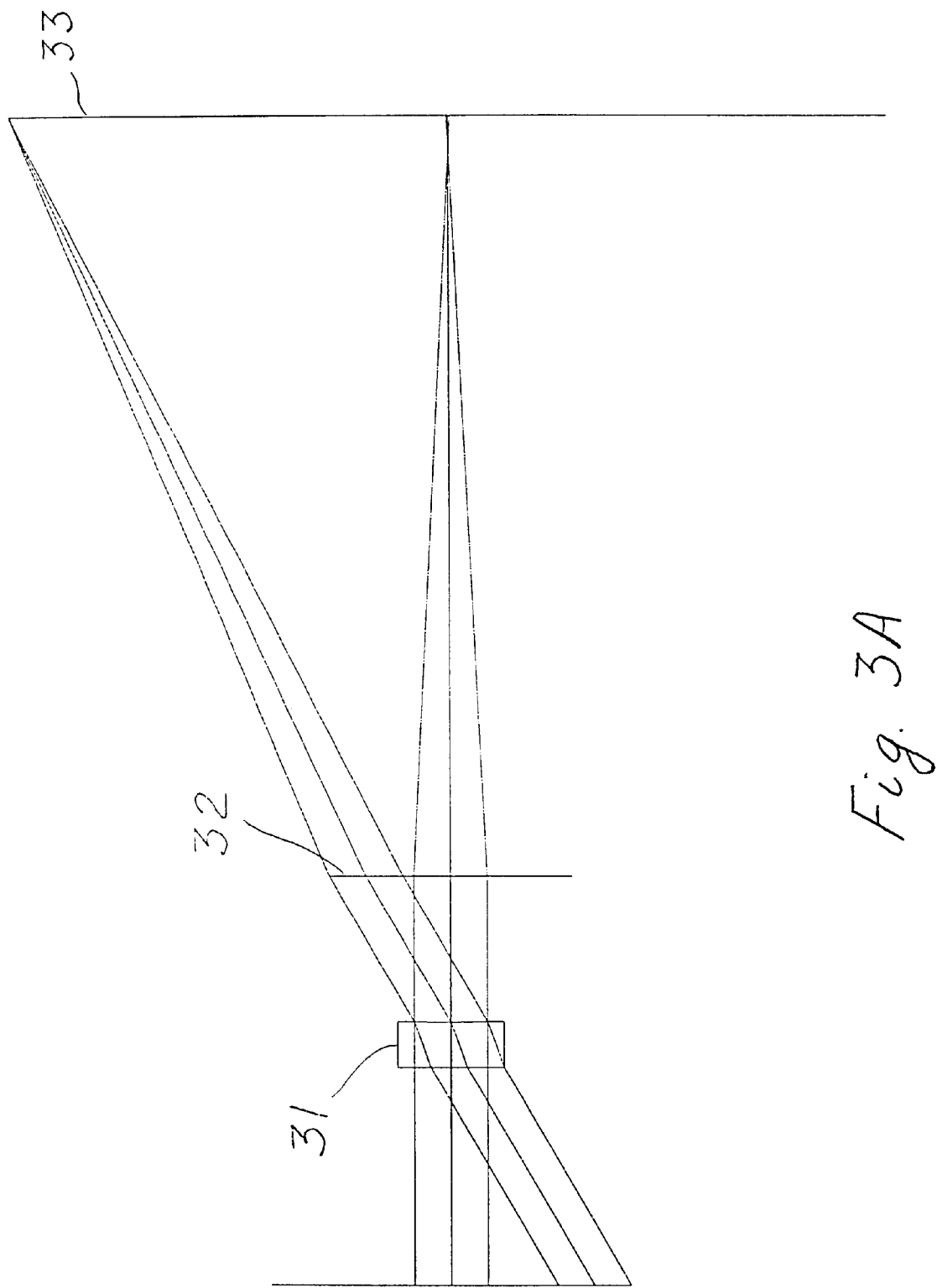

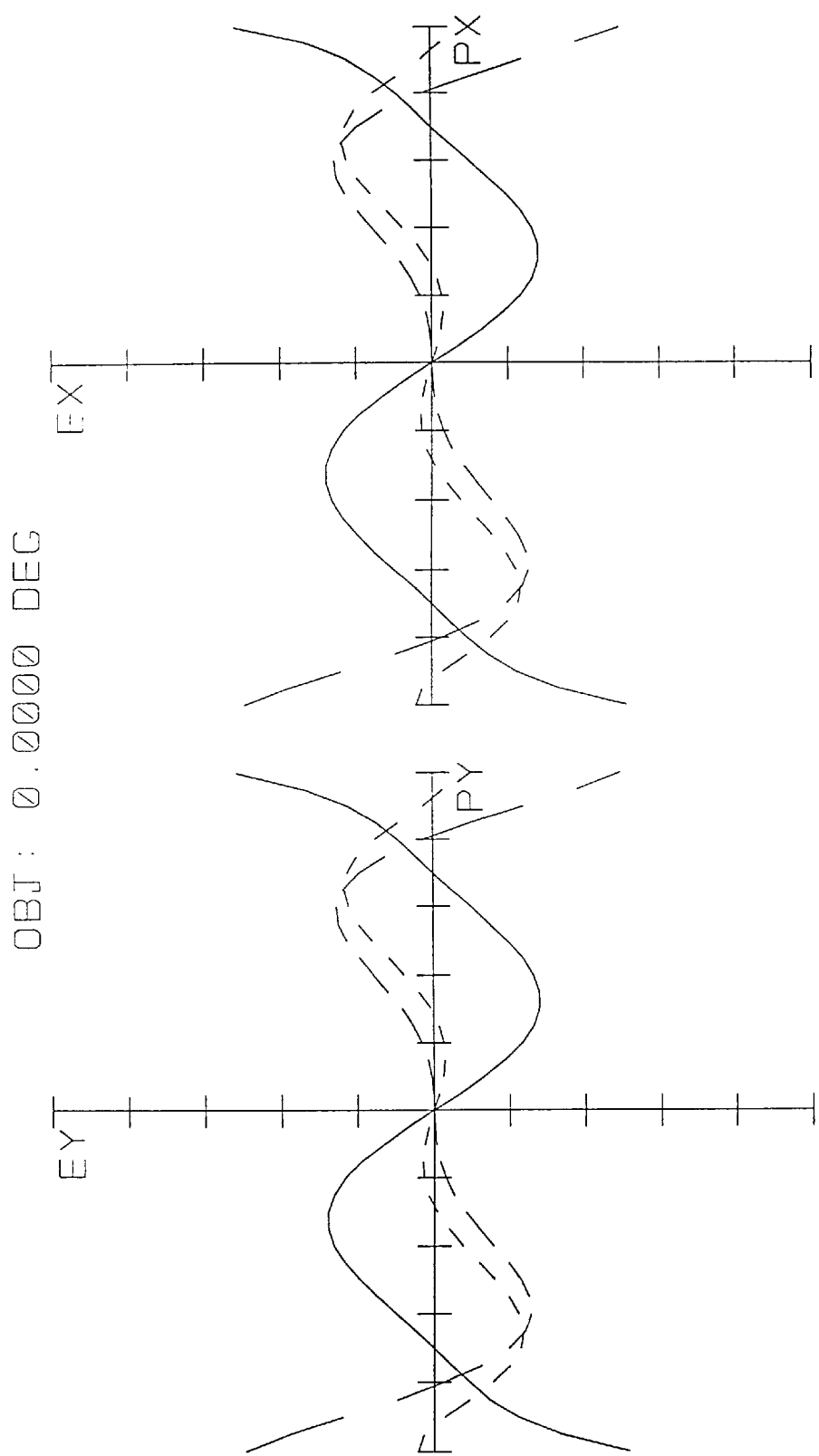

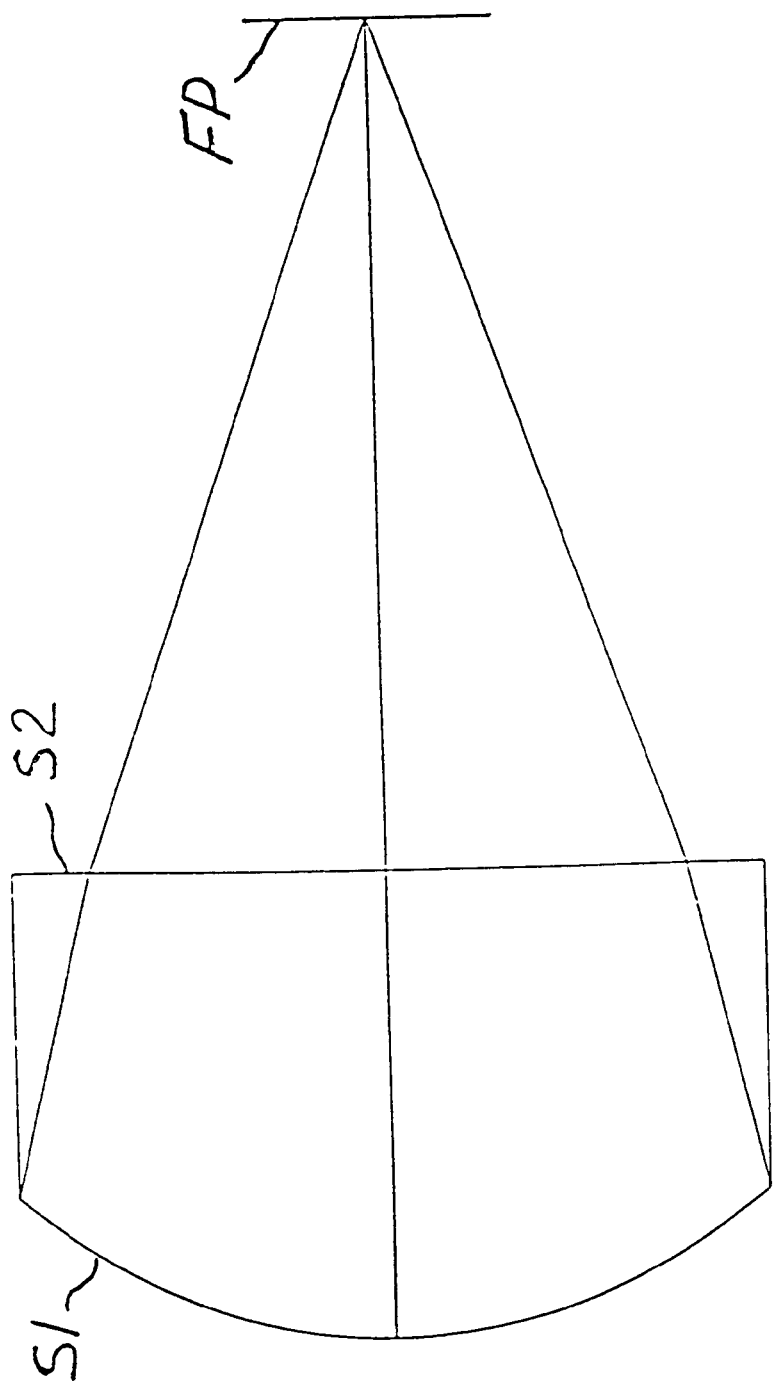

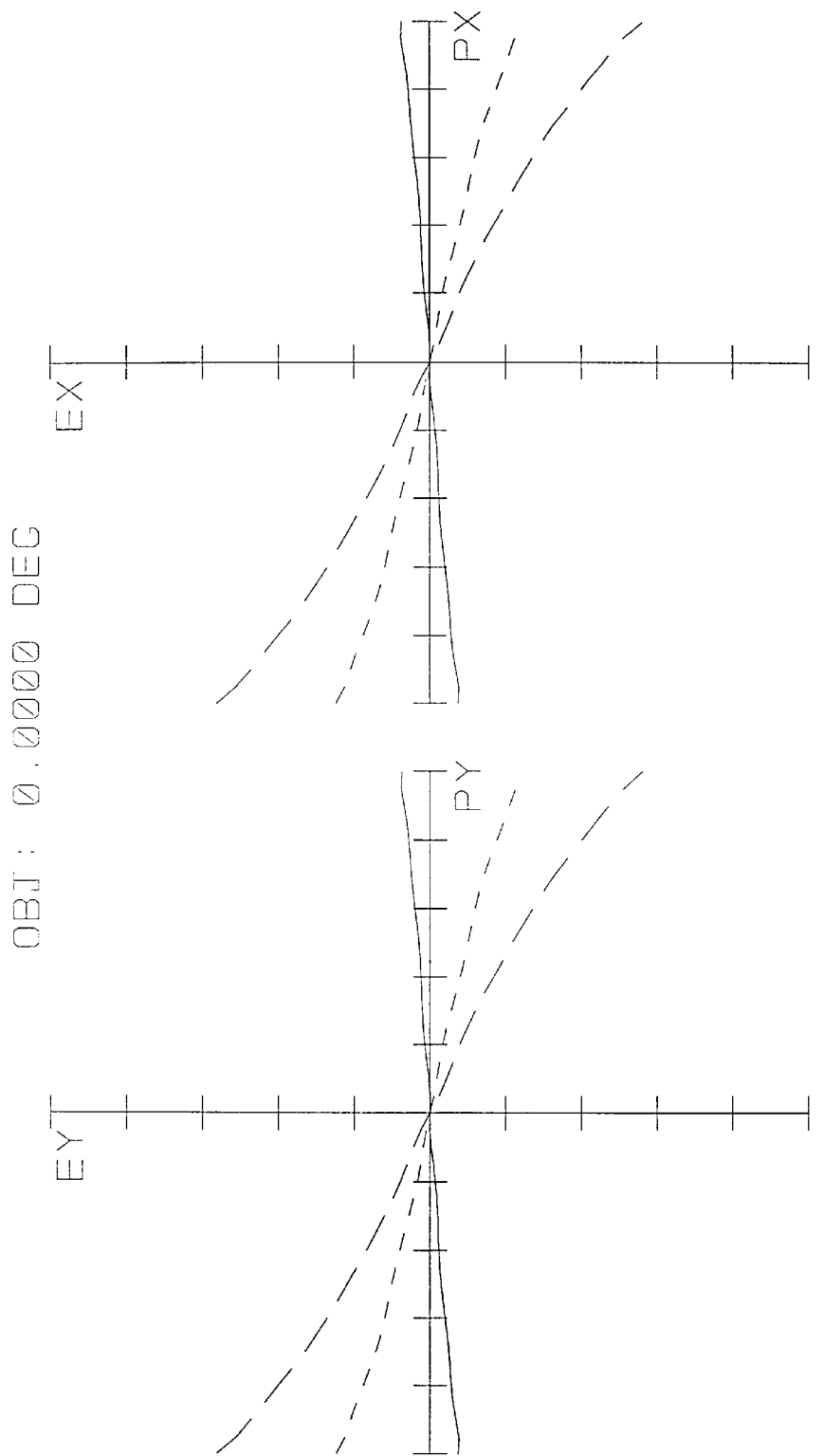

OBJ: 0.00 DEG

Fig. 23B-1

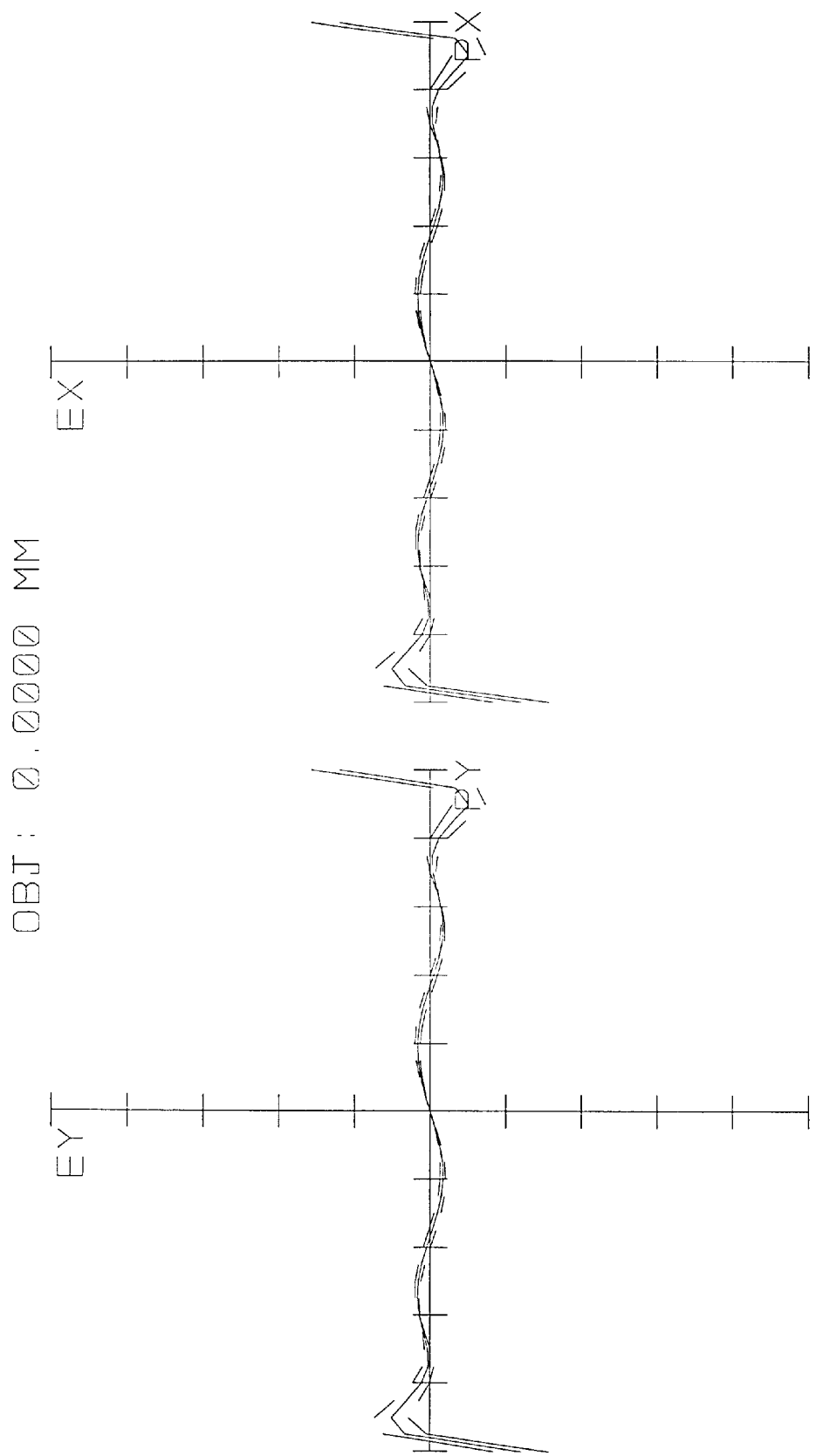

OPTICAL SYSTEMS EMPLOYING STEPPED DIFFRACTIVE SURFACES

This application claims the benefit under 35 USC §119(e) of U.S. Provisional Application No. 60/098,268 filed Aug. 28, 1998, the content of which in its entirety is hereby incorporated by reference.

I. FIELD OF THE INVENTION

This invention relates to optical systems employing stepped diffractive surfaces (SDSs).

More specifically, in accordance with certain of its aspects, the invention relates to the color correction of optical systems using SDSs, and, in particular, to the use of SDSs to correct axial and/or lateral chromatic aberration.

In accordance with other aspects, the invention relates to correction of monochromatic aberrations of optical systems, as well as balancing the monochromatic aberrations of non-SDS elements of an optical system against the monochromatic aberrations of SDS elements.

In accordance with additional aspects, the invention relates to correction of both chromatic and monochromatic aberrations of optical systems employing SDSs.

In accordance with still further aspects, the invention relates to:

(1) SDSs in which the surface's step heights are determined based on the curvature of the propagating wavefront;

(2) SDSs in which the surface step widths are determined based on the shape of the base curve and the local step height;

(3) SDSs in which the surface's step widths and step heights are determined using the grating equation (see, for example, equation (10.3) below);

(4) SDSs in which the wavefront incident on the SDS is non-planar (e.g., converging or diverging) or is planar but oriented at an angle to the optical system's optical axis;

(5) methods for tracing rays through SDSs using the grating equation (see, for example, equation (10.3) below);

(6) methods for designing optical systems which employ SDSs;

(7) optimization of the diffraction efficiency of an SDS; and/or (8) the use of SDSs having a radially variable step height within a diffraction order.

These latter aspects of the invention are applicable to color corrected and non-color corrected (e.g., monochromatic) optical systems.

II. BACKGROUND OF THE INVENTION

A. Diffractive Optical Elements (DOEs)

The demand for a higher level of correction of aberrations in optical systems, preferably at a lower cost, has always exist. The modern optical designer possesses numerous design tools and techniques to correct aberrations, including aspherical surfaces, a wide variety of optical materials, diffractive optical elements, etc.

Diffractive optical elements (DOEs) have proven themselves as effective tools in the correction of aberrations of optical systems, including both monochromatic and chromatic aberrations. The advantages of a DOE come at the price of contrast reduction due to a portion of the light going into spurious diffraction orders. The efficiency of a DOE is used as the measure of the amount of light that leaks into spurious orders and causes the reduction in contrast. There are several factors that reduce the efficiency of a DOE, including manufacturing imperfections and the fundamental nature of a DOE. Improving the fabrication process can reduce the factor due to imperfections. The fundamental nature of a DOE causes reduction in efficiency due to the finite spectral band of light used in the system, as well as through "light shadowing" in the DOE.

One of the widely used diffractive surface configurations for a DOE is a kinoform. Kinoform DOEs have optical power and affect (change) the direction of propagation of light for the entire wavelength band and range of incidence angles. This optical power needs to be accounted for during the design stage of the optical system and affects the paraxial properties of the entire system, as well as the aberration contribution of the refractive part of the system in the case of hybrid diffractive-refractive systems. The diffraction order of a kinoform DOE in most cases is equal to unity, but can also be equal to a larger integer. The kinoform phase profile is blazed at an angle that varies as a function of aperture, i.e., as a function of radial distance from the system's optical axis. See G. J. Swanson, Binary Optical Technology: Theoretical Limits on the Diffraction Efficiency of Multilevel Diffractive Optical Elements, MIT Lincoln Laboratory Tech. Rep. 914, 1991; D. W. Sweeney and G. E. Sommargren, Harmonic diffractive lenses, Appl. Opt., V. 34 (14), pp. 2469–2475, 1995; D. Faklis and M. Morris, Spectral properties of multiorder diffractive lenses, Appl. Opt., V. 34 (14), pp. 2462–2468, 1995; and D. Faklis and M. Morris, Polychromatic diffractive lens, U.S. Pat. No. 5,589,982, 1996.

Except for a very limited wavelength band and range of incidence angles, the diffraction efficiency (DE) of even a perfectly manufactured (theoretical) kinoform is less than unity. As a result, a certain amount of light is redistributed into diffraction orders differing from the working order, thus producing a halo in the image and a reduction in image contrast. See G. J. Swanson, 1989, supra; C. Londono and P. Clark, Modeling diffraction efficiency effects when designing hybrid diffractive lens systems, Appl. Opt., V. 31 (13), pp. 2248–2252, 1992; and G. J. Swanson, 1991, supra.

The use of DOEs, specifically, kinoform DOEs, to correct chromatic aberrations of optical systems has been discussed in detail in several articles. See T. Stone and N. George, Hybrid diffractive-refractive lenses and achromats, Appl. Opt., V. 27(14), pp. 2960–2971, 1988; M. M. Meyers and J. R. Bietry, Hybrid refractive/diffractive achromatic camera lens and camera using such, U.S. Pat., No. 5,581,405, 1996; and G. J. Swanson, Binary optics technology: the theory and design of multi-level diffractive optical elements, MIT Lincoln Laboratory Tech. Rep. 854, 1989. An ideal DOE would effectively correct the chromatism of an optical system without a significant decrease in DE.

One of the fundamental limitations on the DE of a kinoform is the "light shadowing" phenomenon referred to above which causes a DOE to have a duty cycle. See G. J. Swanson, 1991, supra. For a kinoform lens, the duty cycle grows with an increase in the lens' optical power and usually increases with an increase in radial coordinate. It follows that the DE of a kinoform decreases with an increase in optical power and/or clear aperture size.

Another issue with kinoform DOEs is fabrication. See H. Welch, Fabrication Issues for DOE Design, CODE V News Supplement, Summer 1996. Because the blaze angle of the kinoform varies as a function of radial coordinate, control of this fundamental feature of a kinoform is very difficult. In many cases, the blaze profiles of kinoform DOEs are approximated with binary step profiles. See G. J. Swanson, 1989, supra; and Gary J. Swanson and Wilfrid B. Weldkamp, Diffractive optical elements for use in infrared systems, Opt. Eng., V. 28 (6), pp. 605–608, 1989. When the continuous blazed profile is approximated by 16 steps, the diffraction efficiency at the primary wavelength is reduced by about 1% from its theoretical maximum value of 100%. See Swanson and Weldkamp, supra.

The fabrication of a binary kinoform DOE typically involves lithographic projection of masks onto the surface of the DOE or a DOE master. See Swanson and Weldkamp, supra; and Gary J. Swanson and Wilfrid B. Weldkamp, Binary lenses for use at 10.6 micrometers, Opt. Eng., V. 24 (5), pp. 791–795, 1985. Such projection techniques have limitations in terms of resolution and alignment tolerances, which lead to a minimum feature size which can be fabricated without substantial loss in accuracy.

If, for example, the minimum feature size for given equipment is 2 micrometers, then for a zone width of 16 micrometers, only 8 steps (features) can be fabricated. As discussed above, 16 steps lead to a reduction in diffraction efficiency at the primary wavelength of 1%. If only 8 steps can be used, the reduction in diffraction efficiency increases to 5%. This reduction in DE means that more light is diffracted into orders other than the working order, leading to a greater contrast reduction in the image plane.

Because every step boundary implies some imperfections (e.g., due to mask alignment and/or the etching process), the binary approximation, with its increased number of boundaries, leads to increased scatter and performance deterioration (e.g., contrast deterioration) compared to a DOE having the nominal (theoretical) configuration. Another complication with kinoforms is based on the fact that the optimum depth is a function of the local zone spacing, which, in turn, is a function of radial position. See G. J. Swanson, 1991, supra. This implies a fundamental efficiency limitation for kinoforms fabricated using lithographic techniques.

The present invention avoids and/or minimizes these deficiencies of kinoform DOEs.

According to the present invention, one can correct chromatic aberrations of an optical system while introducing substantially less optical power into the system than would be introduced by a kinoform used for the same purpose. In certain cases, the power of the SDS at the primary wavelength can be zero.

Whereas the reduction in DE due to the finite spectral band of light is unavoidable for any DOE, as discussed in detail below, the structure of the diffractive component according to the present invention can be optimized such that the reduction of DE due to variable incidence angle (finite field of the optical system and/or wavefront curvature of the incident light) is minimized. More generally, the present invention provides an optimally shaped DOE (substrate shape as well as microstructure) such that the surface has a maximum DE in the working order.

With regard to the "light shadowing" phenomenon, a DOE according to the present invention has almost no "bending" effect on the rays, so that the light shadowing of the surface is, in general, negligible. In certain cases, the light shadowing is completely eliminated, the duty cycle is zero, and the DE is constant across the radial coordinate of the SDS and has its maximum theoretical value of unity.

In the case when the wavefront incident on the DOE according to the present invention is not planar, or when the DOE has nonzero axial power, for example when the efficiency is optimized for a finite field (see below), the duty cycle for the light propagating through the DOE is not zero and the DE is less than one. However, because the power of the DOE according to the present invention is substantially less than that of a kinoform employed for the same purpose, the duty cycle of the DOEs of the invention are always less than that of a kinoform, and the DE at the primary wavelength is always higher.

These properties of the DOE of the present invention make it the preferred choice, compared to a kinoform, in applications that demand the highest contrast (highest DE).

As to manufacturability, whereas kinoforms have a variable blaze angle across the aperture (see G. J. Swanson, 1991, supra), DOEs according to present invention have planar steps orthogonal to the DOE's axis of symmetry. Compared to a kinoform there is one degree of freedom less to control, so that fabrication of a DOE according to the present invention using single point diamond turning equipment is more accurate compared to a kinoform. Also the microstructure of the DOE of the present invention is inherently composed of steps, thus eliminating the problems caused by a binary approximation to the non-step like blaze of a kinoform.

In sum, essentially any aberration corrective optical function, which can be performed by a kinoform, can also be performed by a DOE according to the present invention, but will typically have better efficiency and will be easier to make.

III. DESCRIPTION OF THE INVENTION

A. Objects of the Invention

In view of the foregoing, it is an object of the invention to provide correction of chromatic aberrations, monochromatic aberrations, or both chromatic and monochromatic aberrations in optical systems by means of one or more stepped diffractive surfaces which are used alone or in combination with other approaches for correcting such aberrations.

It is a further object of the invention to provide aberration-corrected optical systems, which have at least one SDS and the aberrations introduced by the SDS are balanced against the aberrations of the rest of the system.

It is another object of the invention to provide aberration-corrected optical systems which have (1) a finite (i.e. nonzero) field of view and (2) at least one SDS, wherein the monochromatic performance of the system with the SDS is substantially equal to and, preferably, is better than the system's monochromatic performance without the SDS.

It is a further object of the invention to provide optical systems, which employ at least one SDS and have optimized diffraction efficiencies.

It is an additional object of the invention to provide improved methods for incorporating SDSs in computerized processes for designing lens systems.

B. Stepped Diffractive Surfaces

FIGS. 1A and 1B illustrate optical elements employing stepped diffractive surfaces 13a and 13b of the type with which the present invention is concerned. To simplify these drawings, opposing surfaces 15a and 15b of these elements have been shown as planar. In the general case, the opposing surfaces can have optical power or can be another stepped diffractive surface, if desired.

As shown in these figures, the stepped diffractive surfaces 13 comprise a plurality of concentric planar zones 17 (also referred to as "steps") which are orthogonal to optical axis 19. The zones lie on a base curve which is shown as part of a circle in FIGS. 1A and 1B, but in the general case can be any curve of the type used in optical design, including conics, polynomial aspheres, etc. The base curve may also constitute a base surface in cases where the concentric planar zones are not axially symmetric, i.e., where their widths are a function of θ in an (r, θ, z) cylindrical coordinate system having its z-axis located along the system's optical axis. For ease of reference, the phrase "base curve" will be used herein and in the claims to include both the axially symmetric and axially non-symmetric cases, it being understood that in the non-symmetric case, the base curve is, in fact, a base surface. In either case, the base curve can be characterized by a vertex radius which can be used in calculating the paraxial properties of the stepped diffractive surface.

The stepped diffractive surfaces of the invention are distinguished from digitized (binary) kinoforms by the fact that the sag of the stepped diffractive surface changes monotonically as the zone number increases. The sag of the microstructure of a binary kinoform, on the other hand, always exhibits a reversal in direction at some, and usually at many, locations on the surface. This is so even if the base curve for the binary kinoform has monotonic sag.

Quantitatively, the zones of the stepped diffractive surface preferably have widths ($w_i$) and depths ($d_i$) which satisfy some or all of the following relationships:

$|d_i|\backslash|d_{i+1}|<2.0$, for i=1 to N-2;                   (A)

$|d_i|\approx j_i\lambda_0/|(n_2-n_1)|$, for i=1 to N-1;          (B)

$w_i/\lambda_0>1.0$, for i=1 to N;                           (C)

where "$j_i$" is the order of the ith zone of the stepped diffractive surface ($j_i \geq 1$), N is the total number of zones (N=6 in FIGS. 1A and 1B), $\lambda_0$ is the primary or nominal wavelength of the optical system, and "$n_1$" and "$n_2$" are the indices of refraction of the media on either side of the stepped diffractive surface, with light traveling through the stepped diffractive surface from the $n_1$ medium to the $n_2$ medium The step "depth" is also referred to herein as the step "height."

The "$j_i$" nomenclature is used in the above equations to indicate that the working order of the stepped diffractive surface can be different for different zones. In many cases, the same working order will be used for all zones; however, for manufacturing reasons, it may be desirable to use different working orders for some zones, e.g., if the zone width $w_i$ would become too small for accurate replication with a constant working order, especially, for a constant working order of 1. In this regard, it should be noted that $j_i$ can be made greater than 1 for all zones, again to facilitate manufacture of the stepped diffractive surface by, for example, reducing the overall number of zones comprising the surface and, at the same time, increasing the depth and width of the individual steps. For simplicity of presentation and in view of the lack of a universal convention for identifying orders in diffractive systems, the "$j_i$" values are assumed to be positive numbers, it being understood that they could equally well be negative numbers.

Like the monotonic sag characteristic, the $|d_i|\backslash|d_{i+1}|<2.0$ characteristic distinguishes the diffractive surfaces of the invention from digitized (binary) kinoforms, where $|d_i|\backslash|d_{i+1}|$ is normally greater than 2.0 for at least some steps, i.e., where the kinoform profile returns to the base curve. The $|d_i|\approx j_i\lambda_0/|(n_2-n_1)|$ characteristic in combination with the requirement that $j_i \geq 1$ also distinguish the stepped diffractive surfaces of the invention from digitized kinoforms in that this expression calls for an optical path difference for each step of at least $j_i\lambda_0$ while for a digitized kinoform of the same diffractive order the optical path difference for each step is at most $j_i\lambda_0/2$ in the case of a two level digitization and becomes even smaller for the digitizations actually used in practice, e.g., an eight or sixteen level digitization. The $w_i/\lambda_0>1.0$ characteristic affects the efficiency of the stepped diffractive surface, with larger ratios generally corresponding to greater efficiencies. In addition, this ratio needs to be sufficiently large for scalar theory to apply. See G. J. Swanson, *Binary Optics Technology: Theoretical Limits on the Diffraction Efficiency of Multilevel Diffractive Optical Elements*, Massachusetts Institute of Technology Lincoln Laboratory Technical Report 914, Mar. 1, 1991, p.24.

It should be noted that when a stepped diffractive surface is incorporated in an optical element as illustrated in FIGS. 1A and 1B, the optical material making up the element could have an index of refraction greater than or less than the surrounding medium. Also, light can pass from left to right or from right to left through the element. Thus, for a stepped diffractive surface, which transmits light, four cases are possible:

(1) passage from a higher index of refraction medium to a lower index of refraction medium through a concave stepped diffractive surface;

(2) passage from a lower index of refraction medium to a higher index of refraction medium through a concave stepped diffractive surface;

(3) passage from a higher index of refraction medium to a lower index of refraction medium through a convex stepped diffractive surface; and (4) passage from a lower index of refraction medium to a higher index of refraction medium through a convex stepped diffractive surface.

As further variations, rather than transmitting light, the stepped diffractive surface 13 can be reflective, in which case equation (B) above becomes:

$|d_i|\approx j_i\lambda_0/2n$, for i=1 to N-1                    (B')

where "n" is the index of refraction of the medium in which the light travels before contacting the reflective surface.

Combinations of the foregoing cases can, of course, be used in optical systems that employ the invention.

For some applications of the invention, N is small and for others, it is large. For example, N can be greater than 175 and can even be greater than 200 or more. Similarly, for some applications, small sags are needed while for others, the sag needs to be large. For example, the sag can be greater than 0.25 millimeters or even greater than 0.30 millimeters or more.

Similarly, for some applications of the invention, the optical system has a finite (non-zero) semi-field of view, while for others it does not. For example, the operative semi-field of view can be greater than 5°, or even greater than 10°, 20°, 40°, or more.

C. Summary of the Invention

In accordance with one of its aspects, the invention provides an optical system having an optical axis and comprising:

(A) at least one refractive or reflective optical surface having a non-zero optical power; and (B) at least one stepped diffractive surface which has a clear aperture, and within said clear aperture comprises N concentric planar zones orthogonal to the system's optical axis which define a base curve, said zones satisfying the relationship:

$d_i/d_{i+1} < 2.0$, for i=1 to N−2, where $d_i$ is the magnitude of the displacement along the optical axis between zone i and zone i+1;

wherein:

(i) removal of the stepped diffractive surface and its replacement with a surface having the same optical power results in an increase in the system's monochromatic aberrations, i.e., its measured and/or calculated monochromatic aberrations (e.g., its calculated blur size), including, for example, astigmatism, coma, distortion, spherical aberration, etc., and/or a change in the system's focal plane position.

As used herein, a surface having the same optical power $\Phi$ as an SDS is a spherical surface that has a radius R defined as: $R=(n_2-n_1)/\Phi$, where $n_2$ and $n_1$ are the refractive indices on either side of the surface. The optical power of the SDS is evaluated at $\lambda_0$. When the SDS power is zero (SDS has no power), then the surface that has the same optical power is a plane (R=∞).

The optical system also exhibits characteristic (i) when the stepped diffractive surface is removed and replaced with a non-stepped surface having the SDS's base curve.

In accordance with another aspect, the invention provides an optical system for forming an image of an object, said system having an optical axis and a non-zero operative semi-field of view in the direction of the object and/or a non-zero operative semi-field of view in the direction of the image, said system comprising:

(A) at least one refractive or reflective optical surface having a non-zero optical power; and (B) at least one stepped diffractive surface positioned away from the stop of the optical system and which has a clear aperture, and within said clear aperture comprises N concentric planar zones orthogonal to the system's optical axis which define a base curve, said zones satisfying the relationship:

$d_i/d_{i+1} < 2.0$, for i=1 to N−2, where $d_i$ is the magnitude of the displacement along the optical axis between zone i and zone i+1;

wherein (i) removal of the stepped diffractive surface and its replacement with a refractive surface having the same power results in an increase in at least one of the system's longitudinal or lateral chromatic aberrations, i.e., its measured and/or calculated longitudinal and/or lateral chromatic aberrations.

The optical system also exhibits characteristic (i) when the stepped diffractive surface is removed and replaced with a non-stepped surface having the SDS's base curve.

In accordance with a further aspect, the invention provides an optical system for forming an image of an object, said system having an optical axis and an operative semi-field of view in the direction of the object and/or an operative semi-field of view in the direction of the image, said system comprising:

(A) at least one refractive or reflective optical surface having a non-zero optical power; and (B) at least one stepped diffractive surface which has a clear aperture and within said clear aperture comprises N concentric planar zones orthogonal to the system's optical axis which define a base curve, said zones satisfying the relationship:

$d_i/d_{i+1} < 2.0$, for i=1 to N−2, where $d_i$ is the magnitude of the displacement along the optical axis between zone i and zone i+1;

wherein:

(i) removal of the stepped diffractive surface and its replacement with a refractive surface having the same power results in:

(a) an increase in at least one of the system's chromatic aberrations; and (b) an increase in the system's monochromatic aberrations within the system's operative semi-field of view in the direction of the object when that operative semi-field of view is largest, or the image when that operative semi-field of view is largest, or both the object and the image when the operative semi-fields of view in those directions are equal.

Alternatively, the optical system exhibits characteristics (a) and (b) when the stepped diffractive surface is removed and replaced with a non-stepped surface having the SDS's base curve.

In accordance with an additional aspect, the invention provides an optical system, said system having an optical axis and an operative wavelength range which has a minimum wavelength $\lambda_{min}$, a maximum wavelength $\lambda_{max}$, and a primary or nominal wavelength $\lambda_0$ which lies between $\lambda_{min}$ and $\lambda_{max}$, said system comprising:

(A) at least one refractive or reflective optical surface having a non-zero optical power; and (B) at least one stepped diffractive surface which has a clear aperture and within said clear aperture comprises N concentric planar zones orthogonal to the system's optical axis which define a base curve, said zones satisfying the relationship:

$d_i/d_{i+1} < 2.0$, for i=1 to N−2, where $d_i$ is the magnitude of the displacement along the optical axis between zone i and zone i+1;

wherein $d_i$ varies as a function of distance from the optical axis and the system has an on-axis diffraction efficiency (calculated or measured) at $\lambda_0$ which exceeds the system's on-axis diffractive efficiency (calculated or measured) at $\lambda_0$ when $d_i$ is constant across the SDS's clear aperture and is equal to $m\lambda_0/|n_1-n_2|$ where m is an integer and $n_1$ and $n_2$, as defined above, are the indices of refraction on either side of the stepped diffractive surface.

In accordance with another aspect, the invention provides an optical system for forming an image of an object, said system having an optical axis, an operative semi-field of view in the direction of the image, and an operative wavelength range which has a minimum wavelength $\lambda_{min}$, a maximum wavelength $\lambda_{max}$, and a primary or nominal wavelength $\lambda_0$ which lies between $\lambda_{min}$ and $\lambda_{max}$, said system comprising:

(A) at least one refractive or reflective optical surface having a non-zero optical power; and (B) at least one stepped diffractive surface which has a clear aperture and within said clear aperture comprises N concentric planar zones orthogonal to the system's optical axis which define a base curve, said zones satisfying the relationship:

$d_i/d_{i+1} < 2.0$, for i=1 to N−2, where $d_i$ is the magnitude of the displacement along the optical axis between zone i and zone i+1;

wherein the system has an average diffraction efficiency (calculated or measured) over the operative semi-field of view in the direction of the image at $\lambda_0$ which is equal to or greater than the system's average diffractive efficiency (calculated or measured) over the operative semi-field of view in the direction of the image at any other wavelength between $\lambda_{min}$ and $\lambda_{max}$.

As described in detail below, to achieve such maximization of the average diffraction efficiency, the step depth $d_i$ is selected to be different from that which the prior art teaches should be used for $\lambda_0$, e.g., for the case of a stepped diffractive surface at an interface between air and a material of refractive index n, the step depth is selected to be different from $m\lambda_0/(n-1)$, where m is an integer. This choice of step depth, in turn, results in maximum diffraction efficiency for $\lambda=\lambda_0$ at an off-axis point rather than on-axis. In other words, on-axis diffraction efficiency is sacrificed to achieve maximum average diffraction efficiency, an approach to the diffraction efficiency problem which has not previously been used in the art.

In accordance with another aspect, the invention provides a method for providing axial and/or lateral color correction for an existing lens system which comprises a plurality of existing lens elements, said method comprising:

(a) adding an element having a stepped diffractive surface to an existing lens system;

(b) adjusting the overall length of the optical system (i.e., the distance between the system's first and last optical surfaces) to accommodate an element with an SDS; and (c) defining the position of the SDS within the optical system so that the axial and/or lateral color of the system is reduced or corrected wherein the number of existing lens elements and their radii of curvature and composition are not changed.

In accordance with still further aspects, the invention provides:

(1) A method for reducing at least one aberration of an optical system which comprises (i) a stepped diffractive surface (SDS) and (ii) an optical surface which has optical power and is not a stepped diffractive surface (non-SDS), said method comprising:

(a) tracing rays through the system by representing the SDS by an equation which describes diffraction by a grating; and (b) using the rays traced in step (a) to select one or more parameters of the system which reduce said at least one aberration.

(2) A method for reducing at least one aberration of an optical system which comprises at least one optical element, said method comprising:

(a) incorporating an additional optical element in the system which comprises a stepped diffractive surface (SDS); and (b) selecting the spacing between the SDS and the at least one optical element;

wherein step (b) is performed by tracing rays through the system by representing the SDS by an equation which describes diffraction by a grating.

(3) An optical system comprising:
(a) a stepped diffractive surface (SDS); and
(b) an optical surface which has optical power and is not an SDS (non-SDS);
wherein the SDS makes an optically significant contribution to the correction of the optical system's lateral color.

(4) An optical system comprising:
(a) a stepped diffractive surface (SDS); and
(b) an optical surface which has optical power and is not an SDS (non-SDS);
wherein the SDS makes an optically significant contribution to the correction of the optical system's astigmatism.

(5) An optical system comprising:
(a) a stepped diffractive surface (SDS); and
(b) an optical surface which has optical power and is not an SDS (non-SDS);
wherein the SDS makes an optically significant contribution to the correction of the optical system's coma.

(6) An optical system comprising:
(a) a stepped diffractive surface (SDS); and
(b) an optical surface which has optical power and is not an SDS (non-SDS);
wherein the SDS makes an optically significant contribution to the correction of the optical system's distortion.

(7) An optical system comprising:
(a) a stepped diffractive surface (SDS); and
(b) an optical surface which has optical power and is not an SDS (non-SDS);
wherein the SDS makes an optically significant contribution to the correction of the optical system's spherical aberration.

(8) An optical system comprising:
(a) a stepped diffractive surface (SDS); and
(b) an optical surface which has optical power and is not an SDS (non-SDS);
wherein the SDS makes optically significant contributions to the correction of two of the optical system's aberrations.

(9) An optical system comprising:
(a) a stepped diffractive surface (SDS); and
(b) an optical surface which has optical power and is not an SDS (non-SDS);
wherein:
(1) the optical system has a field of view and a nominal wavelength $\lambda_0$; and
(2) the SDS has a constant step height selected to increase the SDS's average diffraction efficiency over the field of view at $\lambda_0$.

(10) An optical system comprising:
(a) a stepped diffractive surface (SDS); and
(b) an optical surface which has optical power and is not an SDS (non-SDS);
wherein:
(1) the optical system has a field of view and a nominal wavelength $\lambda_0$; and
(2) the SDS has a constant step height selected so that the maximum diffraction efficiency at $\lambda_0$ occurs at an intermediate field point within the field of view.

(11) An optical system comprising:
(a) a stepped diffractive surface (SDS); and
(b) an optical surface which has optical power and is not an SDS (non-SDS);
wherein the diffraction efficiency of the SDS is optimized for a wavefront incident on the SDS which is non-planar.

(12) An optical system comprising:
(a) a stepped diffractive surface (SDS); and
(b) an optical surface which has optical power and is not an SDS (non-SDS);

wherein the optical system has an optical axis and the diffraction efficiency of the SDS is optimized for a planar wavefront which, at the SDS, has a direction of propagation which is oriented at a non-zero angle to said axis.

(13) An optical system comprising:
 (a) a stepped diffractive surface (SDS); and
 (b) an optical surface which has optical power and is not an SDS (non-SDS);
 wherein the diffraction efficiency of the SDS is optimized over a spectral range.

(14) A stepped diffractive surface comprising a plurality of steps having a plurality of step heights wherein the step heights are not all equal within a diffraction order.

(15) A stepped diffractive surface comprising a base curve and a plurality of steps having a plurality of step heights wherein the base curve is an asphere and the step heights are not all equal within a diffraction order.

In connection with aspects (1) through (8) above, the SDS's contribution to the aberration(s) is preferably substantially balanced against the non-SDS's contribution to the aberration(s).

In the foregoing, the aberrations (monochromatic and/or chromatic) and the diffraction efficiencies can be calculated or measured. Also, as used herein, the phrase an "optically significant contribution" means that the contribution is to be evaluated in terms of the specifications and/or performance of the optical system. Thus, an optically significant contribution can be a very small contribution for a system which has stringent specifications and/or a high level of performance, e.g., a diffraction limited system. On the other hand, an optically significant contribution may need to be a large contribution for a system which has lenient specifications and/or a low level of performance. Persons skilled in the art can readily determine whether a contribution is optically significant or not for any particular application of the invention in accordance with their general experience in determining whether a contribution is of concern in terms of meeting desired specifications or performance criteria. The phrase "substantially balanced" means that the residual aberration resulting from the combination of the SDS's contribution to the aberration and the non-SDS's contribution to the aberration is not optically significant.

In accordance with an additional aspect, the invention provides methods for designing and producing optical systems which substantially satisfy predetermined specifications and which include at least one stepped diffractive surface comprising:
 (a) defining the stepped diffractive surface as a function of step heights $d_i$ and the shape of the base curve;
 (b) performing a ray trace through the optical system;
 (c) defining the system's aberrations;
 (d) optimizing the system, including the step heights $d_i$ and the shape of the base curve, based on the system's predetermined specifications.

In accordance with a further aspect, the invention provides methods for designing and producing optical systems which substantially satisfy predetermined specifications and which include at least one stepped diffractive surface comprising:
 (a) defining the stepped diffractive surface as a function of step heights $d_i$ and step widths $w_i$;
 (b) performing a ray trace through the optical system;
 (c) defining the system's aberrations;
 (d) optimizing the system, including the step heights $d_i$ and step widths $w_i$, based on the system's predetermined specifications.

Optical systems designed in accordance with either or both of the foregoing aspects of the invention can be produced using a variety of lens fabrication and assembly procedures well known in the art. The invention, of course, can also be practiced using fabrication and assembly procedures, which may be developed in the future. General discussions of applicable manufacturing techniques can be found in, for example, *The Handbook of Plastic Optics*, 2nd edition, U.S. Precision Lens Inc., Cincinnati, Ohio, 1983, and Horne, Douglas F., *Optical Production Technology*, 2nd ed., Adam Hilger, Ltd., Bristol, 1983, the relevant portions of which are incorporated herein by reference.

The stepped diffractive surface(s) used in connection with the foregoing aspects and embodiments of the invention can be made using a variety of techniques now known or subsequently developed. Examples of such techniques including machining of individual elements using, for example, a diamond turning machine or, more preferably, producing a master mold and forming elements having the desired diffractive surface using injection molding techniques. Elements having stepped diffractive surfaces, especially when made by molding, will generally be composed of a plastic material, e.g., an acrylic polymer, although other materials, e.g., glass materials, can be used if desired.

In addition to the foregoing, the invention also provides computer programs which embody the methods of the invention for designing optical systems which include an SDS. The programs can be embodied as an article of manufacture comprising a computer usable medium, such as a magnetic disc, an optical disc, or the like, upon which the program is encoded. The optical design data generated by the programs can similarly be stored on various types of storage media for distribution and or display (e.g., display as an image of the optical design either on paper or on a computer monitor).

These method-of-designing aspects of the invention are practiced on a digital computer system configured by suitable programming to perform the various computational steps. The computer system can comprise a general purpose scientific computer and its associated peripherals. The system should include means for inputting data and means for outputting the results of the design process both in electronic and visual form. The output can also be stored on a disk drive, tape drive, or the like for further analysis and/or subsequent display.

D. Differences Between the Invention and Prior Disclosures of Stepped Diffractive Surfaces The earliest reference discussing the use of a stepped diffractive surface in an optical system is A. I. Tudorovskii, "An Objective with a Phase Plate," *Optics and Spectroscopy*, Vol. 6(2), pp. 126–133 (February 1959). The optical system considered by Tudorovskii was a telescope objective and the stepped diffractive surface was designed to correct the system's secondary color, as opposed to its primary color.

Significantly, with regard to the present invention, the Tudorovskii article deals with an optical system which has essentially a zero angular field of view. Also, in Tudorovskii, the wavefront at the SDS surface is planar and orthogonal to the system's optical axis. The maximum SDS base curve sag in the Tudorovskii examples does not exceed 0.012 mm. That is equivalent to an optical path difference (OPD) of 10 waves or 0.006 mm.

Tudorovskii provides no disclosure with regard to balancing the monochromatic aberrations of SDSs against the monochromatic aberrations of non-stepped optical surfaces, no disclosure with regard to correcting lateral chromatic aberrations of an optical system with an SDS, no disclosure with regard to treatment of individual steps in the process of designing a lens system which includes an SDS, no disclosure of the use of the grating equation to determine the optical properties of an SDS, no disclosure of methods for optimizing the diffraction efficiency of an SDS, and no disclosure of an SDS having a variable step height within a diffraction order.

U.S. Pat. No. 5,153,778, which issued to Jose M. Sasian-Alvarado in 1992, also discloses a stepped diffractive surface. The Sasian-Alvarado system is monochromatic and the stepped diffractive surface is said to be useful for correcting field curvature and/or spherical aberration. The patent suggests use of a quadratic base curve to correct field curvature and a quartic base curve to correct spherical aberration.

With regard to the present invention, this patent does not mention correction of chromatic aberrations, axial or lateral, and does not include any disclosure of techniques for incorporating a color-correcting, stepped diffractive surface in a lens system. The patent does not mention correction of other monochromatic aberrations in addition to the ones listed above. Similarly, the patent has no disclosure with regard to the treatment of individual steps in the process of designing a lens system which includes an SDS, no disclosure of the use of the grating equation combined with the shape of the base curve to define a ray trace through an SDS, and no disclosure of methods for optimizing the diffraction efficiency of an SDS and, in particular, no disclosure of the use of variable step heights for that purpose. Significantly, the disclosure of this patent is entirely qualitative and does not include a single prescription for an SDS or any other components of an optical system.

In 1993, Jose M. Sasian-Alvarado and Russell A. Chipman published an article on stepped diffractive surfaces entitled "Staircase lens: a binary and diffractive field curvature corrector," *Applied Optics*, Vol. 32, No. 1, Jan. 1, 1993, pages 60–66 (the "Sasian/Chipman article"). In the article, the SDS is analyzed based on fourth order wave aberrations and the Sweatt model is used to perform the ray trace. (See W. C. Sweatt, Describing Holographic Optical Elements As Lenses, *JOSA*, V. 67, pp. 803–808, 1977; W. C. Sweatt, Mathematical Equivalence Between A Holographic Optical Element And An Ultra-High Index Lens, *JOSA*, V. 69, pp. 486–487, 1979.)

The fourth order aberration theory cannot substitute for an actual (real) ray trace and provides only an approximation. The Sweatt model can be used to trace rays through a general diffraction surface, but this model is not shape preserving and does not constrain the steps to be orthogonal to the optical axis. The concept of the optical power of a surface is used in optical design to calculate the paraxial properties of the optical system. When the optical power of the refractive substrate and the Sweatt model for the diffractive properties of an SDS are combined, the solution will have no paraxial power. Only a few steps in close proximity to the optical axis will retain the properties of a SDS, i.e., will have step surfaces perpendicular to the optical axis. To compensate for the local curvature of the substrate in the non-paraxial domain, the steps are not constrained to be perpendicular to the optical axis, i.e., they will constitute a kinoform rather than an SDS. As a result, the Sweatt model cannot be used to balance the monochromatic aberrations of a SDS against the monochromatic aberrations of non-stepped optical surfaces in an optical system based on an actual ray-trace.

In its Section 2(D), the Sasian/Chipman article discusses the use of an SDS to correct field curvature. In this example, the refractive lens and the stop position were chosen to correct coma and astigmatism and the SDS was located at the stop to correct field curvature. The example, however, does not account for other monochromatic aberrations introduced by the SDS, including astigmatism, coma and spherical aberration. Although the article does not include sufficient information to determine quantitatively the extent of correction of the field curvature in the above example, it is clear that there is no teaching on how the monochromatic aberrations of the SDS should be balanced against the monochromatic aberrations of other system components.

Placement of the SDS at the stop in this example means that the SDS can have no effect on the lateral color of the system. Accordingly, it is clear that Sasian/Chipman did not recognize the usefulness of SDSs in correcting this aberration. Similarly, Sasian/Chipman does not disclose or suggest SDSs having deep sags or high numbers of zones within the SDS's clear aperture. The maximum base curve sag of the SDS described in the Sasian/Chipman article does not exceed 0.192 mm, which corresponds to 150 steps and a maximum OPD of 150 wavelengths or 0.095 mm. Significantly, in use, the Sasian/Chipman SDS has a clear aperture defined by the stop of the system which is equal to 10 millimeters. This clear aperture corresponds to just 58 steps, an OPD of just 58 wavelengths, and a sag of just 0.075 millimeters.

Although primarily concerned with field curvature correction, the Sasian/Chipman article does mention the effects of a stepped diffractive surface on longitudinal chromatic aberration. In particular, the article discusses using an acrylic element having an SDS with a concave base curve on one surface and a plane on the other to correct the longitudinal chromatic aberration of a plano-convex lens composed of BK7 glass and having a focal length of 100 mm. The stepped diffractive surface is described as being located 58 mm behind the BK7 lens and as having a base curvature of 166.5 mm. It is thus located in a converging beam. (See Section 3(B) of the Sasian/Chipman article.)

Using the techniques of the present invention, calculations were performed for the combination of a plano-convex BK7 lens and a plane parallel plate made from acrylic. In particular, calculations were performed assuming that this combination was corrected for spherical aberration, i.e., assuming that at the primary wavelength of $\lambda_0=0.588\mu$, the convex surface of the BK7 lens had a radius of curvature of $-51.68$ mm and a conic constant of $-2.2947$. This combination was found to have an RMS spot radius of 0.05 microns which is less than the system's Airy disk radius of 2.6 microns, i.e., the original system was diffraction limited.

Replacement of a planar surface of the plate by an SDS element was found to introduce sizable spherical aberration into the system at the above mentioned primary wavelength since the SDS is in a converging wavefront. In particular, the RMS spot radius and the geometrical spot radius for the system at 0.588 microns were found to be 5.3 microns and 9.6 microns, respectively, while the Airy disk radius, as discussed above, was only 2.6 microns, i.e., the system employing an SDS was not diffraction limited at the primary wavelength.

Plainly, the Sasian/Chipman article does not disclose or suggest simultaneously correcting chromatic aberrations and balancing the monochromatic aberrations of an SDS against monochromatic aberrations of a system's non-stepped optical surfaces. If aberration balancing had been performed, the monochromatic performance of the refractive portion of the system would show monochromatic aberrations, including spherical aberration, of the opposite sign to that introduced by the SDS. The Sasian/Chipman article neither discloses nor suggests such "opposite sign" balancing.

U.S. Pat. No. 5,629,799, which issued to Maruyama et al. in 1997, as well as U.S. Pat. Nos. 5,796,520 and 5,883,774, which issued to Maruyama in 1998 and 1999, respectively, are devoted to using an SDS for correcting the axial color as well as spherochromatism of an optical system. At column 40, lines 17–20, of U.S. Pat. No. 5,629,799 caution is expressed against using hybrid diffractive lenses (i.e., lenses composed of a diffractive plastic element affixed to a glass element) in systems having a wide field of view. In particular, in discussing the types of systems other than those illustrated in their patent in which such hybrid lenses might be used, Maruyama et al. wrote: "It should be noted . . . that the hybrid lens is also applicable to other types of optical system unless the view angle is very wide."

The only example of the above patents which has a semi-field of view greater than 5° is Example 5E, the structure of which is shown in Maruyama's FIG. 72 and the prescriptions for which are set forth in Maruyama's Tables 6E and 7E. In particular, Table 6E sets forth the original catadioptric lens system of this example, and Table 7E sets forth the prescription for the SDS which is to replace surface 4 of the original prescription in order to provide axial color correction.

The original lens system without an SDS is well-corrected on-axis and at the same time has significant residual field aberrations. Using the prescription of Table 6E and conventional ray-tracing techniques, an RMS spot size radius of 0.84 microns (1.29 microns geometric radius) was determined for the original system at a primary wavelength of 0.5876 microns (the d-line of Maruyama's FIG. 73). This spot size is less than the system's Airy disk radius of 4.7 microns, i.e., the monochromatic performance of the original system is diffraction limited on-axis.

Using the techniques of the present invention, the RMS spot size radius on-axis of the system at the same wavelength with surface 4 replaced with the SDS defined by Table 7E was found to be 9.8 microns. That is, the RMS spot size increased more than ten-fold upon introduction of the SDS and was now more than twice the Airy disk radius of 4.7 microns.

Thus, with regard to on-axis monochromatic aberrations, introducing an SDS changed a well-corrected, diffraction limited system into one which can not be considered as diffraction limited. Because the level of correction of the off-axis aberrations was low, the contribution of the off-axis aberrations introduced by the SDS into the system was significantly less than the system's residual off-axis aberrations such that the level of correction of the off-axis aberrations was practically unchanged.

Plainly, this example of Maruyama et al. does not teach balancing the monochromatic aberrations of an SDS against monochromatic aberrations of a system's non-stepped surfaces. Rather, the example demonstrates that in correcting chromatic aberrations, an SDS can cause great harm to monochromatic performance unless the techniques of the present invention are employed.

For comparison, original surface 4 was also replaced with a plane. This modification of the system was found to degrade the system's monochromatic performance at the primary wavelength to essentially the same extent as the replacement of surface 4 with the SDS defined by Table 7E.

In addition to Example 5E, the above patents employ stepped diffractive surfaces in Examples 2, 2B, 3B, 5B, 3D, 4D, and 1E through 4E. Using the techniques of the present invention, it was determined that the SDSs of Examples 2B, 3B, 5B, 4D, and 1E have practically no effect on on-axis spherical aberration so that the monochromatic spot size is essentially unchanged when the SDS is replaced by a planar surface located at the SDS's vertex. For each of these examples, the SDS is located in collimated light parallel to the optical axis. Examples 2E through 4E in which the SDS is oriented at an angle with respect to the system's optical axis were not analyzed but are expected to behave similarly to Example 1E. All of the above examples have finite fields and substantial residual off-axis aberrations. Maximum base curve sag of the SDS in these examples does not exceed 0.158 mm (Example 4D, FIG. 57), which is equivalent to an OPD of 140 waves or 0.082 mm.

For Examples 2 and 3D, where the SDS was located in converging light, it was determined that the SDS introduces sizeable spherical aberration into the system and the RMS spot size decreases when the SDS is replaced with a plane located at the vertex of the SDS. That is, the SDS makes the monochromatic performance of the system at the reference wavelength worse, not better. Thus, once again, these examples illustrate the inability of the prior art to balance an SDS's monochromatic aberrations against monochromatic aberrations of non-stepped optical surfaces in the system. (In analyzing Example 2, it was assumed that the best imagery was located on axis in accordance with Maruyama et al.'s FIG. 6.)

As discussed above and in more detail below, in accordance with certain of its aspects, the present invention employs stepped diffractive surfaces in which the step height varies within a diffraction order. In connection with Example 3D, the Maruyama patents discuss decreasing step height by "about 1%" to provide equal "phase differences" for the central and peripheral annular segments of a high numerical aperture lens. (Maruyama et al. '799 patent at column 37, lines 36–58.)

Significantly, Maruyama et al. give no information regarding which annular segments should be considered central and which should be considered peripheral. Accordingly, there is no way of knowing from this reference where the decrease in step height should begin. Moreover, the reference does not teach whether all peripheral step heights should be decreased by the same amount or whether some should be decreased more than others. In the end, Maruyama et al. teach away from varying the step height and use a constant step height for Example 3D: "[T]he discontinuity in phase that occurs if the difference in thickness between annular segments is made equal in the whole part of the lens will cause no problem in practical applications. Therefore, in Example 3D under discussion, ΔN is expressed as a linear function of N and the difference in thickness between individual annular segments is set to be equal in both the central and peripheral parts of the lens." (Maruyama et al. '799 patent at column 37, lines 51–58.)

In the above mentioned patents, the lateral color introduced by the SDS is ignored. It is believed by Maruyama et al. that an SDS corrector can be placed "any distance" from the lens with the field of view ranging from 1.4 degrees to 1.7 degrees (see Table 5B from example 2B, Table 7B from example 3B, and Table 13B from example 5B). In fact, as can be shown using the ray trace techniques of the present application, displacement of the SDS from the lenses shown in the above examples will introduce lateral color and the lateral color can exceed other aberrations of the system, making the performance of the system unacceptable.

E. The Aberrations of Stepped Diffractive Surfaces

The optical systems with which the present invention is concerned are typically those which comprise one or more elements which together have a non-zero optical power. Because the index of refraction of optical materials varies with wavelength, such systems exhibit chromatic aberrations, both axial and lateral, and much effort has been expended in developing techniques for dealing with these aberrations.

(1) Axial Chromatic Aberration

Axial chromatic aberration is an aperture dependent aberration. It manifests itself as a change in focus position along a system's optical axis with a change in wavelength. For an optical system designed to have an operative wavelength range which extends from a minimum wavelength $\lambda_{min}$ to a maximum wavelength $\lambda_{max}$, the system's axial chromatic aberration can be quantified by calculating (or measuring) the system's shortest and longest focal points within the operative wavelength range and then calculating (or measuring) the distance along the optical axis between those calculated (or measured) focal points.

This calculated (or measured) distance will be referred to herein as the "optical system's axial chromatic aberration or, more simply, as the "axial color," and one of the objects of the invention is to hold this parameter within the design specifications (performance requirements) of the optical system.

Depending on its shape, an SDS may exhibit axial color having a sign (direction) opposite to that of the optical system to be corrected. The one or more stepped diffractive surfaces can be the sole means for correcting axial chromatic aberration or can be combined with other techniques, e.g., the stepped diffractive surface(s) can be combined with one or more color-correcting doublets or kinoform diffractive lenses and their binary counterparts.

When calculated focal points are used to evaluate the chromatic aberration parameter, such focal points are obtained from: (1) measured or prescription values for the optical elements of the system; (2) measured or modeled values for the indices of refraction of the optical elements as a function of wavelength; and (3) a lens design computer program, such as the program sold by Focus Software Incorporated, Tucson, Ariz., under the trademark ZEMAX, the program sold by Optical Research Associates, Pasadena, Calif., under the trademark CODE V, or other commercial or non-commercial programs having similar capabilities. When the system includes a stepped diffractive surface, the techniques disclosed below for incorporating such a surface in the lens design process are used in determining the system's axial chromatic aberration.

When measured values are used, such values can be obtained using, for example, an optical bench.

As discussed above, most of the prior disclosures of SDSs related to correction of axial color.

(2) Lateral Chromatic Aberration

Lateral chromatic aberration, or lateral color, is a chromatic difference of magnification of an optical system. It is a field dependent aberration and manifests itself as a change in height of the chief ray at the image plane with a change in wavelength. Since it is a field-dependent aberration, lateral color has an insignificant effect in systems with small fields of view. At the same time, lateral color can play a detrimental role in systems with finite fields.

For an optical system designed to have an operative wavelength range which extends from a minimum wavelength $\lambda_{min}$ to a maximum wavelength $\lambda_{max}$, the system's primary lateral chromatic aberration can be quantified for a given field by calculating (or measuring) the highest and the lowest intersection points of a chief ray with the image plane for wavelengths within the operative wavelength range and then calculating (or measuring) the distance between those points in that plane.

This calculated (or measured) distance will be referred to herein as the "optical system's lateral color for a wavelength range from $\lambda_{min}$ to $\lambda_{max}$" or, more simply, as the "lateral color". One of the objects of the invention is to hold this parameter within the design specifications (performance requirements) of the optical system by means of one or more stepped diffractive surfaces.

In accordance with the invention, it has been determined that an SDS placed away from an optical system's aperture stop introduces lateral color into the system. The amount of lateral color introduced by the SDS is dependent on the shape and position of the SDS in the optical system. Since the SDS introduces lateral color into an optical system, it can be used to correct lateral color produced by other components (surfaces) in the system. The one or more stepped diffractive surfaces can be the sole means for correcting lateral color or can be combined with other techniques, e.g., the stepped diffractive surface(s) can be used in combination with appropriate selection of materials for the refractive components in the system, or with diffractive kinoform lenses and their binary counterparts.

Correction of the lateral color of the optical system should not compromise the system's performance with regard to axial color. An optical element that affects lateral color will also introduce changes in the axial color of the system. This means that when SDS is used to correct the lateral color of the optical system, the SDS's effect on axial color must also be taken into account in the design of the system. In optical systems with extended fields, the correction of chromatic aberrations usually requires the correction of both axial and lateral chromatic aberrations, making that task much more difficult compared to optical systems with small fields of view, where only the axial chromatic aberration needs to be accounted for and corrected.

As in the evaluation of axial color, when calculated intersection points are used to evaluate lateral color, such points are obtained from: (1) measured or prescription values for the optical elements of the system; (2) measured or modeled values for the indices of refraction of the optical elements as a function of wavelength; and (3) a lens design computer program, such as the program sold by Focus Software Incorporated, Tucson, Ariz., under the trademark ZEMAX, the program sold by Optical Research Associates, Pasadena, Calif., under the trademark CODE V, or other commercial or non-commercial programs having similar capabilities. When the system includes a stepped diffractive surface, the techniques disclosed below for incorporating such a surface in the lens design process are used in determining the system's lateral chromatic aberration.

Again as in the case of the axial color, when measured values are used, such values can be obtained using an optical bench.

As discussed above, there were no suggestions in the prior art regarding using an SDS to correct the lateral color of an optical system. Rather, the lateral color introduced by an SDS was totally ignored. In particular, in U.S. Pat. Nos. 5,629,799, 5,796,520 and 5,883,774 do not in any way take into account the lateral color introduced by the SDSs disclosed in those patents.

(3) Monochromatic Aberrations of Stepped Diffractive Surfaces

Chromatic aberrations are, of course, only a few of many aberrations that can affect the performance of an optical system. Monochromatic aberrations are at least as important as chromatic aberrations. Most of the monochromatic aberrations are aperture dependent and some of them are also field dependent. In particular, as is well known in the art, the primary monochromatic aberrations other than spherical aberration, i.e., coma, astigmatism, field curvature, and distortion, as well as the lateral chromatic aberration discussed above, are field dependent aberrations. These aberrations become more difficult to correct as the field of view increases.

The effects of system aberrations (chromatic and/or monochromatic) can be evaluated using a variety of computation (and measurement) techniques known in the art. Representative examples of the techniques include, but are not limited to, computing the spot size (also known as blur spot size), modulation transfer function (MTF), Strehl ratio, wave aberrations, and edge response function. The above techniques can be used for the evaluation of both monochromatic and polychromatic performance of the optical system. The polychromatic system performance is computed based on the weighted performance average at several wavelengths within the operative wavelength range of the system. The measure of monochromatic aberrations is evaluated at least at a representative (primary) wavelength $\lambda_0$ within the system's operative wavelength range (also referred to as the "reference wavelength" or the "nominal wavelength"). The selected wavelength may be the system's central wavelength (i.e., $\lambda_0=(\lambda_{min}+\lambda_{max})/2$), but can be a different wavelength depending upon the design criteria for the system.

In the examples presented below, the level of correction of monochromatic aberrations is assessed in most cases using a computed geometric blur spot size. It is to be understood that the use of this measure is for purposes of illustration only and is not intended to limit the invention in any way. As will be evident to persons skilled in the art, other measures of monochromatic aberrations now known or subsequently developed can equally be used in the practice of the invention.

In the case when the level of aberration correction of the original optical system is low, the aberrations introduced by an SDS may not substantially affect the image quality of the system. On the other hand, for systems with a high level of aberration correction, even a small amount of aberrations introduced by an SDS can play a detrimental role in system performance. It is the relative contribution of the aberrations of the SDS to the total aberrational budget of the optical system that affects the performance of the optical system.

In accordance with the invention, it has been determined that the aberrations introduced by an SDS into an optical system are in general proportional to the sag of the SDS substrate, the curvature of the incident wavefront, and the operative semi-field of view of the system.

Prior discussions of the use of SDSs in optical systems were concerned with the correction of only a limited subset of the aberrations actually introduced by an SDS. The discussions were limited primarily to the correction of aperture dependent aberrations, such as axial color, spherical aberration and spherochromatism, even in systems with finite, i.e. nonzero, fields where SDSs, in fact, introduce a variety of field dependent aberrations. For the cases where correction of a field dependent aberration was discussed, i.e., field curvature in the Sasian patent and the Sasian/Chipman article, correction of the rest of the aberrations introduced by the SDS, including other field dependent monochromatic aberrations and chromatic aberrations, was not done. Introduction of an SDS into an optical system with a finite field of view (FOV) will unavoidably affect the field aberrations of the optical system, including the field curvature, astigmatism, coma and higher order aberrations, and, unless placed at the stop location, will affect the lateral color. Correction only of the field curvature in a system with a finite FOV does not assure adequate system performance. It is believed that the prior art's inability to account for the actual aberrations introduced into an optical system by an SDS was due to the lack of techniques for real ray tracing through optical systems containing an SDS. As a result, the prior art could not accurately determine the optical effects, including monochromatic effects and effects on lateral color, of an SDS in an optical system.

Most of the prior art discussions were also limited to the case when the SDS was placed in a collimated beam so that the wavefront of light at the primary wavelength propagating through the SDS is planar. In the few cases of a nonplanar wavefront, it was erroneously believed that the SDS would have no effect on the aberrations of the optical system (see the Maruyama patents).

In sum, the prior art limited itself to optical systems where there was at least one of the following conditions: (1) field dependent aberrations were neglected, corresponding to systems with practically zero FOV; (2) not more than two aberrations from several introduced by the SDS were considered; (3) the stepped diffractive surface was employed at the stop location and the wavefront incident on the SDS was planar and was directed along the system's optical axis; (4) the effects of the wavefront curvature at the primary wavelength propagating through the SDS on monochromatic performance of the optical system were neglected; and/or (5) the overall monochromatic performance of the system was relatively poor, so that the aberrations introduced by the SDS were substantially smaller than the aberrations of the initial system. Under these conditions, it was apparently believed that an SDS could be analyzed qualitatively, e.g., through the use of wavefront graphs with phase delays, or semi-quantitatively, e.g., through the use of the Sweatt model. Nowhere in the prior art is there any disclosure of a lens design process in which the dimensions of the individual steps of an SDS, their actual heights and widths, are taken into account.

In particular, there is no disclosure in the prior art where all real ray aberrations introduced by an SDS into an optical system, as opposed to just a limited number of aberrations, has been accounted for in the design process and balanced against the aberrations of the rest of the system. Balancing the aberrations of an SDS means that the performance of the optical system will deteriorate and its aberrations will increase when the SDS is replaced by the equivalent optical power refractive surface. In many cases that equivalent optical power refractive surface is a plane, but it may be refractive surface with optical power when the SDS has optical power at the reference wavelength. There also is no disclosure in the prior art where the SDS is positioned away from the stop of the optical system in order to correct the lateral chromatic aberration of the system. Nowhere in the prior art is there any disclosure of the real ray aberrations, chromatic and monochromatic, introduced into an optical system due to the wavefront incident on the SDS being not planar and/or at an angle to the optical axis of the system.

Significantly, as revealed by the present invention, the locations of the individual steps of an SDS (their heights and widths) are important for evaluation of the real ray aberrations of the SDS. For the general case, by incorporating the locations of the individual steps in the lens design process, SDSs can be effectively employed in essentially any optical system, including systems which have significant fields of view, non-planar wavefronts, and/or excellent correction of monochromatic and chromatic aberrations. This represents an important advance in the art since it allows the full aberration-correcting potential of stepped diffractive surfaces to be achieved.

It is clear that in any optical system employing an SDS all aberrations should be considered, including the monochromatic and chromatic aberrations. In a properly designed optical system, the aberrations of an SDS should be accounted for and balanced with/against the aberrations of the rest of the system. As discussed below, in certain of its aspects, the present invention employs one or more stepped diffractive surfaces (SDSs) to achieve color correction (balancing) of an optical system and, at the same time, balances the monochromatic aberrations of the SDS against monochromatic aberrations of non-stepped optical surfaces in the system. This combination of correction (balancing) of chromatic aberrations and balancing of monochromatic aberrations in an optical system employing an SDS has not previously been taught or achieved in the art.

F. The Fundamental Misconception of the Prior Art

Beginning with Tudorovskii and continuing through to Maruyama et al., prior discussions of SDSs have assumed that such surfaces can be understood in terms of their effects on the phase relationship between different parts of a wavefront. As Tudorovskii stated in 1959: "The plate formed by joining together cylindrical rings separates light rays parallel to the axis into cylindrical bundles and imparts to them different phases without changing their direction . . ."; "The introduction of the phase plate PP does not change the geometrical path of the rays, but divides the spherical surface QQ into spherical zones with different phases . . ."; and "A phase plate, computed for a wavelength $\lambda_0$ and located . . . in a parallel beam of the same wavelength $\lambda_0$, does not influence the image of an infinitely remote point . . ." (Tudorovskii at pages 171, 172, and 174, respectively; emphasis added.)

Following this line of reasoning, the Sasian patent, the Sasian/Chipman article, and the Maruyama patents each include a figure which shows a planar wavefront remaining planar after passing through or being reflected by an SDS. See, for example, FIG. 3 of the Sasian patent (U.S. Pat. No. 5,153,778), FIG. 2 of the Sasian/Chipman article, and FIG. 60 the Maruyama patents. The step height of the SDS was chosen by the prior art to be: $d_i = j_i \lambda_0 / |(n_2 - n_1)|$.

It was not realized by the prior art that:
(a) It is the grating equation (see (10.3) below) that governs the ray propagation through an SDS and affects the system aberrations. That is, an SDS can be considered as a grating with a variable step spacing (or width $w_i$) placed on a non-planar substrate defined by the shape of the base curve and the blaze angle of the grating is constrained to maintain the planar step boundaries perpendicular to the optical axis.
(b) The specific step heights of an SDS are important primarily only for distributing the light between the different orders of diffraction, i.e., they primarily affect only the diffraction efficiency (DE). Instead of taking into account (a) and (b), the prior art used the phase shift reasoning exemplified by the above-referenced figures of the Sasian patent, the Sasian/Chipman article, and the Maruyama patents. This reasoning does not allow one to reach any meaningful conclusions regarding propagation through an SDS. Moreover, in the Sasian patent, it led to wrongful conclusions regarding wavefront curvature, i.e., it led to the conclusion than an on-axis planar wavefront will remain planar after interaction with an SDS regardless of the widths of the zones making up the SDS. The fundamental problem with the phase shift reasoning is that it does not provide real ray-tracing of an optical system.

Under the phase shift reasoning, an SDS of constant step height illuminated with a planar wavefront, i.e., collimated light which is parallel to the optical axis, will not produce monochromatic aberrations at the reference wavelength. In accordance with the present invention, it has been determined that this existing conception of the effects of an SDS on a planar wavefront is incorrect. In fact, an SDS of constant step height introduces monochromatic aberrations at the reference wavelength, specifically, spherical aberration, into a planar wavefront propagating along the optical axis. That is, spherical aberration depends on the zone width $w_i$ and/or the base curve shape of the SDS.

In contrast to the phase shift reasoning of the prior art, the present invention treats an SDS as a grating with a groove width $w_i$, which is a function of radial distance from the optical axis, placed on a non-planar substrate defined by the base curve. The blaze angle of the grating is constrained in such a manner that the bounding surfaces of the microstructure are perpendicular to the optical axis. The groove spacing of the grating affects the direction of rays propagating through the SDS. The height of the SDS steps affects the efficiency of light propagating into different diffractive orders and does not substantially affect the direction of rays or the wavefront propagating through the SDS. For a given step height $h_i$ and shape of the SDS base curve, the radial spacing $w_i$ is uniquely defined. This, in turn, defines the direction of light propagating through the SDS. Changing the base curve of the substrate without changing the heights of the steps changes the groove spacing, causing a change in the wavefront (direction of rays) of light propagating through the SDS. This was not understood in the prior art.

As shown below, a planar wavefront propagating along the optical axis through an SDS with a spherical substrate and a constant step height defined by equation (B) above exhibits spherical aberration at the primary wavelength. This spherical aberration is proportional to the sag of the SDS substrate and increases with an increase of the SDS's maximum clear aperture and the curvature of the base curve. To illustrate this consider a singlet 20 with focal length of 100 mm made from acrylic and having a planar entrance surface 21 and a refractive exit surface 22, as illustrated in FIG. 2A. Surface 22 has optical power and is characterized by a radius −49.1668 mm and conic constant −2.2251. During the calculations, the nominal wavelength was chosen to be 0.588 microns, corresponding to an SDS step height of 1.195 microns. The light impinging on the entrance surface 21 of the singlet was assumed to be at the reference wavelength, collimated and parallel to the optical axis. The shape of surface 22 of the singlet was chosen such that the spherical aberration of the singlet at the nominal wavelength was completely corrected, making the singlet diffraction limited.

Replacing the plane surface 21 by an SDS introduces spherical aberration into the system. When the radius of curvature of the SDS is large and the aperture is small, the amount of spherical aberration produced by the SDS is insignificant. For example, when the SDS has a radius of curvature of −845 mm and an aperture size of 20 mm, the amount of spherical aberration is negligible and the singlet remains diffraction limited. The situation, however, changes with a reduction of the SDS radius and/or an increase in clear aperture.

FIGS. 2B and 2C are ray fan plots showing the spherical aberration produced by the singlet as the characteristics of the SDS are changed. OBJ represents the object size in millimeters, EY and EX represent the tangential and sagittal directions in the image plane, and PY and PX represent the tangential and sagittal directions in the pupil of the system. The scales of FIGS. 2B and FIG. 2C are +/−10 microns and +/−5 microns, respectively.

In the case corresponding to FIG. 2B, the SDS's base curve had a radius −50 mm and the aperture remained 20 mm. In FIG. 2C, the SDS's base curve had a radius −845 mm and the aperture was increased to 168.5 mm. In each case the focal length of the singlet remained at 100 mm. The spherical aberration introduced by the SDS was 6.3 microns and 3.6 microns for the two cases, respectively, whereas the radius of the Airy disk was 3.6 microns and 0.7 microns, respectively. These SDSs clearly made the singlet not diffraction limited.

As can be seen from this basic example, a planar wavefront propagating parallel to the optical axis through an SDS with a constant step height and a spherical base curve does exhibit spherical aberration at the reference wavelength, an effect not previously recognized in the art, and that aberration can severely reduce the performance of the optical system. That aberration shows up at relatively high apertures and/or high curvatures of the SDS base surface.

As shown below, an SDS introduces even more severe aberrations when the propagating wavefront is not planar and/or is propagating at an angle to the optical axis.

In view of these considerations, it is clear that an SDS cannot simply be treated as a phase element, as incorrectly believed in the prior art. An SDS is a diffractive element, and it has diffractive effects governed by the grating equation, which lead to monochromatic aberrations at the reference wavelength.

In another basic case, when a planar wavefront is propagating at an angle to the optical axis of an SDS with a spherical base curve and a constant step height, several field dependent aberrations are introduced, including field curvature, astigmatism and coma. FIG. 3 illustrate these effects. In FIG. 3A, numeral 31 denotes an SDS with base curve radius of 166.5 mm positioned at a stop having a radius of 5 mm. This figure thus corresponds to the example of the Sasian/Chipman article. Numeral 32 denotes an "ideal" lens, i.e., a mathematical model of a thin lens that has optical power and no aberrations. Numeral 33 denotes the image plane. The traced rays correspond to a wavelength of 0.6328 microns and to two field positions: on-axis field and a 30° field. The position of the image plane is adjusted to bring the tangential ray bundle for 300 field in focus.

FIG. 3B shows the ray aberration curves corresponding to this case, where OBJ represents the object field angle in degrees, EY and EX represent the tangential and sagittal directions in the image plan, and PY and PX represent the tangential and sagittal directions in the pupil of the system. The scale for FIG. 3B is +/−100 microns. As can be seen in this figure, the SDS introduces both astigmatism and coma into the system.

An SDS introduces an even wider variety of aberrations when the incident wavefront is not collimated and/or a finite spectral band is considered.

As discussed above, the magnitude of the monochromatic aberrations introduced by an SDS at the reference wavelength depends on the SDS's clear aperture and the curvature of its base curve. An increase in either or both of these factors leads to an increase in the sag of the SDS base curve. The base curve sag can be used as a qualitative measure of aberrations introduced by an SDS. The magnitude of monochromatic aberrations also depends on the field angle and the wavefront curvature of propagating light, as well as the microstructure geometry of the SDS. It is this important discovery which forms the basis of the present invention's improvements on the prior uses of SDSs in optical systems.

The computed base curve sags of the SDSs of FIGS. 2B and 2C were 1.0 mm and 4.2 mm, respectively, which corresponds to OPDs of 846 waves or 0.497 mm and 3524 waves or 2.072 mm, respectively. The highest base curve sag value for an SDS employed in the prior art was calculated to be 0.192 mm in the Sasian/Chipman article (OPD of 150 wavelengths or 0.095 mm). However, in use, Sasian/Chipman located their stop at the SDS and limited the aperture to 10 mm so that the effective sag was only 0.075 mm. As shown above (see FIG. 3B), even this small amount of sag results in a significant amount of off-axis aberrations at a 30° field.

In accordance with one aspect of the invention, the monochromatic aberrations shown in FIG. 2 can be effectively reduced by making the SDS's base curve aspherical. As set forth above, the geometric spot size radius for the singlet of FIG. 2B with a spherical base curve was 6.3 microns (RMS spot size radius of 3.0 microns) while the Airy disk radius was 3.6 microns, i.e., the system is not diffraction limited. By aspherising the base curve by using a conic constant of −50, the geometric and RMS spot size radii are reduced to 0.5 and 0.3 microns, respectively, i.e., with this change, the monochromatic aberrations are reduced to a level that makes the system diffraction limited. Similarly, for FIG. 2C, the geometric and RMS spot size radii for a spherical base curve are 3.6 microns and 1.6 microns, respectively, while the Airy disk radius for this case is 0.7 microns. Thus, as for the FIG. 2B example, for a spherical base curve, the system is not diffraction limited. By employing a base curve having a conic constant of −600, the geometric and RMS spot size radii are reduced to 0.07 and 0.04 microns, respectively. With this change, the spherical aberration is substantially smaller than the diffraction blur attributable to the lens' aperture (Airy disk radius is 0.7 microns) and the system is considered to be diffraction limited.

Although a conic constant has been used to introduce asphericity into the base curve, it is to be understood that other mathematical formulations can be used for this purpose, including polynomial aspheres, splines, etc. It should be noted that for the case when the SDS step height is constant and the impinging wavefront is planar there always exists some residual spherical aberration and by aspherizing the base curve the spherical aberration introduced by an SDS is reduced to an acceptable level but not completely eliminated.

The Maruyama patents discussed above employ aspherical base curves in some of their SDS examples. This asphericity, however, is not used to eliminate monochromatic aberrations (spherical aberration in particular) at the reference (primary) wavelength, but rather was intended to correct spherochromatism introduced into the system at wavelengths other than the reference (primary) wavelength. As discussed above, the Maruyama patents, as well as the rest of the prior art, worked under the assumption that an SDS with a spherical base curve and a constant step height when illuminated with a planar wavefront does not exhibit monochromatic aberrations at the reference wavelength, an assumption which the present invention, with its method of preserving the normal-to-the-axis-orientation of individual steps through the use of the grating equation to analyze an SDS, shows was wrong.

In summary, the prior art considered an SDS as a phase-shifting structure that divides the incoming wavefront into several individual portions and introduces optical path differences that are multiples of the nominal wavelength. The fact that it is diffraction that governs light propagation through the system and that the grating equation should be used to perform a real ray-trace was neither disclosed nor recognized in the art. The optical path difference between the individual portions of the wavefront is important to achieve a certain level of diffraction efficiency for an SDS at a given wavelength, but is not sufficient to permit an SDS to be incorporated in practical, real world optical systems. Moreover, the prior art thought that to obtain the maximum diffraction efficiency an SDS with a constant step height should be employed. It was not realized that to obtain the highest DE the step height may need to be made a function of the incident wavefront curvature and/or field angle.

G. Diffraction Efficiency

As is well known in the art, optical systems which employ diffractive elements can suffer from low diffraction efficiency as a result of substantial amounts of light being diffracted into orders other than the design order for the system. None of the prior uses of stepped diffractive surfaces have specifically addressed this problem and none have provided techniques for optimizing the diffraction efficiency of optical systems employing such surfaces. As discussed below, in certain embodiments, the present invention addresses and solves this problem by intentionally sacrificing on-axis diffraction efficiency in order to maximize average diffraction efficiency. In other embodiments, the diffraction efficiency at the nominal wavelength $\lambda_0$ is maximized by selecting a step height different from the value suggested in the prior art of $d_i = j_i \lambda_0 / |n_2 - n_1|$.

IV. BRIEF DESCRIPTION OF THE DRAWINGS

FIG. 9 presents ray aberration curves for the achromatic singlets of the first group.

Figure 10:
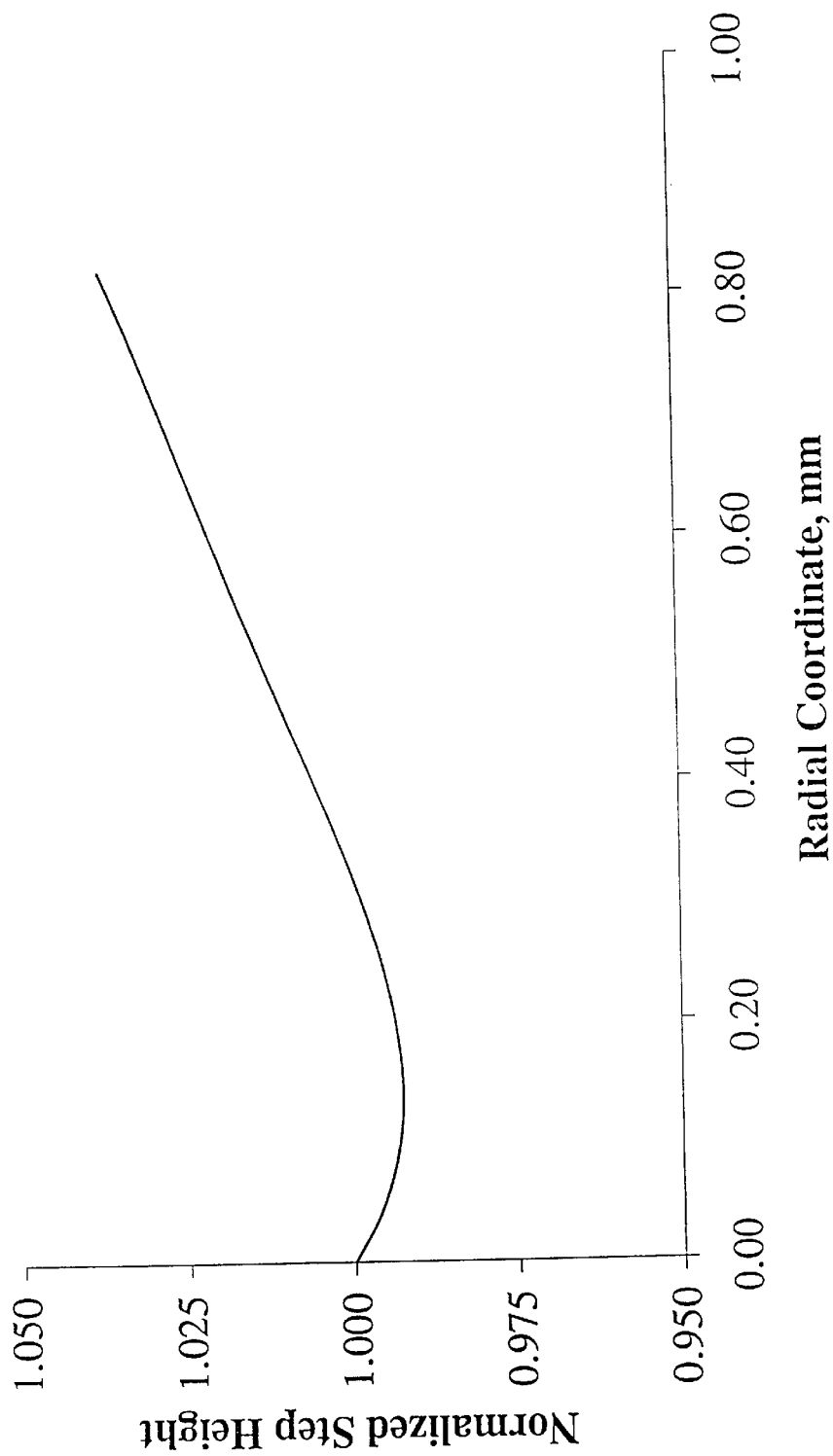

FIG. 10 is a plot of SDS step height as a function of radial coordinate for singlet #3.

FIG. 11 is a schematic layout of achromatic singlets #6 through #11 of Example 1 (hereinafter the "second group").

FIG. 12 presents ray aberration curves for the achromatic singlets of the second group.

Figure 13:
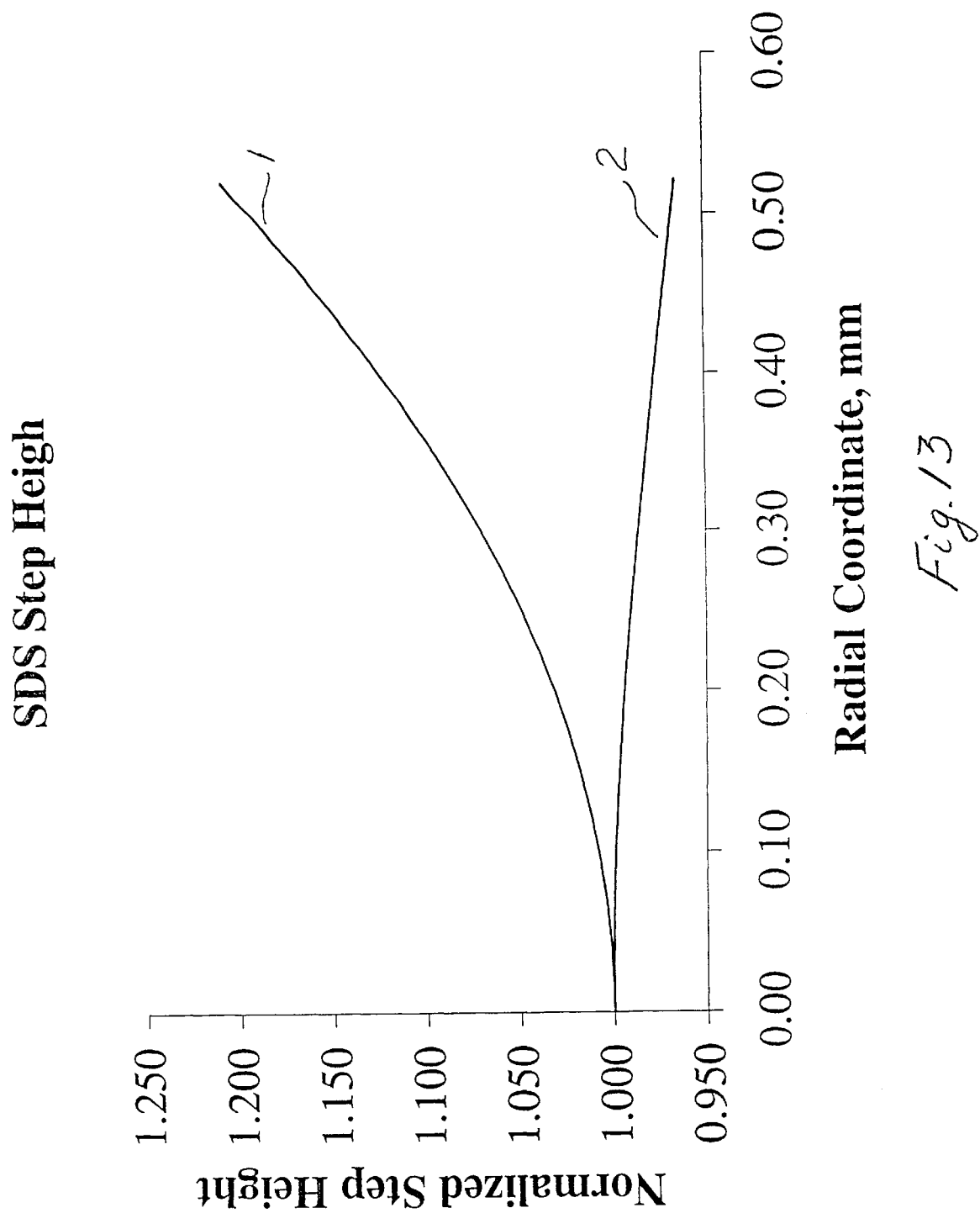

FIG. 13 is a plot of SDS step height as a function of radial coordinate for singlets #8 and #9.

Figure 14:
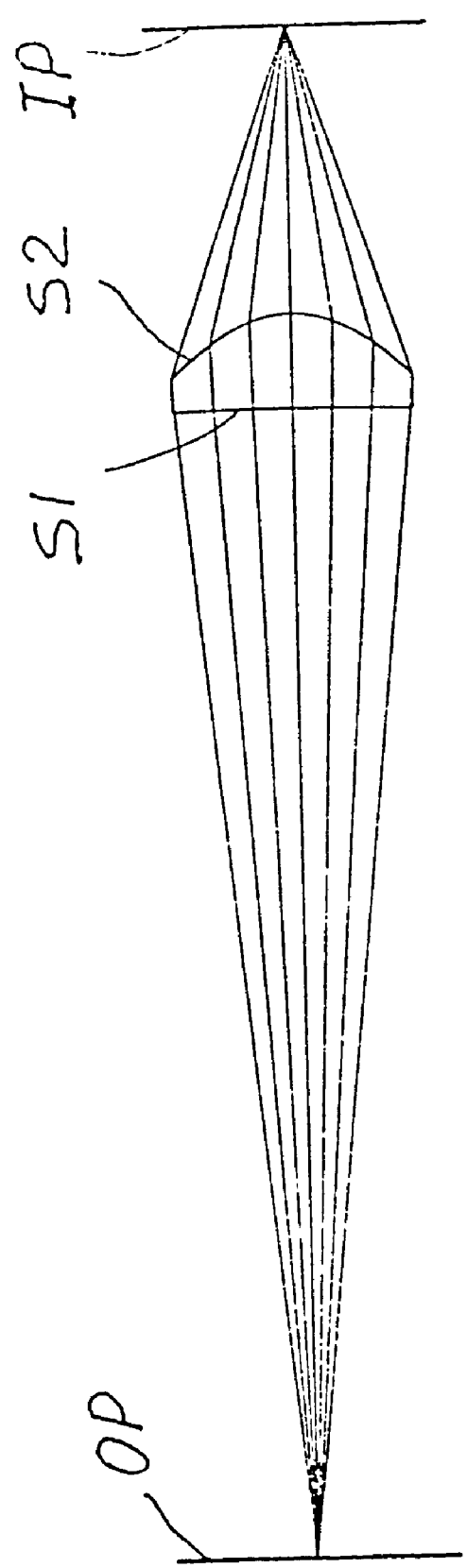

FIG. 14 is a schematic layout of achromatic singlets #12 through #17 of Example 1 (hereinafter the "third group").

FIG. 15 presents ray aberration curves for the achromatic singlets of the third group.

Figure 16:
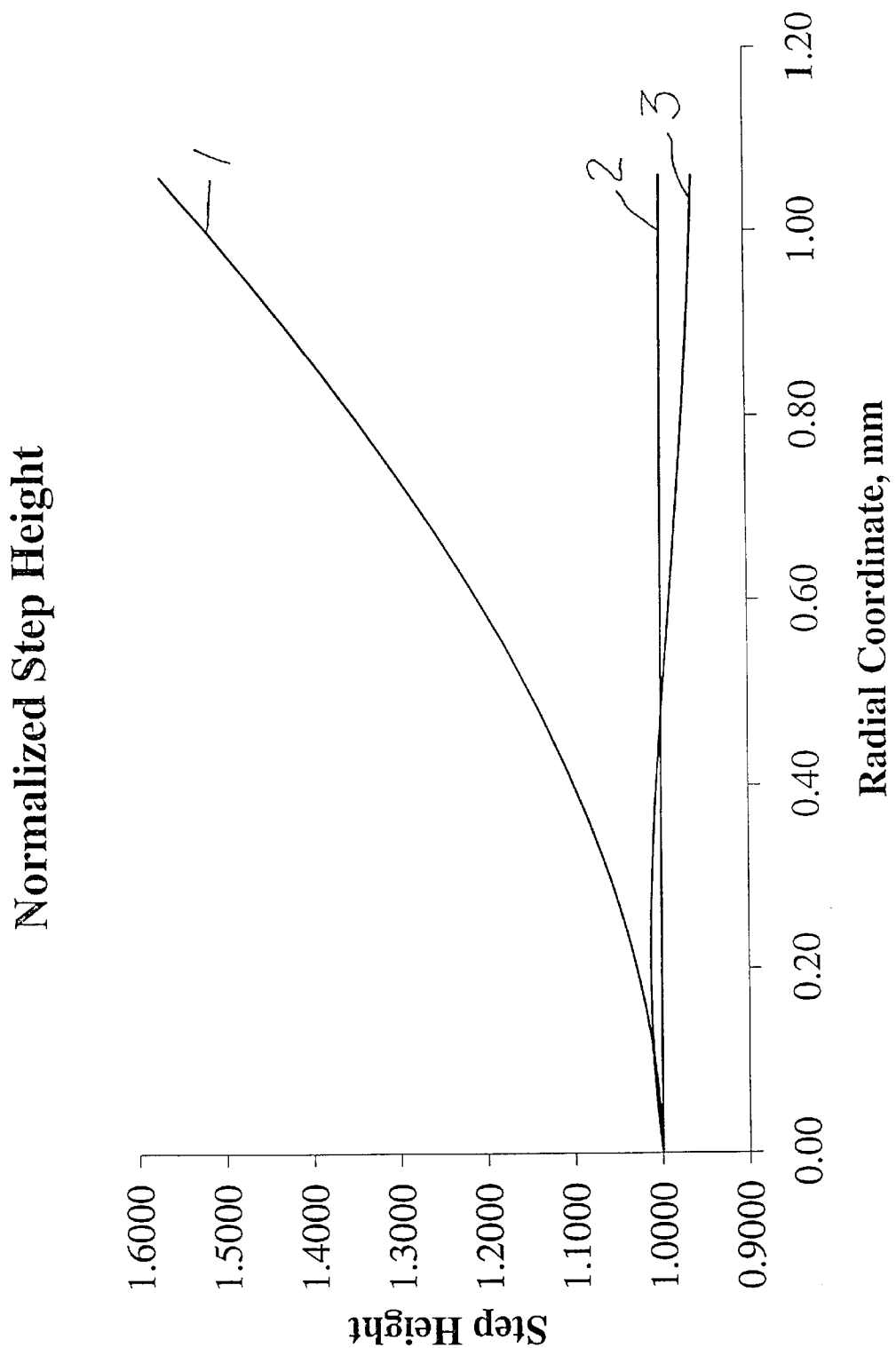

FIG. 16 is a plot of SDS step height as a function of radial coordinate for singlets #14 through #17.

Figure 17:
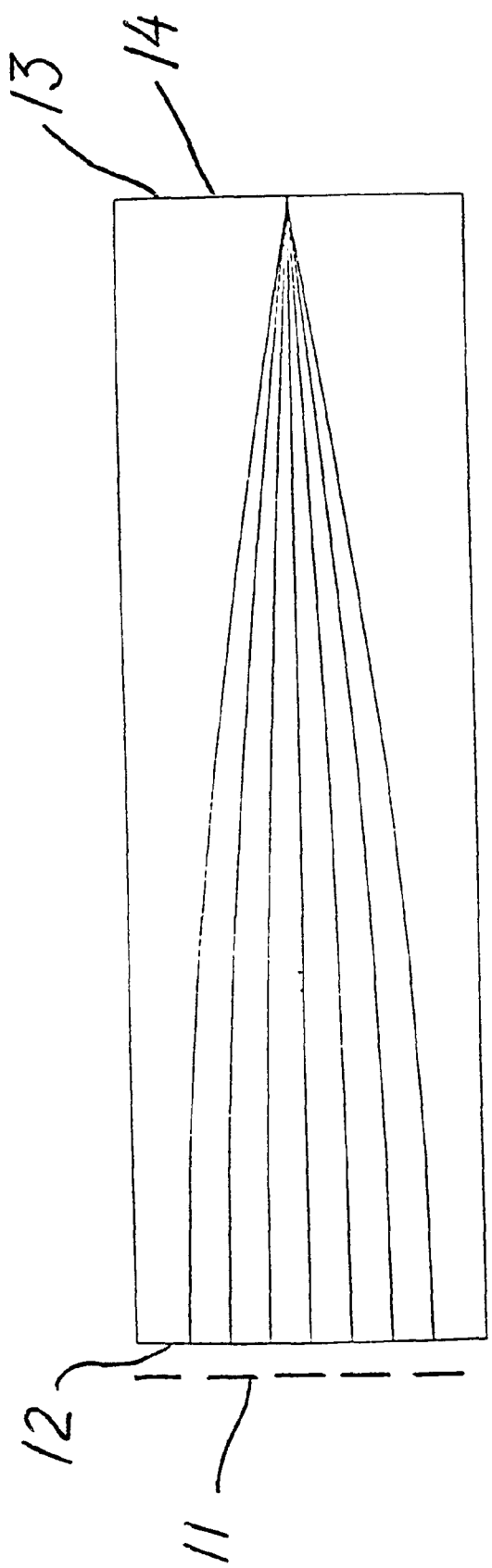

FIG. 17 is a schematic layout of a GRIN lens.

Figure 18:
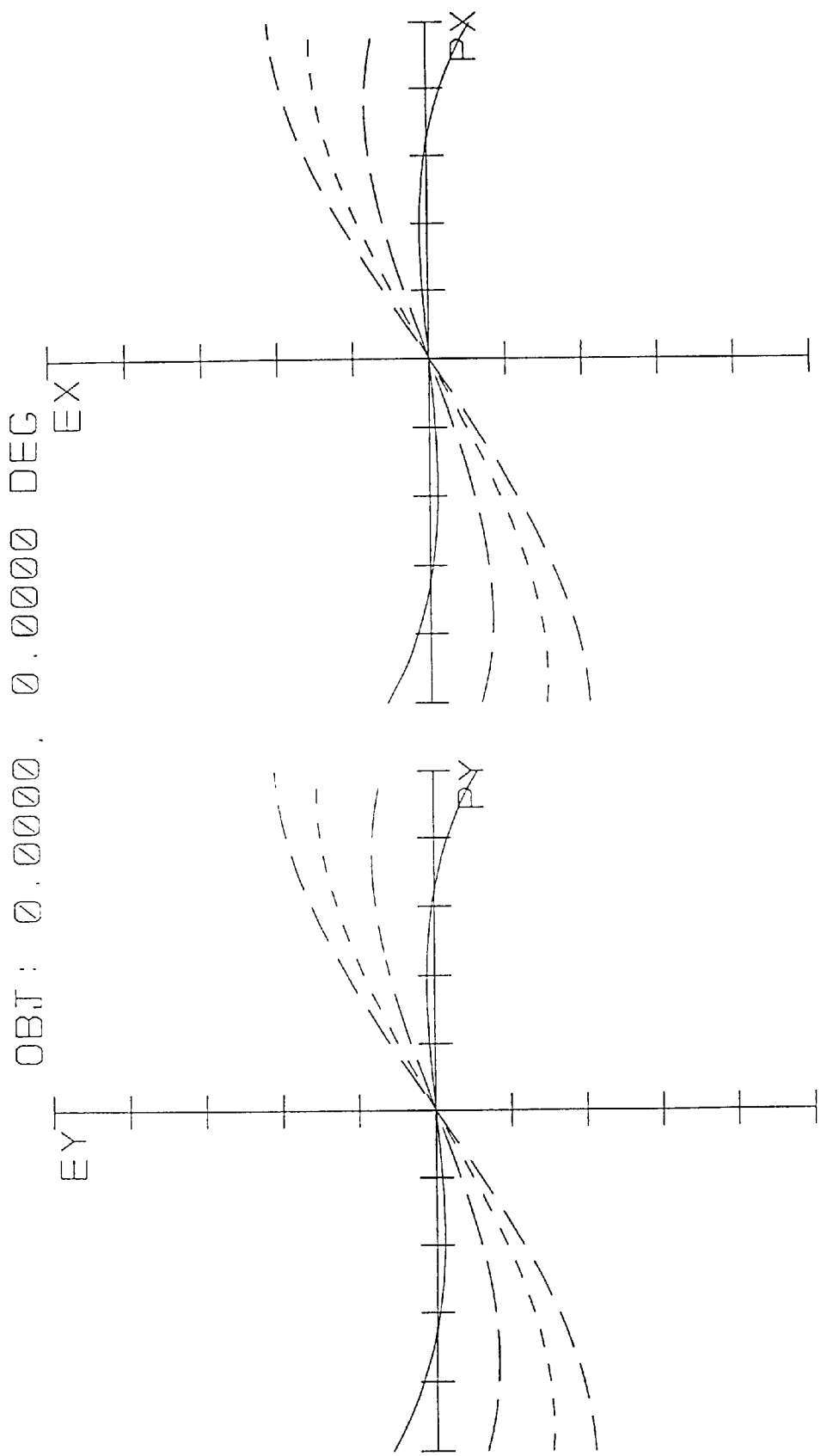

FIG. 18 presents ray aberration curves of a typical GRIN lens.

Figure 19:
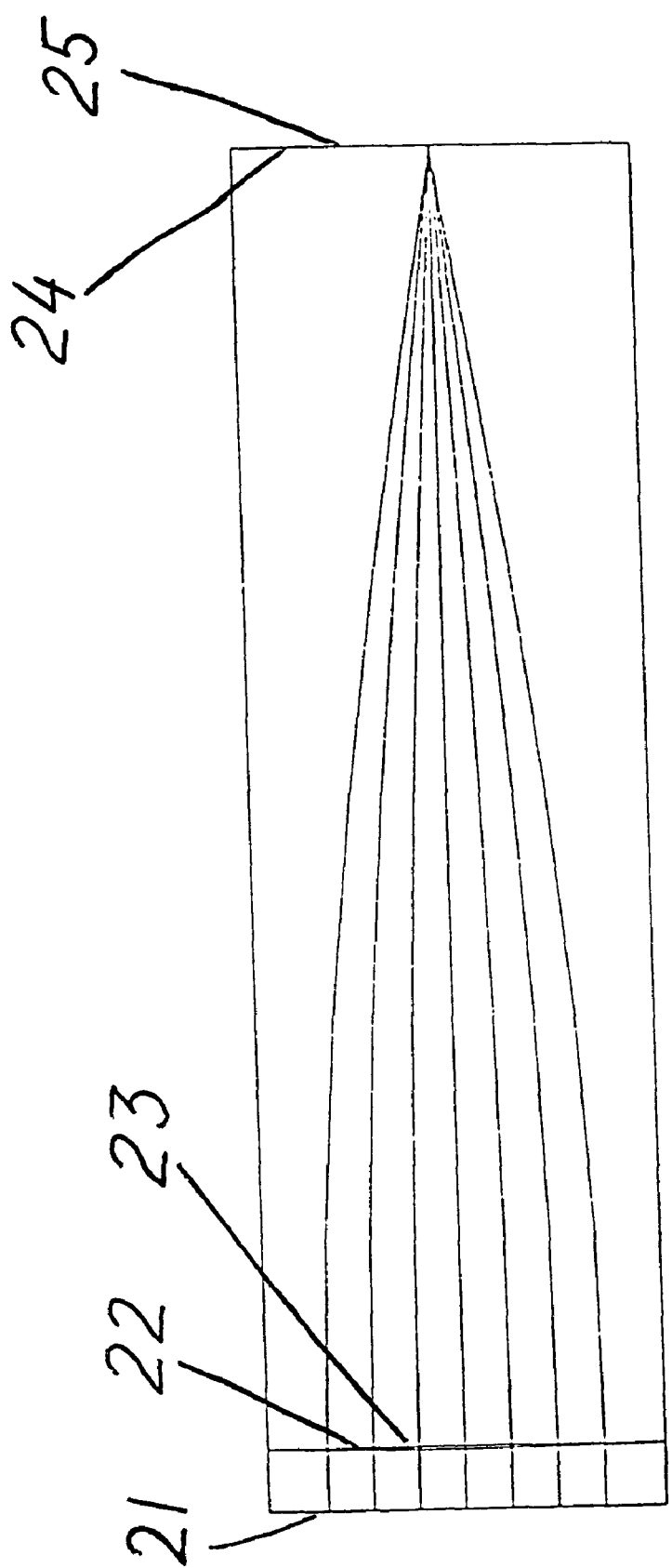

FIG. 19 is a schematic layout of an SDS corrector and a GRIN lens.

FIG. 20 presents ray aberration curves of achromatic combinations of an SDS and a GRIN lens.

Figure 21:
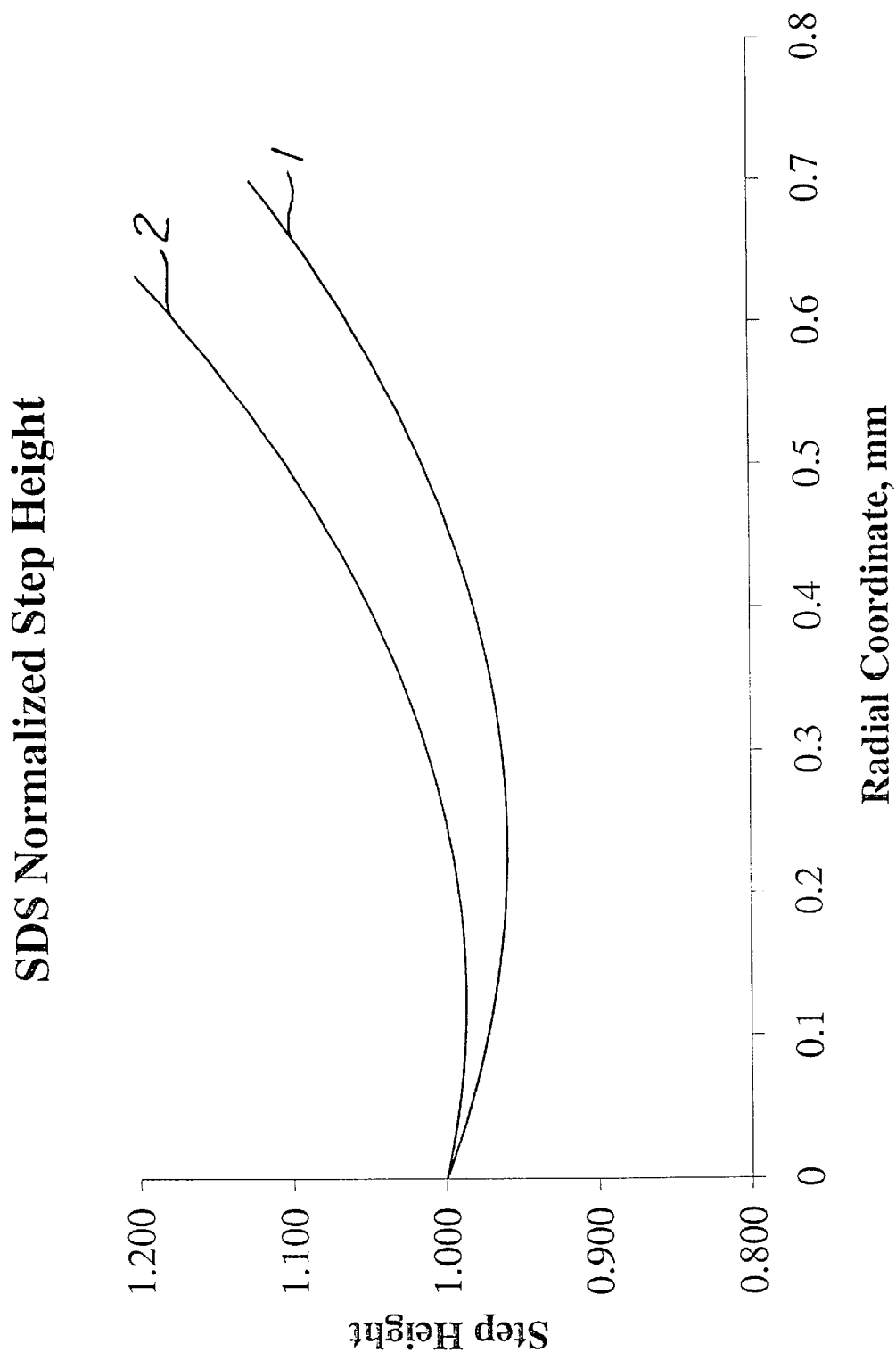

FIG. 21 is a plot of SDS step height as a function of radial coordinate for SDS/GRIN combinations.

Figure 22A:
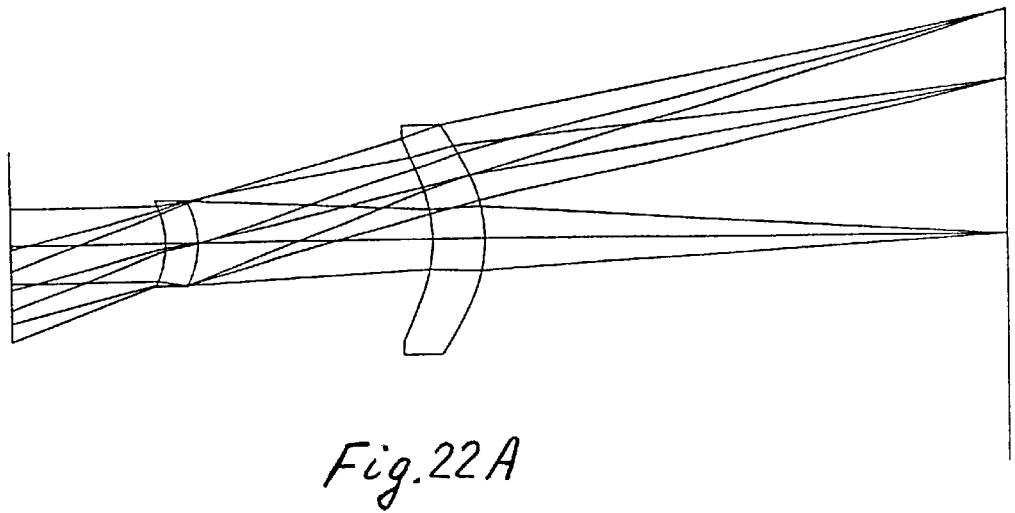

FIG. 22A is a schematic layout of a two-component Petzval lens.

Figures 1, 22B:
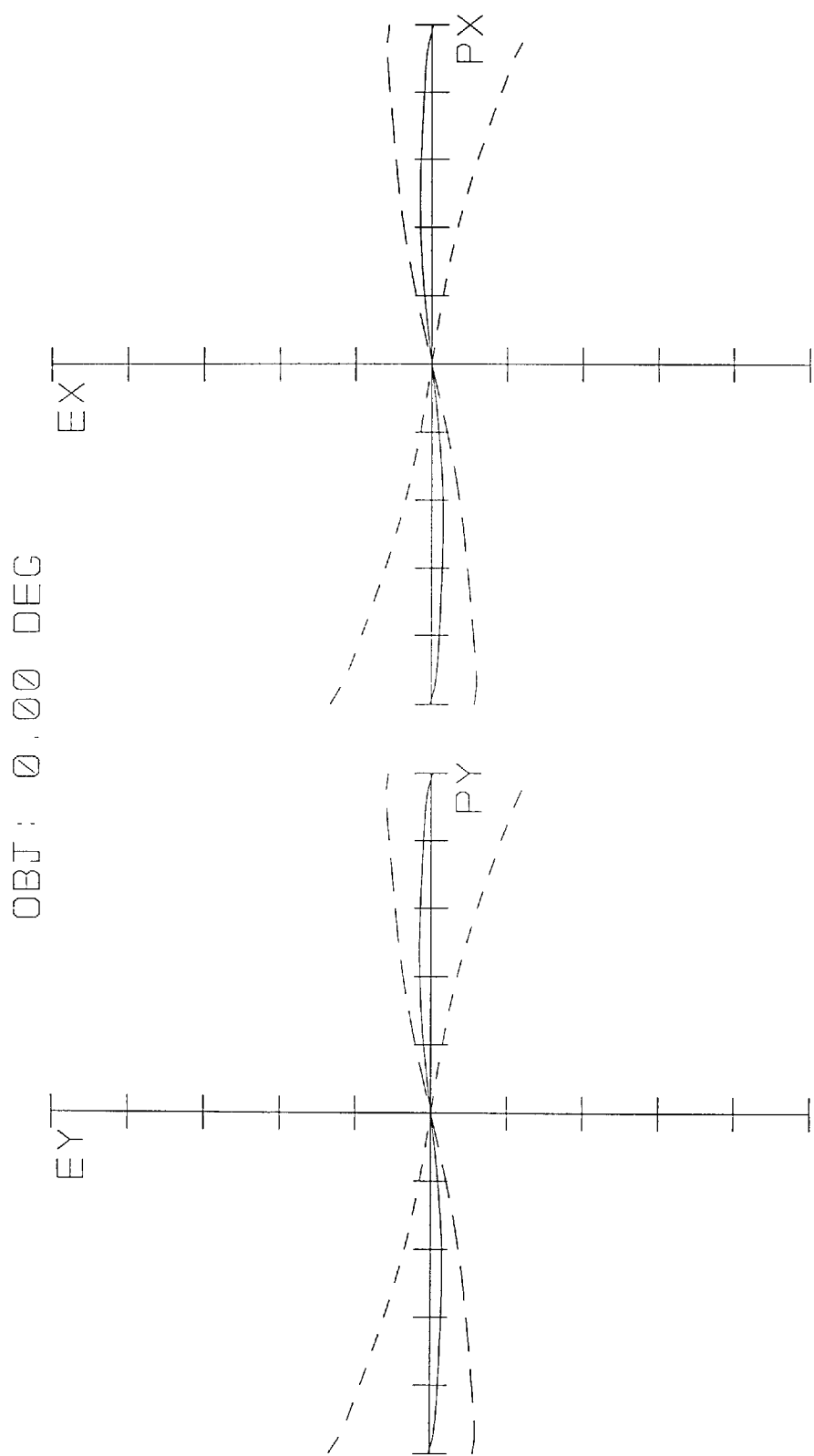
Figures 2, 22B:
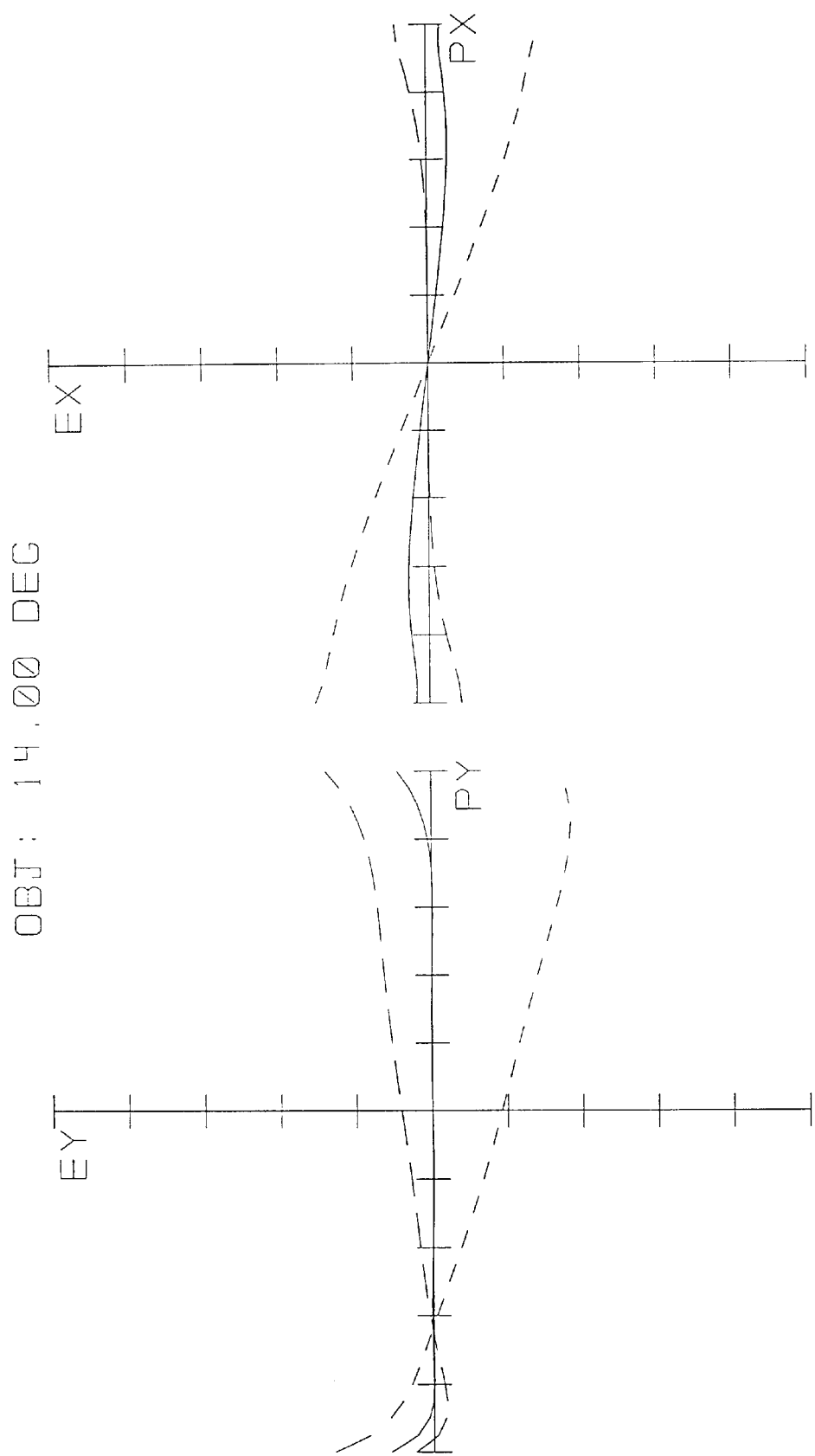
Figures 3, 22B:
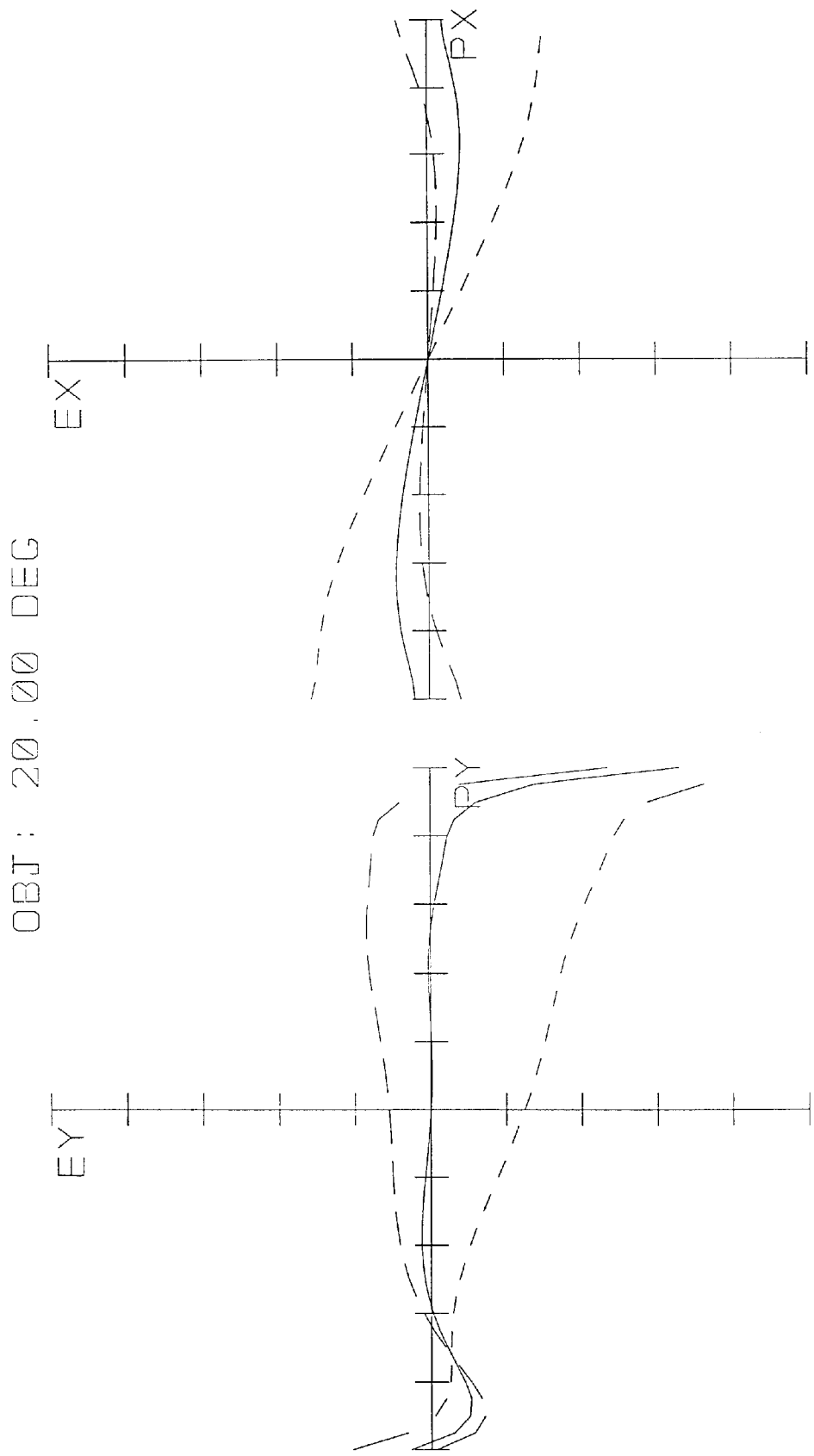

FIG. 22B presents ray aberration curves for the lens of FIG. 22A.

Figure 23A:
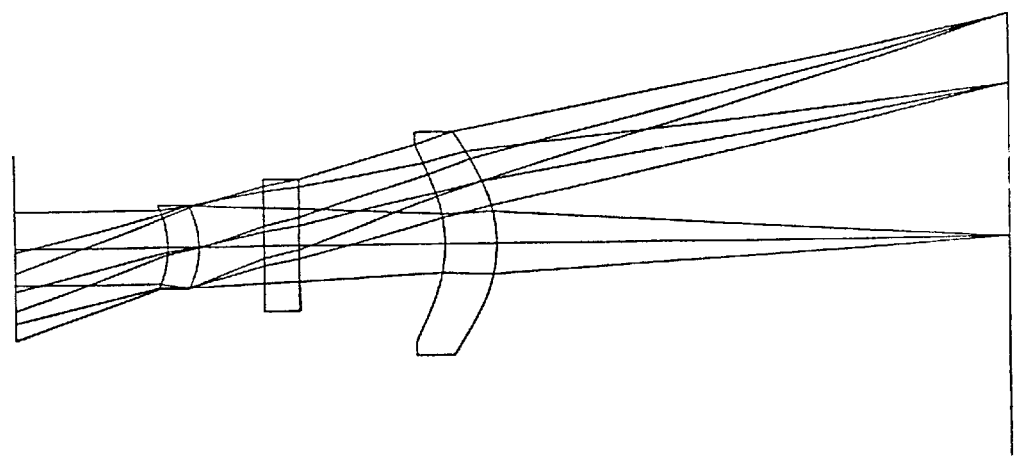

FIG. 23A is a schematic layout of a two-component Petzval lens with an SDS corrector.

Figures 2, 23B:
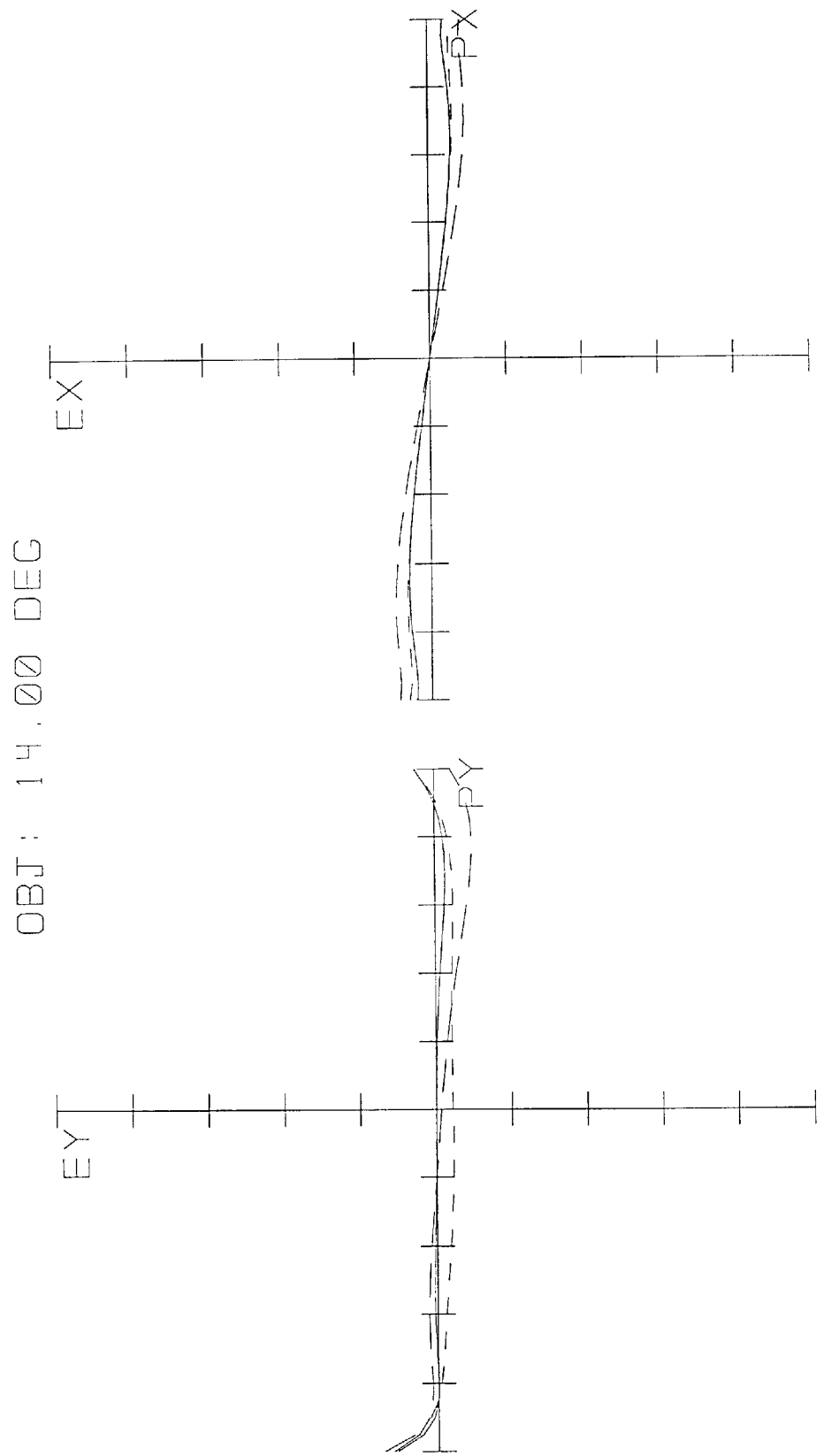
Figures 3, 23B:
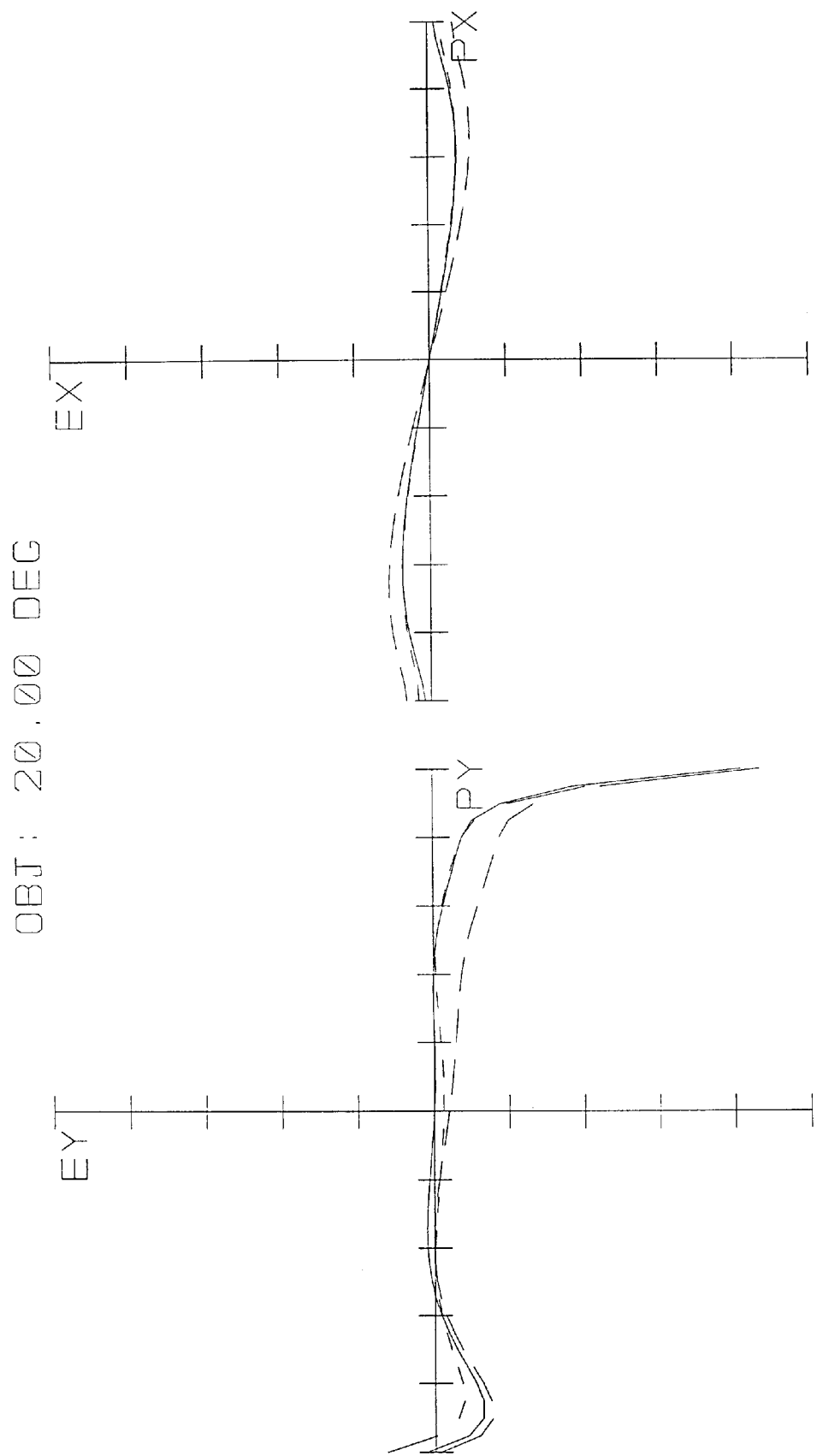

FIG. 23B presents ray aberration curves for the lens system of FIG. 23A.

Figure 24:
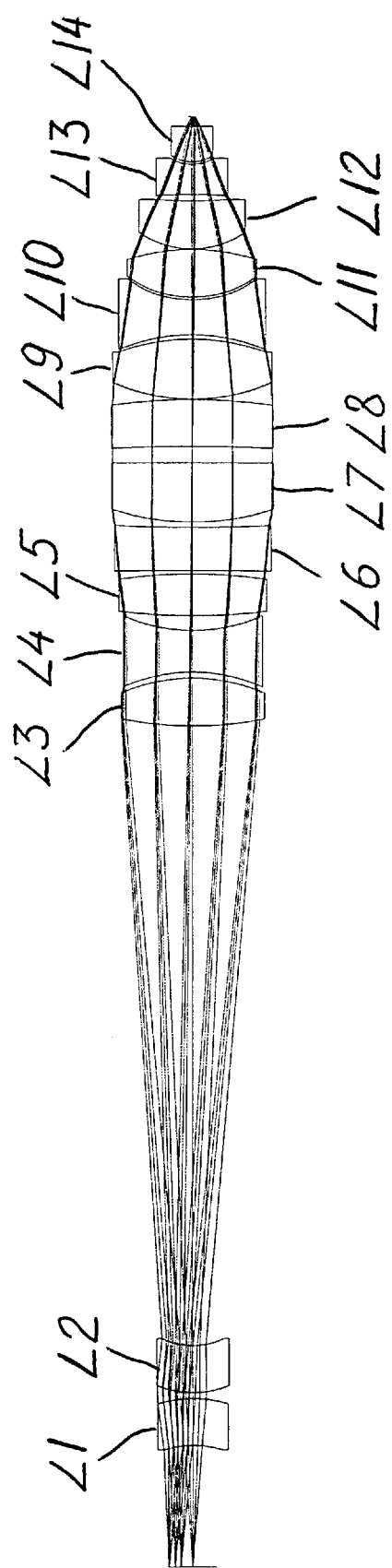

FIG. 24 is a schematic layout of a diffraction limited achromatic lens employing an SDS.

Figures 2, 25A:
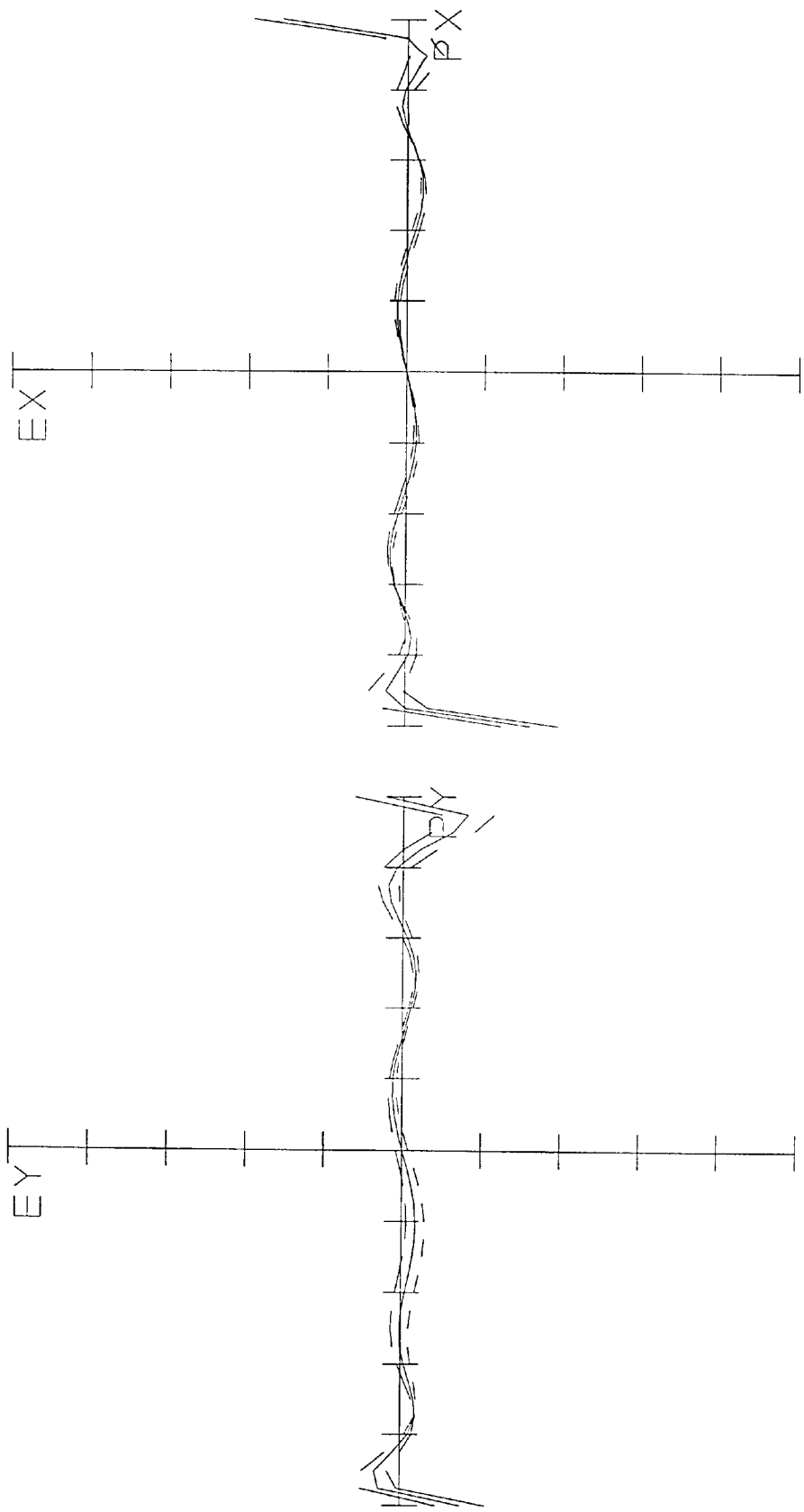
Figures 3, 25A:
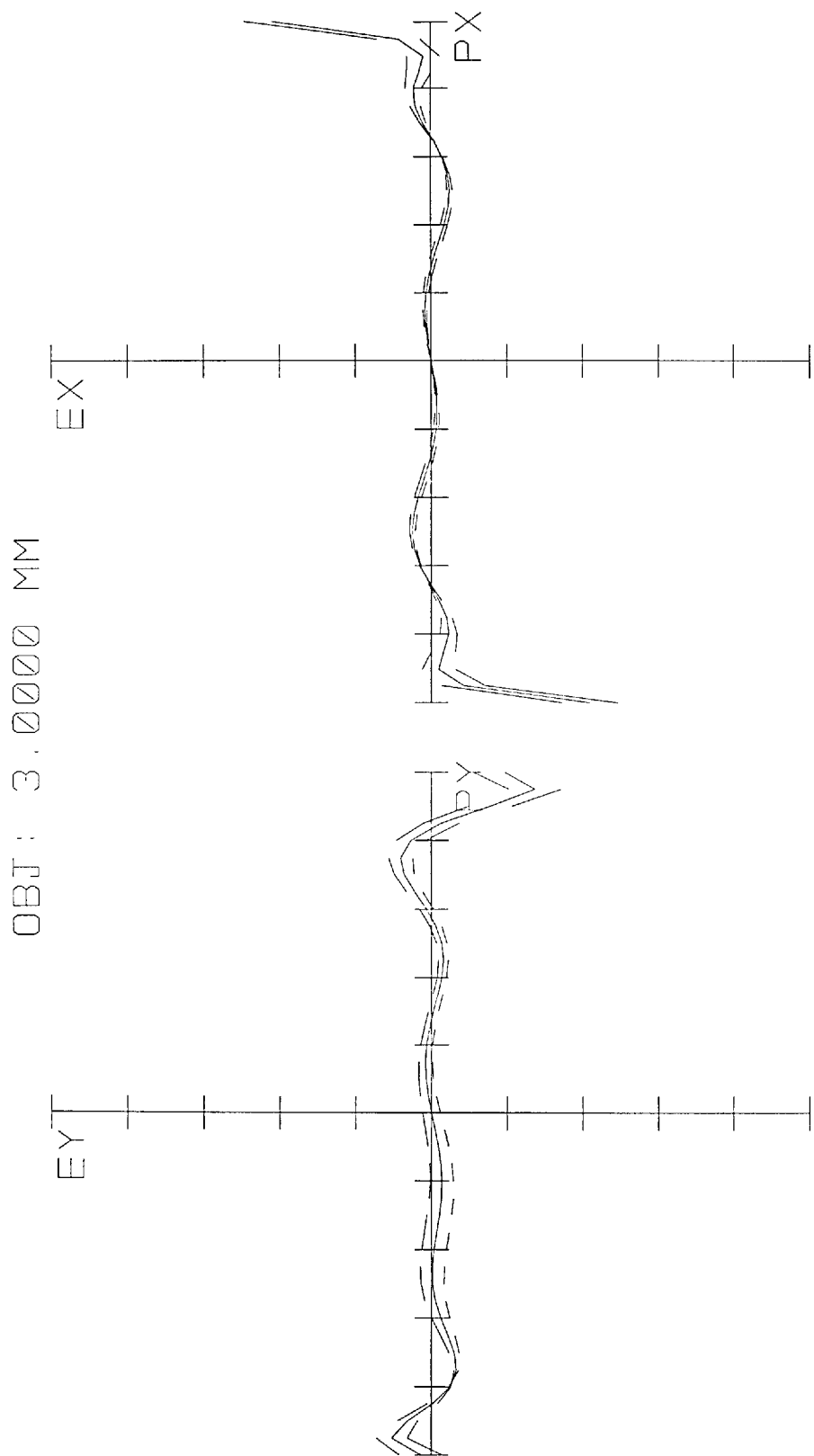
Figures 4, 25A:
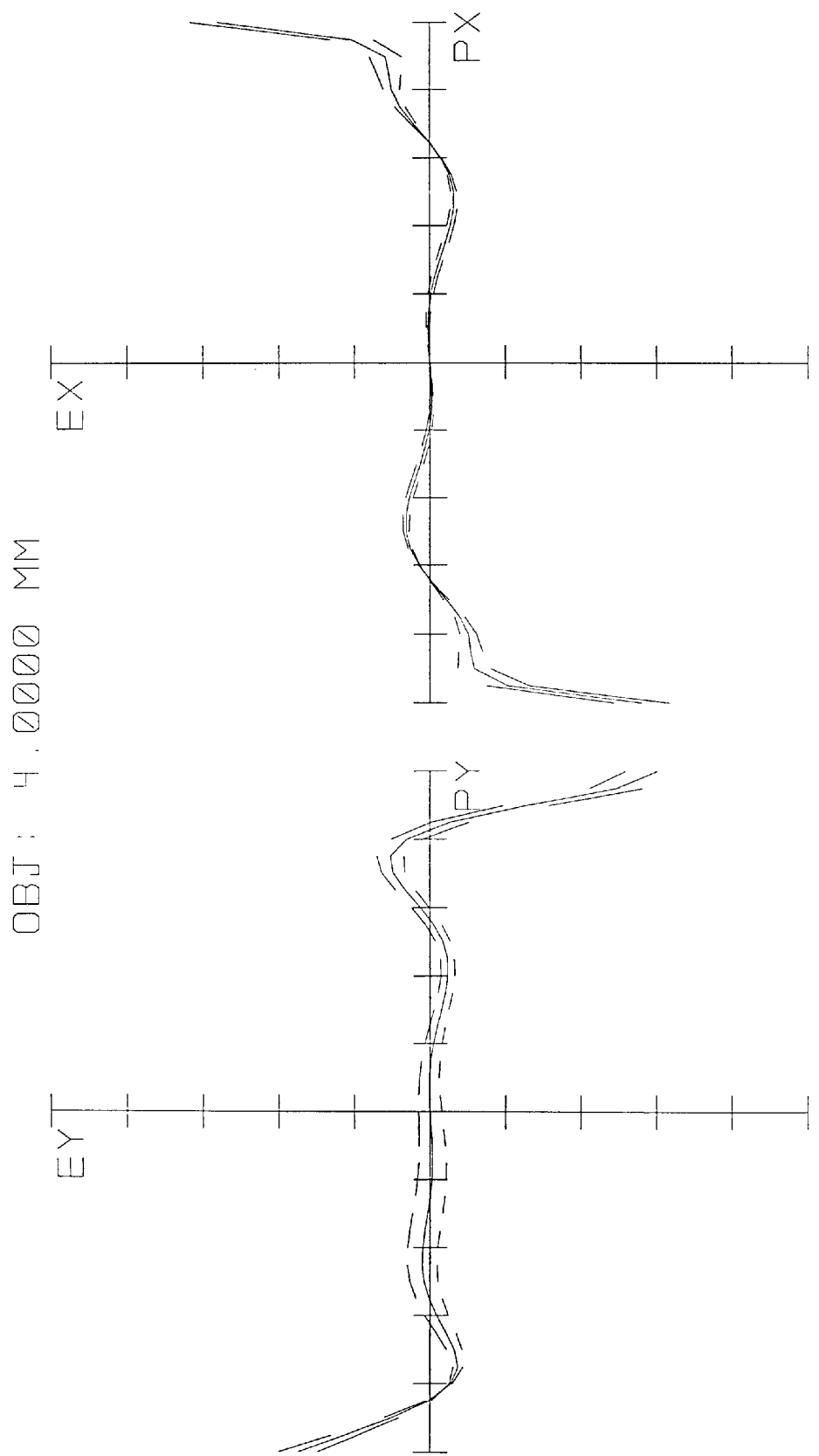

FIG. 25A presents ray trace data for the lens of FIG. 24.

Figure 25B:
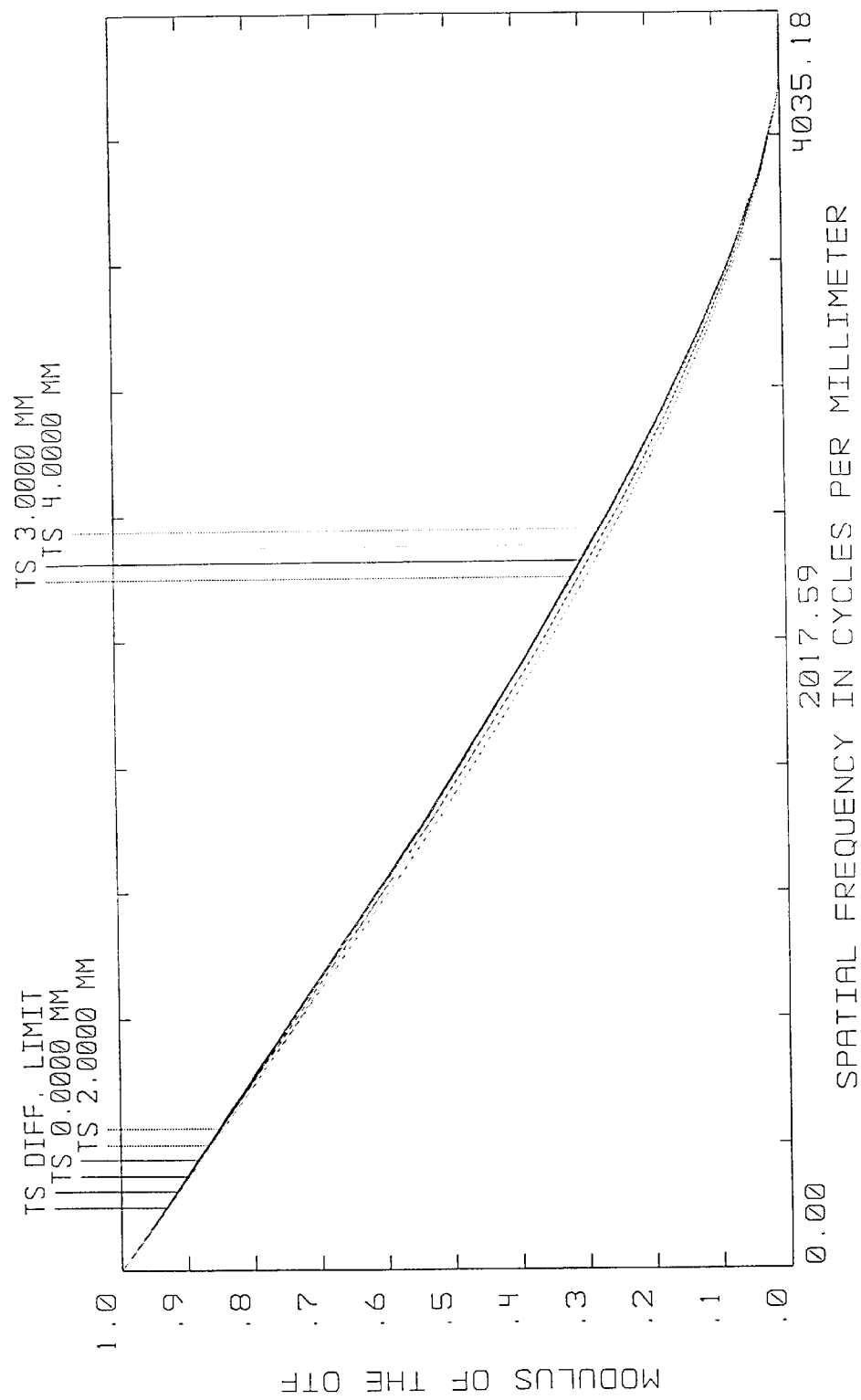

FIG. 25B is an MTF plot for the lens of FIG. 24.

Figures 1, 25C:
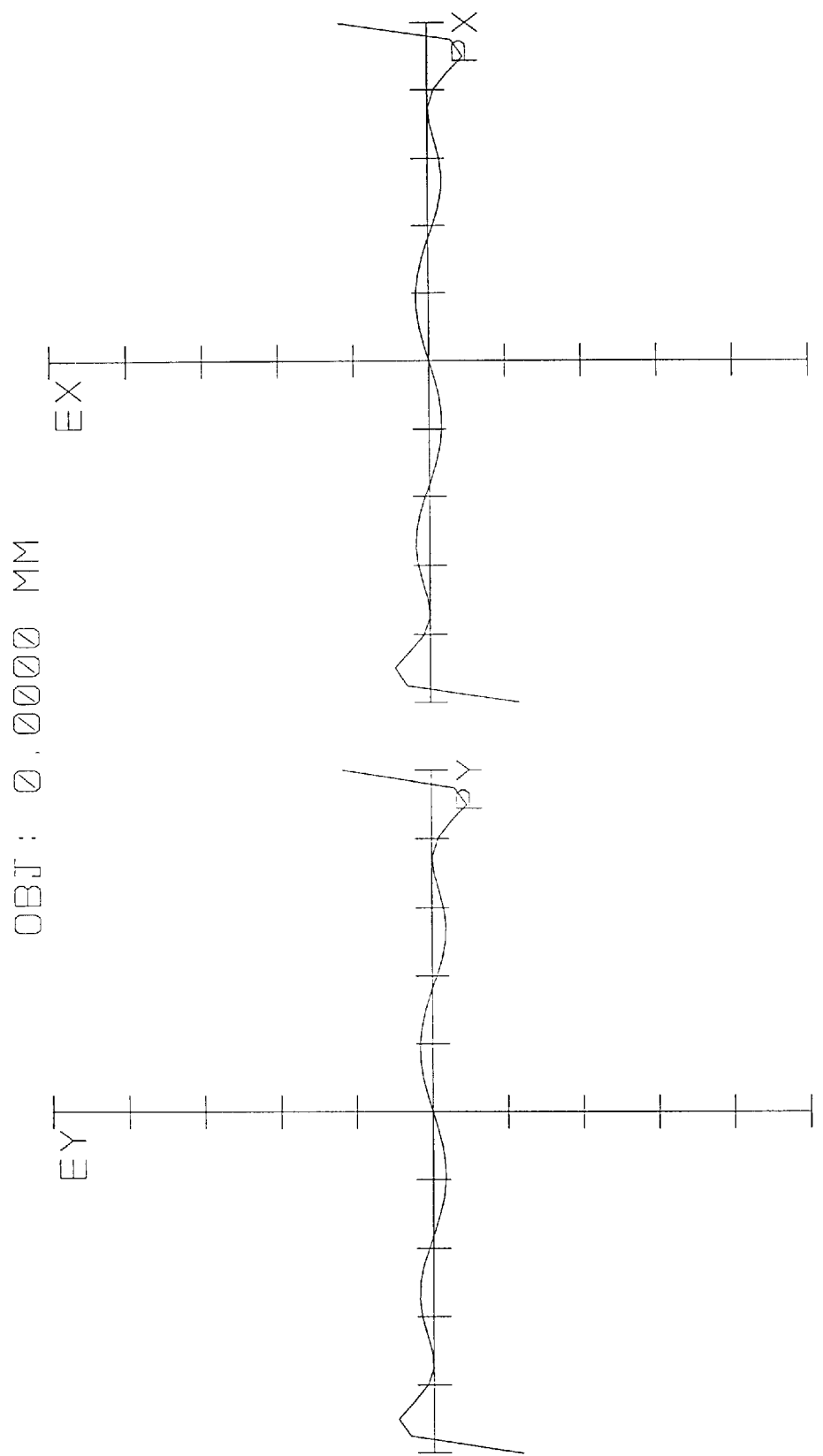
Figures 2, 25C:
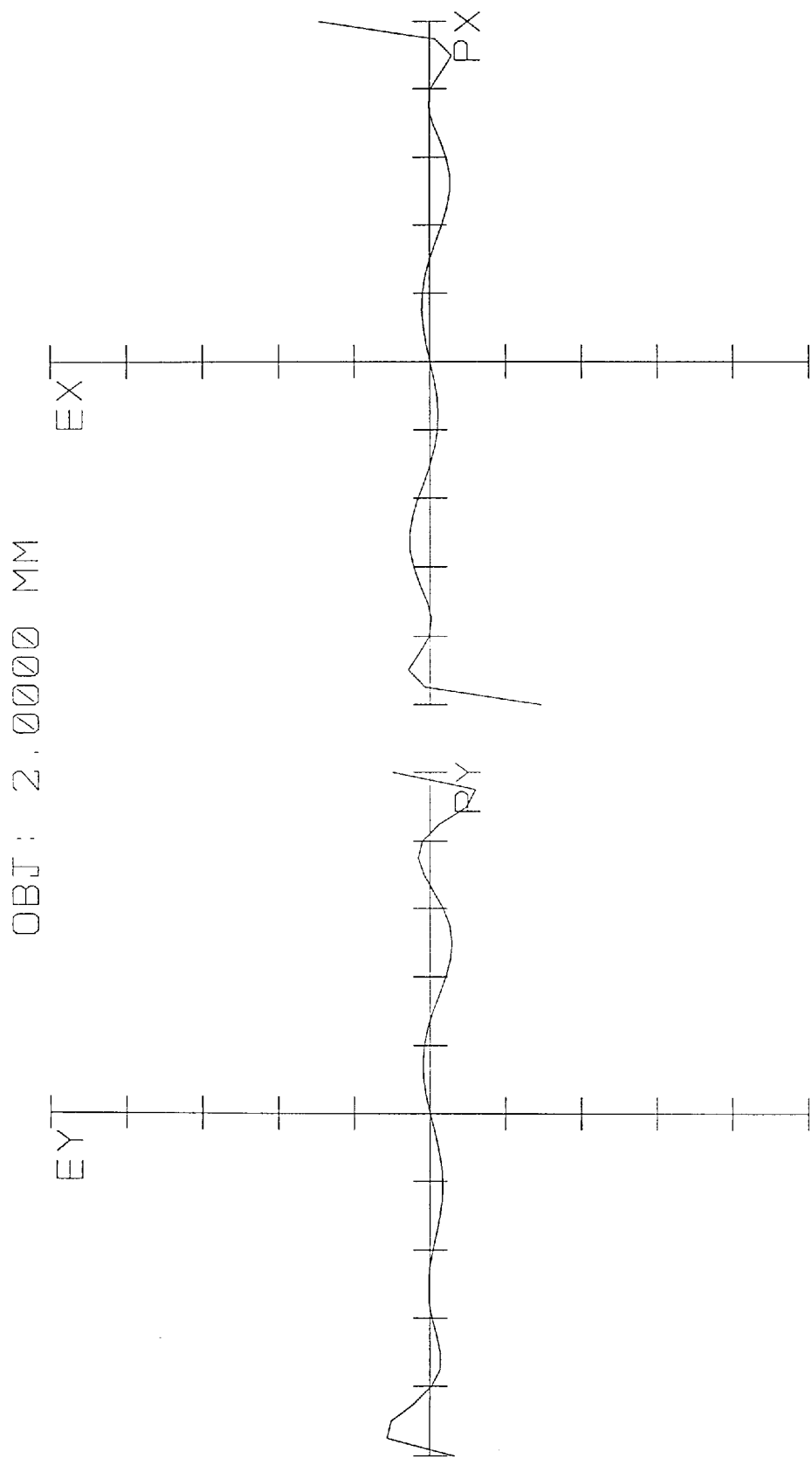
Figures 3, 25C:
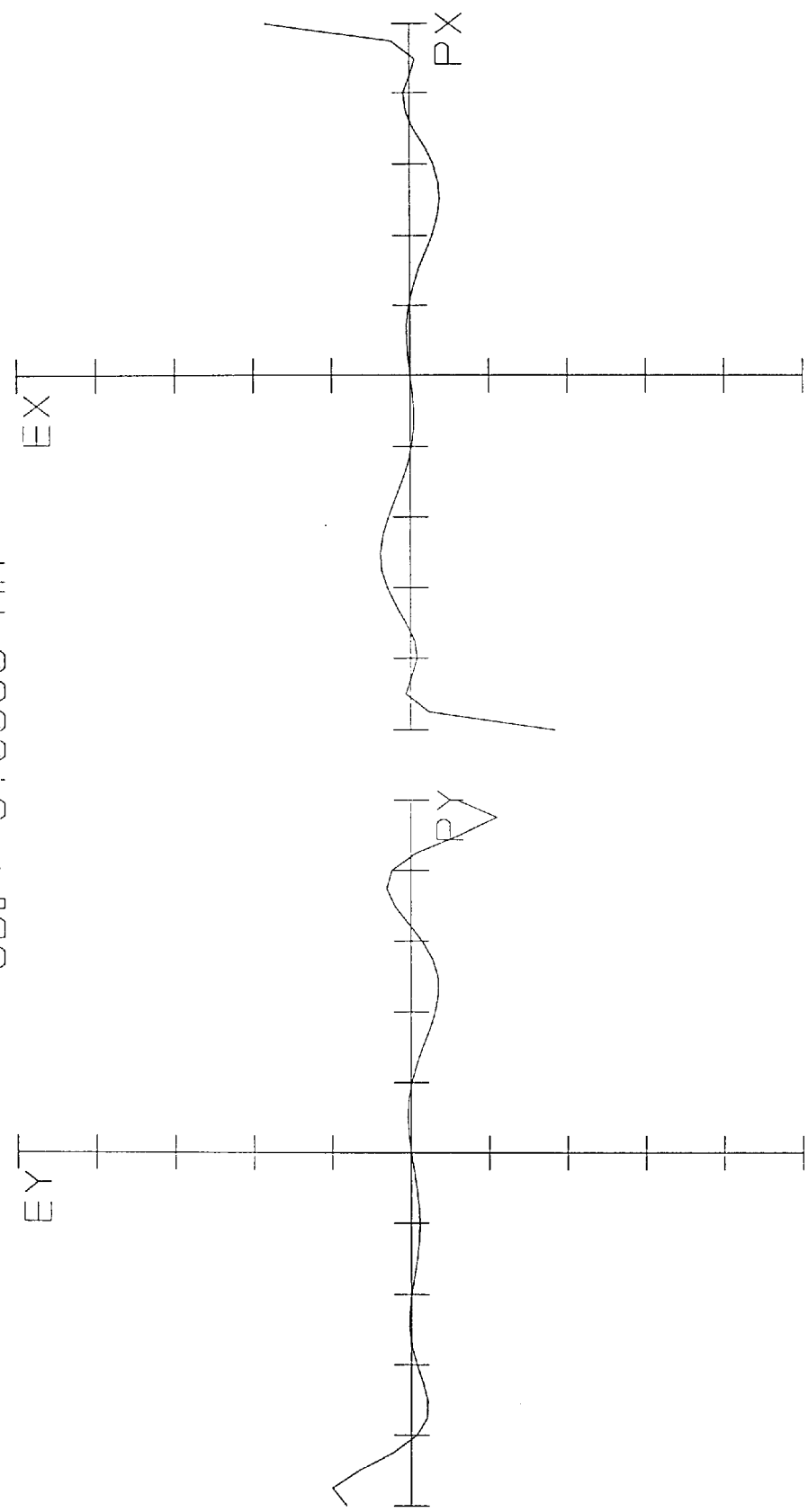
Figures 4, 25C:
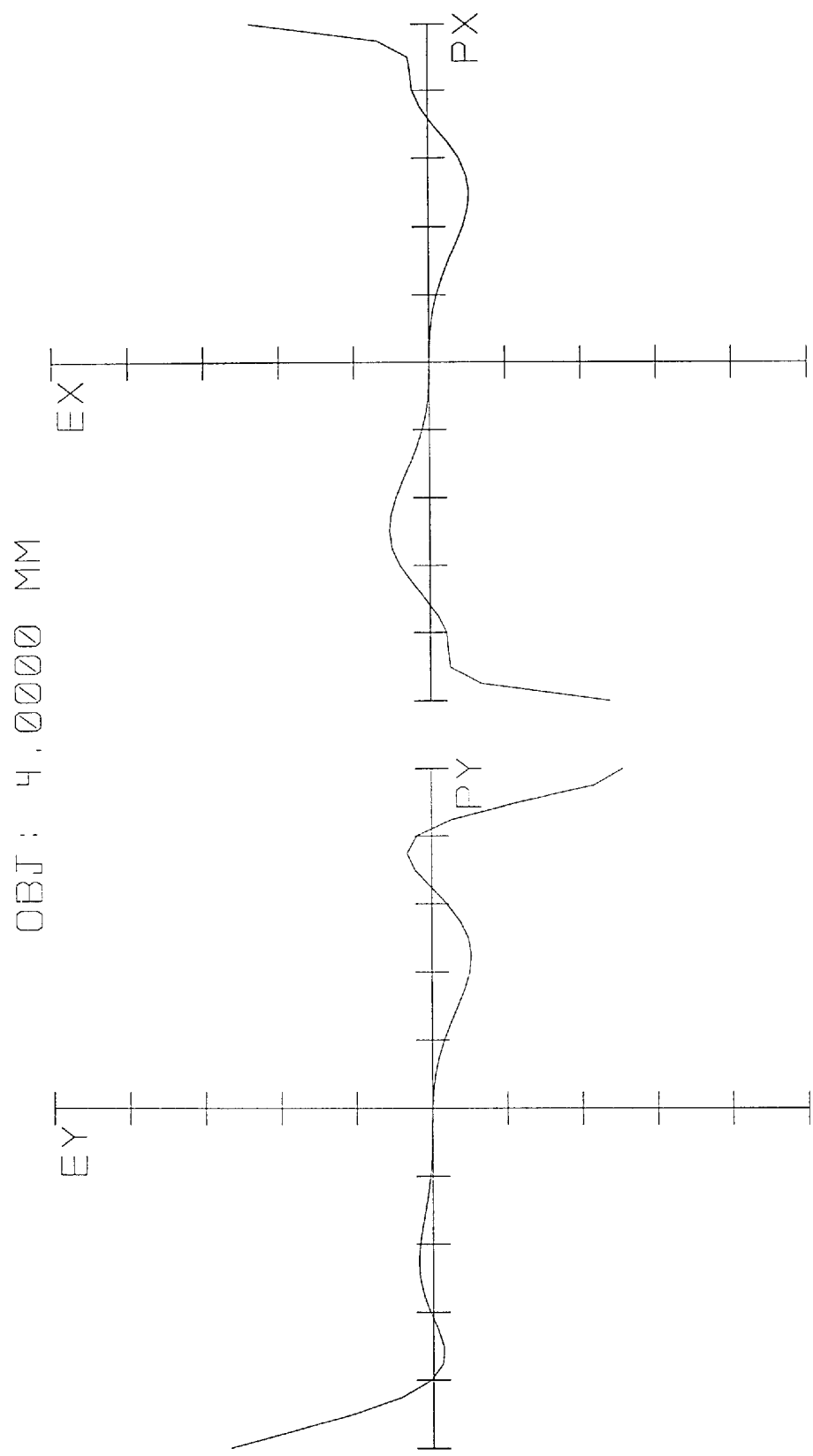

FIG. 25C presents ray trace data for the lens of FIG. 24 with the SDS replaced with a planar surface.

Figure 26:
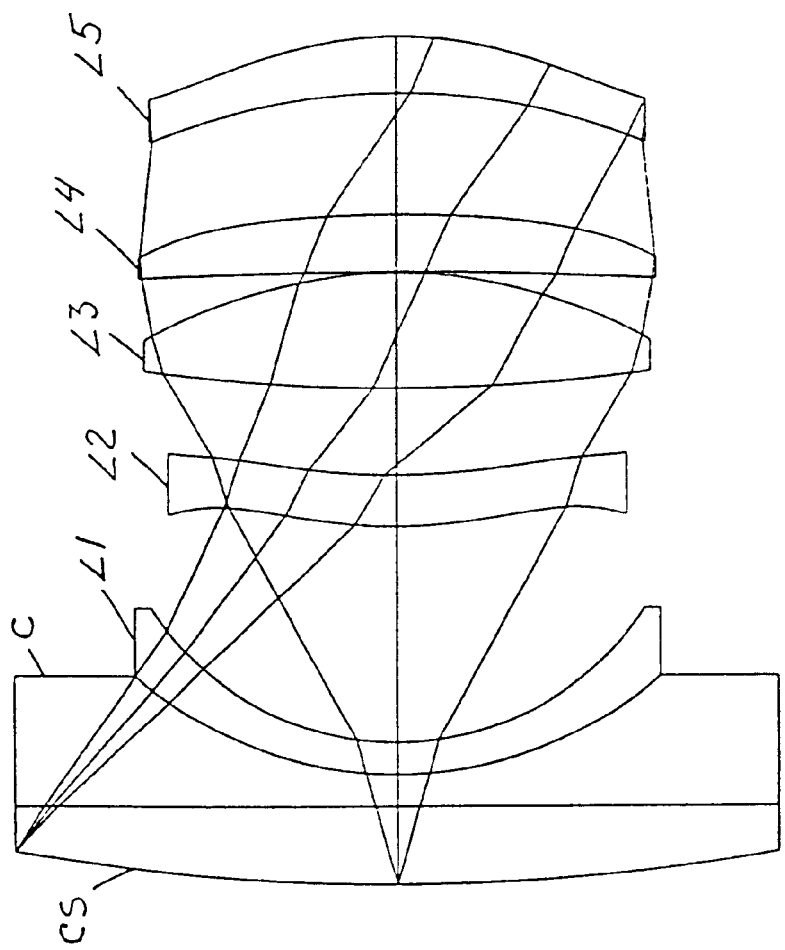

FIG. 26 is a schematic layout of a refractive lens employing an SDS for projection TV applications.

Figure 27:
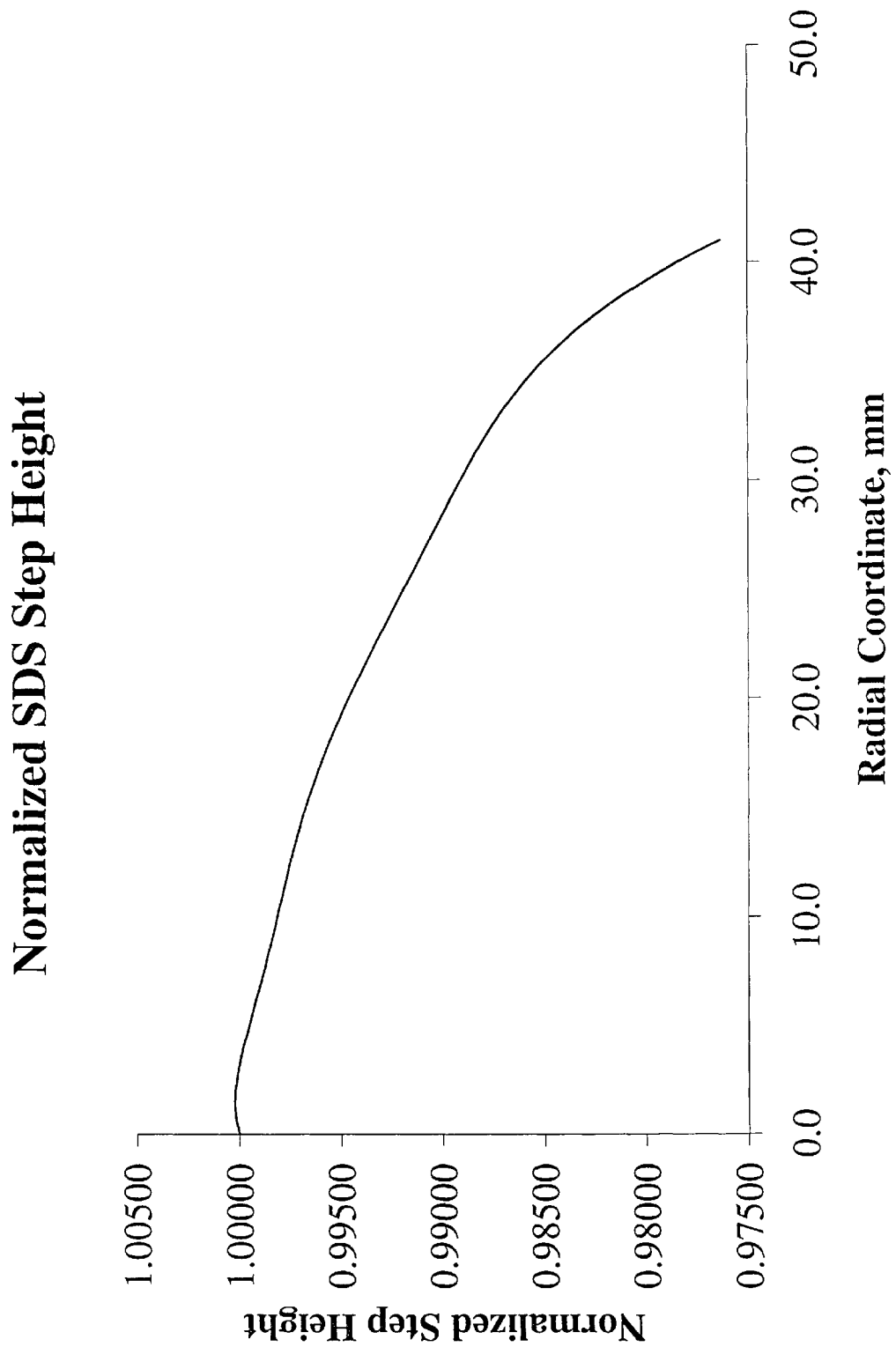

FIG. 27 is a plot of relative step height of the SDS of FIG. 26 as a function of radial coordinate.

FIG. 28 presents ray trace, field curvature, distortion, and MTF data for the lens of FIG. 26.

The foregoing drawings, which are incorporated in and constitute part of the specification, illustrate various embodiments of the invention, and together with the description, serve to explain the principles of the invention. It is to be understood, of course, that both the drawings and the description are explanatory only and are not restrictive of the invention.

V. DETAILED DESCRIPTION OF THE INVENTION

A. Design Process for Optical Systems Employing Stepped Diffractive Surfaces In the preferred embodiments of the invention, the stepped diffractive surface is treated as part of the optical system right from the beginning of the design process. There are several methods, which potentially can be used in the design of an optical system that contains a diffractive optical element (DOE). The ones based on rigorous solutions of Maxwell equations as well as the ones based on solutions of Fresnel-Kirchhoff integral equations (see M. G. Moharan and T. K. Gaylord, Diffraction Analysis of Surface-Relief Grating, *JOSA*, V. 72, No. 10, pp. 1385–1392, 1982; and E. G. Johnson and A. D. Kathman, Rigorous Electromagnetic Modeling of Diffractive Optical Elements, *Proceedings SPIE*, V. 1545, 1991, pp. 209–216) are impractical in multi-component optical systems with complex aspherical shapes.

The other three methods commonly used for systems with DOEs are ray-trace methods based on the Sweatt model, or the phase model, or on vector ray propagation through recorded holograms. See W. C. Sweatt, Describing Holographic Optical Elements As Lenses, *JOSA*, V. 67, pp. 803–808, 1977; W. C. Sweatt, Mathematical Equivalence Between A Holographic Optical Element And An Ultra-High Index Lens, *JOSA*, V. 69, pp. 486–487, 1979; D. C. Sinclair, Designing Diffractive Optics Using The Sweatt Model, *Sinclair Optics Design Notes*, V. 1, No. 1, Winter 1990; *ZEMAX Optical Design Program, User's Guide*, Version 7.0, pp. 13–23, 13–24, Focus Software Inc., 1998; *OSLO Version 5, Optics Reference*, pp. 359–361, Sinclair Optics, Inc., 1996; D. A. Buralli, Optical design with diffractive lenses, *Sinclair Optics Design Notes*, V. 2, No. 4, 1991; W. T. Welford, Vector Raytracing Equation For Hologram Lenses of Arbitrary Shape, *Opt. Commun.*, V. 14, 322–323, 1975; and *Code V Reference Manual*, Version 8.20, pp. 2A-433, 2A-434, 1998.

Although the above models represent mathematical equivalency to the diffraction phenomenon, they do not explicitly specify the spacing, the blaze angle, and the height of the grooves of the microstructure. The models also do not account for actual physical changes of the microstructure as a result of environmental changes, such as, temperature, pressure, etc.

The parameters of the microstructure (the step width as well as the blaze angle) are determined usually as a secondary procedure after the ray trace based on the model (as opposed to real ray tracing) is done and the system is optimized. In particular, the parameters of the microstructure are obtained using the final optimized data generated by the model, i.e., the Sweatt lens parameters (index of refraction and radii of curvature), the phase polynomial, or the polynomials representing the wavefronts for a recorded hologram for the above three models, respectively. Optimization of the diffraction efficiency is performed as an iterative process between modeling the system to correct aberrations and adjusting the zone size and blaze angle to maximize the efficiency of the diffractive component. See C. Londono and P. Clark, The design of achromatized hybrid diffractive lens system, *Proceedings SPIE*, V. 1354, pp. 30–37, 1990.

The above methods are not suited for ray tracing of stepped diffractive surfaces (SDSs) because they do not allow one to directly constrain the blaze angles of the diffractive microstructure to be perpendicular to the optical axis. The solutions obtained with the above methods will in general differ from the actual SDS geometry and instead will provide kinoform type diffractive surfaces with nonzero blaze angles. Also, these methods do not allow one to take into account aberrations of diffractive components induced by a change in environmental parameters.

Figure 1B:
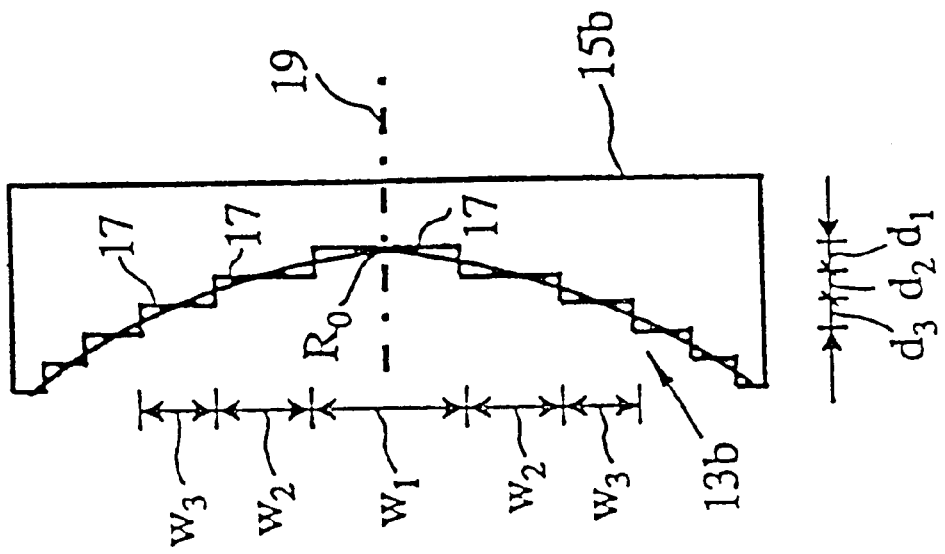
FIG. 1A and FIG. 1B illustrate optical elements employing stepped diffractive surfaces.
Figure 1A:
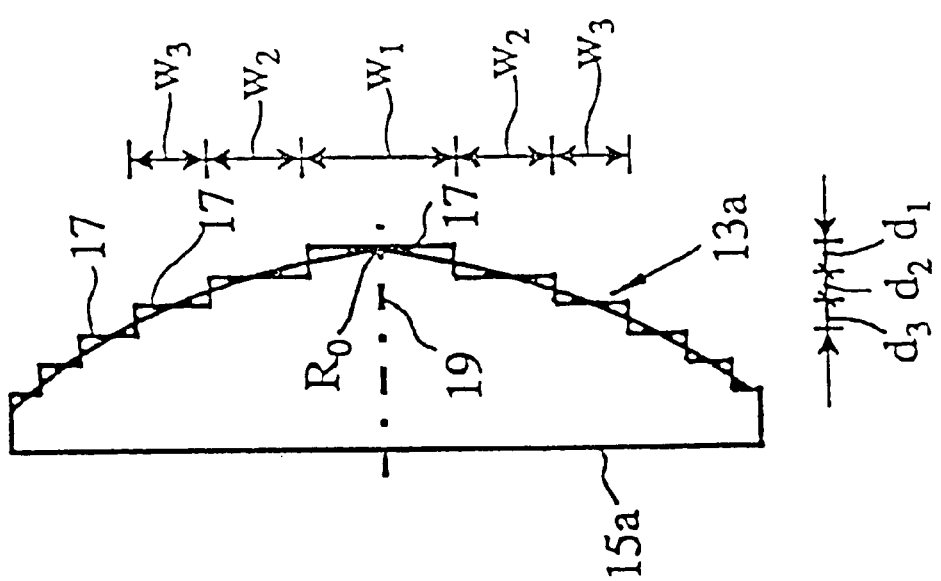
Figure 2A:
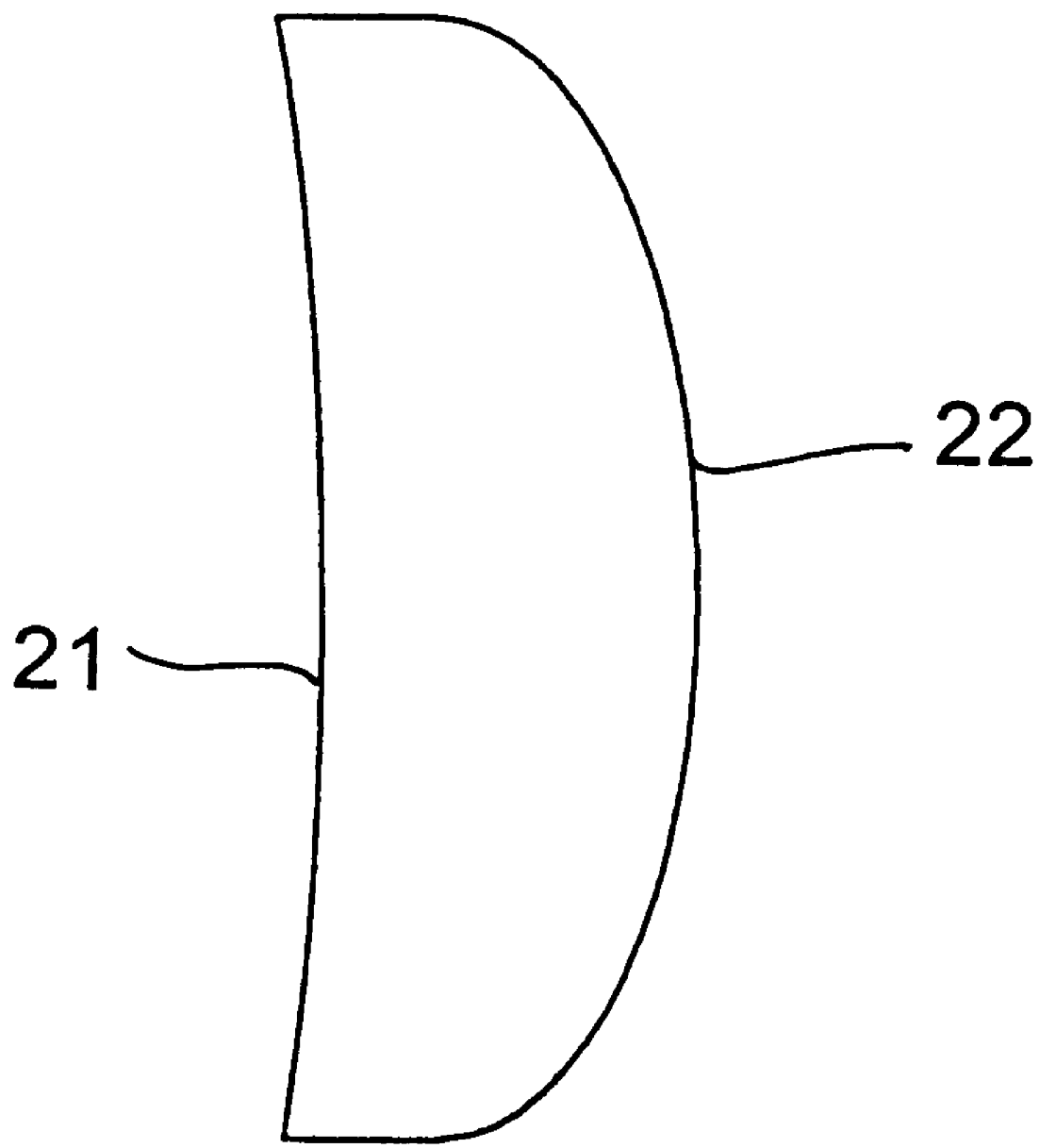
FIG. 2 illustrates the spherical aberration introduced by an SDS with a spherical base curve and a constant step height when illuminated on axis.
Figure 2B:
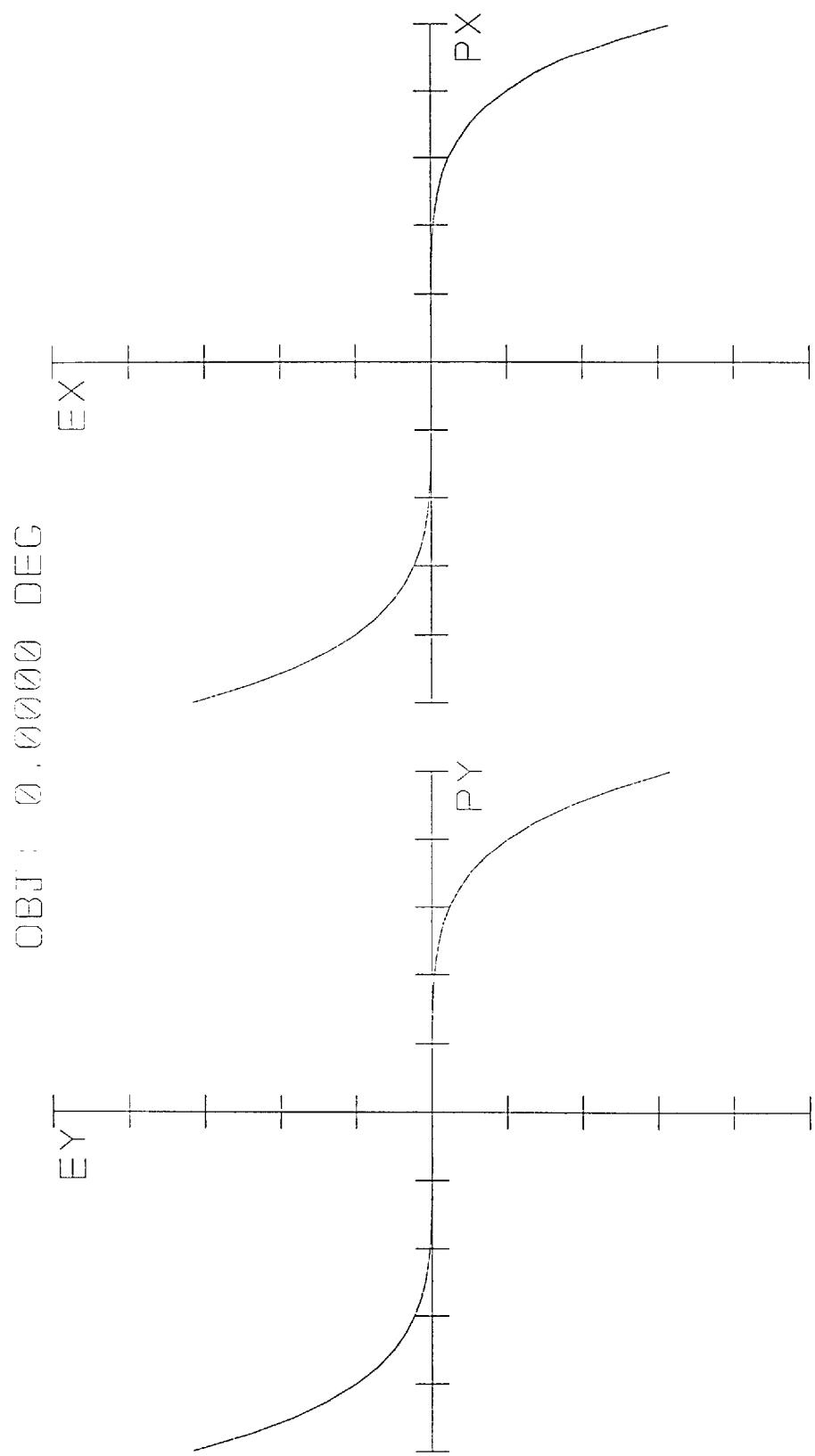
Figure 2C:
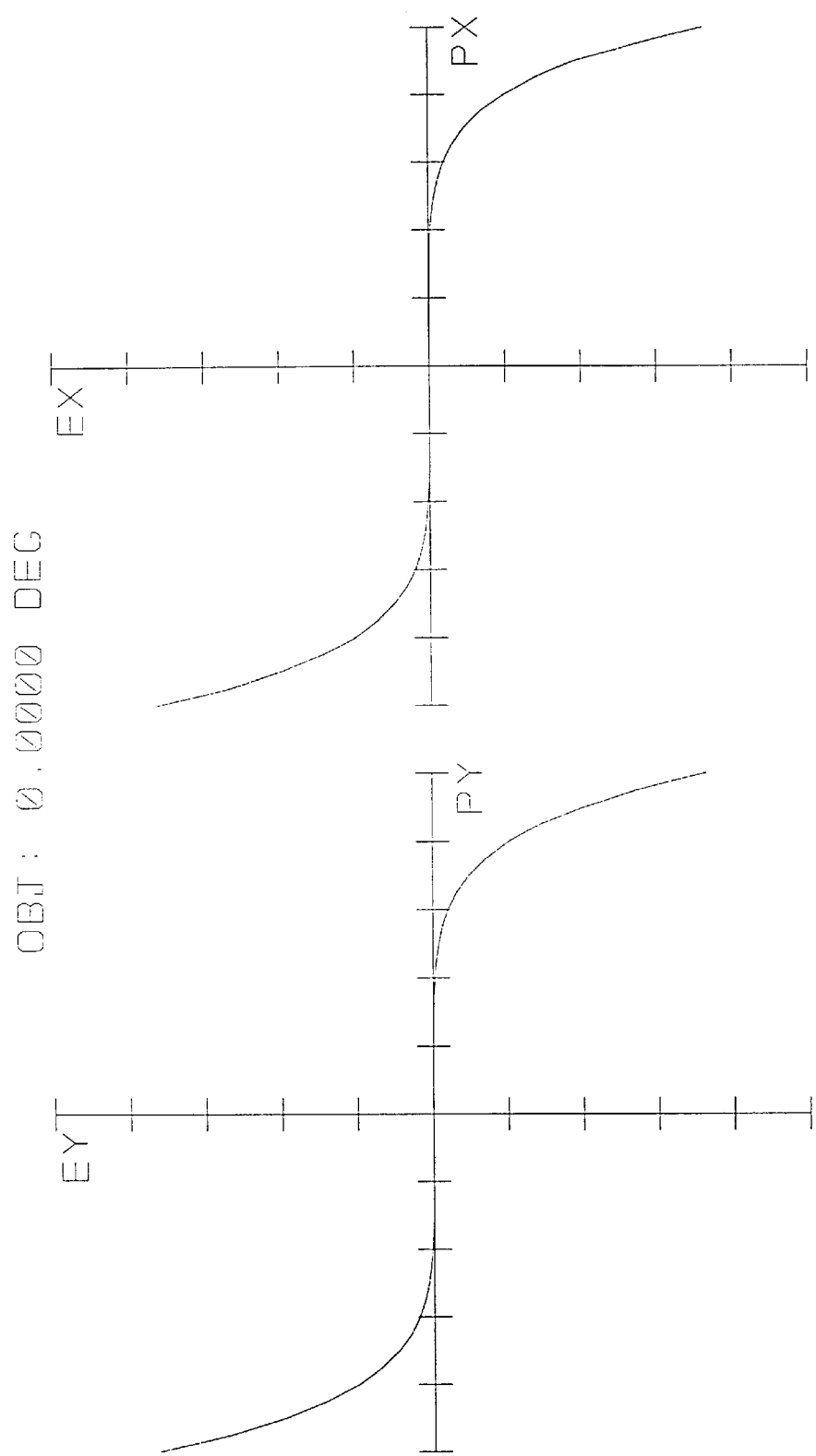
Figure 3B:
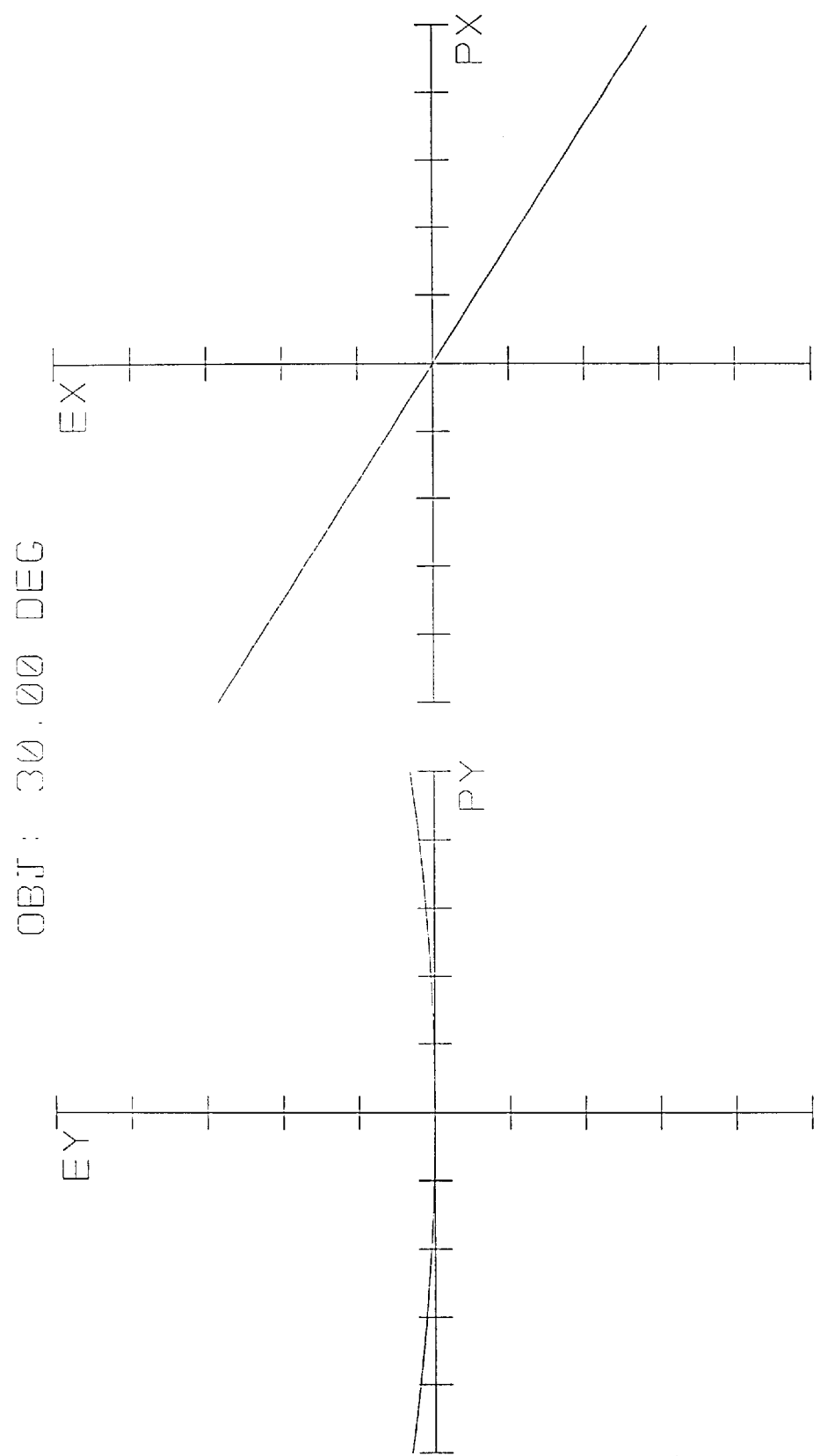
FIG. 3 illustrates the field aberrations introduced by an SDS with a spherical base curve and a constant step height.
Figure 4:
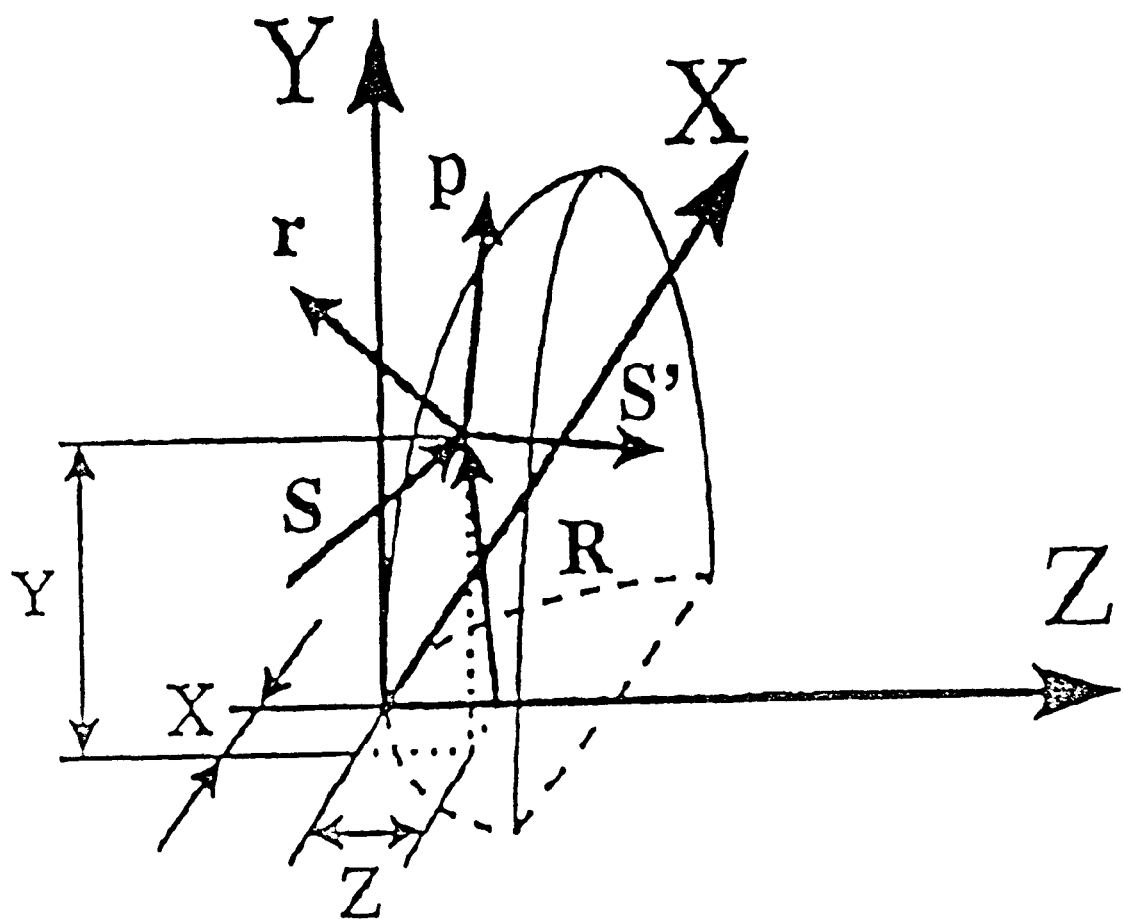
FIG. 4 illustrates the relationships of vectors r, p, S, S', and R which, in accordance with the invention, are used in performing ray tracing for a stepped diffractive surface.

In accordance with the present invention, ray tracing of SDS elements is based on direct implementation of the grating equation in combination with constraining the diffractive geometry to a staircase shape. In brief, the method (1) employs the general ray trace method of Spencer and Murty, (2) constrains the micro-geometry, and (3) derives the local spacing of the grooves based on the substrate profile and the step height. See G. H. Spencer and M. V. R. K. Murty, General Ray-Tracing Procedure, *JOSA*, V. 52, pp. 672–678, 1962. The details of the method are as follows, where the vectors r, p, S, S', and R are illustrated in FIG. 4.

Consider a diffractive surface at the interface between two media with refractive indices $n_1$ and $n_2$. For ease of presentation, the surface will be assumed to have axial symmetry and to consist of circular diffractive step structures with the local spacing being a function of the radial coordinate. The step boundaries are defined by cylindrical and planar annular surfaces with their axis coinciding with the axis of symmetry of the lens. The shape of the surface substrate (base curve) could be any of the types used in optical design, including spheres, conics, polynomial aspheres, etc.

As shown by Spencer and Murty, the diffraction phenomenon of a ray propagating through the (diffractive) surface of a grating can be described by the following vector equation:

$$n_2(S'\times r)=n_1(S\times r)+\Lambda_q \tag{1}$$

where the above vectors can be written in terms of their components as follows:

$$\begin{cases} S' = L'_s i + M'_s j + N'_s k \\ S = L_s i + M_s j + N_s k \\ r = L_r i + M_r j + N_r k \\ q = L_q i + M_q j + N_q k \end{cases} \tag{2}$$

The unit vectors S and S' define the propagation direction before and after the surface; r is a vector normal to the surface (base curve) at the ray intersection point. For the case of a diffractive structure with concentric rings (axisymmetrical lens), q is a vector orthogonal to the plane of symmetry at the point of intersection, where the plane of symmetry is a plane defined by the optical axis and the normal to the SDS substrate at the point of intersection.

Parameter $\Lambda$ is a function of the diffractive structure (working order of diffraction j and local radial line spacing $w_i$) and the wavelength $\lambda$ associated with the propagating ray:

$$\Lambda = \frac{j\lambda}{w_i} \tag{3}$$

It is the second term of equation (1) that is responsible for the diffraction phenomenon. For the purely refractive case the term vanishes, so that the refracted ray lies in the plane defined by the incident ray and the normal to the surface at the point of intersection.

For the general case of an axisymmetrical diffractive structure, equation (1) can be rewritten as:

$$r\times n_2 S' = r\times D^D \tag{4}$$

where the vector $$D^D = n_1 S + \Lambda_p, \tag{5}$$

combines the effects of both refraction (first term) and diffraction (second term).

Vector p=ui+vj+wk is a unit vector defined such that:

$$q=p\times r=(wM_r-vN_r)i+(uN_r-wL_r)j+(vL_r-uM_r)k \tag{6}$$

As shown in FIG. 4, vector p is tangential to the surface at the intersection point and lies in the plane of symmetry.

Equation (4) can be reduced to three equations for direction numbers (unnormalized direction cosines) of the ray after diffraction at the surface:

$$\begin{cases} L'_S = \dfrac{1}{n_2}(n_1 L_S + \Lambda u + \Gamma^D L_r); \\ M'_S = \dfrac{1}{n_2}(n_1 M_S + \Lambda v + \Gamma^D M_r); \\ N'_S = \dfrac{1}{n_2}(n_1 N_S + \Lambda w + \Gamma^D N_r); \end{cases} \quad (7)$$

where the multiplier $\Gamma^D$ is defined as follows:

$$\Gamma^D = -\dfrac{(L_r D_X^D + M_r D_Y^D + N_r D_Z^D)}{((L_r)^2 + (M_r)^2 + (N_r)^2)} + \dfrac{\sqrt{(L_r D_X^D + M_r D_Y^D + N_r D_Z^D)^2 + (n_2)^2 - ((D_X^D)^2 + (D_Y^D)^2 + (D_Z^D)^2)}}{((L_r)^2 + (M_r)^2 + (N_r)^2)}; \quad (8)$$

If $R = Xi + Yj$ is a vector at the point of intersection normal to the optical axis, then the directional cosines of vector p can be determined as:

$$u = -\dfrac{X}{|R|}\sin(R, r); \quad (9.1)$$

$$v = -\dfrac{Y}{|R|}\sin(R, r); \quad (9.2)$$

$$w = \dfrac{(XL_r + YM_r)}{|R|} = \cos(R, r) \quad (9.3)$$

Using (9), equations (7) and (8), describing ray propagation through the diffractive surface, can be rewritten as:

$$\begin{cases} L'_S = \dfrac{n_1}{n_2} L_S + \dfrac{1}{n_2}\left(-\Lambda \dfrac{X\sin(R, r)}{|R|} + \Gamma^D L_r\right); \\ M'_S = \dfrac{n_1}{n_2} M_S + \dfrac{1}{n_2}\left(-\Lambda \dfrac{Y\sin(R, r)}{|R|} + \Gamma^D M_r\right); \\ N'_S = \dfrac{n_1}{n_2} N_S + \dfrac{1}{n_2}(\Lambda \cos(R, r) + \Gamma^D \sin(R, r)); \end{cases} \quad (10.1)$$

$$\Gamma^D = \dfrac{1}{|r|^2}\left(-n_1 \cos(r, S) + \sqrt{(n_2)^2 - (\Lambda + n_1 \sin(r, S))^2}\right) \quad (10.2)$$

Using the grating equation:

$$n_2 \sin(S', r) = n_1 \sin(S, r) + \Lambda, \quad (10.3)$$

equation (10.2) can be also written as:

$$\Gamma^D = \dfrac{1}{|r|^2}(-n_1 \cos(r, S) + n_2 \cos(r, S')) \quad (10.4)$$

For an SDS with a step height of $d_i$ the local zone spacing $w_i(R, d_i)$ is determined as:

$$w_i(R, d_i) = d_i \left| \dfrac{\dfrac{\partial \varphi(R, z)}{\partial z}}{\dfrac{\partial \varphi(R, z)}{\partial R}} \right| = d_i \left( \left| \dfrac{dz}{dR} \right| \right)^{-1}; \quad (11)$$

where $\varphi(R, z) = 0$ is the analytical definition of the substrate surface. If the substrate is explicitly described as a general aspheric surface of the form:

$$z = \dfrac{cR^2}{1 + \sqrt{1 - (1+k)c^2 R^2}} + \sum_{i=1}^{i=NT} A_i (R)^{2i}, \quad (12)$$

where c is the vertex curvature, k is a conic constant, and NT is the total number of aspheric terms, then the zone spacing as a function of the radial coordinate R can be written as:

$$w_i(R, d_i) = \left( \left| \dfrac{cR}{\sqrt{1 - (1+k)c^2 R^2}} + 2\sum_{i=1}^{i=NT} iA_i (R)^{2i-1} \right| \right)^{-1} \cdot d_i \quad (13)$$

and the diffractive term A is computed as follows from equation (3):

$$\Lambda = \dfrac{j\lambda}{d_i} \cdot \left| \dfrac{cR}{\sqrt{1 - (1+k)c^2 R^2}} + 2\sum_{i=1}^{i=NT} iA_i (R)^{2i-1} \right|. \quad (14)$$

The step depth $d_i$ can be variable if, for example, diffraction efficiency is to be optimized.

In the examples presented below, the foregoing methodology is used to provide real ray tracing through a variety of optical systems employing SDSs.

In general terms, SDS prescriptions fall into one of the following four cases:

(1) An SDS with a constant step height on a spherical base curve. This is the simplest form of an SDS type diffractive surface.

(2) An SDS with a constant step height on an aspheric base curve. The lateral step spacing (set of step widths) is different from that defined in case 1, allowing for extra degrees of freedom which can be used for adjustments in monochromatic performance of the system. This type of SDS can be efficiently used when the wavefront propagating through the SDS is planar or has only a small departure from a planar shape.

(3) An SDS with a variable step height on a spherical base curve. The lateral step spacing (set of step widths) for an SDS prescription of this type is, in general, different from cases 1 and 2. Allowing the step heights to vary provides extra degrees of freedom that can be used for adjustments in monochromatic performance (through variations in step widths) and efficiency of the system (through variations in step heights). This type of SDS can be efficiently used when the wavefront propagating through the SDS is not planar.

(4) An SDS with a variable step height on an aspheric base curve. An SDS prescription of this type provides lateral step spacings that, in general, are different from the ones provided by cases 1 through 3. This prescription provides the maximum degrees of freedom which can be used for adjustments in the monochromatic performance and diffraction efficiency of the system for any given shape of the wavefront propagating through the SDS.

B. Procedures for Optimizing the Diffraction Efficiency of Optical Systems Which Employ Stepped Diffractive Surfaces As discussed above, there are several factors affecting reduction in the diffraction efficiency (DE) of diffractive surfaces, and SDSs in particular. Those factors include finite spectral band of the radiation, finite field of view of the optical system, manufacturing imperfections, i.e., deviation of the microstructure from the nominal shape, etc.

The DE of a diffractive element is wavelength dependent. In optical systems with a finite spectral band, the DE is defined as an integral value over the working spectral range and is lower than the maximum value at the nominal wavelength. In the case of an SDS, that integral value can be optimized by a proper choice of the nominal wavelength $\lambda_0$ within the working spectral range and by balancing the losses at the marginal wavelengths. Typically, the value of the nominal wavelength $\lambda_0$ is offset from the median wavelength of the working wavelength range $\lambda_{med}=(\lambda_{min}+\lambda_{max})/2$ towards a shorter wavelength, i.e., $\lambda_0<\lambda_{med}$.

The DE of a diffractive element is also field dependent. Diffractive kinoforms are optimized on-axis. For any non-zero field, light propagates at an angle to the optical axis and the DE is lower compared to that on axis. The reduction in DE is proportional to the field of view (FOV). In particular, the DE of an optical system is obtained as an integral value over the FOV range and is less than the on-axis value.

Manufacturing imperfections also contribute to reduction of DE that can be reduced by improvements in the fabrication process.

In accordance with the invention, the DE of an optical system employing one or more SDSs is optimized using the procedures set forth below. The situations in which these procedures can be used are:

(1) where the optical system has a nonzero FOV;

(2) where a non-planar wavefront propagates along the optical axis of the system; and (3) the most general case, where both conditions 1 and 2 exist.

The invention also optimizes the DE for the above cases for systems which are not monochromatic, i.e., systems having a finite spectral range.

(1) Diffraction Efficiency Optimization in Optical Systems Having Finite Operative Fields As discussed above, one of the factors affecting the DE of a diffractive surface is the field of view of the optical system in which the diffractive surface is used. The diffraction efficiency of kinoform surfaces is usually optimized on-axis, i.e., the blaze angle of each individual zone is chosen such that at the nominal wavelength for an on-axis point the optical path difference (OPD) between all portions of the wavefront introduced by the individual zones of the kinoform is held constant and is a multiple of the nominal wavelength. For an off-axis point, i.e., for non-zero fields, this relation is not valid and the DE at the nominal wavelength is reduced compared to the on axis value.

In accordance with the invention, the diffraction efficiency of a lens system with a nonzero FOV employing a stepped diffractive surface is optimized at the nominal wavelength $\lambda_0$ so as to maximize the average diffraction efficiency over the system's field of view at the image plane. This is obtained at the expense of the system's on-axis diffraction efficiency. For a given wavelength, the OPD acquired by a wavefront propagating through the steps of an SDS monotonically increases with an increase in the angle of incidence of the wavefront. For a planar wavefront propagating through an SDS, the OPD normalized to its value at normal incidence is defined by the equation:

$$OPD = \sqrt{(n_2)^2 - (n_1 \cdot \sin(\theta))^2} - n_1 \cdot \cos(\theta) \quad (15)$$

where $\theta$ is the angle of incidence of the planar wavefront relative to the SDS's optical axis.

Figure 5:
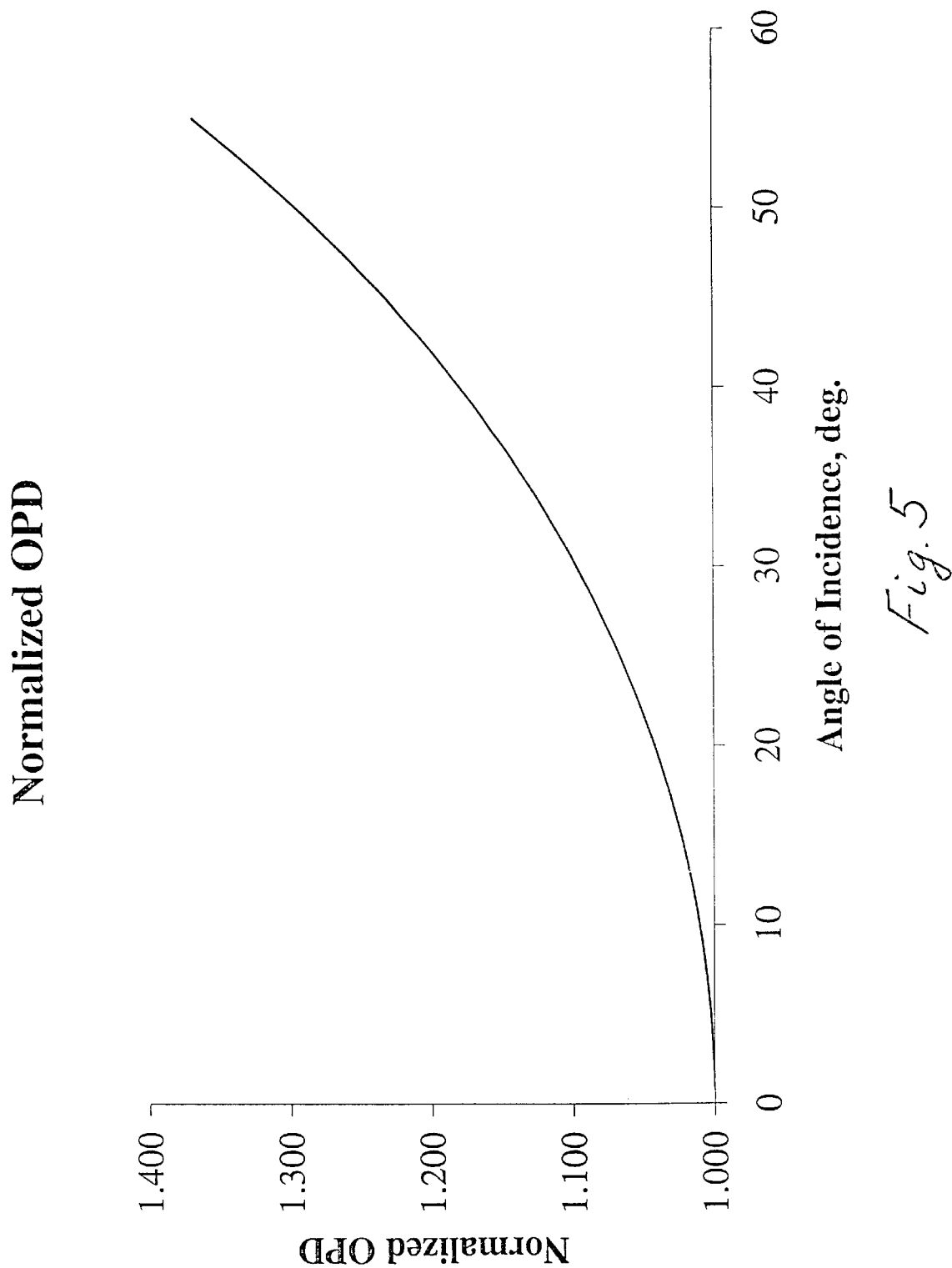
FIG. 5 is a plot of normalized OPD of an SDS as function of incident angle.

A graph of normalized OPD as a function of incidence angle is shown in FIG. 5.

The optimum (from an efficiency standpoint) step height for the ith zone when the incident wavefront is planar and collinear with the optical axis, i.e., the incidence angle is zero, is defined as:

$$d_{0i} \approx j_i \lambda_0/|(n_2-n_1)|, \quad (16)$$

where, as above, "$j_i$" is the order of the ith zone of the stepped diffractive surface ($j_i \geq 1$). This step height was consistently used in the prior art.

When the angle of incidence is not zero, the optimum step height is defined as follows:

$$d_{0i} = \left| \frac{j_i \lambda_0}{\sqrt{(n_2)^2 - (n_1 \cdot \sin(\theta_0))^2} - n_1 \cdot \cos(\theta_0)} \right| \quad (17)$$

where $\theta_0$ is the nominal angle of incidence on the planar structure, i.e., the angle that corresponds to optimum step height $d_{0i}$.

Figure 6:
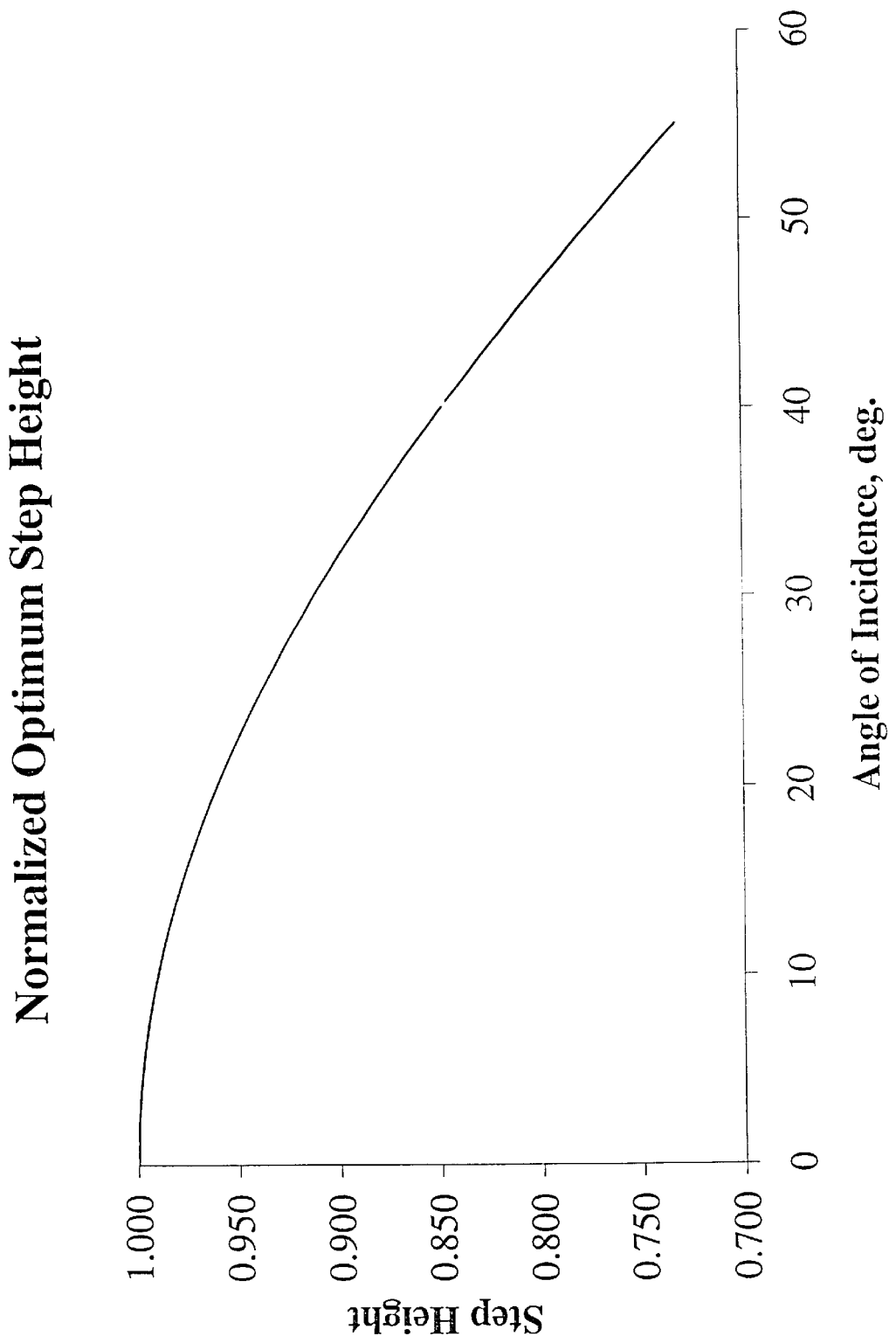
FIG. 6 is a plot of normalized optimum step height of an SDS as function of incident angle.

A normalized graph of equation (17) is shown in FIG. 6. Equation (17) reduces to equation (16) when the nominal angle of incidence $\theta_0=0$.

Because the optimum step height is not constant, but is a monotonically decreasing function of the nominal angle of incidence on the SDS structure, in most optical systems, efficiency optimization will require SDS step heights that are different from those used by the prior art and defined by equation (16). The only case when the optimum SDS diffraction efficiency is obtained with a constant nominal step height defined by equation (16) is for a plane wavefront propagating through the SDS along the optical axis.

The corresponding diffraction efficiency $\eta$ as a function of incidence angle $\theta$ is computed in the following manner:

$$\eta(\theta) = \left[ \frac{\sin\left[\pi\left(\frac{OPD(\theta)}{OPD(\theta_0)} - 1\right)\right]}{\left[\pi\left(\frac{OPD(\theta)}{OPD(\theta_0)} - 1\right)\right]} \right]^2 \quad (18)$$

where $\theta_0$ is the nominal angle of incidence, i.e. the angle used in calculating $d_{0i}$ in equation (17) which is the angle at which the DE has its maximum value of 1.0.

Figure 7:
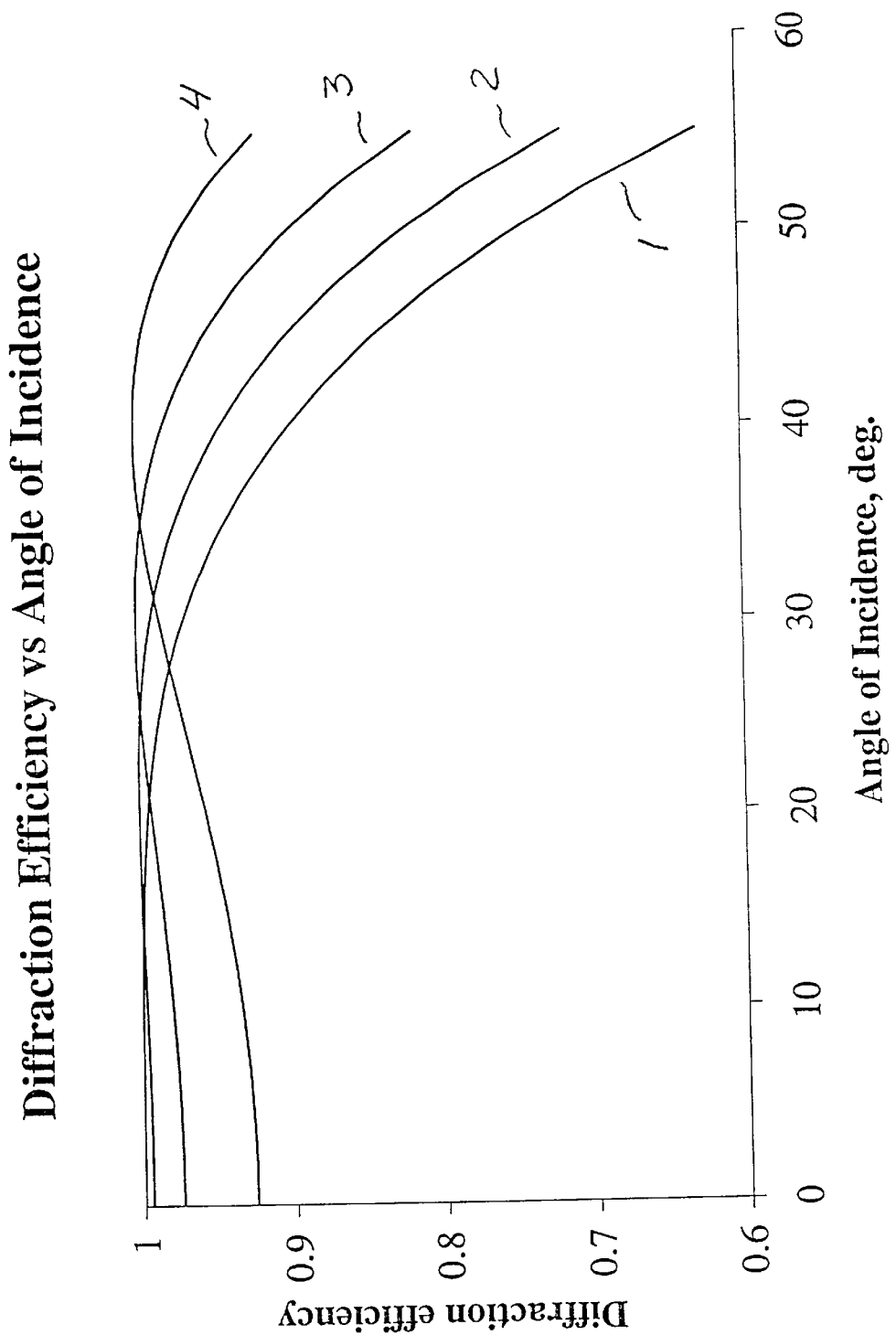
FIG. 7 illustrates DE as a function of angle of incidence.

Graphs of diffraction efficiency as a function of incidence angle $\theta$ calculated in accordance to equation (18) for nominal angles $\theta_0$ of 0, 20, 30 and 40 degrees are shown in FIG. 7 as curves 1 through 4, respectively.

The average diffraction efficiency for a finite angular range is computed as:

$$\eta_{Aver} = \frac{\int_0^{\theta_{Max}} \omega_\theta \eta(\theta) d\theta}{\int_0^{\theta_{Max}} \omega_\theta d\theta} \quad (19)$$

where $\theta_{Max}$ is the maxiumu angle within the angular range and $\lambda_\theta$ is a weighting factor associated with the given angle of incidence. The weighting factors $\lambda_\theta$ are chosen based on the specifications of the optical system, including the object size, on-axis versus off-axis contrast requirements, etc.

Equation (19) can be used to compute the average DE over the SDS when the incidence wavefronts are planar and every point on SDS receives light in the same angular range.

Average diffraction efficiencies computed for the above four $\theta_0$ angles by using equation (19), assuming equal angular weighting and a maximum angle of 50 degrees gave respectively 94.9%, 96.9%, 97.9% and 96.5%. The lowest efficiency of 94.9% corresponds to the case used in the prior art, i.e., $\theta_0=0$ so that doi is given by equation (16). It is clear that by choosing the step height of the SDS at the nominal wavelength based on a nonzero angle of incidence in accordance with equation (17), the DE of the system with nonzero FOV can be substantially improved.

(2) Diffraction Efficiency Optimization for Non-Planar Wavefronts and Finite Spectral Ranges When a non-planar wavefront is propagating through an SDS along the optical axis, the optimum step height should be made a function of the local wavefront curvature (or, equivalently, the local angle of incidence of a ray representing the wavefront, where the ray is normal to the wavefront at the point of interest). In particular, the optimum step height is calculated using equation (17) with $\theta_0$ in that equation being the local angle of incidence of the ray representing the wavefront. In this case, the SDS's optimum step height will vary across the SDS's aperture.

To define the step height as function of radial coordinate, various functions can be used, including polynomials of different orders, splines, etc. In various of the examples presented below, the SDS step height is defined using the following polynomial:

$$h(r) = h_0 A_0 \sum_{i=1}^{i=k} A_i r^i \quad (20)$$

where $h_0$ is the paraxial step height defined by equation (16), r is the radial coordinate, k is the degree of the polynomial and $A_i$ are the polynomial coefficients. Coefficient $A_0$ is used to scale the entire set of steps.

A first order diffraction efficiency $\eta$ as a function of the step height $d_i$, angle of incidence $\theta$ and wavelength $\lambda$ can be expressed as follows:

$$\eta = \left( \frac{\sin\pi\left( \frac{d_i\left(\sqrt{(n_2)^2 - (n_1\sin\theta)^2} - n_1\cos\theta\right)}{\lambda} - 1 \right)}{\pi\left( \frac{d_i\left(\sqrt{(n_2)^2 - (n_1\sin\theta)^2} - n_1\cos\theta\right)}{\lambda} - 1 \right)} \right)^2 \quad (21)$$

Equation (21) through its dependence on $\lambda$ allows the DE of the SDS structure to be optimized over a finite working spectral range. In particular, using equation (17), the first order diffraction efficiency over the spectral range from $\lambda_{min}$ to $\lambda_{max}$ can be calculated as:

$$\eta_{aver} = \int_{\lambda_{min}}^{\lambda_{max}} \left( \frac{\sin\pi\left(\frac{\lambda_0}{\lambda} - 1\right)}{\pi\left(\frac{\lambda_0}{\lambda} - 1\right)} \right)^2 d\lambda \quad (22)$$

In equation (22), the nominal wavelength $\lambda_0$ can be a function of radial coordinate, i.e., it may have different values for different steps of the SDS.

If a variable step height is impractical due to, for example, the limitations of a fabrication process, a constant step height can be used where the value of the step height is chosen by averaging across the SDS aperture so as to increase the average diffraction efficiency in the image plane. That is, the step height is optimized such that the on-axis DE and the DE at the marginal fields are compromised in such a manner that the overall DE of the system is improved. The optimum step height then occurs for some nonzero angle within the range of angles of incidence and is different from that used by the prior art and defined by equation (16).

It should be noted that when the step height is chosen to be constant to satisfy, for example, manufacturing considerations, then in evaluating equation (22), the nominal wavelength $\lambda_0$ becomes a variable function of radial coordinate or the step number i of the SDS.

In the most general case of an optical system with nonzero FOV, finite spectral range and a nonplanar wavefront propagating through an SDS, the optimum step height is a variable function of aperture position and is defined for some nonzero field within the system's operative field of view, accounting for the extent of the working wavelengths.

VI. EXAMPLES

Without intending to limit it in any manner, the present invention will be more fully described by the following examples.

In the ray aberration plots below, OBJ represents the object size in millimeters, EY and EX represent the tangential and sagittal directions in the image plan, and PY and PX represent the tangential and sagittal directions in the pupil of the system. Except where indicated, the solid lines represents the nominal wavelength, the dashed lines with the longer dashes represents the longer marginal wavelength within the working wavelength range, and the dashed lines with the shorter dashes represents the shorter marginal wavelength within the working wavelength range.

Each of the SDS's described below is designed to work in first order, i.e., $j_i=1$ for all i.

Example 1

Achromatic Singlets with Stepped Diffractive Surfaces

Incorporation of an SDS into an optical system introduces aberrations. Specifically, when an SDS is used to achromatize a singlet, spherical aberration is introduced into the system and if not taken into account in the design process, can make the system's performance unacceptable. At the same time, accounting for both chromatic and monochromatic aberrations of an SDS in the design process can improve system performance over the case when an SDS is not used.

This example provides several possible solutions for achromatic diffraction limited singlets, i.e., single lenses that include SDS surfaces and provide diffraction limited performance over a wide spectral range. For purposes of illustration, the spectral range was chosen to be from 0.85 microns to 1.5 microns, making the singlets suitable for transmission in any existing fiber communication channels. The material for the singlets was chosen to be fused silica. The F/# of the singlets was chosen to be 1.5, allowing efficient collimating and coupling for both single-mode and multi-mode fibers. The calculated coupling losses for the singlets were negligible for single-mode fibers with a numerical aperture of 0.1 and were less than 1 dB for multi-mode fibers with a numerical aperture of 0.25. The singlets can be used as collimators or as focusing lenses that respectively diverge light from a point source to an essentially planar wavefront or converge an incoming planar wavefront to an achromatic diffraction limited spot. It is to be understood that these examples were chosen for illustrative purposes only and the principles of the invention are applicable for any other singlets with different F/#'s, wavelength ranges and conjugates both in image and object space.

Figure 8:
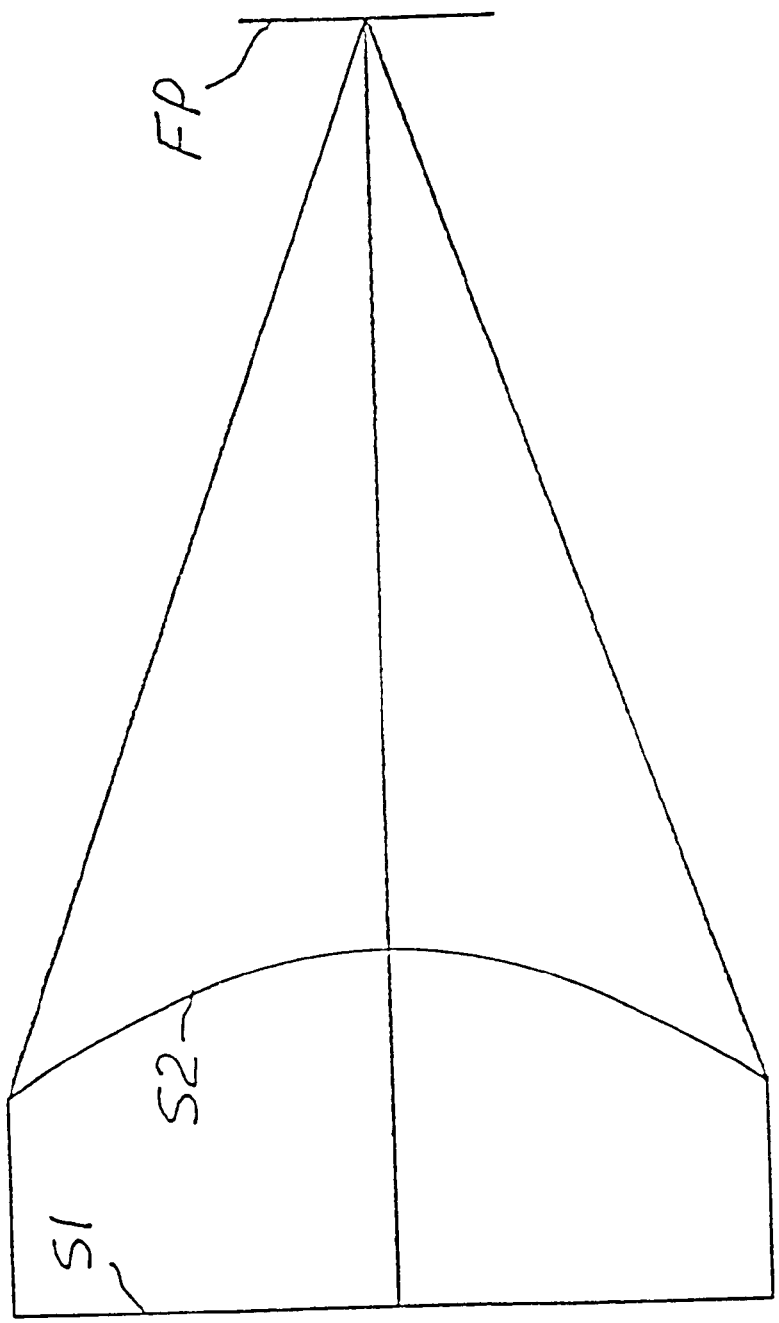
FIG. 8 is a schematic layout of achromatic singlets #1 through #5 of Example 1 (hereinafter the "first group").

The first set of singlets comprises an SDS as a first surface located in a collimated beam and a refractive asphere in a converging beam as a second surface. The wavefront propagating through the SDS is planar, so that the singlet functions as a converging lens with the SDS positioned on the infinite conjugate side. The layout of the singlets is shown in FIG. 8, where S1 and S2 designate respectively the first and the second surfaces of the singlet and FP is its focal plane. The prescription data for the singlets in millimeters is shown in Table 1, where in this table and in Tables 3 and 5, A0 through A4 are for use in equation (20) above to define step heights and R, K, D, E, F, G and H are the coefficients of a polynomial asphere defined by the following equation:

$$S = \frac{r^2}{R\left(1 + \sqrt{1 - (1+K)\left(\frac{r}{R}\right)^2}\right)} + D(r)^4 + E(r)^6 + F(r)^8 + G(r)^{10} + H(r)^{12}$$

where S is the axial sag of the asphere and r is the radial coordinate. The distances between S1 and S2 for singlets #1 through #5 was 0.8 millimeters in all cases.

The radius of the Airy disk was calculated to be 1.56 microns based on the shortest wavelength of the spectrum. Singlets #1 through #3 are designed at the nominal wavelength of 0.85 microns. The SDS step height for singlets #1 and #2, as well as the paraxial step height for singlet #3 was 1.878 microns as defined by equation (16). Singlet #4 was designed at the nominal wavelength of 1.3 microns and had an SDS step height of 2.909 microns. Singlet #5 was designed at the nominal wavelength of 1.5 microns with an SDS step height of 3.374 microns. Singlets #2, #4 and #5 are identical in terms of degrees of freedom used in the design, i.e., they each comprise an SDS having a conic base surface and a constant step height and a refractive asphere. The difference between them is the nominal wavelength, leading to a different step size as follows from equation (16). Between the five singlets considered, singlets #2, #4 and #5 provide the highest diffraction efficiency at the nominal wavelength since the light incident on the SDS is collimated and parallel to the optical axis so that the step height is optimum.

Singlet #1 contains an SDS with a constant step height on a spherical substrate as surface S1 and a refractive asphere as surface S2. The step heights and widths for the singlet are listed in Table 2A. The ray aberration curves for this case are shown in FIG. 9A. The full scale of FIG. 9A is +/−2 microns. The design has a sizeable amount of residual spherical aberration at the nominal wavelength, comparable to the size of the Airy disk. The geometrical radius of the spot diagram at the nominal wavelength was 1.03 microns. Replacement of the SDS by a planar surface introduces no change in monochromatic performance at the nominal wavelength of 0.85 microns.

Figure 9B:
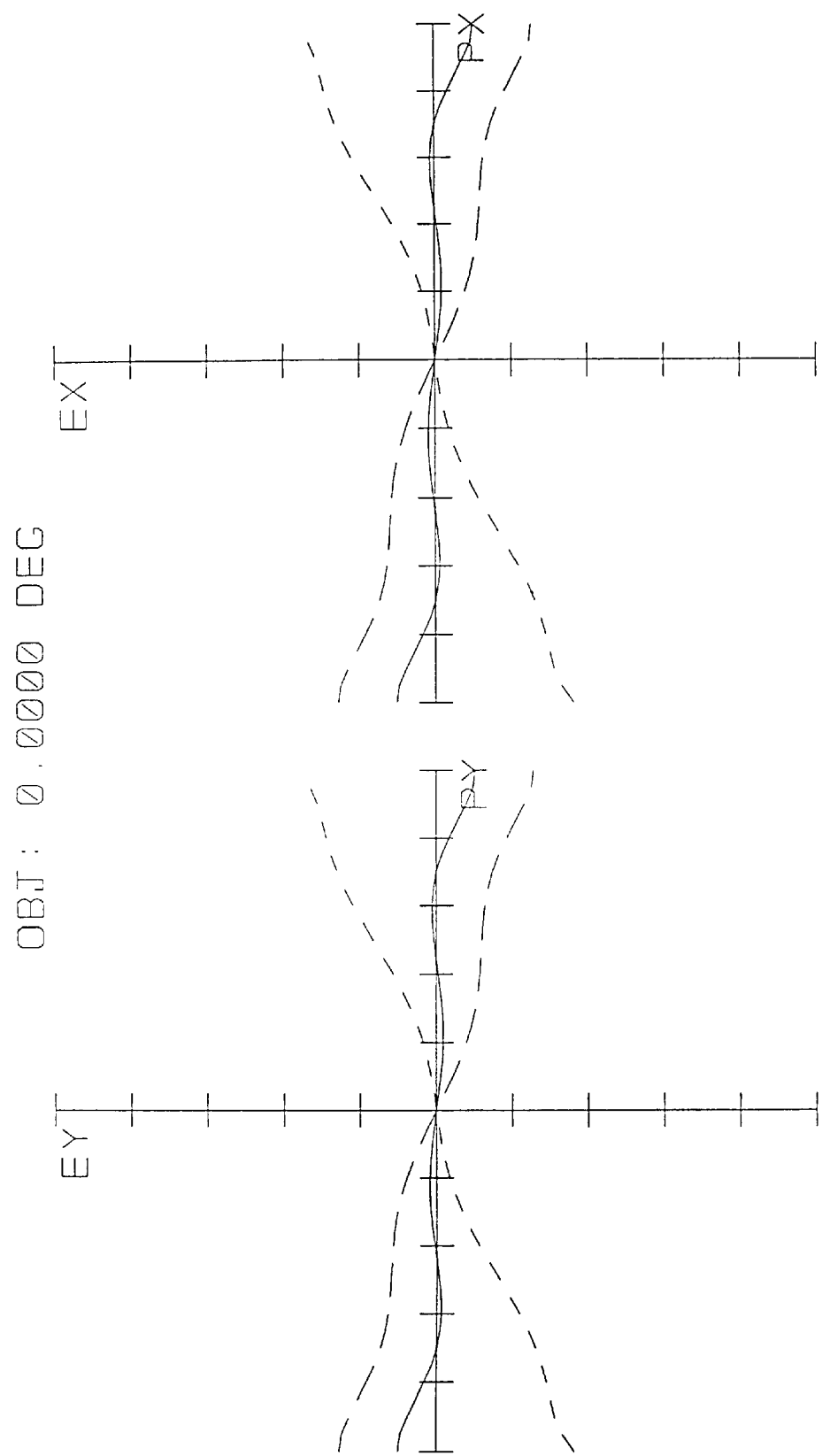

To reduce the amount of spherical aberration at the nominal wavelength, the SDS base surface can be aspherized, as illustrated by singlet #2. This singlet is composed of an SDS with a constant step height and an aspherical (conic) substrate as surface S1 and a refractive asphere as surface S2. The step heights and widths for the singlet are listed in Table 2B. The ray aberration curves for this case are presented in FIG. 9B. The full scale of FIG. 9B is +/−0.5 microns. As can be seen in this figure and from the change in scale compared to FIG. 9A, allowing the base curve of the SDS to be aspherical has essentially eliminated the system's spherical aberration. The geometrical radius of the spot diagram at the nominal wavelength was 0.05 microns and did not change with replacement of the SDS with a planar surface.

Figure 9C:
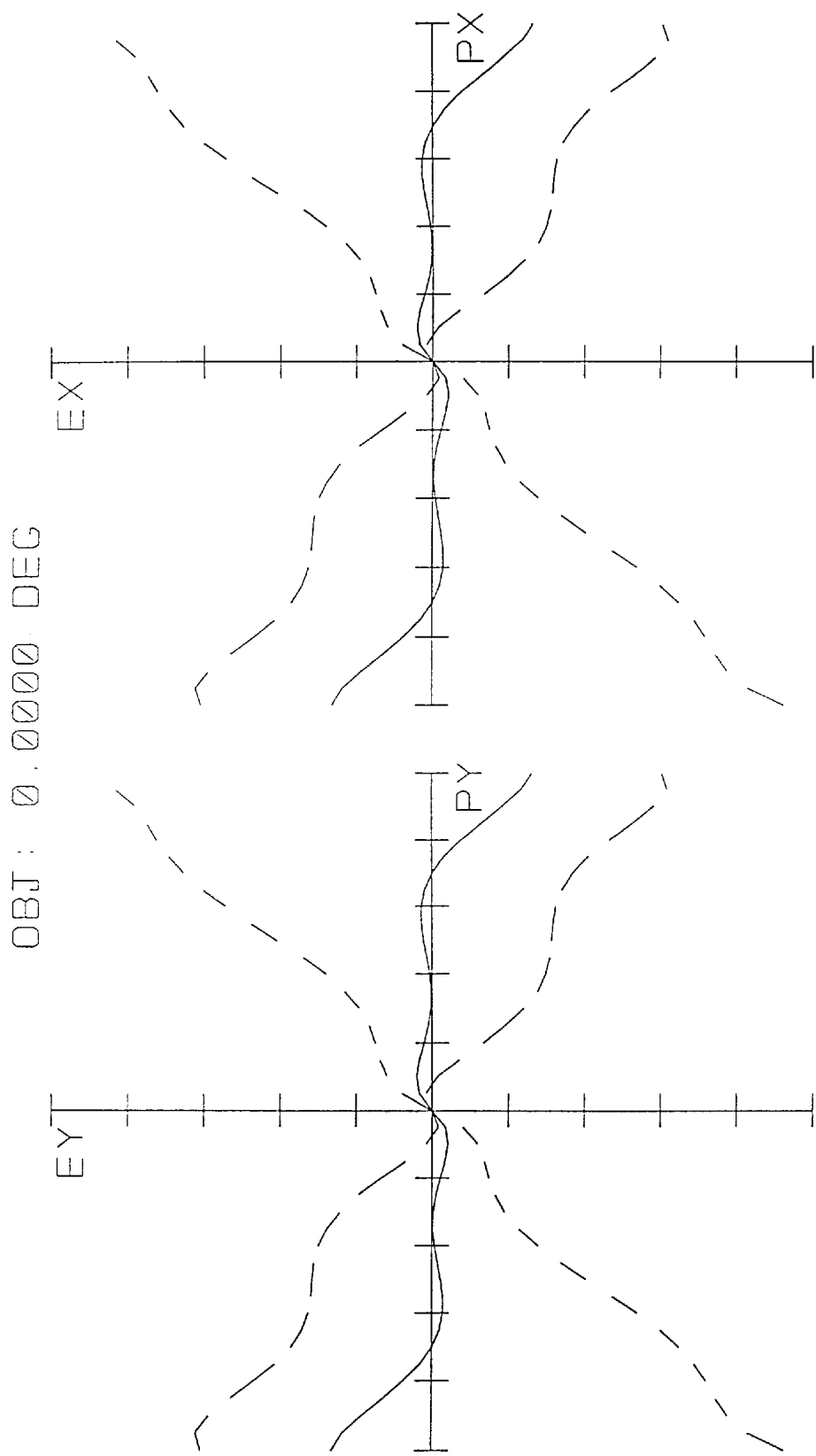

Singlet #3 is composed of an SDS with a variable step height on a conical base surface as surface S1 and a refractive asphere as surface S2. The step heights and widths for the singlet are listed in Table 2C. By using an SDS with a conical base surface and with a variable step height, this singlet achieves the same level of performance as singlet #2 with the complexity of the refractive asphere reduced to a conic. The ray aberration curves for this case are presented in FIG. 9C. The full scale of FIG. 9C is +/−0.2 microns. The geometrical radius of the spot diagram at the nominal wavelength of 0.85 microns was 0.05 microns and becomes 0.91 microns when the SDS is replaced by a planar surface. A graph of normalized step height as a function of radial coordinate is shown in FIG. 10.

Figure 9D:
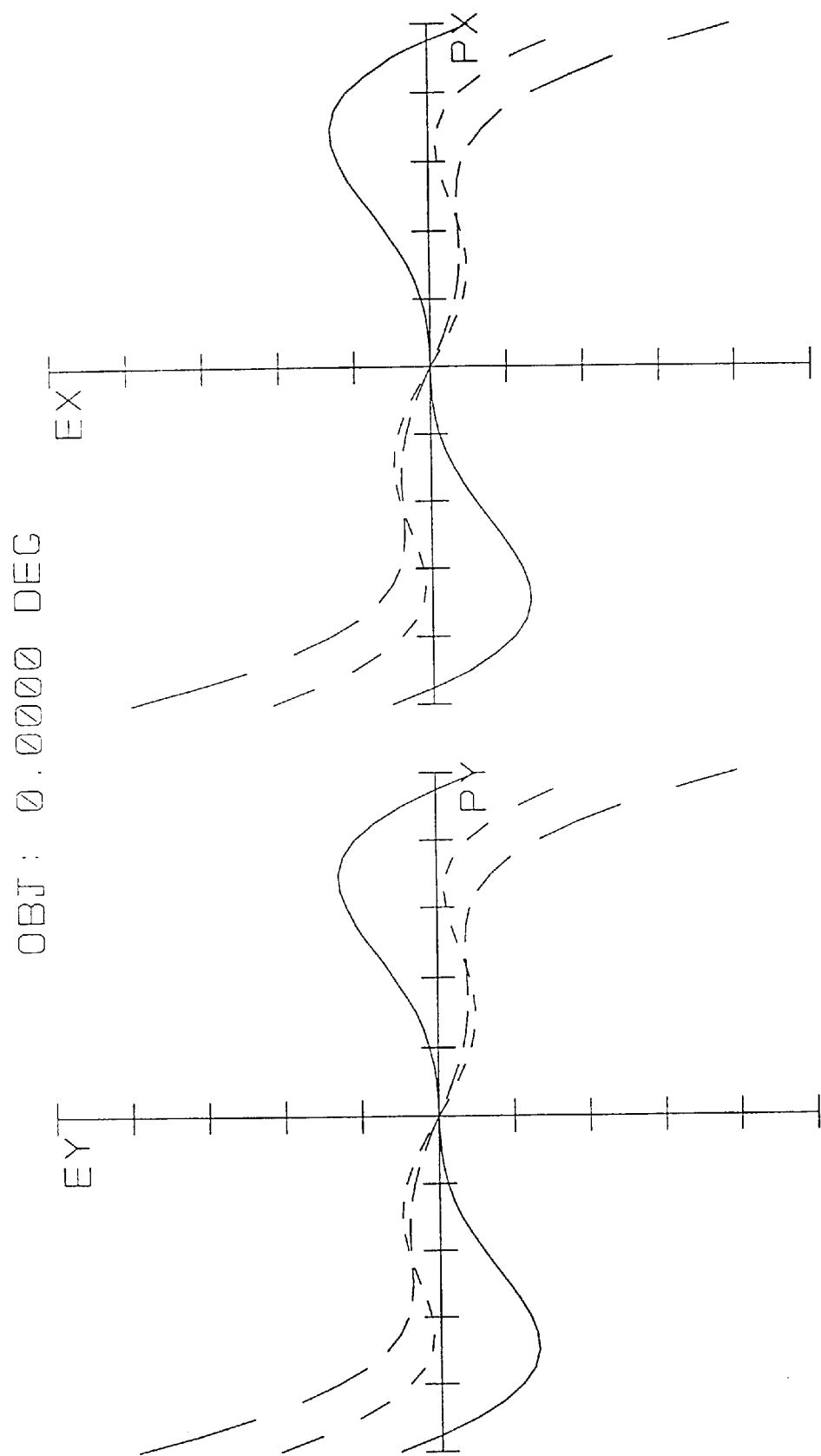

Singlet #4 is composed of an SDS with a constant step height and an aspherical (conic) substrate as surface S1 and a refractive asphere as surface S2. The step heights and widths for the singlet are listed in Table 2D. The ray aberration curves for this case are shown in FIG. 9D. The full scale of FIG. 9D is +/−0.5 microns. The geometrical radius of the spot diagram at the nominal wavelength of 1.3 microns was calculated to be 0.13 microns and did not change when the SDS was replaced by a planar surface.

Figure 9E:
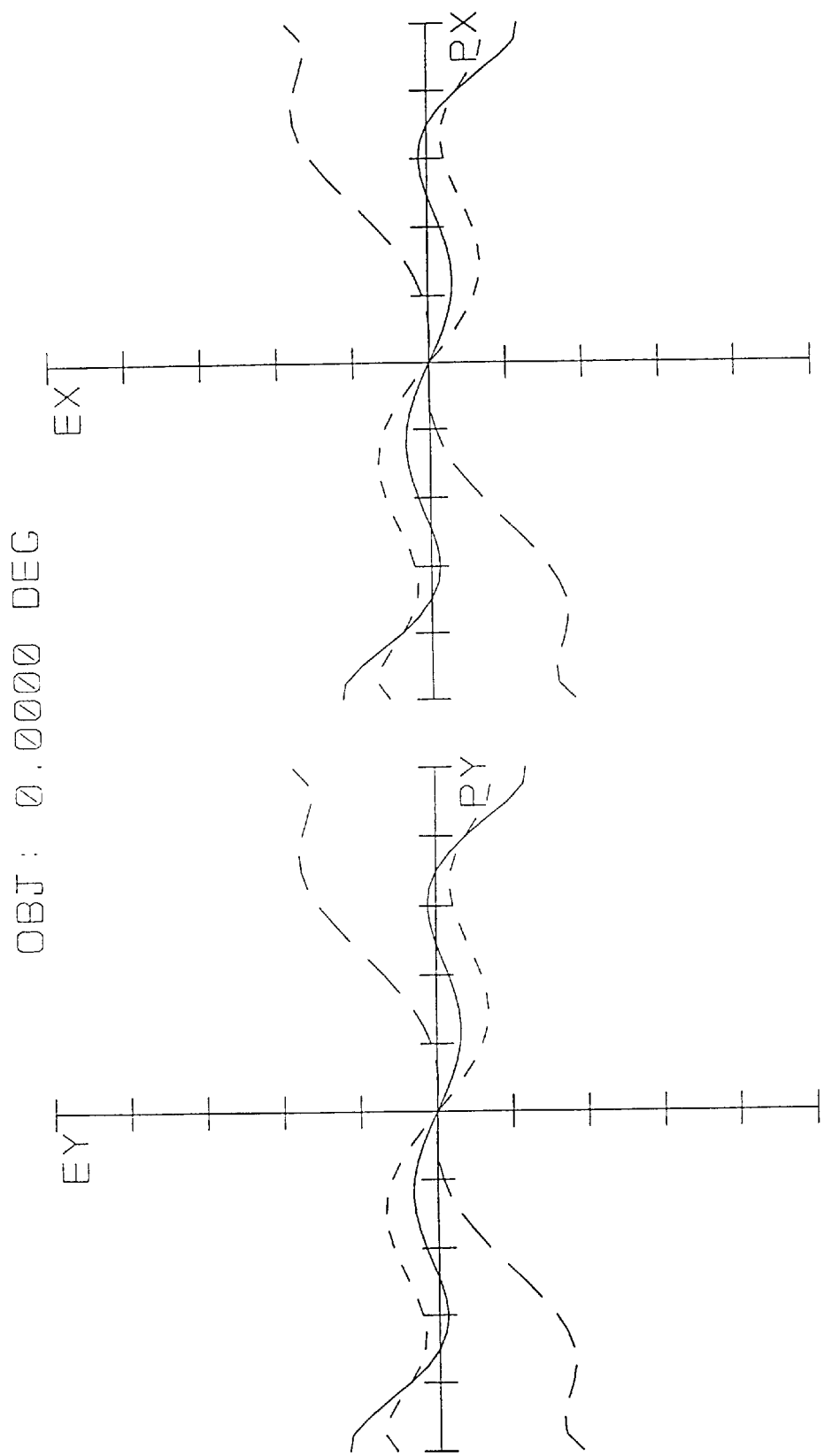

Singlet #5 is composed of an SDS with a constant step height and an aspherical (conic) substrate as surface S1 and a refractive asphere as surface S2. The step heights and widths for the singlet are listed in Table 2E. The ray aberration curves for this case are shown in FIG. 9E. The full scale of FIG. 9E is +/−0.5 microns. The geometrical radius of the spot diagram at the nominal wavelength of 1.5 microns did not change when the SDS was replaced by a planar surface and was calculated to be 0.12 microns.

The second set of singlets comprises a refractive asphere as a first surface located in a collimated beam and an SDS as a second surface in a converging beam. The layout of the singlets is shown in FIG. 11. The designations are the same as on the FIG. 8. The prescription data for the singlets is shown in Table 3. The distances between S1 and S2 for singlets #6 through #11 was 0.8 millimeters in all cases.

The radius of the Airy disk was calculated to be 1.56 microns, based on the shortest wavelength of 0.85 microns. Singlets #6 through #9 were designed at the nominal wavelength of 0.85 microns. The SDS step height for singlet #6, as well as the paraxial step height for singlets #8 and #9, was 1.878 microns as defined by equation (16). To increase the average diffraction efficiency over the singlet aperture, the SDS step height for singlet #7 was 1.841 microns, corresponding to a nominal angle of incidence of 14 degrees. Singlet #10 was designed at the nominal wavelength of 1.3 microns and had an SDS step height of 2.909 microns. Singlet #11 was designed at the nominal wavelength of 1.5 microns with an SDS step height of 3.374 microns. Singlets #7, #10 and #11 are identical in terms of degrees of freedom used in the design, i.e., each singlet comprises an SDS with a conic base surface and a constant step height as surface S2 and a refractive asphere as surface S1. The difference between them is the nominal wavelength, leading to different step sizes as follows from equation (16). Because the SDS is located in a convergent beam, singlet #9 with a conic base curve and a variable step height provides the highest diffraction efficiency in the group.

Figure 12A:
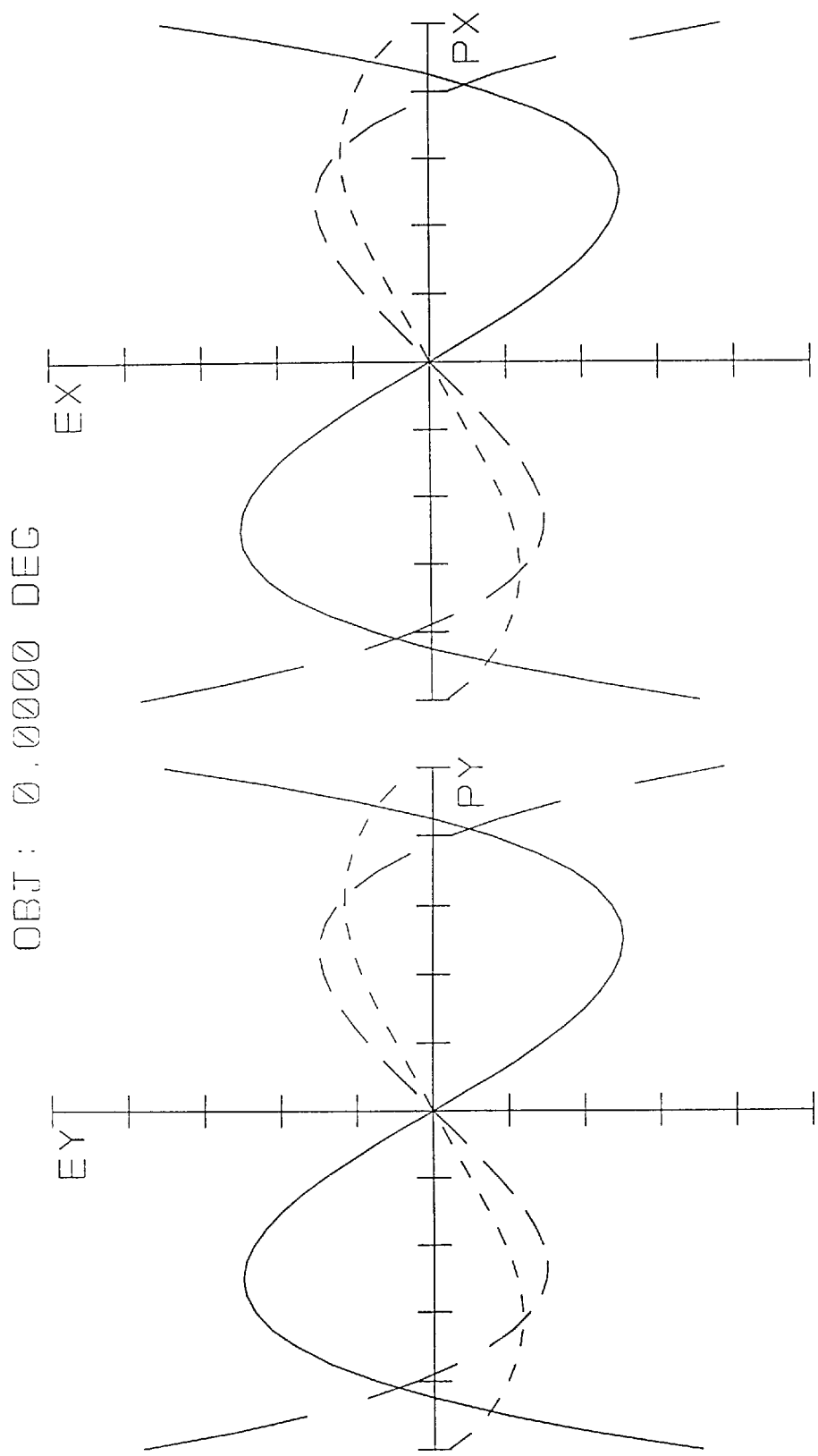

Singlet #6 contains an SDS with a constant step height on a spherical substrate. The step heights and widths for the singlet are listed in Table 4A. The wavefront propagating through the SDS is converging, corresponding to a focusing lens with the SDS positioned at the short conjugate, i.e., closer to the focus. The ray aberration curves for this case are presented in FIG. 12A. The full scale of FIG. 12A is +/−0.5 microns. Replacement of the SDS by a planar surface introduces monochromatic aberrations. In particular, the geometrical radius of the spot diagram at the nominal wavelength of 0.85 microns is increased from 0.35 microns to 0.84 microns by such a replacement. In this example, the spherical aberration introduced by the SDS is corrected by balancing it against spherical aberration of opposite sign introduced by the refractive surface. The SDS step height for this singlet was defined by equation (16).

Figure 12B:
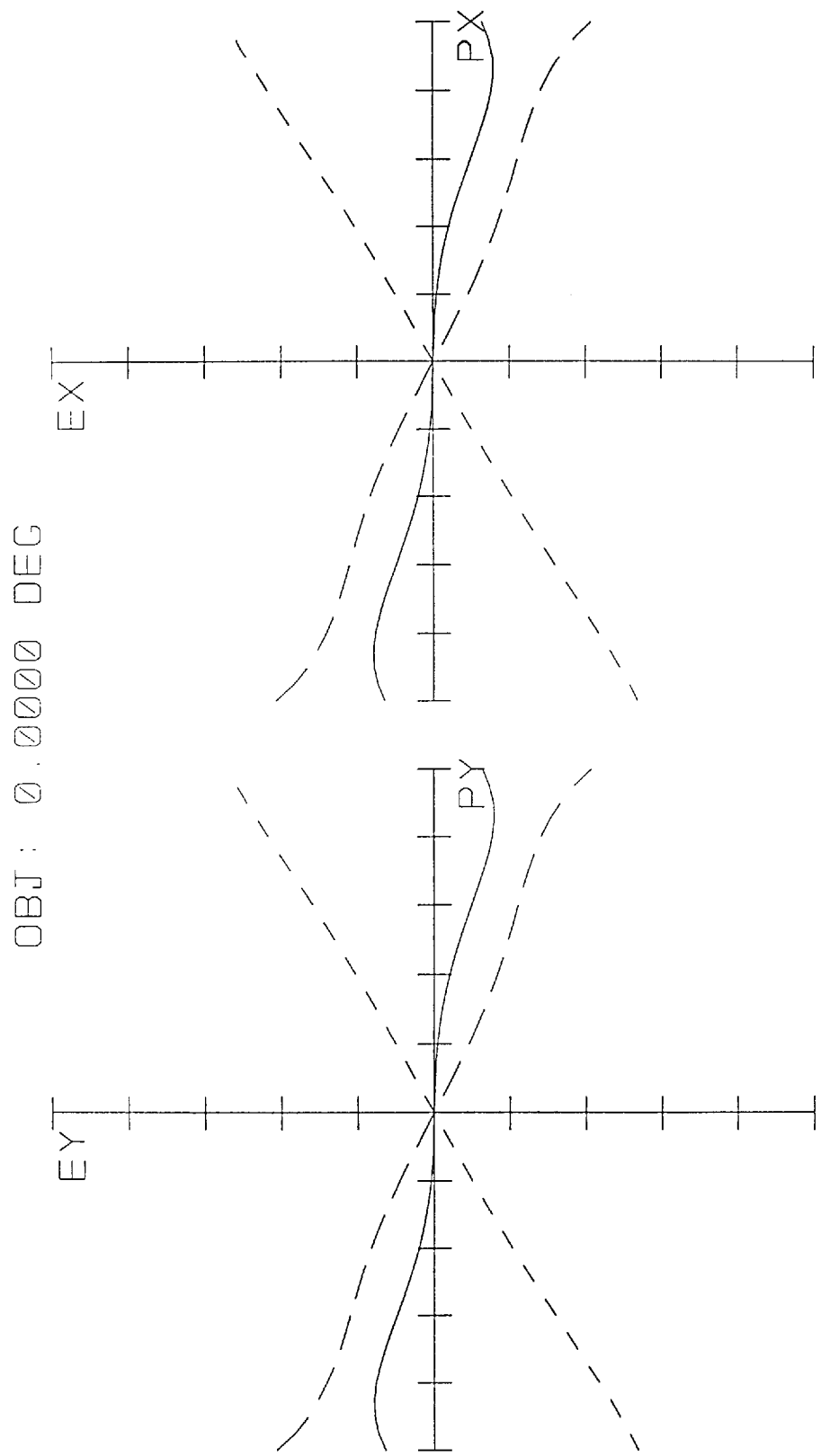

Singlet #7 is composed of a refractive asphere as surface S1 and an SDS with a constant step height and an aspherical (conic) substrate as surface S2. The step heights and widths for the singlet are listed in Table 4B. To increase the average diffraction efficiency over the aperture of the singlet, the step height was chosen to be 1.841 microns, corresponding to a nominal angle of incidence of 14 degrees. The ray aberration curves for this case are presented in FIG. 12B. The full scale of FIG. 12B is +/−0.2 microns. Replacement of the SDS by a planar surface introduces monochromatic aberrations. In particular, the geometrical radius of the spot diagram at the nominal wavelength of 0.85 microns is increased from 0.03 microns to 0.90 microns by such a replacement. The spherical aberration introduced by the SDS is corrected by balancing it against spherical aberration of opposite sign introduced by the refractive surface.

Figure 12C:
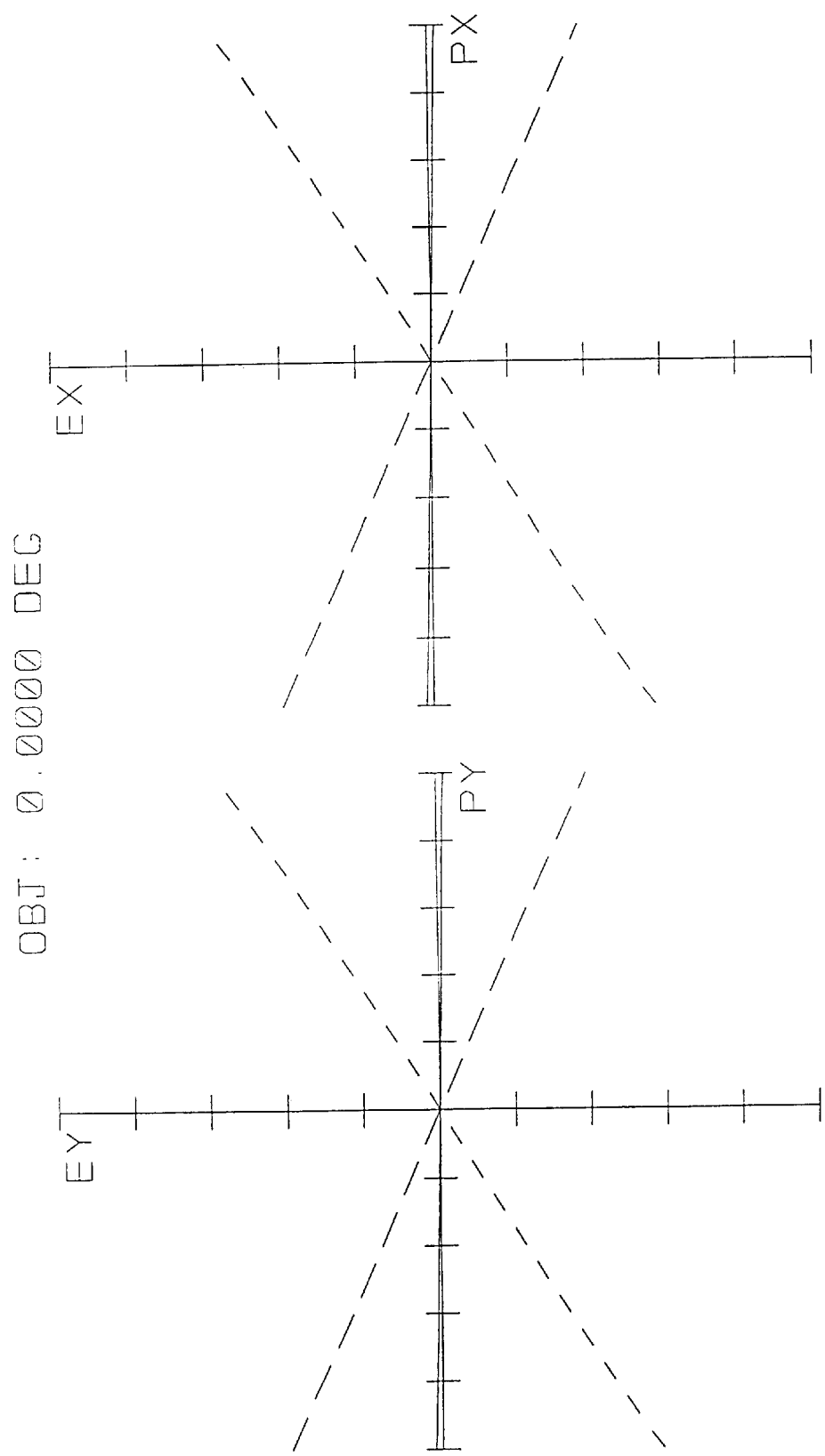

Singlet #8 is composed of a refractive asphere as surface S1 and an SDS with a variable step height on a spherical base surface as surface S2. The step heights and widths for the singlet are listed in Table 4C. The ray aberration curves for this case are presented in FIG. 12C. The full scale of FIG. 12C is +/−0.2 microns. Replacement of the SDS by a planar surface introduces monochromatic aberrations. In particular, the geometrical radius of the spot diagram at the nominal wavelength of 0.85 microns is increased from 0.01 microns to 4.23 microns by this replacement. The step height of the SDS was defined by a fourth order polynomial in accordance with equation (20). A graph of normalized step height as a function of radial coordinate is shown in FIG. 13, curve 1.

Figure 12D:
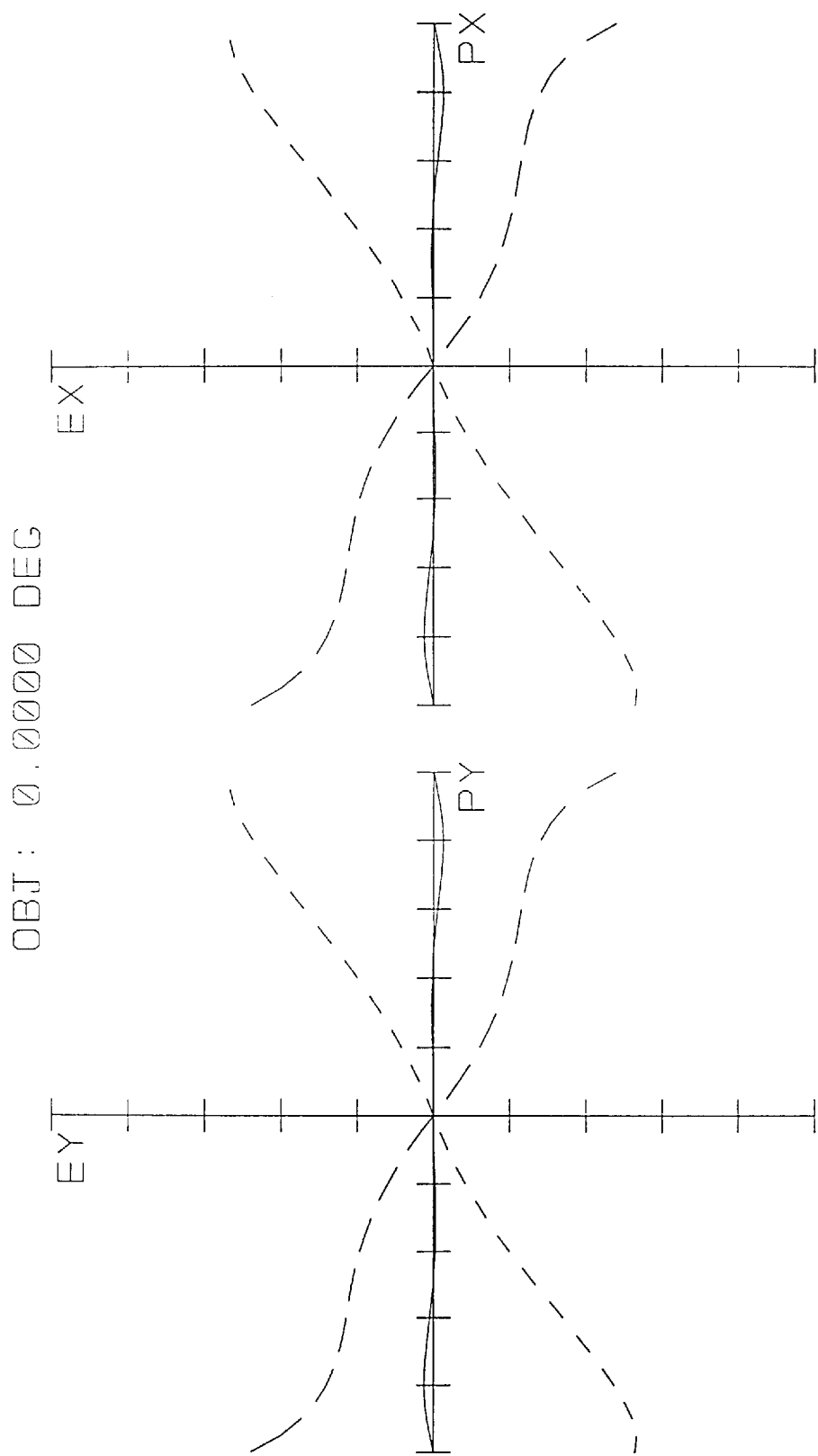

Singlet #9 is composed of a refractive asphere as surface S1 and an SDS with a variable step height on a conical base surface as surface S2. The step heights and widths for the singlet are listed in Table 4D. The ray aberration curves for this case are presented in FIG. 12D. The full scale of FIG. 12D is +/−0.2 microns. Replacement of the SDS by a planar surface introduces monochromatic aberrations. In particular, the geometrical radius of the spot diagram at the nominal wavelength of 0.85 microns is increased from 0.01 microns to 0.66 microns by this replacement. The step height of SDS was defined by a fourth order polynomial in accordance with equation (20) and was constrained by the angles of incidence in accordance with equation (17) to get the highest diffraction efficiency. Singlet #9 has the highest diffraction efficiency of the group. A graph of normalized step height as a function of radial coordinate is shown in FIG. 13, curve 2.

Figure 12E:
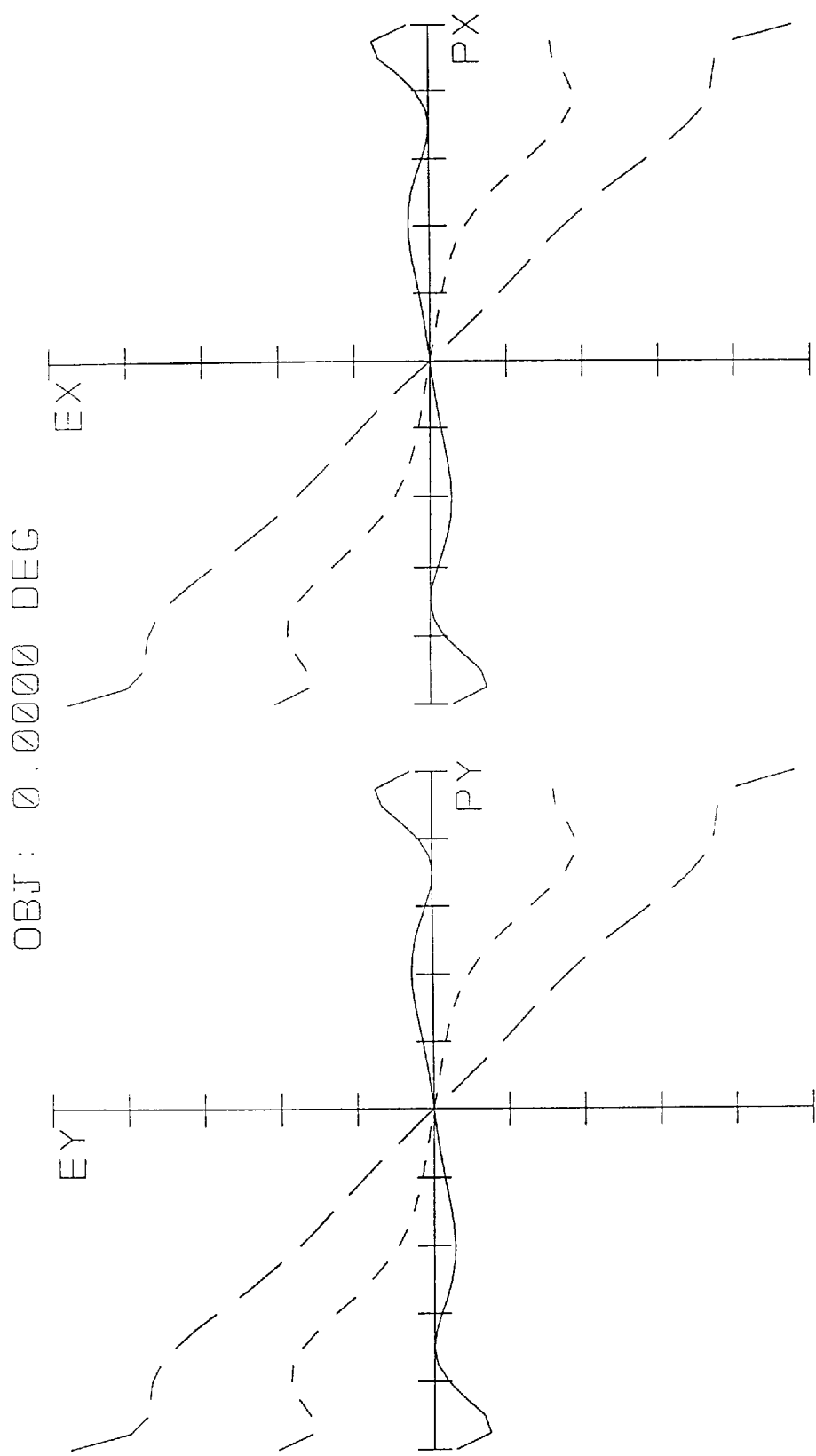

Singlet #10 is composed of a refractive asphere as surface S1 and an SDS with a constant step height and aspherical (conic) substrate as surface S2. The step heights and widths for the singlet are listed in Table 4E. The ray aberration curves for this case are presented in FIG. 12E. The full scale of FIG. 12E is +/−0.2 microns. Replacement of the SDS by a planar surface introduces monochromatic aberrations. In particular, the geometrical radius of the spot diagram at the nominal wavelength of 1.3 microns is increased from 0.03 microns to 0.94 microns by such a replacement.

Figure 12F:
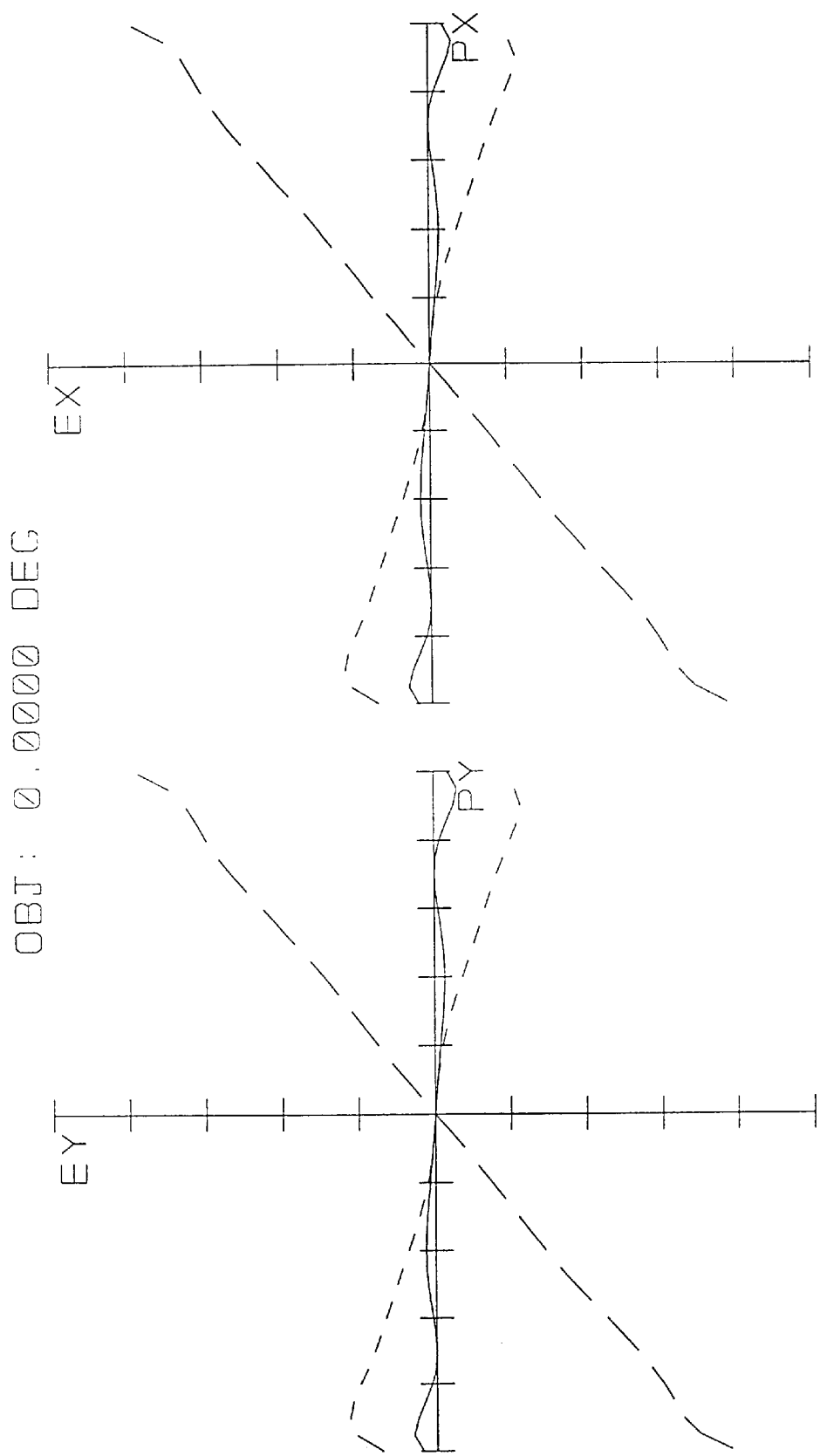

Singlet #11 is composed of a refractive asphere as surface S1 and an SDS with a constant step height and an aspherical (conic) substrate as surface S2. The step heights and widths for the singlet are listed in Table 4F. The ray aberration curves for this case are presented in FIG. 12F. The full scale of FIG. 12F is +/−0.2 microns. Replacement of the SDS by a planar surface introduces monochromatic aberrations. In particular, the geometrical radius of the spot diagram at the nominal wavelength of 1.5 microns is increased from 0.01 microns to 1.09 microns by such a replacement.

From the results obtained with the singlets of sets 1 and 2, it can be seen that except for a planar wavefront propagating on-axis through an SDS with a constant step height (i.e., singlets #1 and #2), when balancing of the monochromatic aberrations of an SDS against the monochromatic aberrations of non-stepped optical surfaces in the system has been performed, the monochromatic performance at the nominal wavelength is degraded when the SDS is replaced by a planar surface.

The third set of singlets provides solutions for lenses that are used at finite conjugates. The singlets can be used as coupling devices. They comprise an SDS facing a longer conjugate and a refractive asphere as a second surface facing the shorter conjugate. The layout of the singlets is presented in FIG. 14 where OP and IP designate respectively the object plane and the image plane, and S1 and S2 designate respectively the first and the second surfaces of the singlet. Although in the examples below, S1 was an SDS and S2 was a refractive surface, the sequence can be reversed. The prescription data for the singlets is shown in Table 5. The distances between S1 and S2 for singlets #12 through #17 was 0.80 millimeters in all cases. The object and image distances were in all cases 10.00 millimeters and 2.47 millimeters, respectively.

The singlets were designed for a primary wavelength of 1.3 microns. They have a working F/#=1.5 and an effective focal length of 2.0 mm. The radius of the Airy disk was calculated to be 1.56 microns, based on the shortest wavelength of 0.85 microns. The paraxial SDS step height was 2.909 microns. As discussed below, singlets #15 and #17, which have variable step heights, provide the highest diffraction efficiency in the group.

Figure 15A:
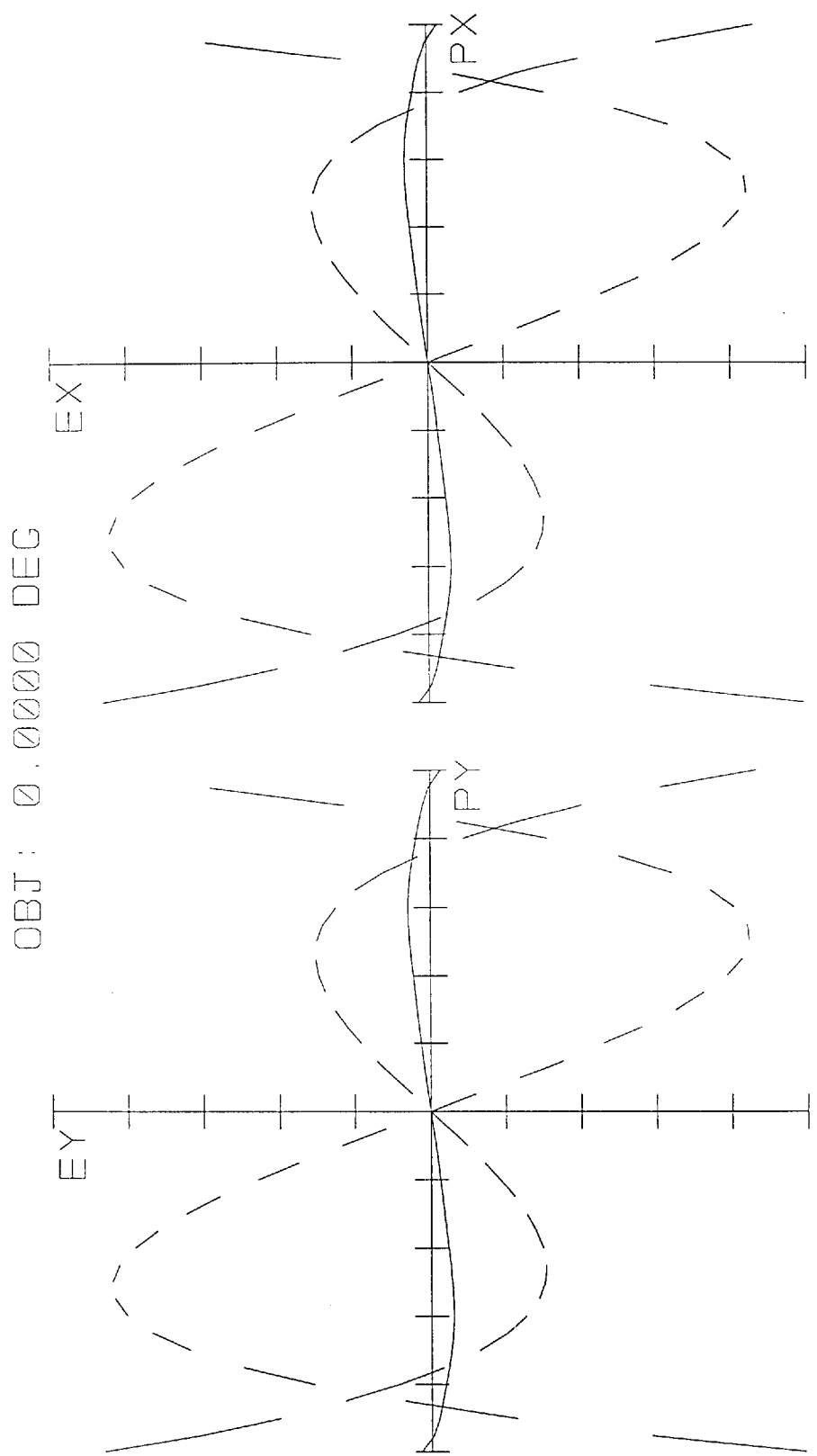

Singlet #12 contains an SDS with a constant step height on a spherical substrate as surface S1. The step heights and widths for the singlet are listed in Table 6A. The wavefront propagating through the SDS is diverging. The step height was 2.909 microns and was constant across the SDS aperture. The ray aberration curves for this case are presented in FIG. 15A. The full scale of FIG. 15A is +/−2.0 microns. Replacement of the SDS by a planar surface introduces monochromatic aberrations. In particular, the geometrical radius of the spot diagram at the nominal wavelength of 1.3 microns is increased from 0.12 microns to 0.62 microns by such a replacement. In this example, the spherical aberration introduced by the SDS is corrected by balancing it against spherical aberration of opposite sign introduced by the refractive surface. The SDS step height for this singlet was defined by equation (16).

Figure 15B:
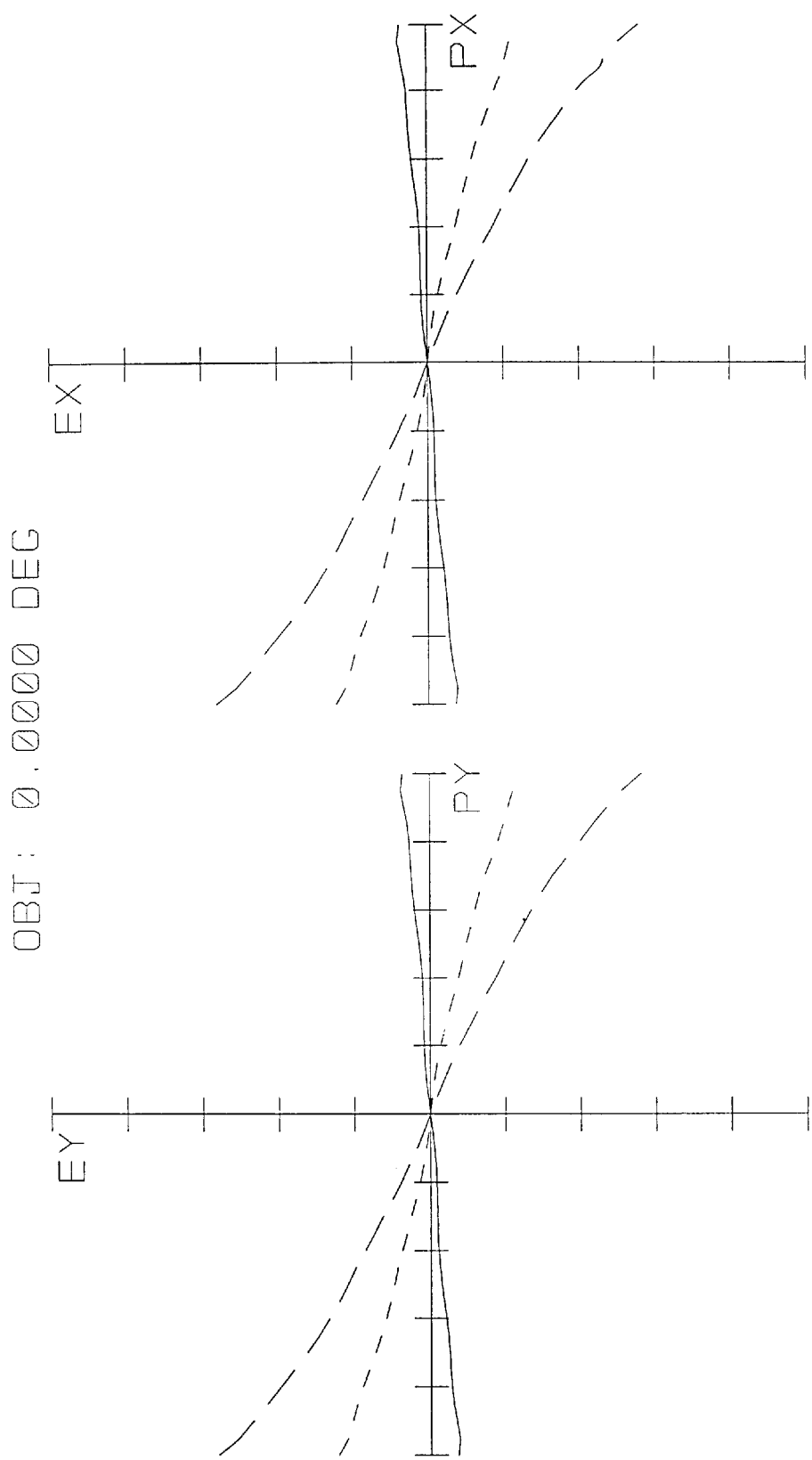

Singlet #13 is composed of a refractive asphere and an SDS with a constant step height and an aspherical (conic)

substrate as surface S1. The step heights and widths for the singlet are listed in Table 6B. The step height was 2.909 microns and was constant across the SDS aperture. The ray aberration curves for this case are presented in FIG. 15B. The full scale of FIG. 15B is +/−1.0 microns. Replacement of the SDS by a planar surface introduces monochromatic aberrations. In particular, the geometrical radius of the spot diagram at the nominal wavelength of 1.3 microns is increased from 0.08 microns to 0.50 microns by such a replacement. The spherical aberration introduced by the SDS is corrected by balancing it against spherical aberration of opposite sign introduced by the refractive surface.

Singlet #14 is composed of an SDS with a variable step height on a spherical base surface as surface S1 and a refractive asphere as surface S2. The step heights and widths for the singlet are listed in Table 6C. The paraxial step height was 2.909 microns. The design goal was primarily to reduce aberrations and no effort was made to maximize the DE. The ray aberration curves for this case are presented in FIG. 15C. The full scale of FIG. 15C is +/−1.0 microns. Replacement of the SDS by a planar surface introduces monochromatic aberrations. In particular, the geometrical radius of the spot diagram at the nominal wavelength of 1.3 microns is increased from 0.08 microns to 39.8 microns by such a replacement. The step height of the SDS was defined by a fourth order polynomial in accordance with equation (20). A graph of normalized step height as a function of radial coordinate is shown in FIG. 16, curve 1. The behavior of this curve is opposite to what would be expected for optimum step height as a function of the angle of incidence if DE had been taken into account. See FIG. 6.

Figure 15D:
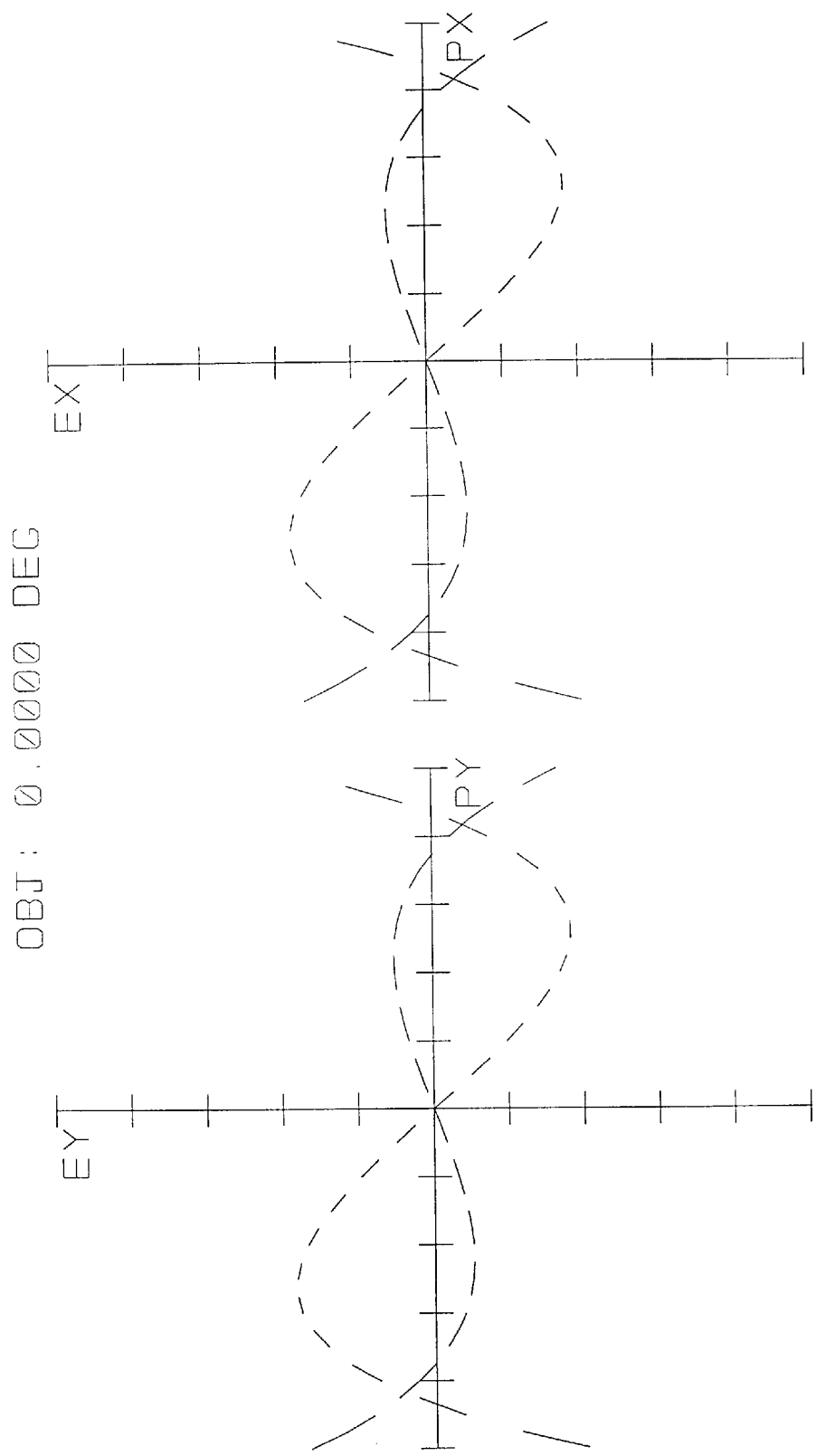

Singlet #15 is composed of an SDS with a variable step height on a spherical base surface as surface S1 and a refractive asphere as surface S2. The step heights and widths for the singlet are listed in Table 6D. The paraxial step height was 2.909 microns. The design goal was to reduce aberrations and at the same time to maximize the DE. The ray aberration curves for this case are presented in FIG. 15D. The full scale of FIG. 15D is +/−5.0 microns. Replacement of the SDS by a planar surface introduces monochromatic aberrations. In particular, the geometrical radius of the spot diagram at the nominal wavelength of 0.85 microns is increased from 0.01 microns to 0.28 microns by such a replacement. The step height of the SDS was defined by a fourth order polynomial in accordance with equation (20) and was constrained by the angles of incidence in accordance with equation (17) to achieve the highest diffraction efficiency. A graph of normalized step height as a function of radial coordinate is shown in FIG. 16, curve 2. This curve has the general shape for optimum step height as a function of angle of incidence (associated with a given radial coordinate) shown in FIG. 6.

Figure 15E:
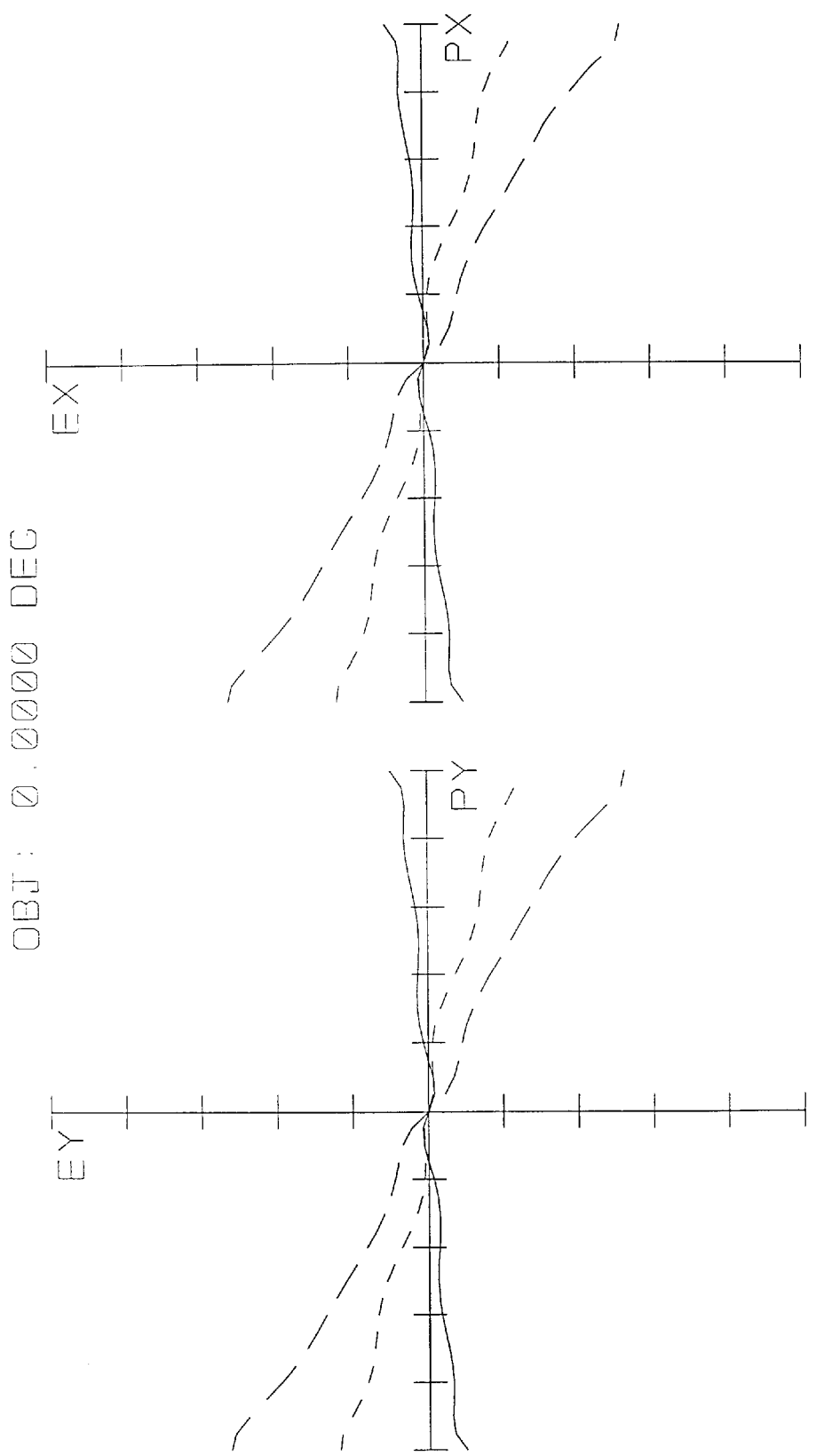
Figure 15F:
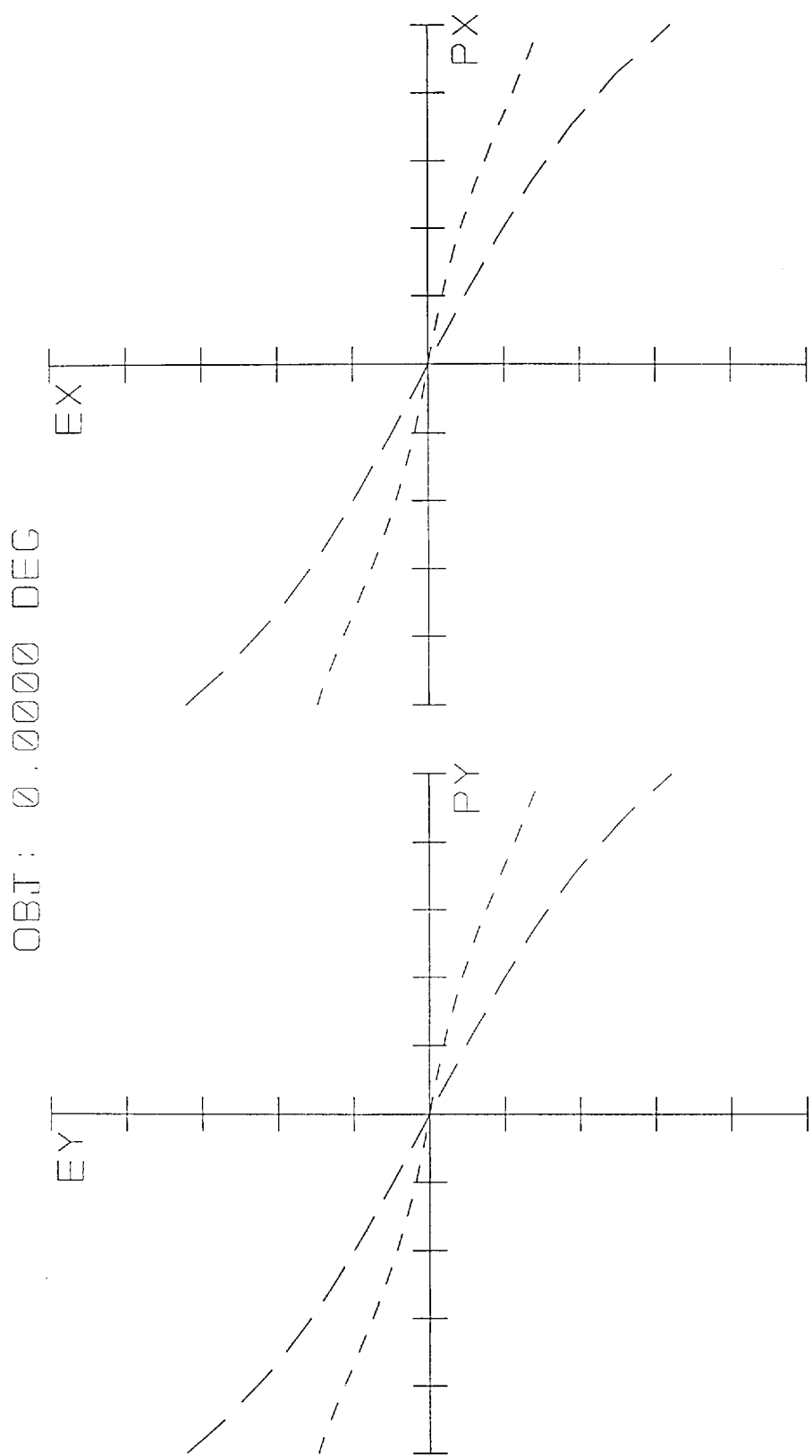

Singlet #16 is composed of an SDS with a variable step height and an aspherical (conic) substrate as surface S1 and a refractive asphere as surface S2. The step heights and widths for the singlet are listed in Table 6E. The paraxial step height was 2.909 microns. The design goal was primarily to reduce aberrations and no effort was made to maximize the DE. The ray aberration curves for this case are presented in FIG. 15E. The full scale of FIG. 15E is +/−1.0 microns. Replacement of the SDS by a planar surface changes the monochromatic performance of the singlet. In particular, the geometrical radius of the spot diagram at the nominal wavelength of 1.3 microns is increased from 0.10 microns to 2.32 microns by such a replacement. The step height of the SDS was defined by a fourth order polynomial in accordance with equation (20). A graph of normalized step height as a function of radial coordinate is shown on FIG. 16, curve 3. The behavior of the curve does not quite match the one for optimum step height as a function of the angle of incidence (associated with radial position across the SDS aperture) shown in FIG. 6. By using an SDS with a variable step height and an aspherical (conic) substrate, the number of polynomial terms for the refractive asphere of surface S2 was reduced from four to two. This makes surface S2 easier to manufacture accurately without changing the manufacturing process for the SDS which still comprises a set of steps orthogonal to the system's optical axis. Singlet #17 is composed of an SDS with a variable step height and an aspherical (conic) substrate as surface S1 and a refractive asphere as surface S2. The step heights and widths for the singlet are listed in Table 6F. The paraxial step height was 2.909 microns. The design goal was to reduce aberrations and at the same time to maximize the DE. The ray aberration curves for this case are presented in FIG. 15F. The full scale of FIG. 15F is +/−1.0 microns. Replacement of the SDS by a planar surface introduces monochromatic aberrations. In particular, the geometrical radius of the spot diagram at the nominal wavelength of 1.3 microns is increased from 0.01 microns to 0.31 microns by such a replacement. The step height of the SDS was defined by a fourth order polynomial in accordance with equation (20) and was constrained by the angles of incidence in accordance with equation (17) to obtain the highest diffraction efficiency. A graph of normalized step height as a function of radial coordinate is shown in FIG. 16, curve 2. As discussed above in connection with singlet #15, this curve follows the shape of the optimum step height as a function of angle of incidence (associated with a specific radial coordinate across the SDS aperture) shown in FIG. 6. Singlet #17 provides the best overall performance in correction of aberrations and highest DE.

Again, as with the singlets of sets 1 and 2, the singlets of set 3 show that except for a planar wavefront propagating on-axis through an SDS with a constant step height, when balancing of the monochromatic aberrations of an SDS against the monochromatic aberrations of non-stepped optical surfaces in the system has been performed, the monochromatic performance at the nominal wavelength is degraded when the SDS is replaced by a planar surface. Although this basic characteristic of the SDSs of the invention has been demonstrated for the case of a single SDS and a single refractive surface, the same is true for more complicated optical systems having multiple non-stepped optical surfaces and/or multiple stepped diffractive surfaces.

Example 2

Achromatization of Gradient Index Lenses

Another important singlet type, widely employed in photonics devices, is based on materials with a nonuniform distribution of refractive index. NSG America, Inc. sells one such material, specifically, a gradient index material (GRIN), under the trademark SELFOC®. The refractive index of this material is a quadratic function of the radial coordinate r and is defined by the following equation:

$$n(r) = n_0 * \left(1.0 - \frac{A * r^2}{2}\right)$$

where $n_0$ is the refractive index on-axis and A is the gradient constant.

This example illustrates how an SDS can be used with a gradient index lens to improve both the monochromatic and chromatic performance of the lens. The original GRIN singlet is shown schematically in FIG. 17 where 11 denotes an incoming planar wavefront, 12 and 13 are the entrance and exit planar surfaces of the gradient index lens, and 14 defines the focal plane. The focusing properties of a GRIN lens are fully defined by the radial distribution of the refractive index of the material, the length of the lens, and the distance to the focal plane. In FIG. 17, the focal plane coincides with the exit surface of the GRIN lens.

The specific GRIN lens used in performing calculations was a SLS-2.0 SELFOC lens having a rod diameter of 2 mm and a rod length (pitch) of 6.47 mm. The entrance pupil diameter was 1.4 mm. Ray aberration plots were calculated for four wavelengths representative of those used in the optical communication channels, specifically, for 0.85 microns, 1.06 microns, 1.30 microns and 1.56 microns. The results are shown in FIG. 18, where the full scale is +/−50 microns. In this figure, the solid line is for 0.85 microns, the dashed line with the largest dashes is for 1.06 microns, the dashed line with the intermediate sized dashes is for 1.56 microns, and the dashed line with the smallest dashes is for 1.30 microns.

As can be seen in FIG. 18, the dominating aberrations are axial chromatic aberration and spherical aberration. In the designs employing an SDS discussed below, the nominal wavelength was chosen to be 0.85 micron, so that the monochromatic aberrations are referenced to that wavelength. Other wavelengths can, of course, be chosen as the nominal wavelength based on the system specifications with all the benefits of the present invention being relevant to these cases as well. The Airy disk radius was 1.969 microns, whereas the geometrical radius of the spot diagram for 0.85 microns located at the best focus was 5.8 microns. The other wavelengths had larger spot sizes.

To improve the performance of the GRIN lens, an SDS can be employed directly on one of the edges (ends) of the lens. An SDS can be etched on the edge or machined on the edge using laser ablation. Alternatively, an SDS corrector can be placed in close proximity to the GRIN lens, as shown in FIG. 19. In this figure, numerals 21 and 22 define the planar and SDS surfaces of the corrector, respectively, 23 and 24 define the entrance and exit surfaces of the GRIN lens, respectively, and 25 defines the focal plane. As in FIG. 17, the focal plane 25 coincides with the exit surface 24 of the GRIN lens.

Figure 20A:
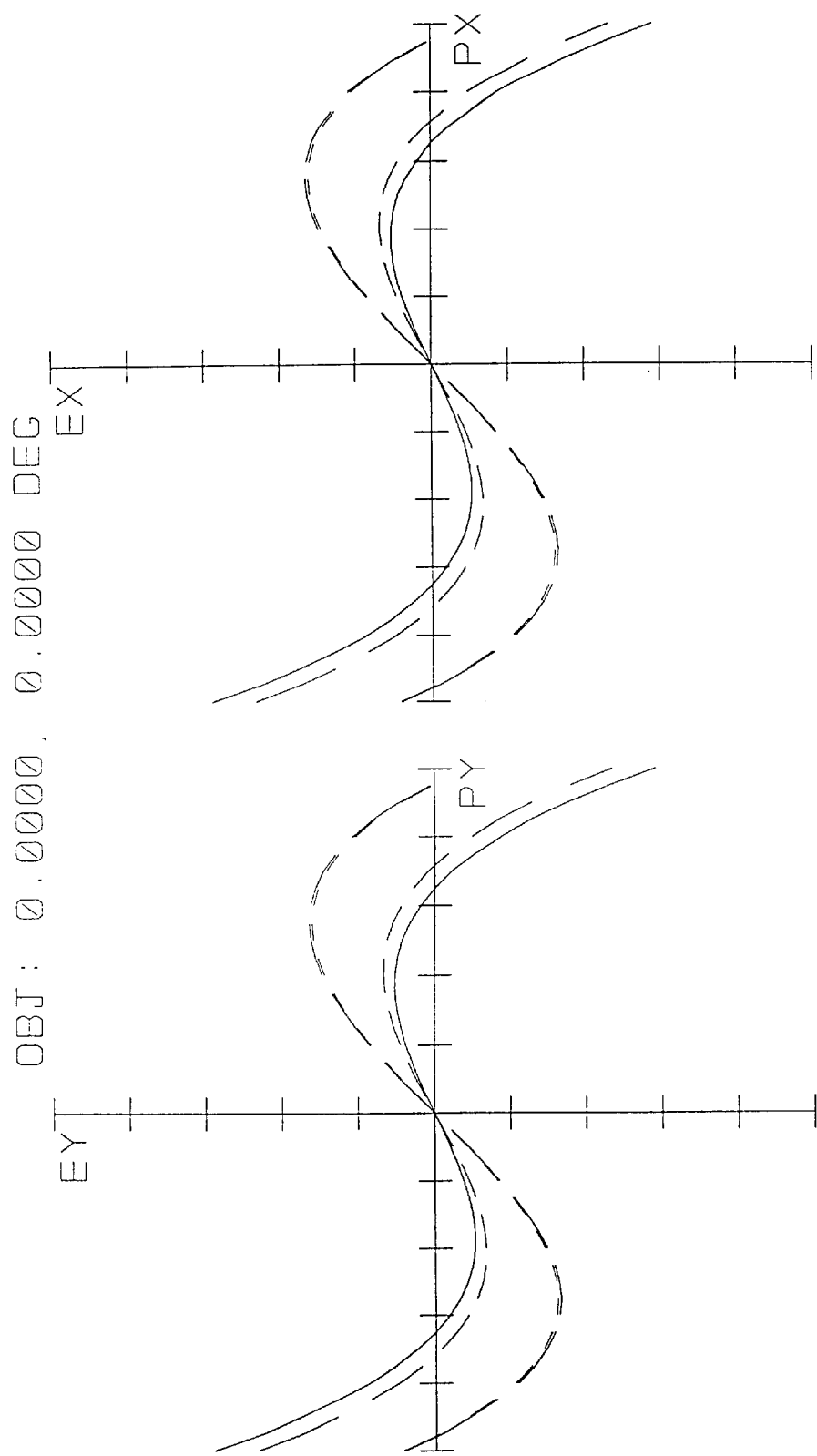

FIG. 20A shows the ray aberration curves for the four wavelengths above when the SDS has a constant step profile on a spherical base surface, with the constant step height being selected in accordance with equation (16) for a nominal wavelength of 0.85 microns. The full scale of FIG. 20A is +/−10 microns and the solid and dashed curves represent the same wavelengths as in FIG. 18. The prescription for the system is provided in Table 7 (Achromat #1). The step heights and widths are listed in Table 8A. The SDS material was fused silica. The step height of the SDS was 1.879 microns.

As can be seen in FIG. 20A, the axial color is corrected and performance is limited by spherical aberration. The Airy disk radius is 1.969 microns, whereas the geometrical radii of the spot diagrams for the four wavelengths 0.85 microns, 1.06 microns, 1.30 microns and 1.56 microns are respectively 5.8 microns, 3.30 microns, 3.22 microns and 4.68 microns. Although the axial color was substantially reduced, the design is not diffraction limited.

To further reduce the aberrations of the GRIN lens, three SDS designs with more degrees of freedom were used. The first design employs an SDS with an aspherical base surface and a constant step height. The second design employs an SDS with a spherical base surface and a variable step height. The third design employs an SDS with an aspherical base surface and a variable step height. The prescriptions for the three designs are provided in Table 7 as Achromat #2 to Achromat #4, respectively. The SDS material was fused silica. The ray aberration curves for the three designs are shown respectively in FIGS. 20B through 20D.

Figure 20B:
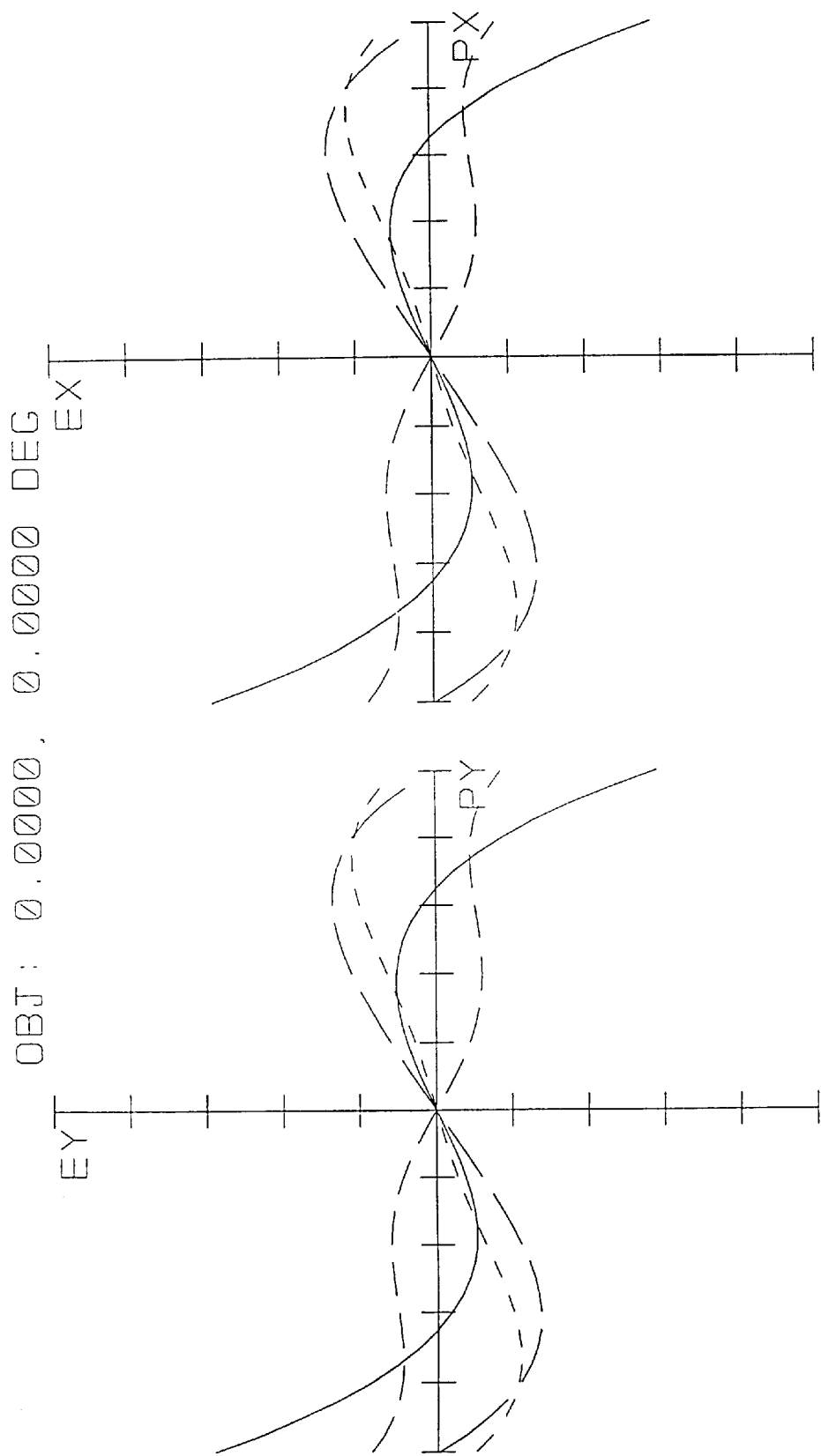

The ray aberration curves for the SDS with a constant step on an aspheric substrate (Table 7, Achromat #2) are shown in FIG. 20B. The full scale of FIG. 20B is +/−10 microns. The step heights and widths are listed in Table 8B. The step height of the SDS was 1.879 microns. The geometrical radii of the spot diagrams for the four wavelengths were respectively 5.82 microns, 2.72 microns, 2.19 microns and 1.72 microns. The design has spherical aberration as well as under corrected spherochromatism.

Figure 20C:
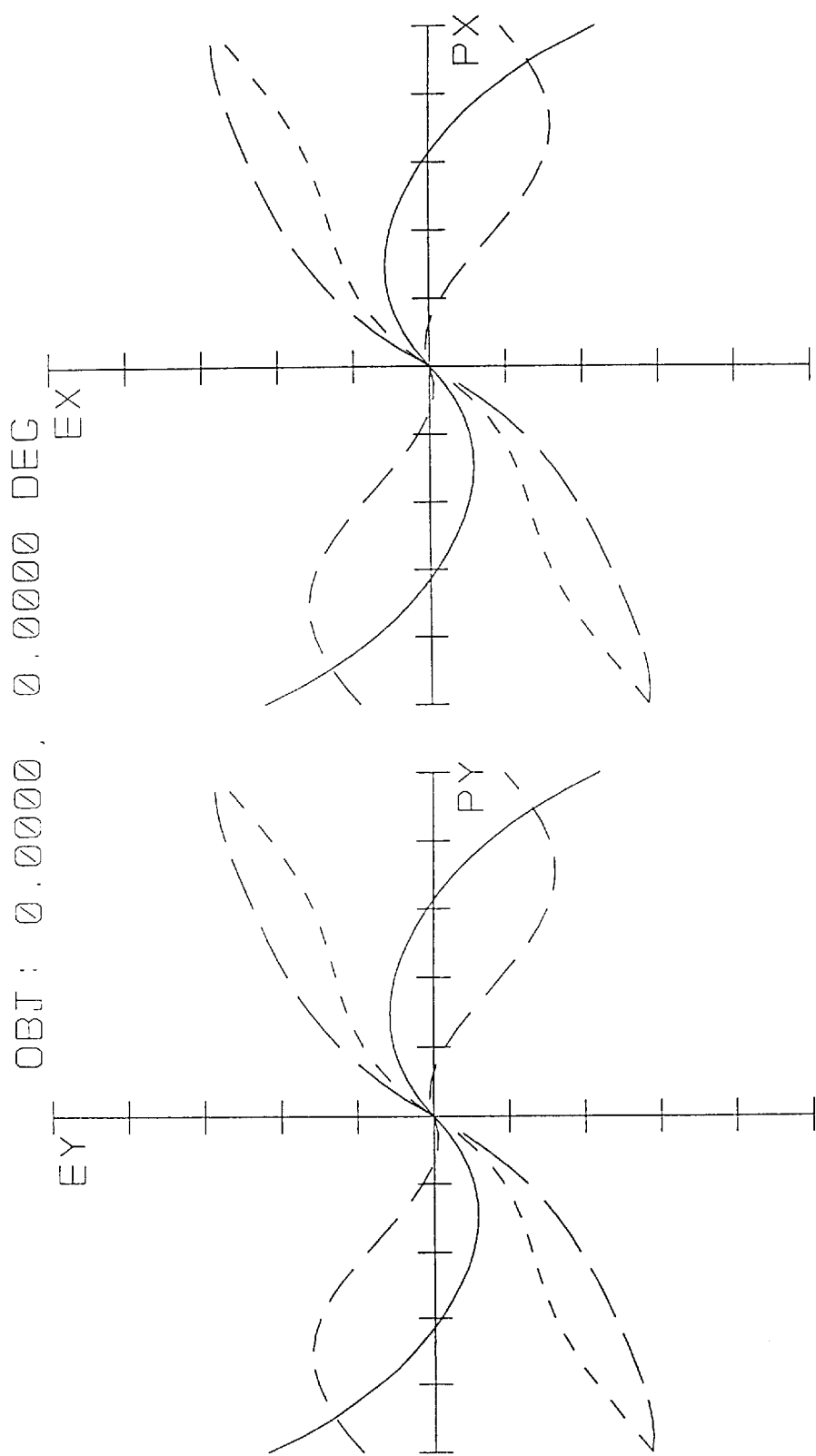

When the SDS was designed as a variable step profile on a spherical substrate (Table 7, Achromat #3), the geometrical radii of the spot diagrams for the four wavelengths were respectively 2.20 microns, 2.87 microns, 2.86 microns and 1.60 microns. The ray aberration curves for this case are shown in FIG. 20C. The full scale of FIG. 20C is +/−5 microns. The step heights and widths are listed in Table 8C. The design also has spherical aberration as well as under corrected spherochromatism. Compared to the case of the SDS with a constant step height on an aspherical base surface, this design has better balance between the four wavelengths. FIG. 21, curve 1, shows the relative SDS step height as a function of the radial coordinate for this case. The paraxial step height of the SDS was 1.879 microns.

Figure 20D:
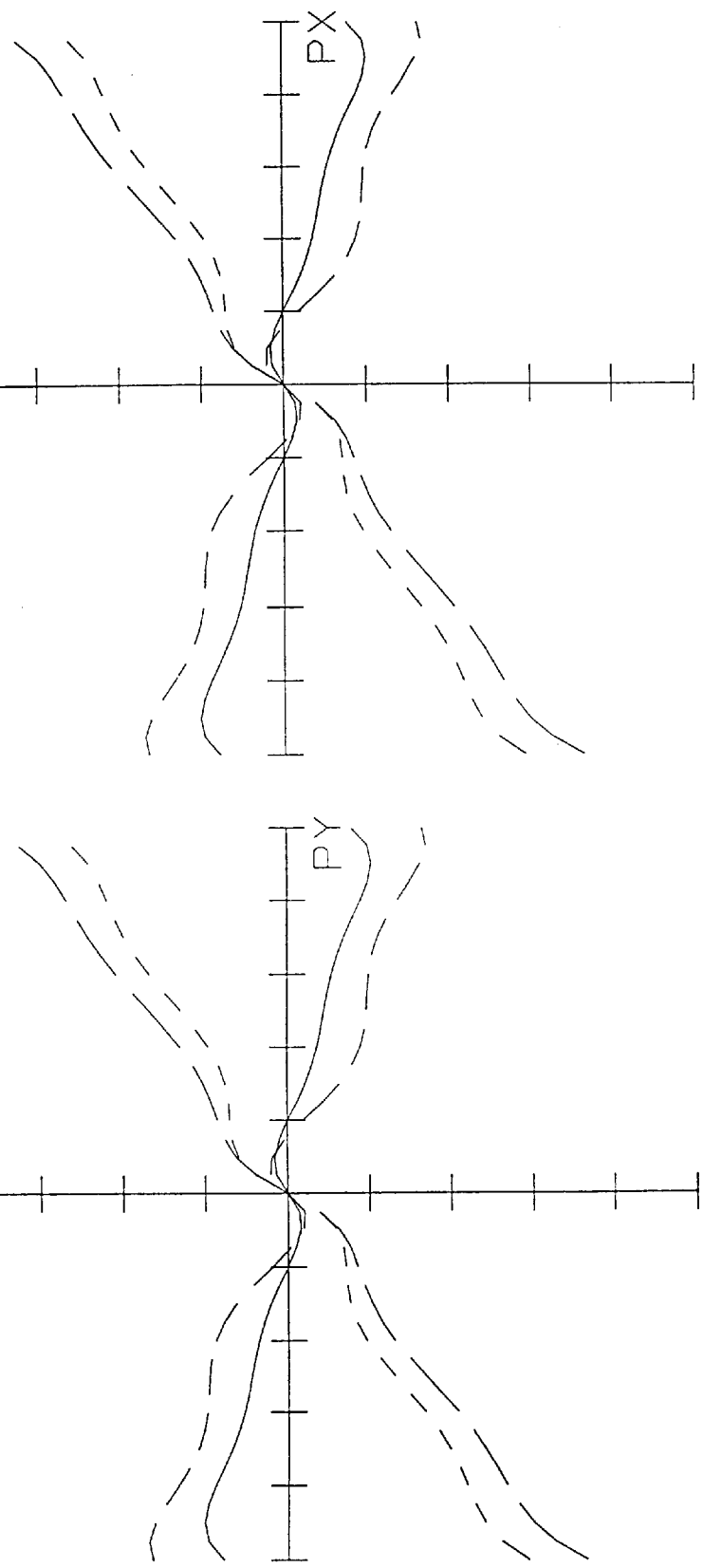

The best correction of aberrations was achieved when both an aspheric base curve and a variable step height for the SDS were used. The prescription of the SDS surface for this case is given in Table 7 (Achromat #4). FIG. 21, curve 2, presents the relative SDS step height as a function of the radial coordinate. The step heights and widths are listed in Table 8D. The paraxial step height of the SDS in the first order was calculated to be 1.894 microns. The ray aberration curves for this case are shown in FIG. 20D. The full scale of FIG. 20D is +/−5 microns. The geometrical radii of the spot diagrams for the four wavelengths considered were respectively 0.99 microns, 3.36 microns, 2.42 microns and 2.43 microns. The design is limited by secondary axial color but the spherical aberration is corrected for all wavelengths in the spectrum. This means that the design can be made diffraction limited at any given wavelength by a slight adjustment of the pitch of the GRIN lens. For the wavelengths considered, Table 9 presents the respective optimum pitch of the GRIN rod, as well as the geometrical spot size radius at the focal plane. For any given pitch, the design is diffraction limited at the respective wavelength and provides high coupling efficiency.

It is to be understood that in the above examples, the SDS was used in a collimated beam for illustrative purposes only. If desired, it could be used in a converging or diverging beam. Also, the SDS design could be done for any nominal wavelength other than 0.85 microns. Similarly, the GRIN lens could be used at finite conjugates, including fiber-to-fiber coupling, fiber-to-detector coupling, and laser diode-to-fiber coupling. Along the same lines, the SELFOC® material was chosen for illustrative purposes only and the principles of the invention are equally applicable to optical systems employing other gradient index materials.

Example 3

Correction of Lateral Color

This example illustrates the use of an SDS to correct both axial and lateral color. In accordance with the invention, it was discovered that when an SDS is positioned away from the stop of an optical system, it affects both the axial and lateral color of the system. This property of an SDS is used in the examples below to substantially reduce overall chromatic aberrations.

In accordance with conventional technology, the correction of both axial and lateral chromatic aberrations usually requires the use of three or more refractive materials. Some of these materials can be very expensive. In the examples below, single material components together with an SDS are used to substantially reduce both the axial and lateral chromatic aberrations of an optical system. An even higher degree of correction can be accomplished when more than one material is used. In either case, employment of an SDS as a lateral color corrector improves both the chromatic and monochromatic performance of a comparable lens that does not employ an SDS.

FIG. 22A is a layout of a two-component Petzval lens, the prescription for which is set forth in Table 10A. The aspherical coefficients D, E, F, G, H and I in this table are for use in the following equation:

$$S = \frac{r^2}{R\left(1+\sqrt{1-\left(\frac{r}{R}\right)^2}\right)} + (D(r))^4 + (E(r))^6 + (F(r))^8 + (G(r))^{10} + (H(r))^{12} + (I(r))^{14}$$

where S is the axial sag of the asphere, r is the radial coordinate, and R is the vertex radius.

The working spectral range of the lens is from 0.486 microns to 0.656 microns with the primary wavelength at 0.588 microns. FIG. 22B shows the aberrations of the lens where both axial and lateral chromatic aberrations are presented. The full scale of the FIG. 22B is +/−500 microns. The solid curve corresponds to the wavelength of 0.588 microns. The dashed curves correspond to the marginal wavelengths, where the smaller dashes correspond to 0.486 microns and the longer dashes correspond to 0.656 microns. The geometrical radii of the spot diagrams at the image plane for 0.486 microns, 0.588 microns and 0.656 microns were respectively 133.53 microns, 15.22 microns and 59.38 microns. Relative to the central wavelength of 0.588 microns, the lateral color for 20 degrees field was −122 microns for the blue wavelength of 0.486 microns and +55 microns for the red edge of the spectrum (wavelength 0.656 micron).

To correct the chromatic aberrations, an SDS corrector was added to the lens. The SDS had a constant step height with a spherical base curve. The layout for the lens is shown in FIG. 23A and the lens prescription is listed in Table 10B. The step height of the SDS was 1.195 microns. The step heights and widths are listed in Table 10C. The components of the initial Petzval lens were unchanged. The position of the corrector within the lens was adjusted to minimize aberrations. The spacing of the lens components was adjusted to account for the optical path difference introduced by the material of the corrector. FIG. 23B present the ray aberration curves for the system with the SDS corrector. The full scale of FIG. 23B is +/−500 microns. The solid curve corresponds to the wavelength of 0.588 microns. The dashed curves correspond to the marginal wavelengths, where smaller dashes correspond to 0.486 microns and the longer dashes correspond to 0.656 microns. The geometrical radii of the spot diagrams at the image plane for 0.486 microns, 0.588 microns and 0.656 microns were respectively 28.30 microns, 15.16 microns, and 12.50 microns. Relative to the central wavelength of 0.588 microns, the lateral color for 20 degrees field was −10 microns for the blue wavelength of 0.486 microns and −23 microns for the red edge of spectrum (wavelength 0.656 micron). From a comparison of FIGS. 22B and 23B, it can be seen that both axial and lateral color were substantially reduced when the SDS was employed. Some increase in the monochromatic MTF at off-axis fields for the nominal wavelength compared to the original lens was found, i.e., the introduction of the SDS corrector into the system affected the monochromatic aberrations in a favorable manner.

Example 4

Hybrid Correction of Color

In this example, correction of chromatic aberrations is achieved by combining corrective properties of two different materials and an SDS. The SDS is used only to partially correct the axial color of the optical system. The rest of the correction is achieved by using two different materials. That combination provides several benefits. First, the monochromatic aberrations are smaller compared to that for a solution without an SDS. At the same time, the SDS can have a smaller number of zones compared to the number when an SDS is used as the only corrective means for color correction. This, in turn, leads to higher diffraction efficiency and simpler fabrication.

This "hybrid" concept is illustrated using a diffraction limited optical system, where even small residual aberrations are not acceptable. The lens is a refractive achromatic design suitable for use as a UV projection lens, including lenses for deep UV projection lithography. The color correction is achieved by combining the corrective properties of an SDS surface (surface S12), as well as the corrective properties of two optical materials: fused silica and calcium fluoride. The lens layout is shown in FIG. 24. It is a F#/1 system with an effective focal length of 18.07 mm and a magnification of 0.15. The object size is +/−4 mm. The nominal wavelength is 0.2484 microns. The SDS is used to provide an achromatic solution for a spectral range of +/−200 pm.

The optical prescription of the lens is presented in Table 11A. The step height of the SDS was 0.5309 microns. The step widths are listed in Table 11B. The total number of zones across the clear aperture of the SDS is 479. The ray aberration curves are shown on FIG. 25A. The full scale for FIG. 25A is +/−0.5 microns. The solid curve corresponds to the wavelength of 0.2484 microns. The dashed curves correspond to the marginal wavelengths, where smaller dashes correspond to 0.2482 microns and the longer dashes correspond to 0.2486 microns. The polychromatic MTF plot is shown in FIG. 25B, where the letters T and S designate the tangential and sagittal directions. During optimization, the wavefront curvature at the on-axis point of the SDS surface was constrained to be planar. The ray aberration curves at the primary wavelength of 0.2484 microns when the SDS was replaced by a planar surface are presented in FIG. 25C. As can be seen from a comparison of FIGS. 25A and 25C, there is almost no change in monochromatic aberrations at the nominal wavelength, which is as expected since the SDS is illuminated by a planar wavefront propagating along the system's optical axis. The full scale of the FIG. 25C is also +/−0.5 microns.

Example 5

Lens for Projection Television with a Stepped Diffractive Surface

This example illustrates the use of the invention in a lens system suitable for CRT projection applications. It is a fast wide-angle lens with performance limited by geometrical aberrations. The system layout is shown in FIG. 26.

In a first embodiment, the design was optimized for the highest DE on-axis. The optical prescription of the lens is presented in Tables 12A through 12C, where Table 12B gives aspheric coefficients to be used in the following equation:

$$S = \frac{r^2}{R\left(1 + \sqrt{1 - (1+K)\left(\frac{r}{R}\right)^2}\right)} + D(r)^4 + E(r)^6 + F(r)^8 + G(r)^{10} + H(r)^{12} + I(r)^{14}$$

where S is the axial sag of the asphere and r is the radial coordinate.

Table 12C gives the coefficients describing the step heights of the SDS in accordance with equation (20) above. Numerical values for the step heights and widths are listed in Table 12D.

Figures 1, 28A:
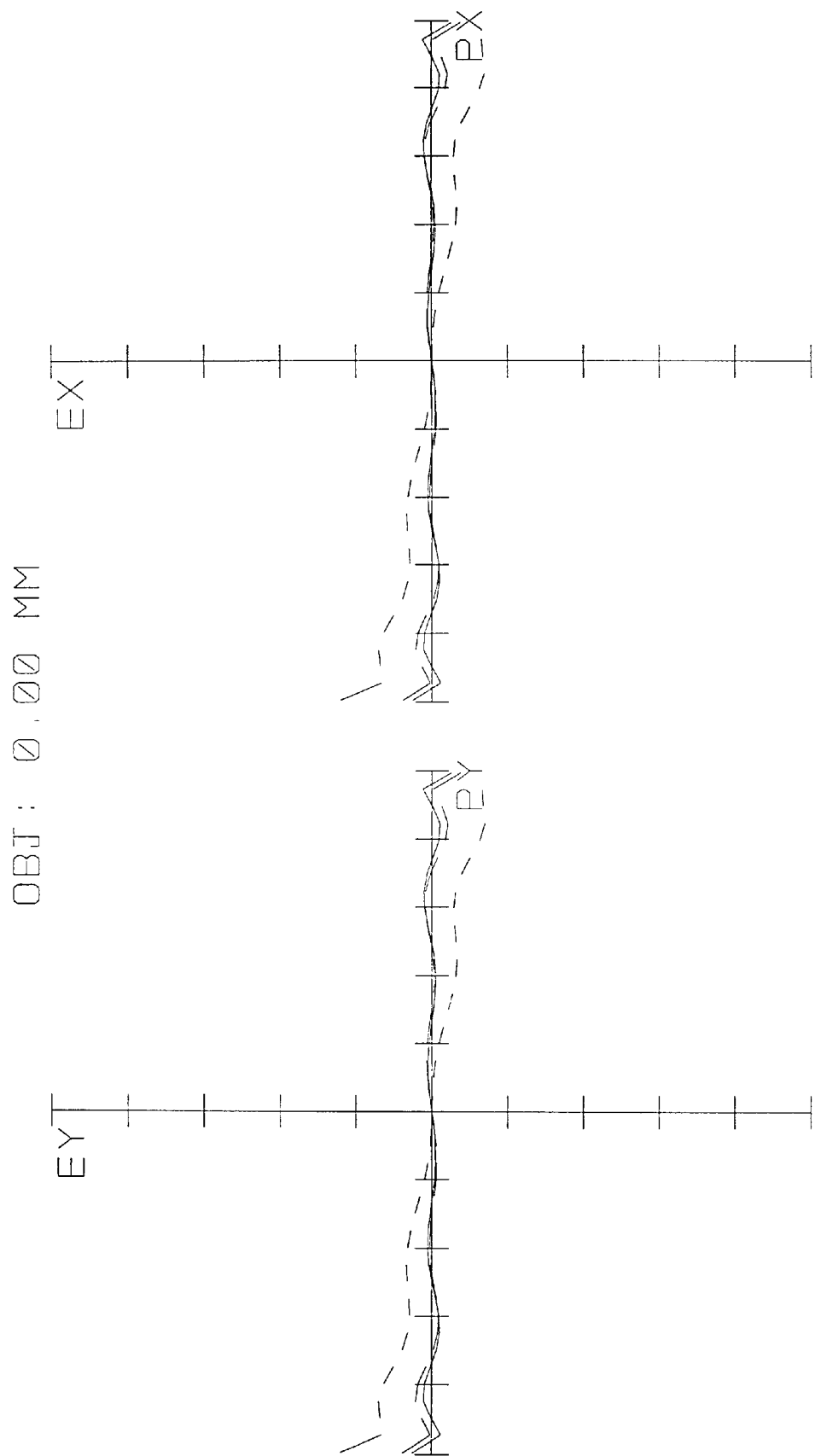
Figures 2, 28A:
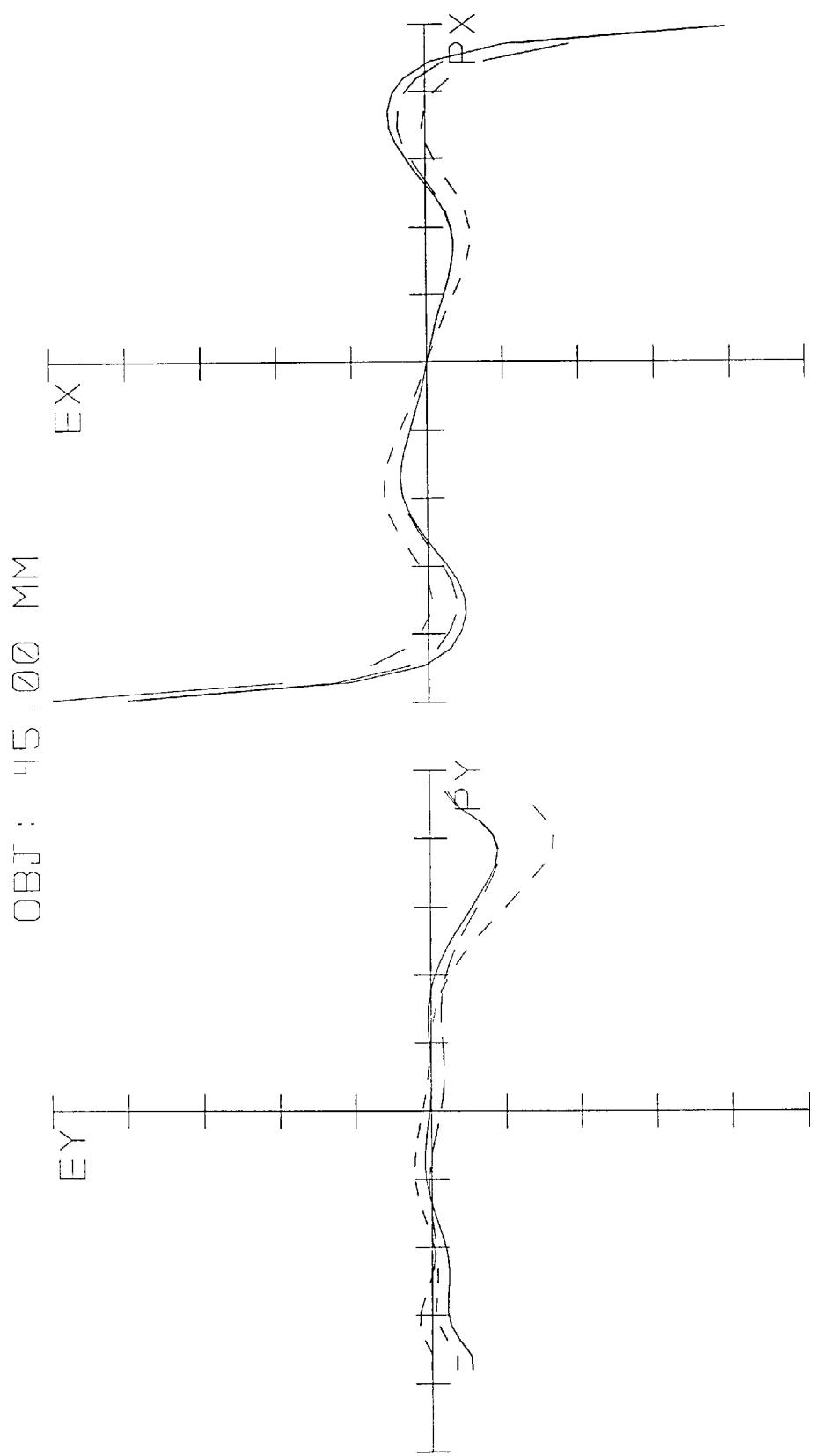
Figures 3, 28A:
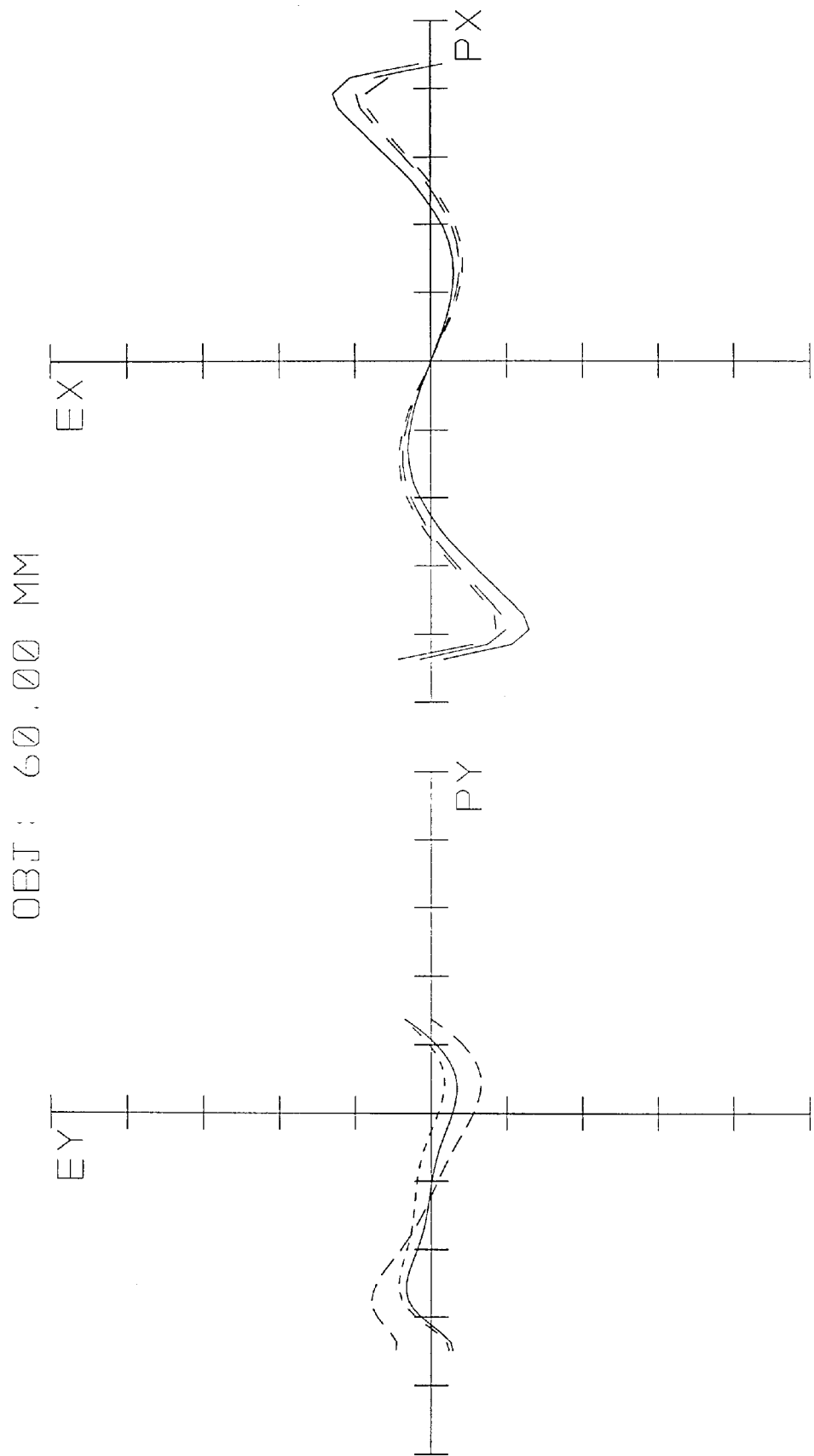
Figure 28B:
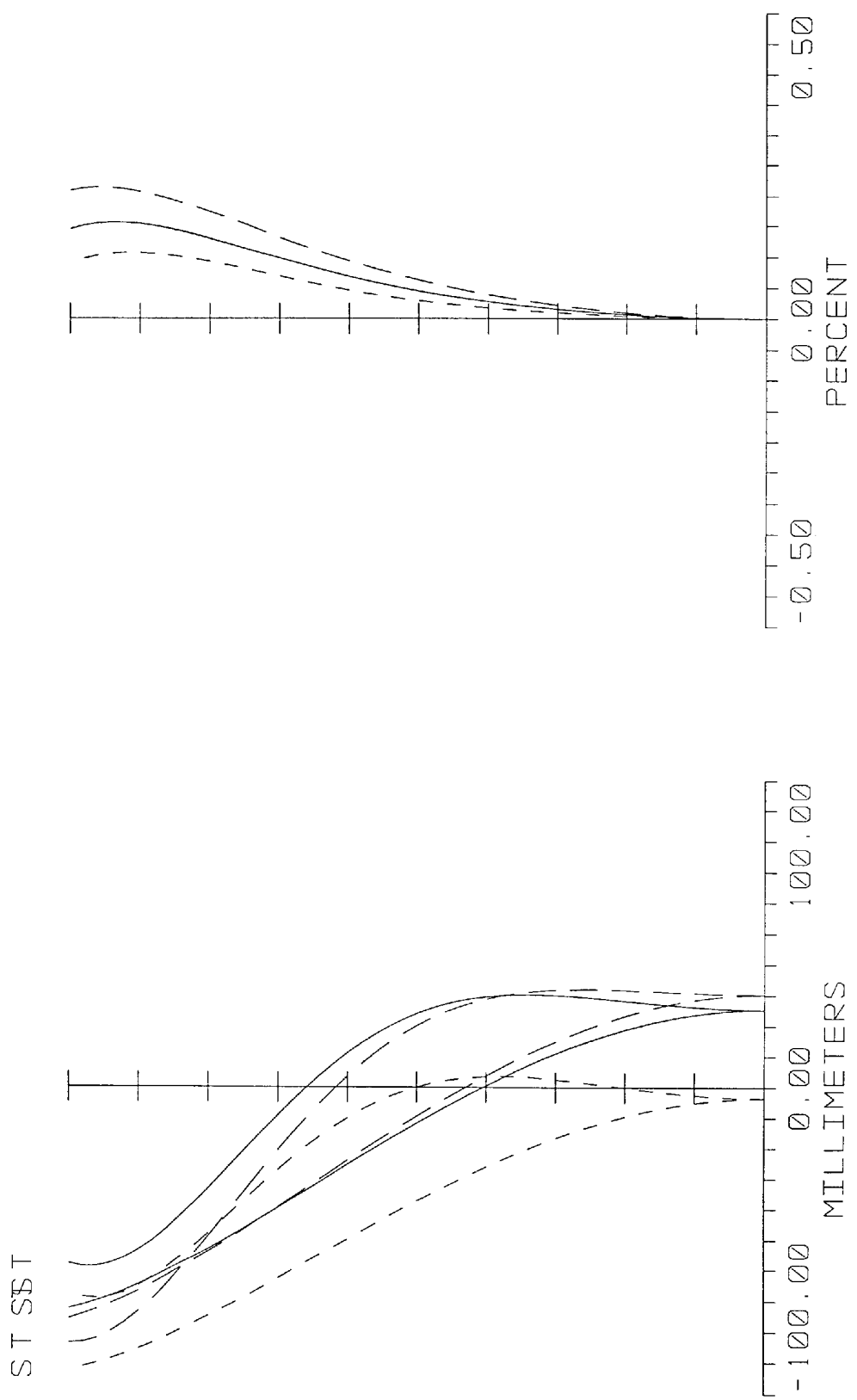
Figure 28C:
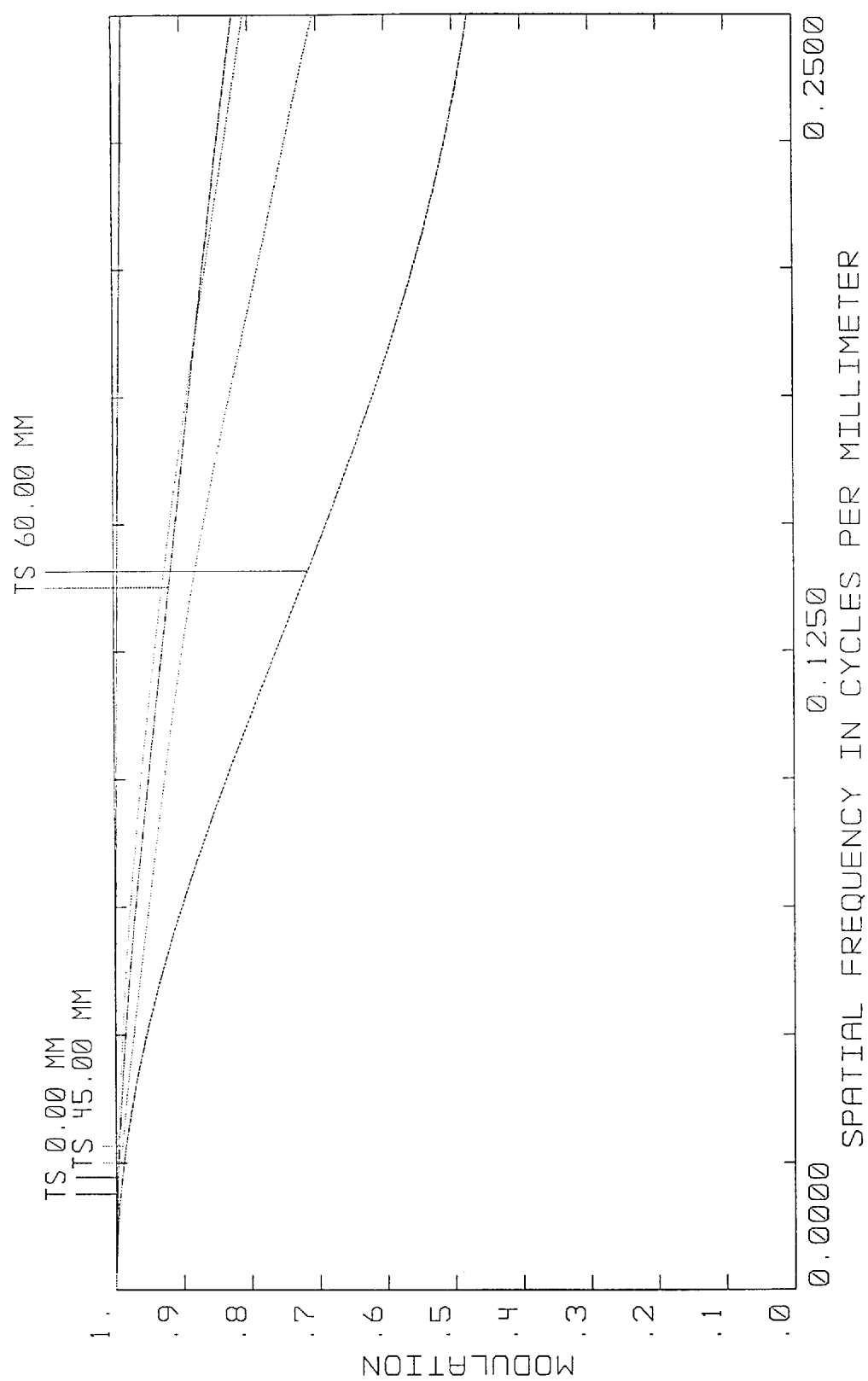
Figure 28D:
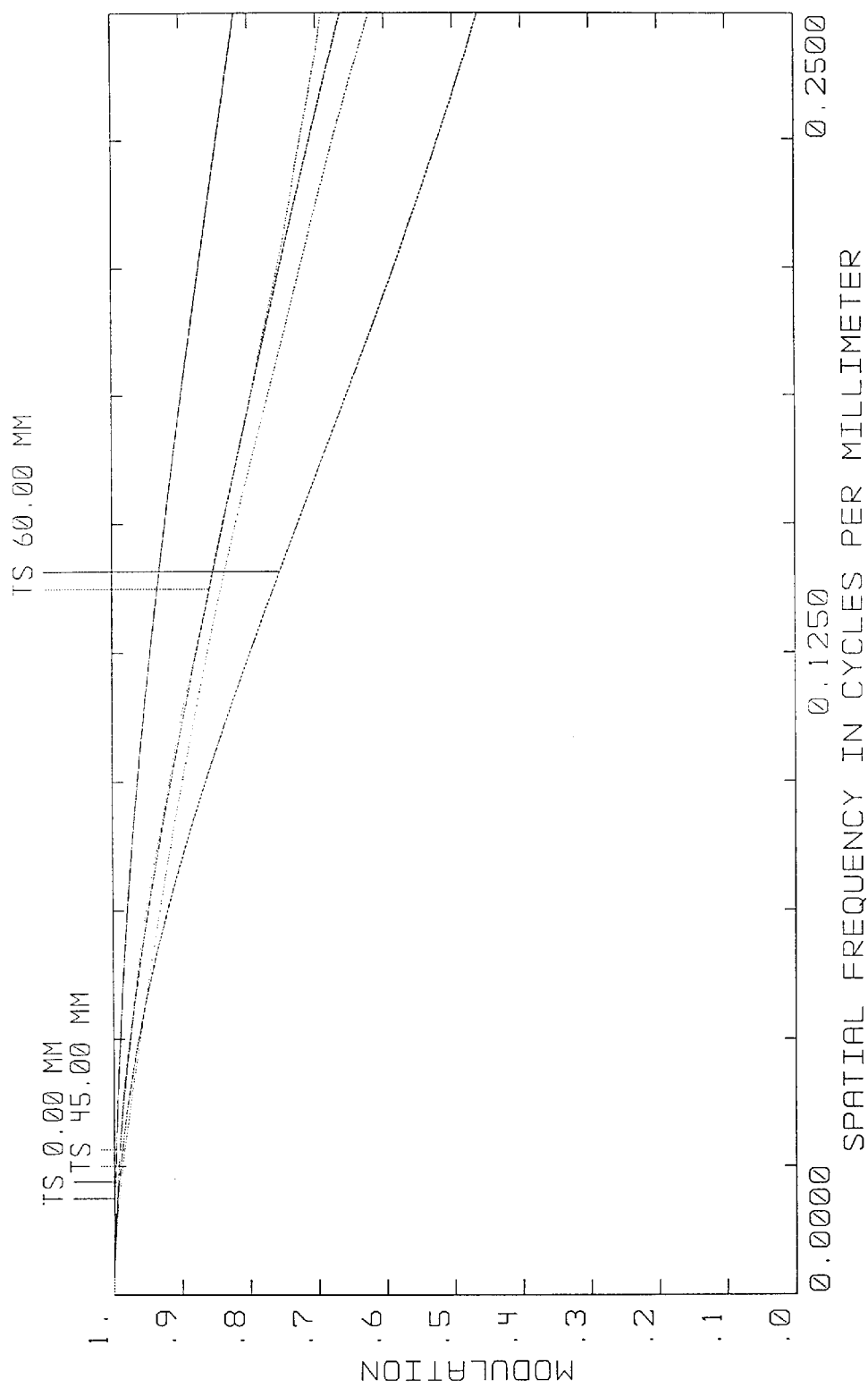
Figures 1, 28E:
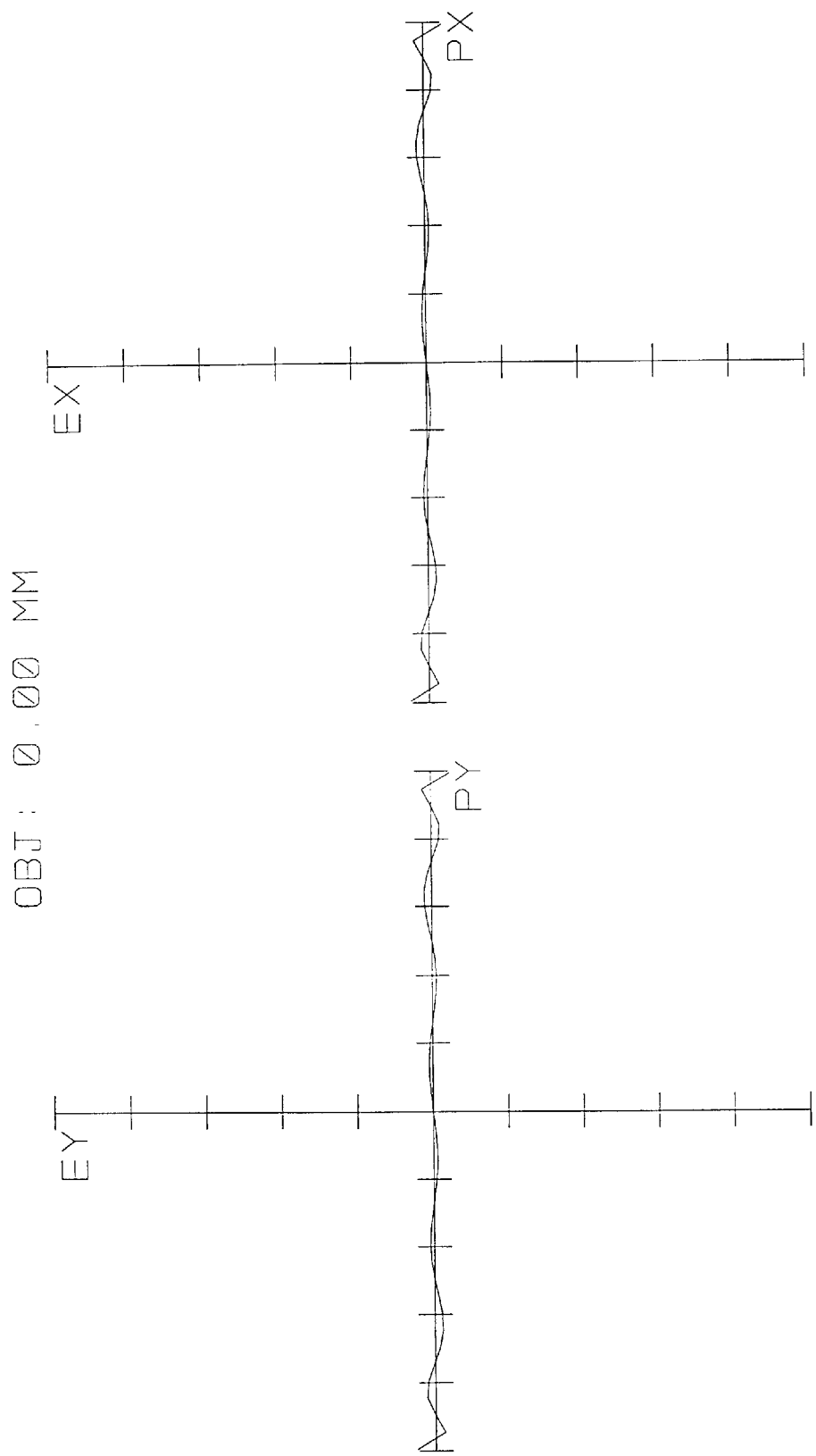
Figures 2, 28E:
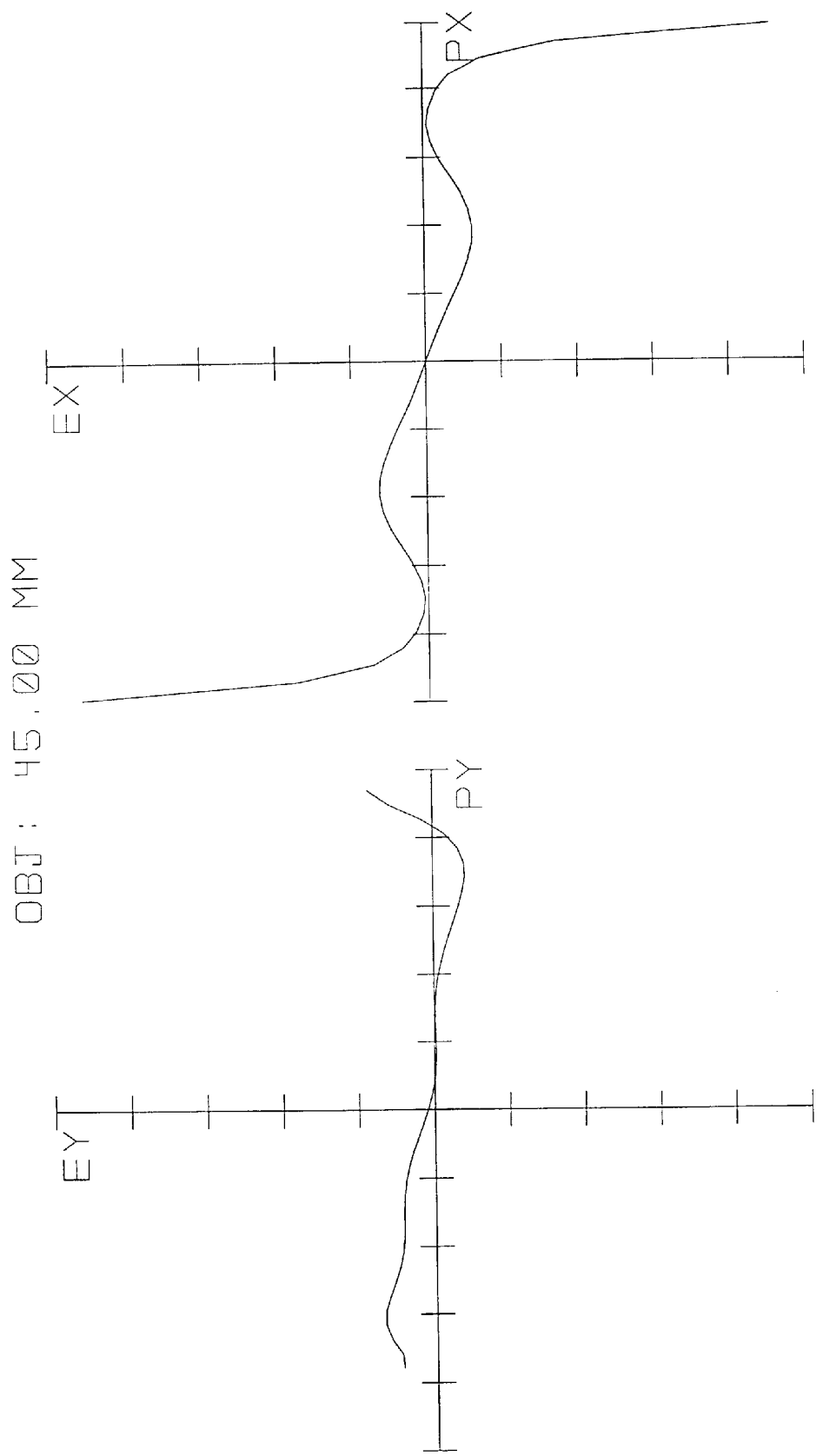
Figures 3, 28E:
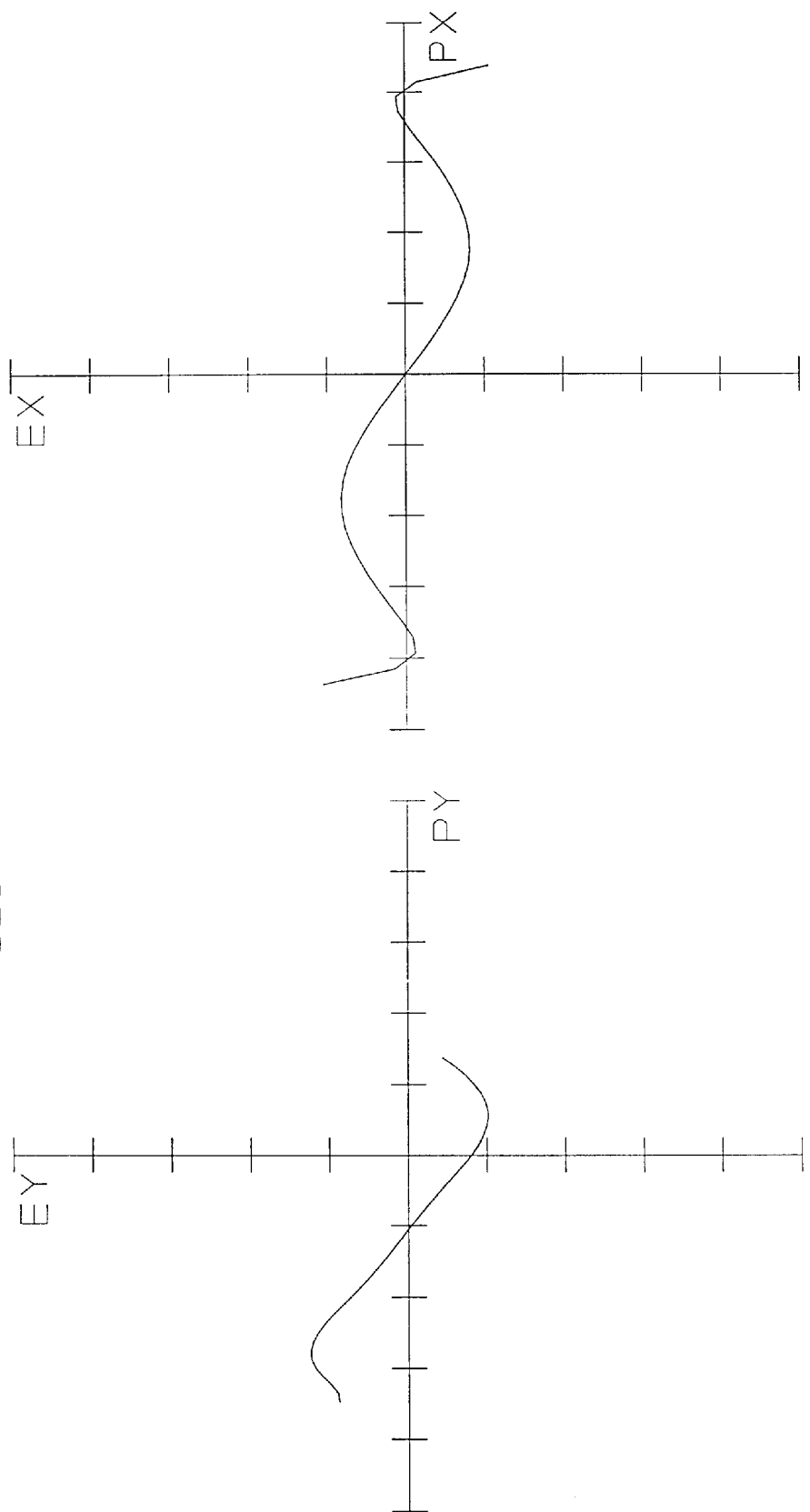

This lens has a wide field of view (i.e., ±44.7° in the direction of the projection television's viewing screen) and a high numerical aperture (image space NA=0.373). The SDS is of variable step height on a spherical base curve. The paraxial step height of the SDS was 1.106 microns. The SDS relative step height as a function of the radial coordinate is presented in FIG. 27. The ray aberration curves are shown in FIG. 28A, where the full scale is +/−10 mm. The solid curve corresponds to the wavelength of 0.546 microns. The dashed curves correspond to the marginal wavelengths, where smaller dashes correspond to 0.480 microns and the longer dashes correspond to 0.644 microns. Field curvature (left panel) and distortion (right panel) are presented in FIG. 28B where the line types are the same as in FIG. 28A and correspond to the same wavelengths. The letters T and S in the field curvature plot designate the tangential and sagittal directions. The monochromatic and polychromatic MTF plots are shown on FIGS. 28C and 28D, respectively. The curve designation is the same as for FIG. 28B. The design accounts for both chromatic and monochromatic aberrations of the SDS. The ray aberration curves at the primary wavelength of 0.546 microns when the SDS is replaced by a planar surface are presented in FIG. 28E. The full scale of FIG. 28E is +/−10 mm. FIG. 28E shows performance deterioration primarily off-axis.

Figures 1, 28F:
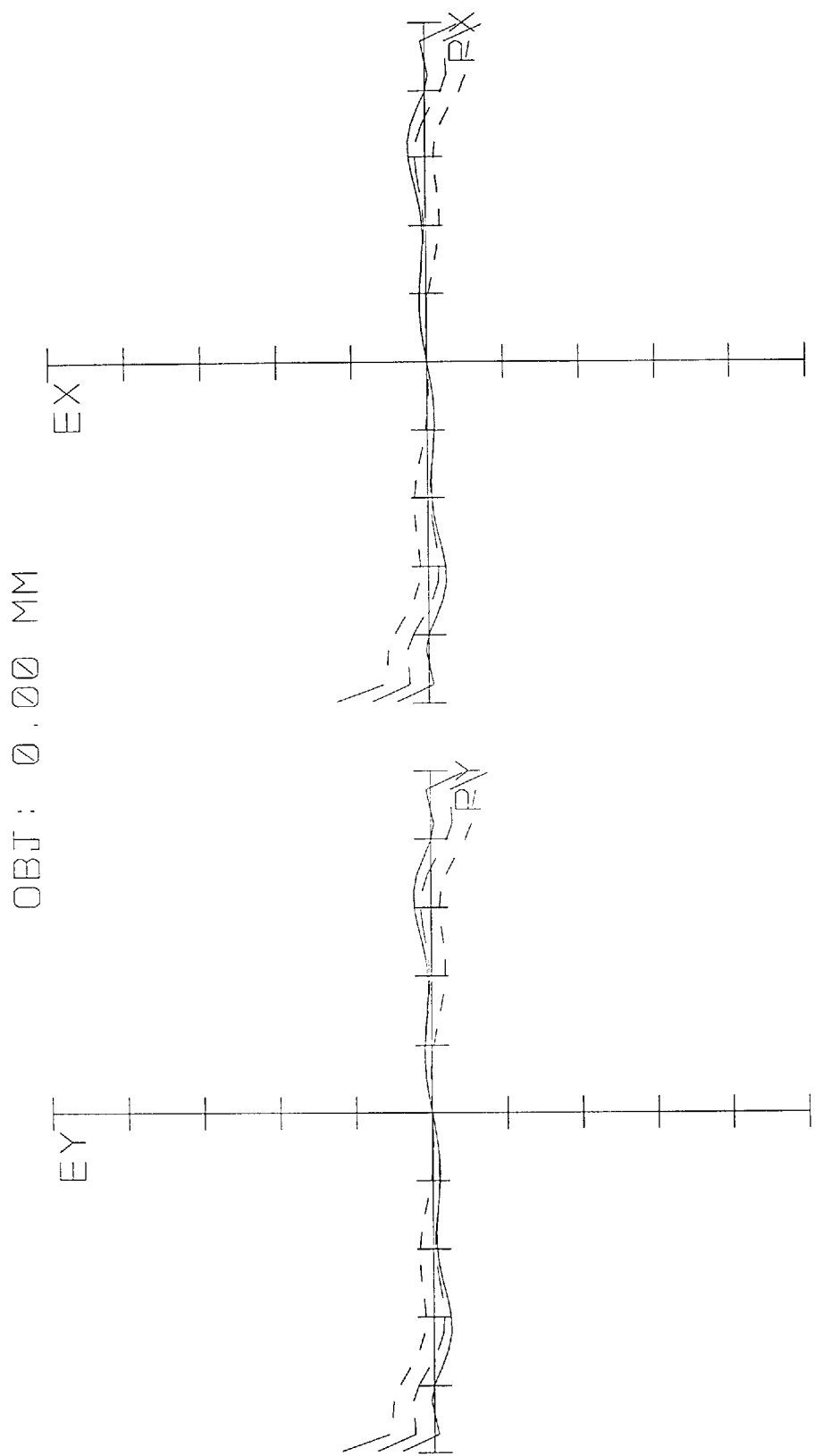
Figures 2, 28F:
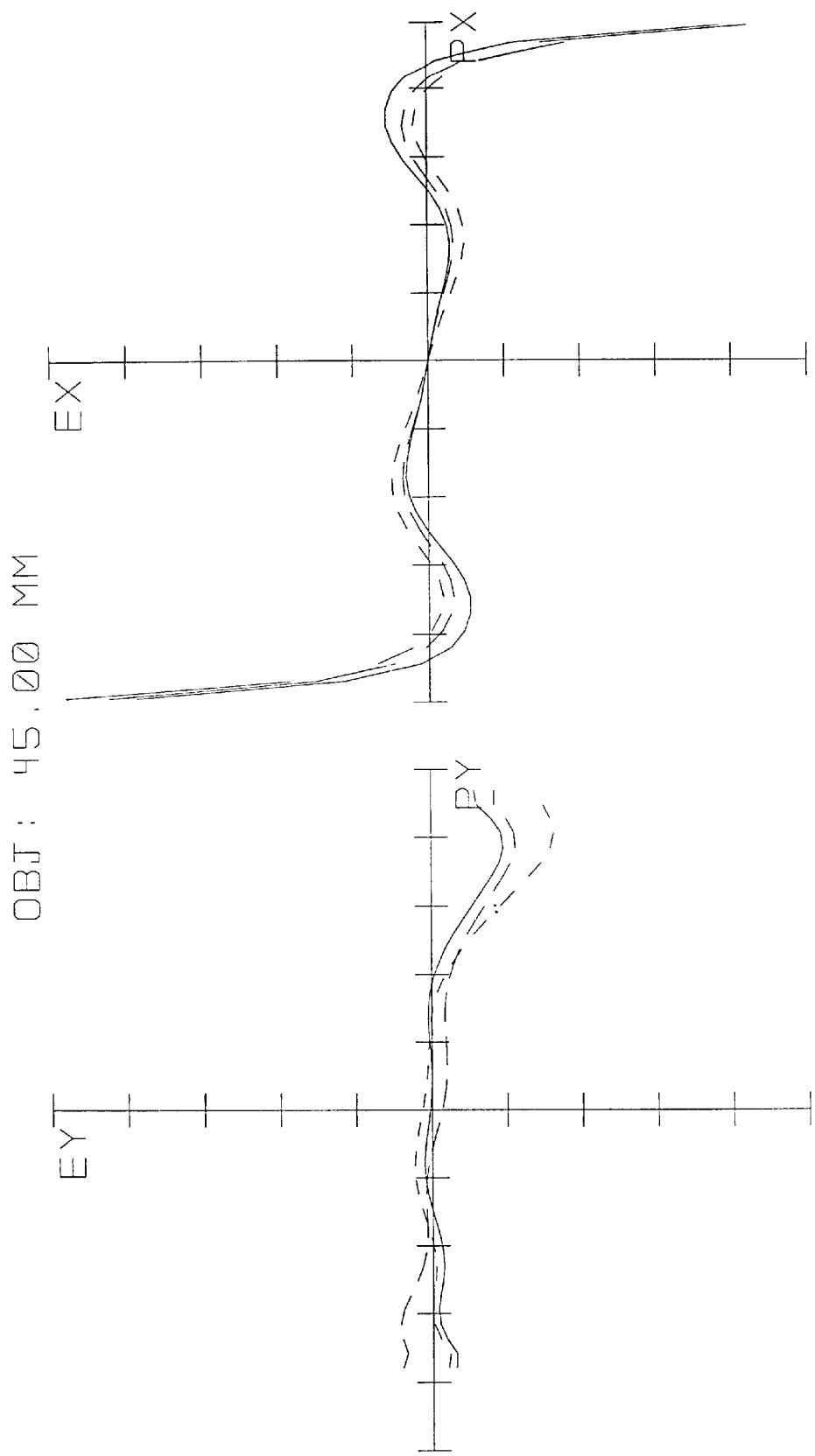
Figures 3, 28F:
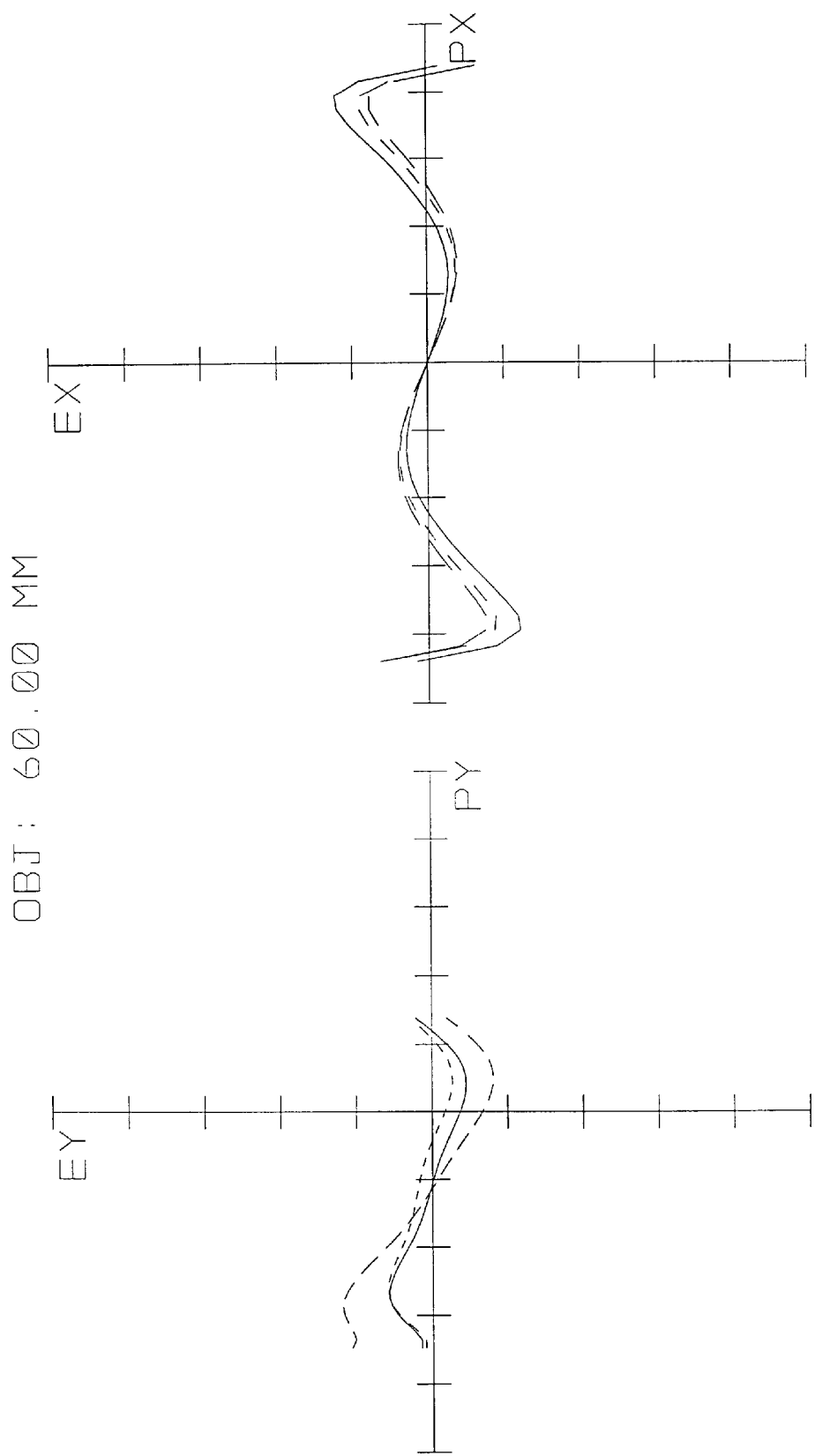
Figure 28G:
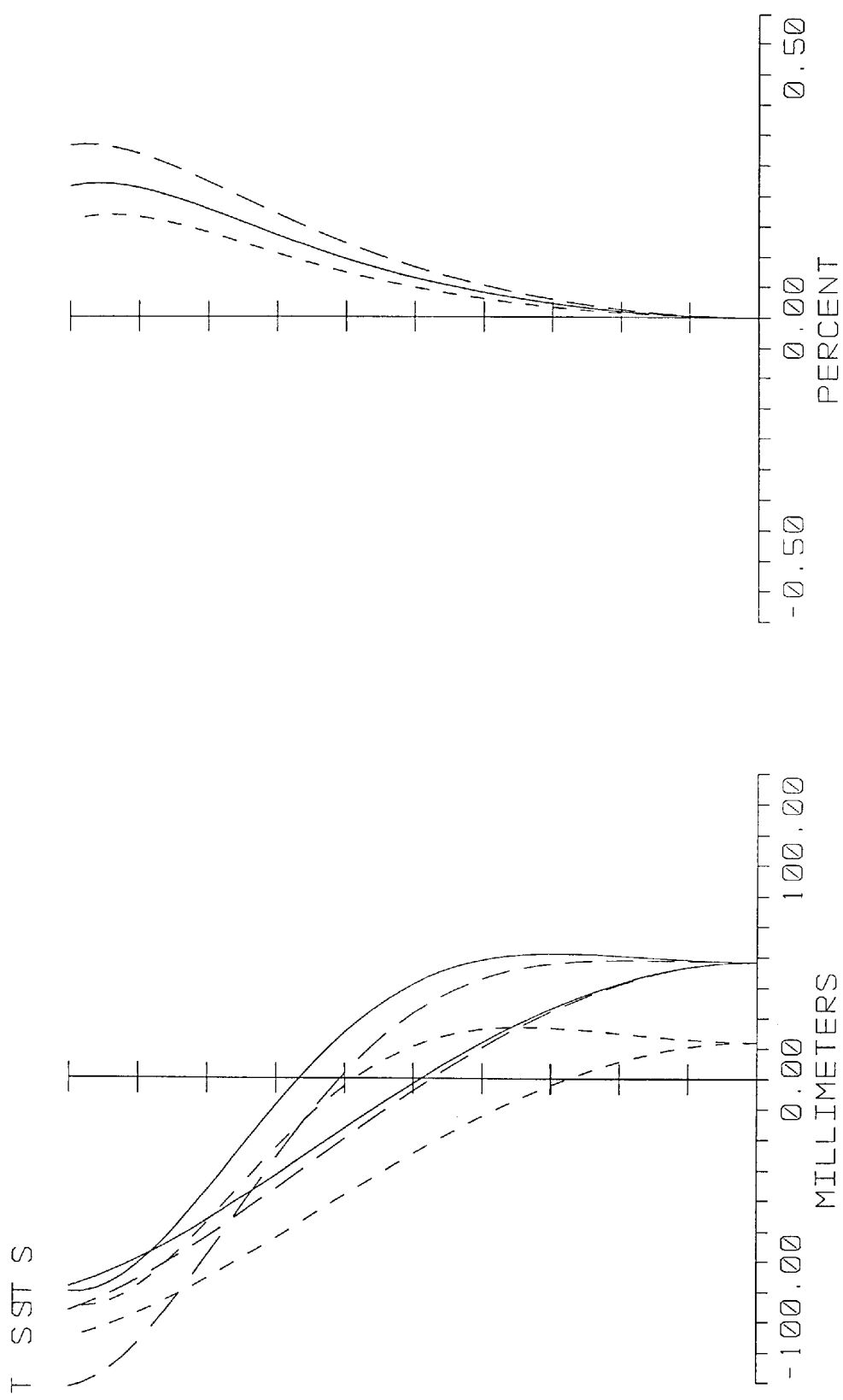
Figure 28H:
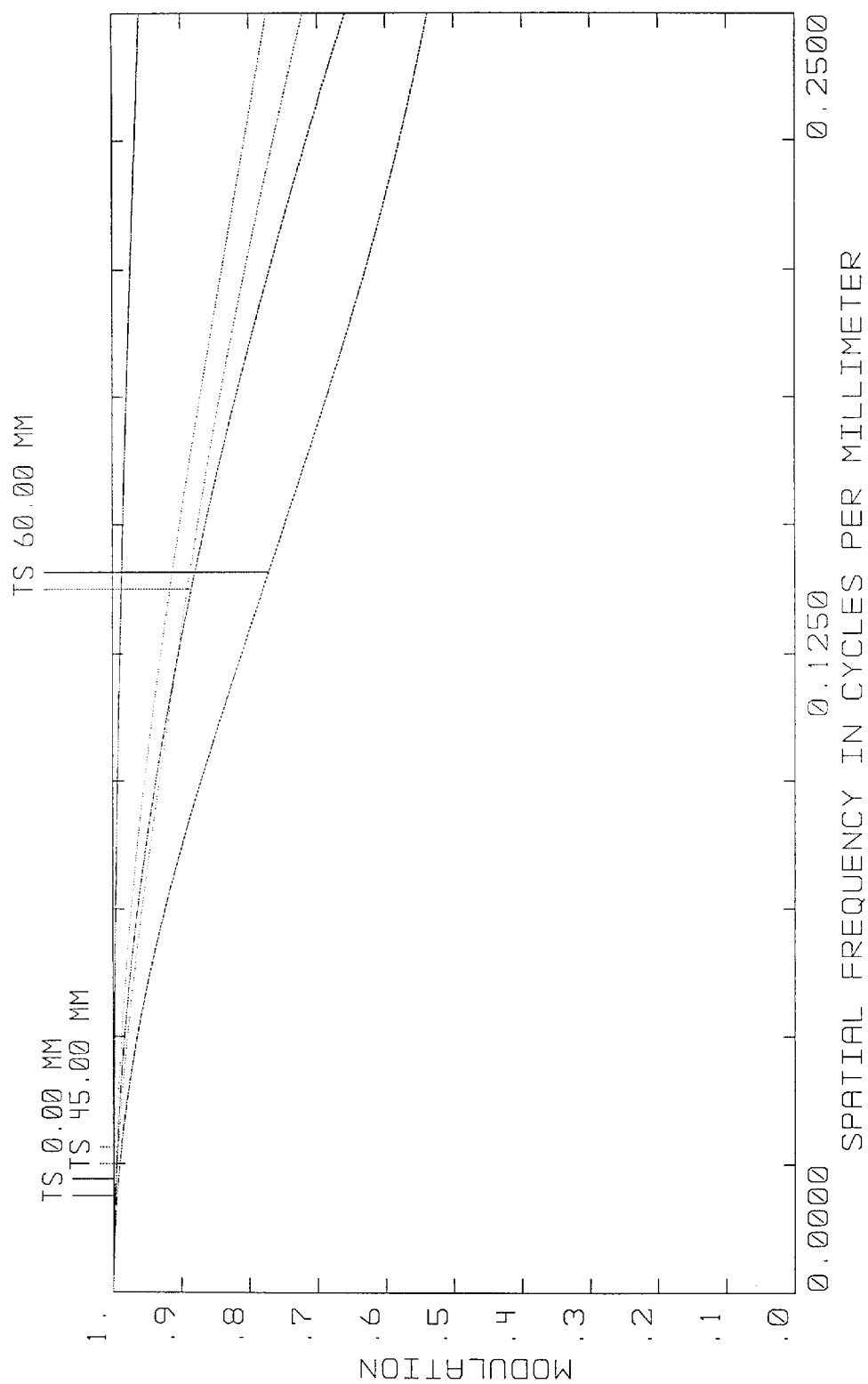
Figure 28I:
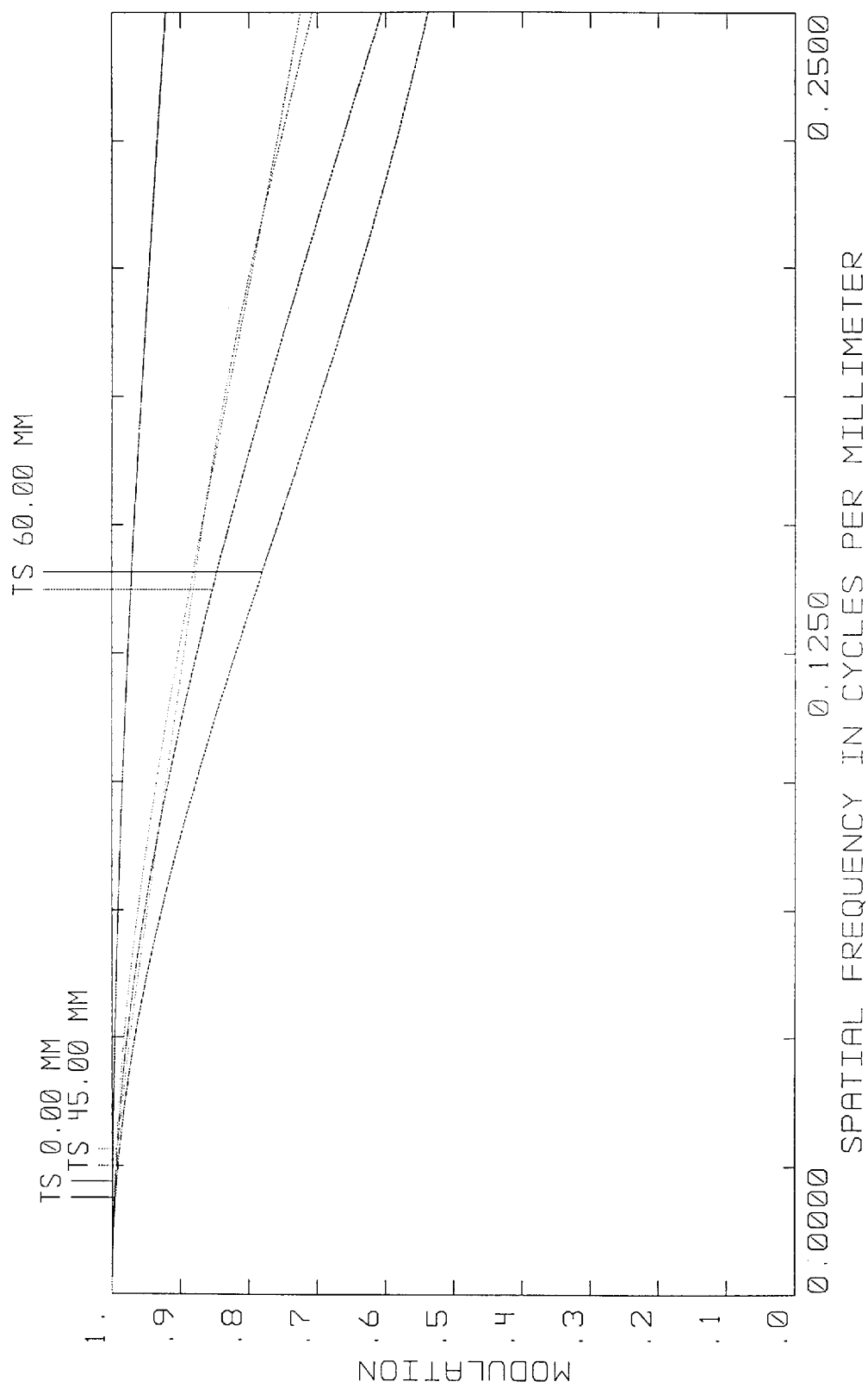
Figures 1, 28J:
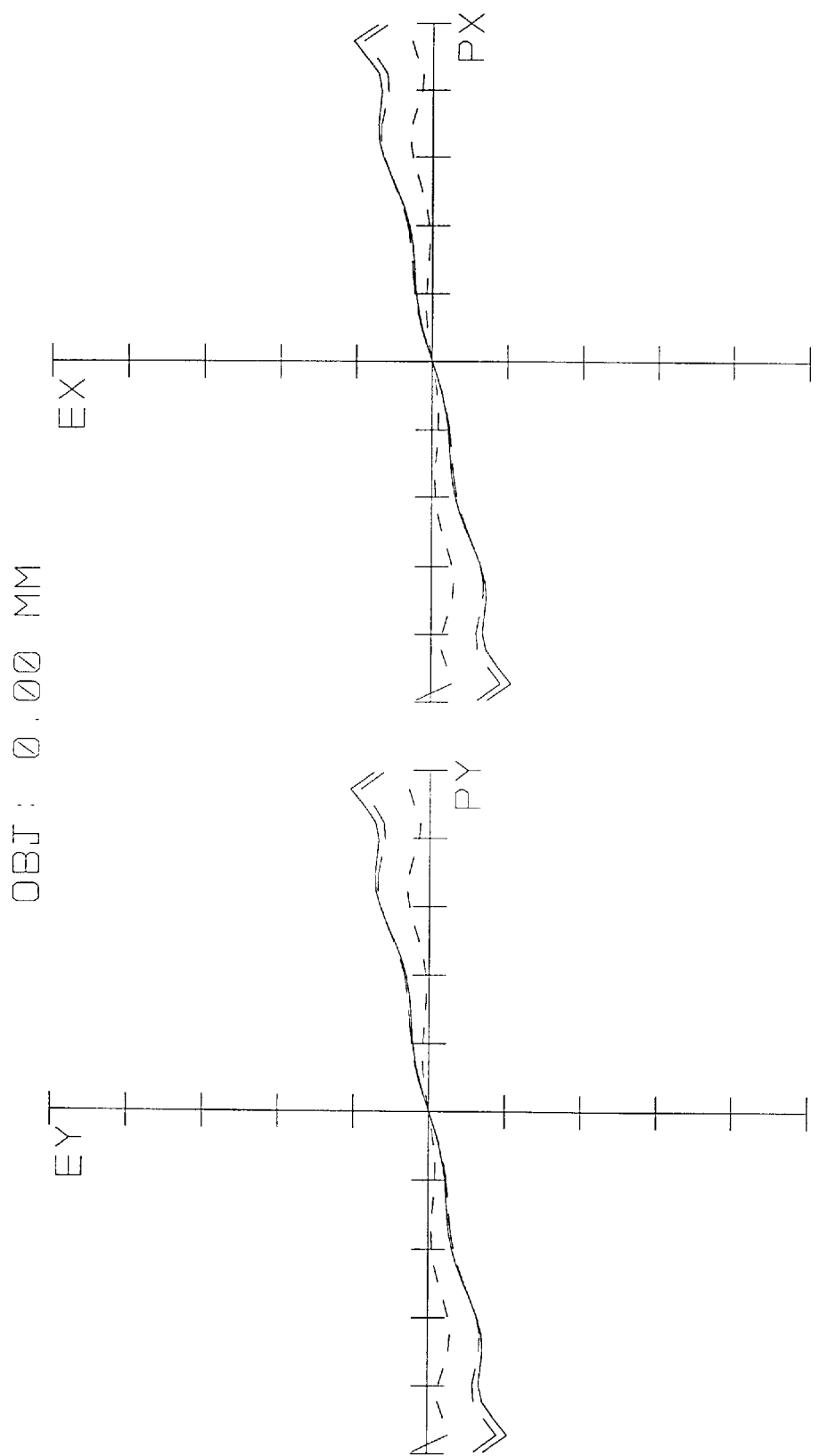
Figures 2, 283:
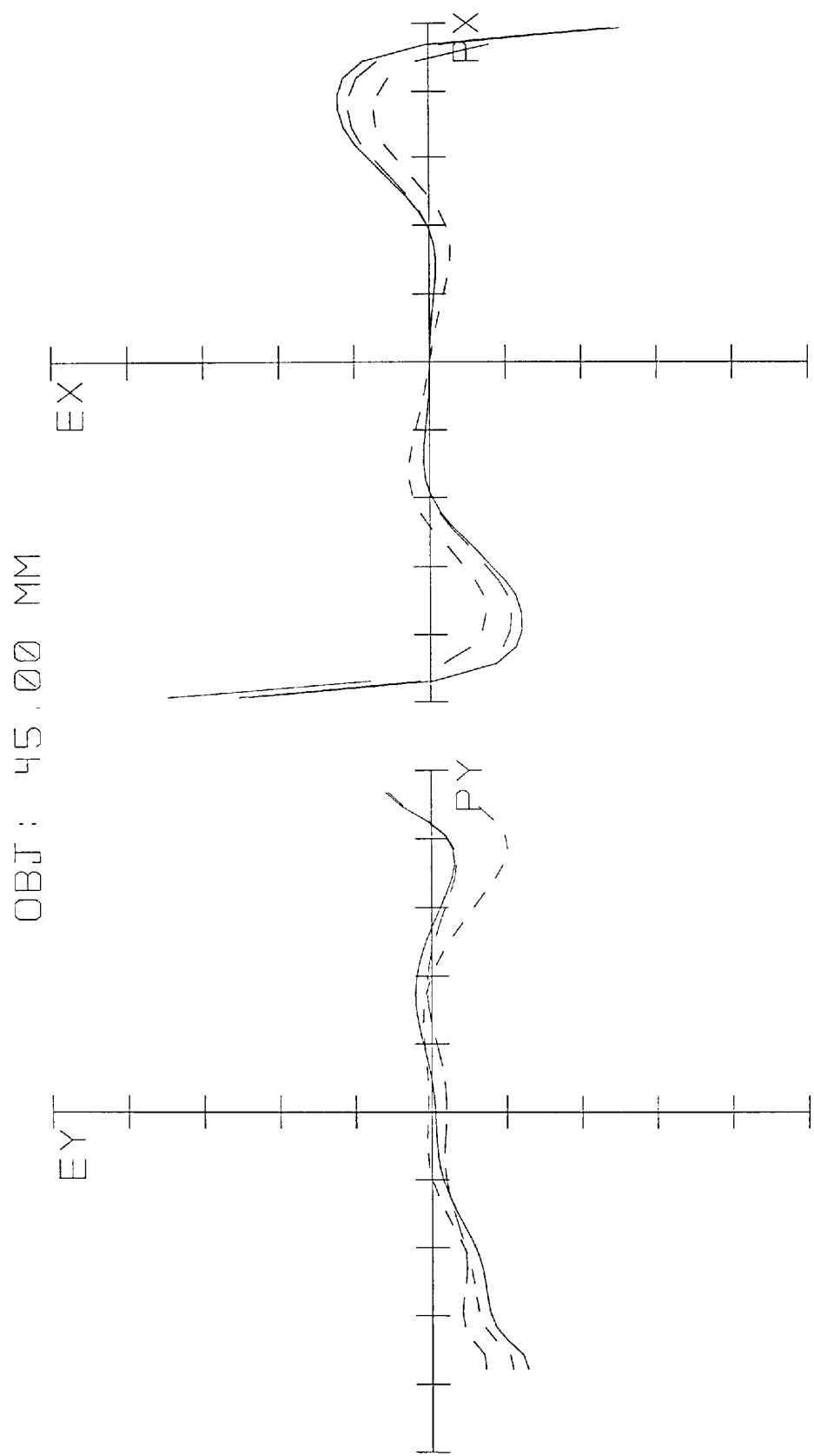
Figures 3, 28J:
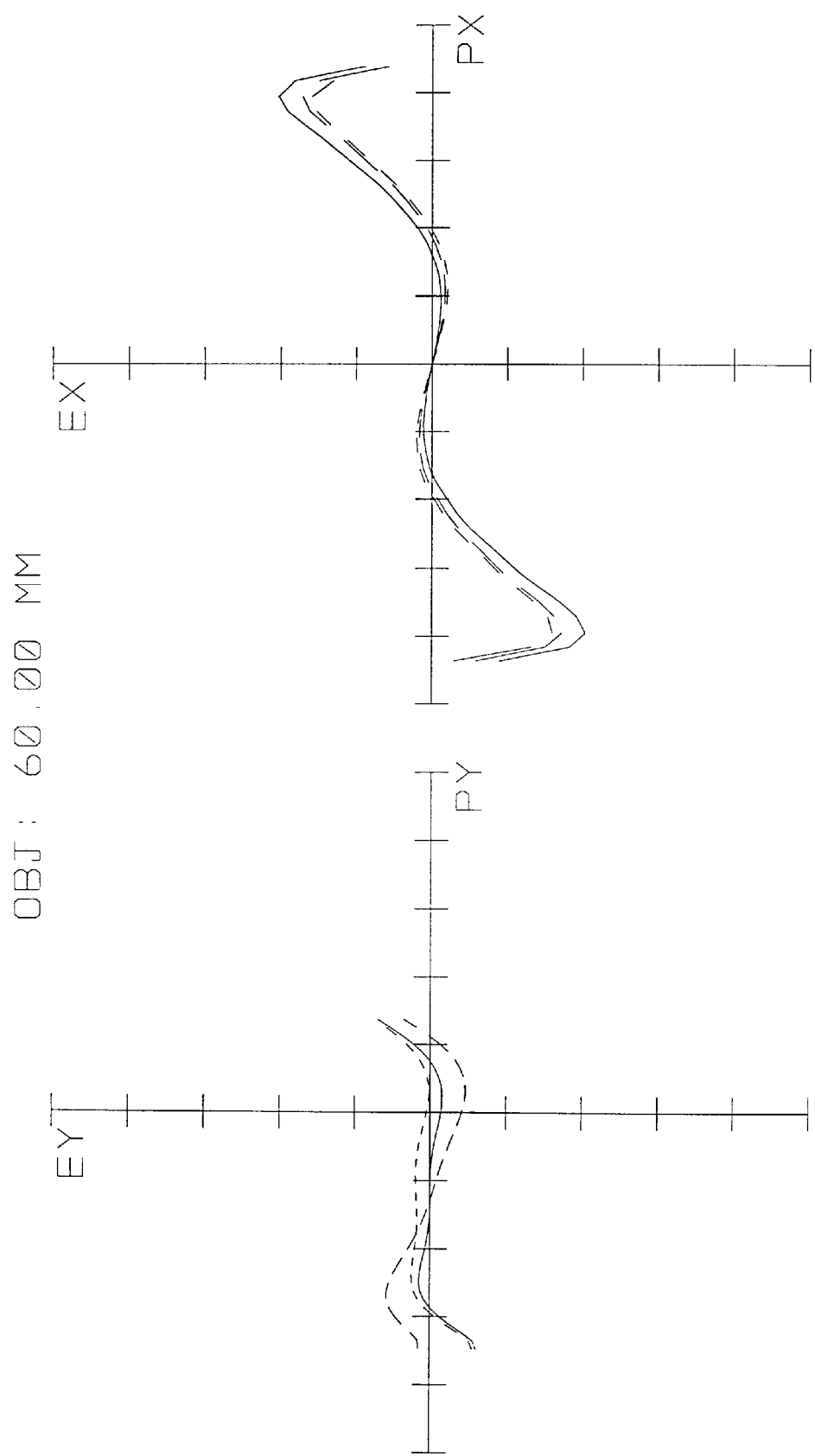
Figures 1, 28K:
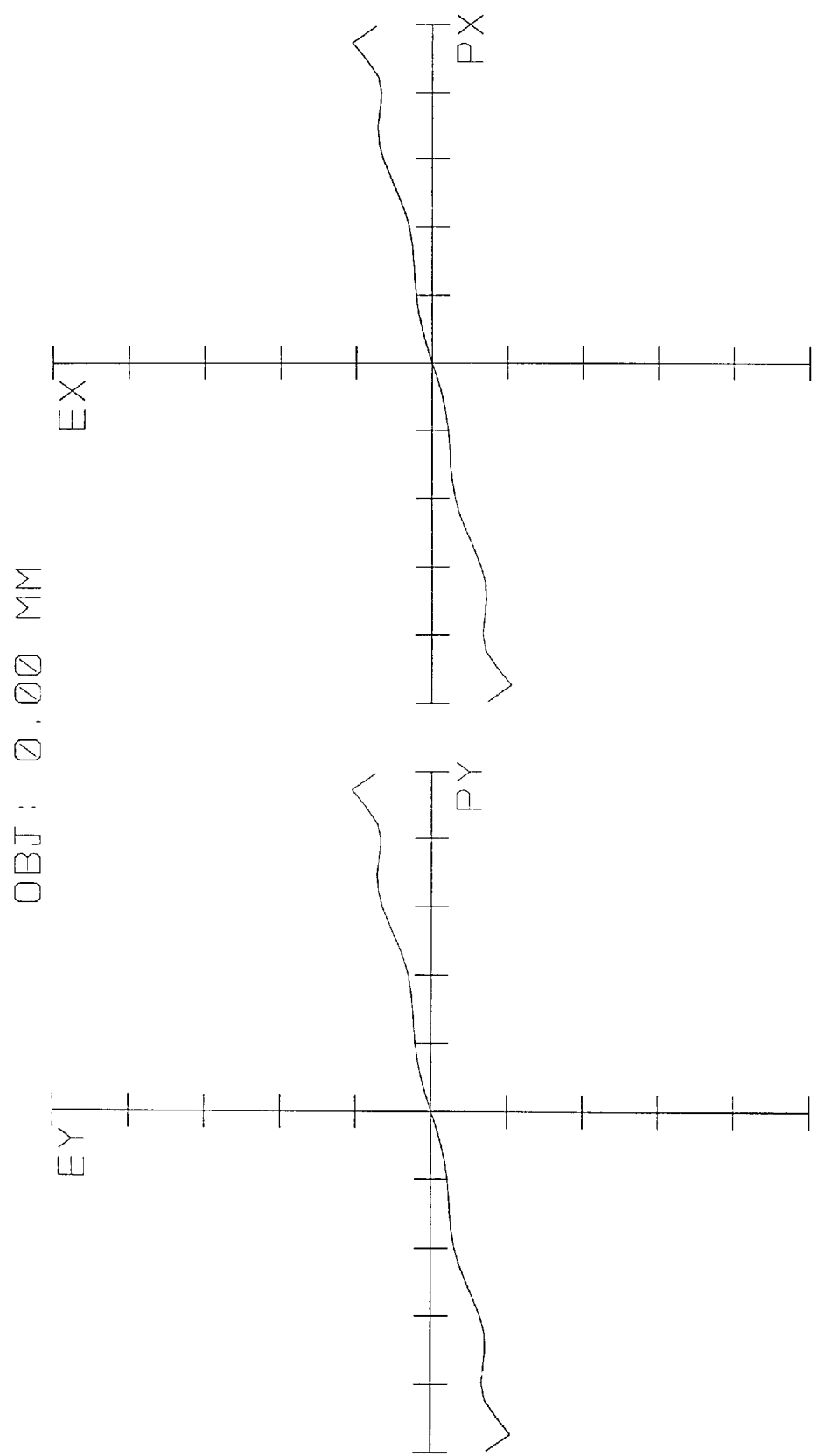
Figures 2, 28K:
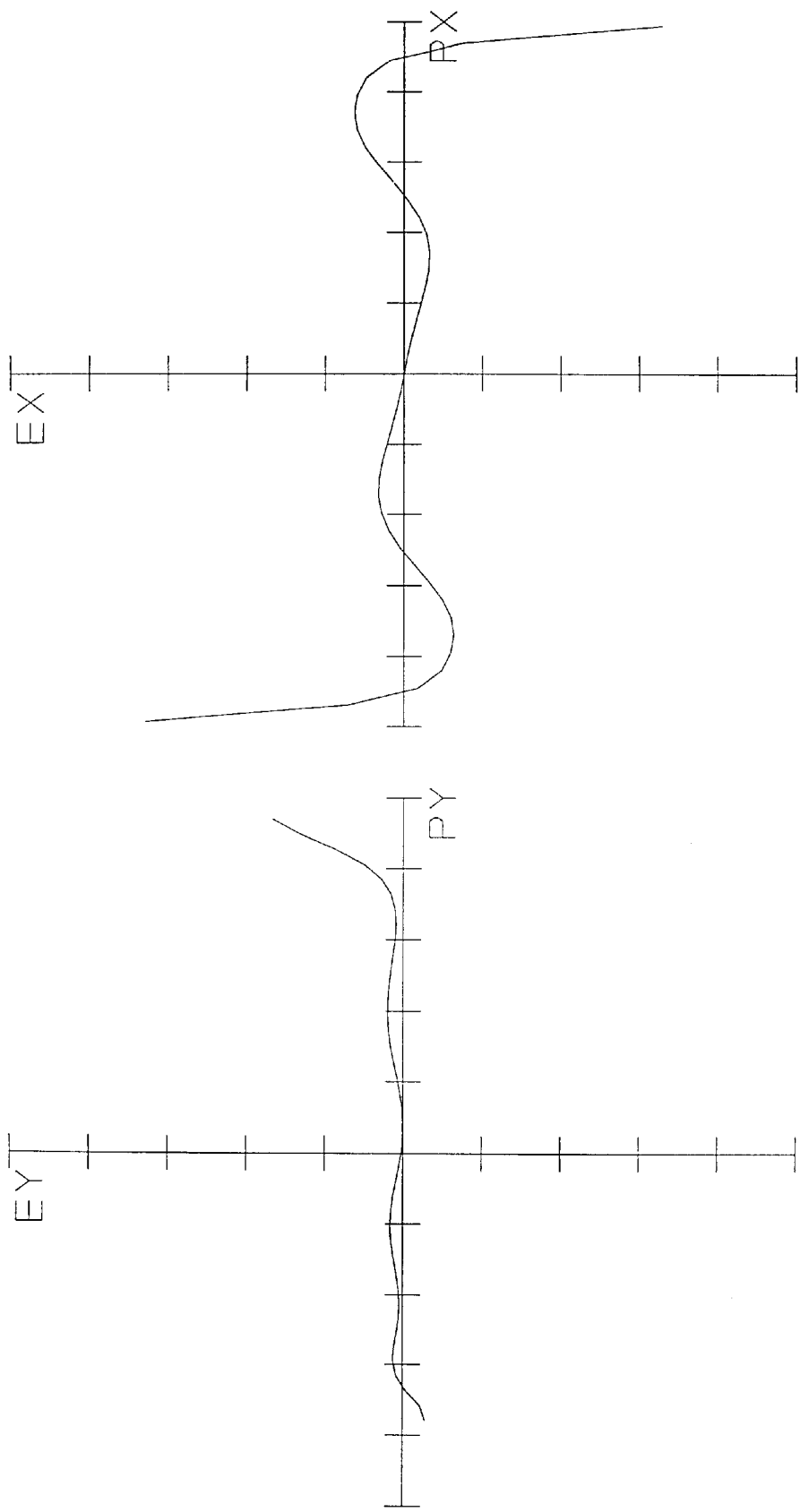
Figures 3, 28K:
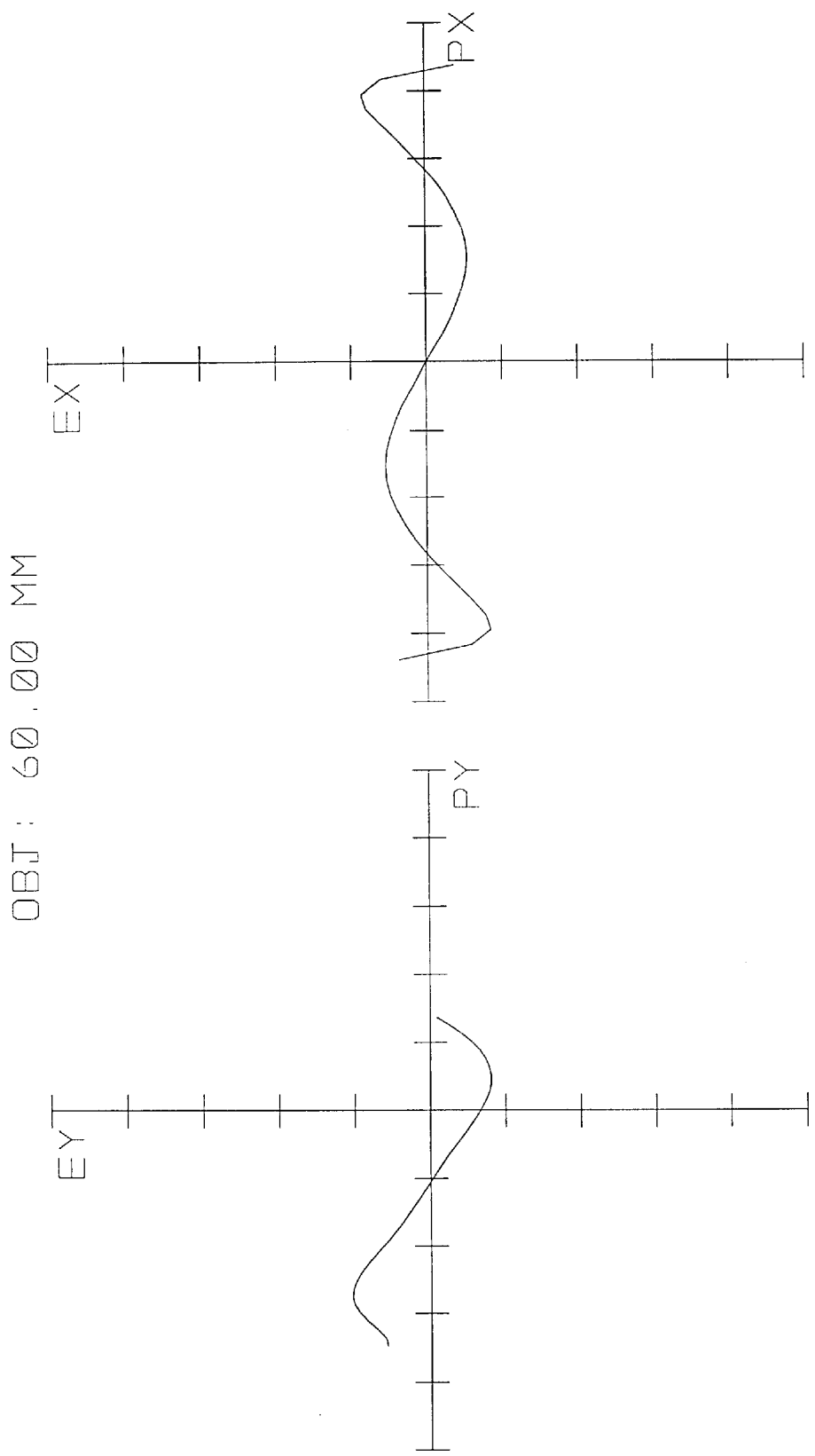

Using the techniques described above, a second design for a lens for a projection TV was prepared to increase the DE over the FOV of the system by changing the paraxial step height of the SDS so as to reduce the on-axis DE and cause the peak (maximum) DE to occur at a non-zero field. The paraxial step height ho in the equation (20) of the stepped diffractive surface was changed to $1.037\mu$ to give the highest average diffraction efficiency (minimum losses) at a primary wavelength of $0.546\mu$ for the field angle of 25°. The optical prescription of the lens is the same as in the previous design except for the air space between the S4 and S5 surfaces. This space was reduced to 33.238 mm to account for the small optical power of the SDS. The SDS is of variable step height on a spherical base curve. The polynomial coefficients that define the SDS step heights in equation (20) are presented in Table 12D. The step heights and widths are listed in Table 12F. The SDS relative step height as a function of the radial coordinate is the same as in the previous example, and is presented in FIG. 27. The ray aberration curves are shown in FIG. 28F. The full scale of FIG. 28F is +/−10 mm. The solid curve corresponds to the wavelength of 0.546 microns. The dashed curves correspond to the marginal wavelengths, where smaller dashes correspond to 0.480 microns and the longer dashes correspond to 0.644 microns. Field curvature (left panel) and distortion (right panel) are presented in FIG. 28G where the line types are the same as in FIG. 28F and correspond to the same wavelengths. The monochromatic and polychromatic MTF plots are shown in FIGS. 28H and 28I, respectively. FIG. 28J presents the ray aberration curves when the $A_0$ coefficient of the SDS was set equal to 1.0, i.e., when the SDS was replaced by the one from the first design, but with the changed spacing between surfaces S4 and S5 maintained. The ray aberration curves at the primary wavelength of 0.546 microns when the SDS was replaced by a planar surface are presented in FIG. 28K. The full scale of FIGS. 28J and 28K is +/−10 mm. FIG. 28K shows performance deterioration on-axis and at the marginal field, while the intermediate field performance was intact.

Although preferred and other embodiments of the invention have been described herein, further embodiments may be perceived by those skilled in the art without departing from the scope of the invention as defined by the following claims.

TABLE 1

SDS/Refractive Achromatic Singlets

|  | Singlet #1 | Singlet #2 | Singlet #3 | Singlet #4 | Singlet #5 |
| --- | --- | --- | --- | --- | --- |
| Nominal Wavelength, $\mu$ | 0.85 | 0.85 | 0.85 | 1.3 | 1.5 |
| Surface 1 | SDS | SDS | SDS | SDS | SDS |
| R1, mm | −50.838 | −40.391 | −40.803 | −26.314 | −22.778 |
| K1 | 0 | −2230.674 | −1860.311 | −897.648 | −685.343 |
| A0 | 1 | 1 | 1 | 1 | 1 |
| A1 | 0 | 0 | −1.201E-01 | 0 | 0 |
| A2 | 0 | 0 | 5.619E-01 | 0 | 0 |
| A3 | 0 | 0 | −6.898E-01 | 0 | 0 |
| A4 | 0 | 0 | 3.043E-01 | 0 | 0 |
| Surface 2 | Refractive | Refractive | Refractive | Refractive | Refractive |
| R2, mm | −0.905 | −0.905 | −0.905 | −0.894 | −0.889 |
| K2 | −2.181 | −2.114 | −2.106 | −2.101 | −2.099 |
| D2 | −6.570E-03 | −5.036E-04 | 0 | −7.848E-04 | −1.390E-03 |
| E2 | 2.880E-03 | 2.162E-04 | 0 | 2.567E-04 | 5.984E-04 |

TABLE 2A

(Singlet #1)

| Zone Number | Sag Value, microns | Radius, mm | Zone Width, mm |
|---|---|---|---|
| 1 | 1.8785 | 0.4370 | 0.4370 |
| 2 | 3.7569 | 0.6180 | 0.1810 |
| 3 | 5.6354 | 0.7569 | 0.1389 |
| 4 | 7.5138 | 0.8740 | 0.1171 |

TABLE 2B

(Singlet #2)

| Zone Number | Sag Value, microns | Radius, mm | Zone Width, mm |
|---|---|---|---|
| 1 | 1.8785 | 0.3995 | 0.3995 |
| 2 | 3.7569 | 0.5788 | 0.1792 |
| 3 | 5.6354 | 0.7253 | 0.1465 |
| 4 | 7.5138 | 0.8561 | 0.1308 |

TABLE 2C

(Singlet #3)

| Zone Number | Step Height, microns | Radius, mm | Zone Width, mm |
|---|---|---|---|
| 1 | 1.8785 | 0.3998 | 0.3998 |
| 2 | 1.9570 | 0.5769 | 0.1771 |
| 3 | 2.0996 | 0.7259 | 0.1490 |
| 4 | 2.2709 | 0.8667 | 0.1407 |

TABLE 2D

(Singlet #4)

| Zone Number | Sag Value, microns | Radius, mm | Zone Width, mm |
|---|---|---|---|
| 1 | 2.9088 | 0.4008 | 0.4008 |
| 2 | 5.8176 | 0.5801 | 0.1793 |
| 3 | 8.7264 | 0.7263 | 0.1462 |
| 4 | 11.6353 | 0.8566 | 0.1303 |

TABLE 2E

(Singlet #5)

| Zone Number | Sag Value, microns | Radius, mm | Zone Width, mm |
|---|---|---|---|
| 1 | 3.3737 | 0.4019 | 0.4019 |
| 2 | 6.7474 | 0.5818 | 0.1800 |
| 3 | 10.1211 | 0.7288 | 0.1470 |
| 4 | 13.4947 | 0.8599 | 0.1311 |

TABLE 3

Refractive/SDS Achromatic Singlets

| | Singlet #6 | Singlet #7 | Singlet #8 | Singlet #9 | Singlet #10 | Singlet #11 |
|---|---|---|---|---|---|---|
| Nominal Wavelength, $\mu$ | 0.85 | 0.85 | 0.85 | 0.85 | 1.3 | 1.5 |
| Surface 1 | Refractive | Refractive | Refractive | Refractive | Refractive | Refractive |
| R1, mm | 0.905 | 0.905 | 0.905 | 0.905 | 0.894 | 0.889 |
| K1 | −0.583 | −0.580 | −0.715 | −0.722 | −0.677 | −0.708 |
| D1 | 4.800E-03 | 5.737E-03 | 3.075E-02 | 2.908E-02 | 2.298E-02 | 2.930E-02 |
| E1 | 1.534E-03 | 1.109E-04 | 1.179E-02 | 1.051E-02 | 1.080E-02 | 1.029E-02 |
| F1 | −3.645E-03 | −2.722E-04 | 5.283E-03 | 3.384E-03 | −2.178E-03 | 6.591E-03 |
| G1 | 1.178E-03 | −1.531E-03 | 0 | 0 | 0 | 0 |
| H1 | 0 | 0 | 1.949E-03 | 1.537E-03 | 9.793E-03 | −1.477E-03 |
| Surface 2 | SDS | SDS | SDS | SDS | SDS | SDS |
| R2, mm | 26.547 | 23.682 | 23.247 | 23.103 | 14.769 | 12.889 |
| K2 | 0.000 | −994.397 | 0 | −1174.907 | −393.975 | −294.849 |
| A0 | 1 | 0.98 | 1 | 1 | 1 | 1 |
| A1 | 0 | 0 | 4.118E-03 | 1.475E-02 | 0 | 0 |
| A2 | 0 | 0 | 7.667E-01 | −2.830E-01 | 0 | 0 |
| A3 | 0 | 0 | 1.774E-02 | 2.894E-01 | 0 | 0 |
| A4 | 0 | 0 | −5.506E-02 | −9.502E-02 | 0 | 0 |

TABLE 4A

(Singlet #6)

| Zone Number | Sag Value, microns | Radius, mm | Zone Width, mm |
|---|---|---|---|
| 1 | 1.8785 | 0.3158 | 0.3158 |
| 2 | 3.7569 | 0.4466 | 0.1308 |
| 3 | 5.6354 | 0.5470 | 0.1004 |

TABLE 4B (Singlet #7)

| Zone Number | Sag Value, microns | Radius, mm | Zone Width, mm |
|---|---|---|---|
| 1 | 1.8409 | 0.3009 | 0.3009 |
| 2 | 3.6818 | 0.4334 | 0.1325 |
| 3 | 5.5227 | 0.5403 | 0.1068 |

TABLE 4C (Singlet #8)

| Zone Number | Step Height, microns | Radius, mm | Zone Width, mm |
|---|---|---|---|
| 1 | 1.8785 | 0.2955 | 0.2955 |
| 2 | 2.0065 | 0.4179 | 0.1224 |
| 3 | 2.1332 | 0.5176 | 0.0997 |

TABLE 4D (Singlet #9)

| Zone Number | Step Height, microns | Radius, mm | Zone Width, mm |
|---|---|---|---|
| 1 | 1.8785 | 0.3016 | 0.3016 |
| 2 | 1.8385 | 0.4361 | 0.1345 |
| 3 | 1.7894 | 0.5434 | 0.1073 |

TABLE 4E (Singlet #10)

| Zone Number | Sag Value, microns | Radius, mm | Zone Width, mm |
|---|---|---|---|
| 1 | 2.9088 | 0.2987 | 0.2987 |
| 2 | 5.8176 | 0.4303 | 0.1315 |
| 3 | 8.7264 | 0.5364 | 0.1061 |

TABLE 4F (Singlet #11)

| Zone Number | Sag Value, microns | Radius, mm | Zone Width, mm |
|---|---|---|---|
| 1 | 3.3737 | 0.3005 | 0.3005 |
| 2 | 6.747 | 0.4328 | 0.1323 |
| 3 | 10.1211 | 0.5394 | 0.1066 |

TABLE 5

Refractive/SDS Achromatic Singlets

| | Singlet #12 | Singlet #13 | Singlet #14 | Singlet #15 | Singlet #16 | Singlet #17 |
|---|---|---|---|---|---|---|
| Nominal Wavelength, $\mu$ | 1.3 | 1.3 | 1.3 | 1.3 | 1.3 | 1.3 |
| Surface 1 | SDS | SDS | SDS | SDS | SDS | SDS |
| R1, mm | −32.905 | −23.343 | −23.278 | −33.056 | −22.789 | −23.287 |
| K1 | 0 | −696.187 | 0 | 0 | −824.113 | −705.451 |
| A0 | 1 | 1 | 1 | 1 | 1 | 1 |
| A1 | 0 | 0 | 2.941E-02 | −5.172E-04 | 1.327E-01 | −8.975E-05 |
| A2 | 0 | 0 | 5.718E-01 | −1.320E-03 | −4.215E-01 | −3.099E-03 |
| A3 | 0 | 0 | −4.794E-02 | −2.817E-03 | 3.311E-01 | −4.509E-04 |
| A4 | 0 | 0 | −3.759E-02 | 1.230E-03 | −8.081E-02 | 2.141E-04 |
| Surface 2 | Refractive | Refractive | Refractive | Refractive | Refractive | Refractive |
| R2, mm | −0.894 | −0.894 | −0.894 | −0.894 | −0.894 | −0.894 |
| K2 | −1.735 | −1.734 | −1.713 | −1.749 | −1.727 | −1.749 |
| D2 | −1.115E-02 | −1.104E-02 | −1.268E-02 | −1.344E-02 | −9.481E-03 | −1.344E-02 |
| E2 | 1.418E-03 | 1.474E-03 | 1.309E-03 | 3.224E-03 | 8.633E-04 | 3.224E-03 |
| F2 | 1.275E-04 | 3.015E-05 | 1.508E-04 | −7.552E-04 | 0 | −7.552E-04 |
| G2 | −9.834E-05 | −6.259E-05 | −8.32E-05 | 9.792E-05 | 0 | 9.79E-05 |

TABLE 6A (Singlet #12)

| Zone Number | Sag Value, microns | Radius, mm | Zone Width, mm |
|---|---|---|---|
| 1 | 2.9088 | 0.4375 | 0.4375 |
| 2 | 5.8176 | 0.6187 | 0.1812 |
| 3 | 8.7264 | 0.7578 | 0.1390 |
| 4 | 11.6353 | 0.8750 | 0.1172 |
| 5 | 14.5441 | 0.9782 | 0.1033 |
| 6 | 17.4529 | 1.0716 | 0.0933 |

TABLE 6B (Singlet #13)

| Zone Number | Sag Value, microns | Radius, mm | Zone Width, mm |
|---|---|---|---|
| 1 | 2.9088 | 0.3764 | 0.3764 |
| 2 | 5.8176 | 0.5433 | 0.1669 |
| 3 | 8.7264 | 0.6785 | 0.1352 |
| 4 | 11.6353 | 0.7983 | 0.1198 |
| 5 | 14.5441 | 0.9089 | 0.1106 |
| 6 | 17.4529 | 1.0132 | 0.1043 |
| 7 | 20.3617 | 1.1130 | 0.0998 |

TABLE 6C (Singlet #14)

| Zone Number | Step Height, microns | Radius, mm | Zone Width, mm |
|---|---|---|---|
| 1 | 2.9088 | 0.3680 | 0.3680 |
| 2 | 3.1655 | 0.5204 | 0.1524 |
| 3 | 3.4037 | 0.6466 | 0.1262 |
| 4 | 3.6596 | 0.7593 | 0.1127 |
| 5 | 3.9327 | 0.8642 | 0.1049 |
| 6 | 4.2248 | 0.9642 | 0.1001 |
| 7 | 4.5377 | 1.0612 | 0.0970 |

TABLE 6D (Singlet #15)

| Zone Number | Step Height, microns | Radius, mm | Zone Width, mm |
|---|---|---|---|
| 1 | 2.9088 | 0.4385 | 0.4385 |
| 2 | 2.9074 | 0.6201 | 0.1816 |
| 3 | 2.9064 | 0.7594 | 0.1393 |
| 4 | 2.9055 | 0.8788 | 0.1174 |
| 5 | 2.9045 | 0.9802 | 0.1034 |
| 6 | 2.9036 | 1.0737 | 0.0934 |

TABLE 6E (Singlet #16)

| Zone Number | Step Height, microns | Radius, mm | Zone Width, mm |
|---|---|---|---|
| 1 | 2.9088 | 0.3736 | 0.3736 |
| 2 | 2.8819 | 0.5413 | 0.1678 |
| 3 | 2.7585 | 0.6774 | 0.1360 |
| 4 | 2.6078 | 0.7939 | 0.1166 |
| 5 | 2.4425 | 0.8966 | 0.1027 |
| 6 | 2.2692 | 0.9883 | 0.0917 |
| 7 | 2.0928 | 1.0705 | 0.0822 |

TABLE 6F (Singlet #17)

| Zone Number | Step Height, microns | Radius, mm | Zone Width, mm |
|---|---|---|---|
| 1 | 2.9088 | 0.3761 | 0.3761 |
| 2 | 2.9074 | 0.5429 | 0.1669 |
| 3 | 2.9060 | 0.6782 | 0.1353 |
| 4 | 2.9045 | 0.7981 | 0.1199 |
| 5 | 2.9029 | 0.9087 | 0.1106 |
| 6 | 2.9011 | 1.0131 | 0.1044 |
| 7 | 2.8993 | 1.1130 | 0.0999 |

TABLE 7

SDS/GRIN Achromats

| | Achromat #1 | Achromat #2 | Achromat #3 | Achromat #4 |
|---|---|---|---|---|
| Nominal Wavelength, μ | 0.85 | 0.85 | 0.85 | 0.85 |
| R2, mm | 29.220 | 20.983 | 26.056 | 27.304 |
| K2 | 0 | −1331.923 | 0 | 630.063 |
| A0 | 1 | 1 | 1 | 1 |
| A1 | 0 | 0 | −0.3538 | −0.2122 |
| A2 | 0 | 0 | 0.7611 | 0.8332 |

TABLE 8A

| Zone Number | Sag Value, microns | Radius, mm | Zone Width, mm |
|---|---|---|---|
| 1 | 1.879 | 0.331 | 0.331 |
| 2 | 3.757 | 0.469 | 0.137 |
| 3 | 5.635 | 0.574 | 0.105 |
| 4 | 7.514 | 0.663 | 0.089 |
| 5 | 9.392 | 0.741 | 0.078 |

TABLE 8B

| Zone Number | Sag Value, microns | Radius, mm | Zone Width, mm |
|---|---|---|---|
| 1 | 1.879 | 0.289 | 0.289 |
| 2 | 3.757 | 0.420 | 0.131 |
| 3 | 5.635 | 0.528 | 0.108 |
| 4 | 7.514 | 0.625 | 0.097 |
| 5 | 9.392 | 0.715 | 0.090 |

TABLE 8C

| Zone Number | Step Height, microns | Radius, mm | Zone Width, mm |
|---|---|---|---|
| 1 | 1.879 | 0.313 | 0.313 |
| 2 | 1.811 | 0.443 | 0.130 |
| 3 | 1.864 | 0.539 | 0.096 |
| 4 | 1.935 | 0.622 | 0.084 |
| 5 | 2.018 | 0.699 | 0.076 |

TABLE 8D

| Zone Number | Step Height, microns | Radius, mm | Zone Width, mm |
|---|---|---|---|
| 1 | 1.894 | 0.318 | 0.318 |
| 2 | 1.960 | 0.448 | 0.130 |
| 3 | 2.068 | 0.549 | 0.100 |
| 4 | 2.186 | 0.634 | 0.085 |
| 5 | 2.310 | 0.707 | 0.074 |

TABLE 9

| Wavelength, μ | 0.85 | 1.06 | 1.3 | 1.5 |
|---|---|---|---|---|
| GRIN Pitch, mm | 6.464 | 6.490 | 6.484 | 6.456 |
| Spot Radius, μ | 0.206 | 0.156 | 0.155 | 0.144 |

TABLE 10A

Petzval Lens

| Lens | Surface | Radius (mm) | Axial Distance, (mm) | $N_D$ | $V_D$ |
|---|---|---|---|---|---|
| L1 | S1 | −18.839 | | | |
| | | | 6.250 | 1.492 | 57.4 |
| | S2 | −16.511 | | | |
| | | | 45.839 | | |
| L2 | S3 | −27.309 | | | |
| | | | 10.000 | 1.492 | 57.4 |
| | S4 | −26.410 | | | |

EFL=120.0 mm

FVD=162.1 mm

Back Focal Distance=100 mm

Semi-Field Angle=20.00

Aperture Stop at Surface S2; Stop Diameter 16 mm

Aspheric Surfaces S1, S3 and S4

| | D | E | F | G | H | I |
|---|---|---|---|---|---|---|
| S1 | −2.2404E-5 | −6.1378E-08 | −6.1124E-10 | 7.9732E-12 | −1.2215E-13 | 8.5264E-16 |
| S3 | 1.1624E-05 | 1.5139E-08 | 1.7689E-11 | −2.1022E-13 | 8.4427E-16 | −1.1446E-18 |
| S4 | 5.9418E-06 | 2.6785E-08 | −4.2053E-11 | 1.5765E-15 | 2.5137E-16 | −3.0608E-19 |

TABLE 10B

Petzval Lens with SDS Corrector

| Lens | Surface | Radius (mm) | Axial Distance, (mm) | $N_D$ | $V_D$ |
|---|---|---|---|---|---|
| L1 | S1 | −18.839 | | | |
|  |  |  | 6.250 | 1.492 | 57.4 |
|  | S2 | −16.511 | | | |
|  |  |  | 15.277 | | |
| L2 | S3 | Infinity | | | |
|  |  |  | 7.000 | 1.492 | 57.4 |
|  | S4* | 690.589 | | | |
|  |  |  | 25.879 | | |
| L3 | S5 | −27.309 | | | |
|  |  |  | 10.000 | 1.492 | 57.4 |
|  | S6 | −26.410 | | | |

EFL=120.0 mm  
FVD=164.4 mm  
Back Focal Distance=100 mm  
Semi-Field Angle=20.00  
Aperture Stop at Surface S2; Stop Diameter 16 mm  
* Surface S4 Radius Corresponds To That For SDS Base Surface Aspheric Surfaces S1, S5 and S6

| | D | E | F | G | H | I |
|---|---|---|---|---|---|---|
| S1 | −2.2404E-05 | −6.1378E-08 | −6.1124E-10 | 7.9732E-12 | −1.2215E-13 | 8.5264E-16 |
| S5 | 1.1624E-05 | 1.5139E-08 | 1.7689E-11 | −2.1022E-13 | 8.4427E-16 | −1.1446E-18 |
| S6 | 5.9418E-06 | 2.6785E-08 | −4.2053E-11 | 1.5765E-15 | 2.5137E-16 | −3.0608E-19 |

TABLE 10C

| Zone Number | Sag Value, microns | Radius, mm | Zone Width, mm |
|---|---|---|---|
| 1 | 1.1950 | 1.2847 | 1.2847 |
| 2 | 2.3901 | 1.8169 | 0.5322 |
| 3 | 3.5851 | 2.2252 | 0.4083 |
| 4 | 4.7801 | 2.5695 | 0.3442 |
| 5 | 5.9752 | 2.8728 | 0.3033 |
| 6 | 7.1702 | 3.1470 | 0.2742 |
| 7 | 8.3653 | 3.3991 | 0.2521 |
| 8 | 9.5603 | 3.6338 | 0.2347 |
| 9 | 10.7553 | 3.8542 | 0.2204 |
| 10 | 11.9504 | 4.0627 | 0.2085 |
| 112 | 133.8441 | 13.5958 | 0.0608 |
| 113 | 135.0392 | 13.6563 | 0.0606 |
| 114 | 136.2342 | 13.7166 | 0.0603 |
| 115 | 137.4292 | 13.7766 | 0.0600 |
| 116 | 138.6243 | 13.8364 | 0.0598 |
| 117 | 139.8193 | 13.8959 | 0.0595 |
| 118 | 141.0144 | 13.9551 | 0.0593 |
| 119 | 142.2094 | 14.0141 | 0.0590 |
| 120 | 143.4044 | 14.0729 | 0.0588 |
| 121 | 144.5995 | 14.1314 | 0.0585 |
| 122 | 145.7945 | 14.1897 | 0.0583 |

TABLE 11A

| Lens | Surface | Radius, mm | Axial Distance, mm | Material |
|---|---|---|---|---|
|  |  |  | 20.597 |  |
| L1 | S1 | −15.926 |  |  |
|  |  |  | 8.000 | $CaF_2$ |
|  | S2 | −19.050 |  |  |
|  |  |  | 1.000 |  |
| L2 | S3 | 15.228 |  |  |
|  |  |  | 8.000 | Silica |
|  | S4 | 11.907 |  |  |
|  |  |  | 104.416 |  |
| L3 | S5 | 61.563 |  |  |
|  |  |  | 8.000 | $CaF_2$ |
|  | S6 | −29.456 |  |  |
|  |  |  | 1.000 |  |
|  | S7 | −28.795 |  |  |
| L4 |  |  | 7.000 | Silica |
|  | S8 | 27.818 |  |  |
|  |  |  | 2.500 |  |
| L5 | S9 | 101.684 |  |  |
|  |  |  | 7.000 | $CaF_2$ |
|  | S10 | −85.052 |  |  |
|  |  |  | 0.572 |  |
| L6 | S11 | −1922.641 |  |  |
|  |  |  | 7.000 | Silica |
|  | *S12 | 220.231 |  |  |
|  |  |  | 0.987 |  |
|  | S13 | 41.652 |  |  |
| L7 |  |  | 10.000 | $CaF_2$ |
|  | S14 | 6266.140 |  |  |
|  |  |  | 2.748 |  |
|  | S15 | −355.288 |  |  |
| L8 |  |  | 8.000 | $CaF_2$ |
|  | S16 | −100.500 |  |  |
|  |  |  | 0.100 |  |
|  | S17 | 33.844 |  |  |

TABLE 11A-continued

| Lens | Surface | Radius, mm | Axial Distance, mm | Material |
|---|---|---|---|---|
| L9 | | | 10.000 | $CaF_2$ |
| | S18 | −37.593 | | |
| | | | 0.700 | |
| | S19 | −33.089 | | |
| L10 | | | 6.000 | Silica |
| | S20 | 18.211 | | |
| | | | 0.500 | |
| | S21 | 18.65098 | | |
| L11 | | | 8.000 | $CaF_2$ |
| | S22 | −32.904 | | |
| | | | 0.100 | |
| | S23 | 15.076 | | |
| L12 | | | 8.000 | $CaF_2$ |
| | S24 | 82.051 | | |
| | | | 1.102 | |
| | S25 | −95.37494 | | |
| L13 | | | 5.000 | Silica |
| | S26 | 6.934 | | |
| | | | 0.400 | |
| | S27 | 6.138 | | |
| L14 | | | 6.040 | $CaF_2$ |
| | S28 | 11.368 | | |
| | | | 1.704109 | |

TABLE IIB

| Zone Number | Sag Value, microns | Radius, mm | Zone Width, mm |
|---|---|---|---|
| 1 | 0.5309 | 0.6142 | 0.6142 |
| 2 | 1.0618 | 0.8686 | 0.2544 |
| 3 | 1.5927 | 1.0638 | 0.1952 |
| 4 | 2.1236 | 1.2284 | 0.1646 |
| 5 | 2.6545 | 1.3734 | 0.1450 |
| 6 | 3.1854 | 1.5045 | 0.1311 |
| 7 | 3.7163 | 1.6250 | 0.1205 |
| 8 | 4.2472 | 1.7372 | 0.1122 |
| 9 | 4.7781 | 1.8426 | 0.1054 |
| 10 | 5.3090 | 1.9423 | 0.0997 |
| 469 | 248.9925 | 13.2991 | 0.0142 |
| 470 | 249.5234 | 13.3133 | 0.0142 |
| 471 | 250.0543 | 13.3274 | 0.0142 |
| 472 | 250.5852 | 13.3416 | 0.0141 |
| 473 | 251.1161 | 13.3557 | 0.0141 |
| 474 | 251.6470 | 13.3698 | 0.0141 |

TABLE IIB-continued

| Zone Number | Sag Value, microns | Radius, mm | Zone Width, mm |
|---|---|---|---|
| 475 | 252.1779 | 13.3839 | 0.0141 |
| 476 | 252.7088 | 13.3979 | 0.0141 |
| 477 | 253.2397 | 13.4120 | 0.0141 |
| 478 | 253.7706 | 13.4261 | 0.0140 |
| 479 | 254.3015 | 13.4401 | 0.0140 |

TABLE 12A

| Lens | Surface | Radius, mm | Axial Distance, mm | $N_D$ | $V_D$ |
|---|---|---|---|---|---|
| | S1 | 350.000 | | | |
| CS | | | 12.500 | 1.527 | 50 |
| | S2 | PLANO | | | |
| C | | | 5.000 | 1.412 | 50.0 |
| | S3 | 63.314 | | | |
| L1 | | | 5.000 | 1.527 | 50 |
| | S4 | 46.778 | | | |
| | | | 33.514 | | |
| | S5 | 79.131 | | | |
| L2 | | | 8.000 | 1.492 | 57.4 |
| | S6 | 116.495 | | | |
| | | | 13.510 | | |
| | S7 | 291.025 | | | |
| L3 | | | 18.000 | 1.517 | 64.2 |
| | S8 | −80.720 | | | |
| | | | 0.100 | | |
| | S9 | *−920.000 | | | |
| L4 | | | 9.000 | 1.492 | 57.4 |
| | S10 | −243.970 | | | |
| | | | 18.978 | | |
| | S11 | −114.098 | | | |
| L5 | | | 9.000 | 1.492 | 57.4 |
| | S12 | −65.112 | | | |

EFL=84.32 mm

FVD=132.6 mm

Image Space NA=0.373

Semi-Field Angle=44.70

Aperture Stop at Surface 10; Stop Diameter 81.8 mm

* Surface S9 Radius Corresponds To That of The SDS Base Surface

TABLE 12B

| | S5 | S6 | S10 | S11 | S12 |
|---|---|---|---|---|---|
| D | −1.848E−06 | 9.000E−08 | −8.709E−07 | −3.004E−07 | 6.036E−07 |
| E | −1.552E−09 | −1.430E−09 | −1.330E−10 | −6.143E−10 | −2.731E−12 |
| F | −4.303E−13 | −5.122E−13 | −1.166E−13 | 5.501E−13 | 3.261E−13 |
| G | −6.292E−17 | 1.491E−16 | 1.112E−17 | 5.011E−17 | 5.546E−17 |
| H | 7.775E−20 | 4.919E−19 | 2.549E−20 | −1.180E−19 | −1.433E−20 |
| I | 1.468E−22 | −1.130E−22 | −7.816E−24 | 1.377E−23 | −1.559E−23 |
| K | 0 | 0.01 | 0 | 0 | 0 |

TABLE 12C

| $A_0$ | $A_1$ | $A_2$ | $A_3$ | $A_4$ | $A_5$ | $A_6$ | $A_7$ | $A_8$ |
|---|---|---|---|---|---|---|---|---|
| 1.000 | 3.598E−04 | −1.658E−04 | 2.004E−05 | −1.199E−06 | 3.427E−08 | −3.665E−10 | −1.634E−12 | 4.198E−14 |

TABLE 12D

| Zone Number | Step Height, microns | Radius, mm | Zone Width, mm |
|---|---|---|---|
| 1 | 1.1059 | 1.4265 | 1.4265 |
| 2 | 1.1062 | 2.0174 | 0.5909 |
| 3 | 1.1061 | 2.4708 | 0.4535 |
| 4 | 1.1061 | 2.8531 | 0.3822 |
| 5 | 1.1060 | 3.1898 | 0.3367 |
| 6 | 1.1059 | 3.4941 | 0.3043 |
| 7 | 1.1058 | 3.7739 | 0.2798 |
| 8 | 1.1058 | 4.0343 | 0.2604 |
| 9 | 1.1057 | 4.2789 | 0.2445 |
| 10 | 1.1056 | 4.5101 | 0.2312 |
| 815 | 1.0809 | 40.5022 | 0.0245 |
| 816 | 1.0809 | 40.5267 | 0.0245 |
| 817 | 1.0808 | 40.5512 | 0.0245 |
| 818 | 1.0808 | 40.5757 | 0.0245 |
| 819 | 1.0807 | 40.6002 | 0.0245 |
| 820 | 1.0807 | 40.6246 | 0.0245 |
| 821 | 1.0806 | 40.6491 | 0.0244 |
| 822 | 1.0806 | 40.6735 | 0.0244 |
| 823 | 1.0805 | 40.6979 | 0.0244 |
| 824 | 1.0804 | 40.7223 | 0.0244 |

TABLE 12E

| $A_0$ | $A_1$ | $A_2$ | $A_3$ | $A_4$ | $A_5$ | $A_6$ | $A_7$ | $A_8$ |
|---|---|---|---|---|---|---|---|---|
| 0.9380 | 3.598E-04 | −1.658E-04 | 2.004E-05 | −1.199E-06 | 3.427E-08 | −3.665E-10 | −1.634E-12 | 4.198E-14 |

TABLE 12F

| Zone Number | Step Height, microns | Radius, mm | Zone Width, mm |
|---|---|---|---|
| 1 | 1.0373 | 1.3815 | 1.3815 |
| 2 | 1.0375 | 1.9539 | 0.5724 |
| 3 | 1.0375 | 2.3931 | 0.4392 |
| 4 | 1.0375 | 2.7633 | 0.3702 |
| 5 | 1.0374 | 3.0894 | 0.3261 |
| 6 | 1.0373 | 3.3842 | 0.2948 |
| 7 | 1.0373 | 3.6554 | 0.2711 |
| 8 | 1.0372 | 3.9077 | 0.2523 |
| 9 | 1.0371 | 4.1447 | 0.2370 |
| 10 | 1.0371 | 4.3688 | 0.2241 |
| 869 | 1.0139 | 40.5043 | 0.0230 |
| 870 | 1.0138 | 40.5273 | 0.0230 |
| 871 | 1.0138 | 40.5503 | 0.0230 |
| 872 | 1.0137 | 40.5732 | 0.0230 |
| 873 | 1.0137 | 40.5962 | 0.0230 |
| 874 | 1.0136 | 40.6191 | 0.0229 |
| 875 | 1.0136 | 40.6421 | 0.0229 |
| 876 | 1.0135 | 40.6650 | 0.0229 |
| 877 | 1.0135 | 40.6879 | 0.0229 |
| 878 | 1.0134 | 40.7108 | 0.0229 |

What is claimed is:

1. A method for reducing at least one aberration of an optical system which comprises:

(i) a stepped diffractive surface (SDS) which comprises a plurality of steps; and (ii) an optical surface which has optical power and is not a stepped diffractive surface (non-SDS), said method comprising:

(a) tracing rays through the system by representing the SDS by an equation which describes diffraction by a grating; and (b) using the rays traced in step (a) to select one or more parameters of the system which reduce said at least one aberration;

wherein in step (a), rays are traced through individual steps of the SDS using the equation which describes diffraction by a grating.

2. The method of claim 1 wherein the at least one aberration is a monochromatic aberration.

3. The method of claim 2 wherein the at least one aberration is spherical aberration.

4. The method of claim 2 wherein the at least one aberration is field curvature.

5. The method of claim 2 wherein the at least one aberration is coma.

6. The method of claim 2 wherein the at least one aberration is astigmatism.

7. The method of claim 1 wherein the at least one aberration is a chromatic aberration.

8. The method of claim 7 wherein the at least one aberration is longitudinal chromatic aberration.

9. The method of claim 7 wherein the at least one aberration is lateral chromatic aberration.

10. The method of claim 1 wherein the optical system has a field of view of at least five degrees.

11. The method of claim 1 wherein the rays at the SDS correspond to a planar wavefront.

12. The method of claim 11 wherein the optical system has an optical axis and the rays at the SDS are parallel to that axis.

13. The method of claim 11 wherein the optical system has an optical axis and the rays at the SDS are at an angle to that axis.

14. The method of claim 1 wherein the rays at the SDS correspond to a non-planar wavefront.

15. The method of claim 1 wherein the rays at the SDS correspond to a converging beam.

16. The method of claim 1 wherein the rays at the SDS correspond to a diverging beam.

17. The method of claim 1 wherein the SDS's contribution to the at least one aberration is substantially balanced against the non-SDS's contribution to the at least one aberration.

18. The method of claim 1 wherein the optical system comprises a plurality of non-SDSs and the SDS's contribution to the at least one aberration is substantially balanced against the combined contributions of the non-SDSs to the at least one aberration.

19. The method of claim 1 wherein the optical system comprises a plurality of SDSs each of which comprises a plurality of steps and the combined contributions of the SDSs to the at least one aberration is substantially balanced against the contribution of the non-SDS to the at least one aberration.

20. The method of claim 1 wherein the optical system comprises a plurality of SDSs each of which comprises a plurality of steps and a plurality of non-SDSs and the combined contributions of the SDSs to the at least one aberration is substantially balanced against the combined contributions of the non-SDSs to the at least one aberration.

21. The method of claim 1 wherein the at least one aberration is a chromatic aberration, the SDS contributes to reduction of the aberration, and the system comprises at least two optical materials with different dispersive properties which contribute to the reduction of the aberration.

22. The method of claim 1 wherein the at least one aberration comprises at least one monochromatic aberration and at least one chromatic aberration.

23. The method of claim 1 wherein the at least one aberration comprises two monochromatic aberrations.

24. The method of claim 1 wherein the at least one aberration comprises two chromatic aberrations.

25. The method of claim 1 wherein the SDS has a base curve which is an asphere.

26. The method of claim 1 wherein the SDS has a non-constant step height within a diffraction order.

27. The method of claim 1 wherein the SDS has a base curve which is an asphere and a non-constant step height within a diffraction order.

28. The method of claim 1 wherein: (1) the optical system has a field of view and a nominal wavelength $\lambda_0$; and (2) the SDS has a constant step height selected to increase the SDS's average diffraction efficiency over the field of view at $\lambda_0$.

29. The method of claim 1 wherein: (1) the optical system has a field of view and a nominal wavelength $\lambda_0$; and (2) the SDS has a constant step height selected so that the maximum diffraction efficiency at $\lambda_0$ occurs at an intermediate field point within the field of view.

30. The method of claim 1 comprising the additional step of displaying the optical system having the one or more parameters selected in step (b).

31. The method of claim 1 comprising the additional step of producing the optical system having the one or more parameters selected in step (b).

32. A method for reducing at least one aberration of an optical system which comprises at least one optical element, said method comprising:
(a) incorporating an additional optical element in the system which comprises a stepped diffractive surface (SDS) which comprises a plurality of steps; and
(b) selecting the spacing between the SDS and the at least one optical element;
wherein step (b) is performed by tracing rays through the system by representing the SDS by an equation which describes diffraction by a grating, said equation being used to trace rays through individual steps of the SDS.

33. The method of claim 32 wherein the at least one aberration is a monochromatic aberration.

34. The method of claim 32 wherein the at least one aberration is a chromatic aberration.

35. The method of claim 34 wherein the at least one aberration is lateral chromatic aberration.

36. The method of claim 1 or 32 wherein the SDS has:
(1) a base curve defined by the equation $\phi(R,z)=0$, where R is a radial coordinate and z is an axial coordinate,
(2) step depths $d_i$, and
(3) step widths $\lambda_i(R,d_i)$ given by the equation:

$$w_i(R, d_i) = d_i \left| \frac{\frac{\partial \varphi(R, z)}{\partial z}}{\frac{\partial (R, z)}{\partial R}} \right|.$$

37. The method of claim 36 wherein the step depths are constant.

38. The method of claim 36 wherein the step depths are variable.

39. An optical system having an optical axis and comprising:
(a) a stepped diffractive surface (SDS) which has a clear aperture and within said clear aperture comprises N concentric planar steps orthogonal to the system's optical axis which define a non-planar base curve, said steps satisfying the relationship;

$|d_i|\backslash|d_{i+1}|<2.0$, for i=1 to N−2 where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step; and
(b) an optical surface which has optical power and is not an SDS (non-SDS);
wherein the SDS makes an optically significant contribution to the correction of the optical system's lateral color.

40. The optical system of claim 39 wherein the SDS has a vertex and removal of the SDS and its replacement with a planar surface at the vertex results in an optically significant increase in the optical system's lateral color.

41. The optical system of claim 39 wherein the SDS's contribution to lateral color is substantially balanced against the non-SDS's contribution to lateral color.

42. The optical system of claim 39 wherein the system comprises a plurality of non-SDSs and the SDS's contribution to lateral color is substantially balanced against the combined contributions of the non-SDSs to lateral color.

43. The optical system of claim 39 wherein:
(i) the system comprises a plurality of SDSs;
(ii) the combined contributions of the SDSs to lateral color is substantially balanced against the contribution of the non-SDS to lateral color; and
(iii) each of the SDSs has a clear aperture and within said clear aperture comprises N concentric planar steps orthogonal to the system's optical axis which define a non-planar base curve, said steps satisfy the relationship:

$|d_i|\backslash|d_{i+1}|<2.0$, for i=1 to N−2, where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step.

44. The optical system of claim 39 wherein:
the system comprises a plurality of SDSs and a plurality of non-SDSs;
(ii) the combined contributions of the SDSs to lateral color is substantially balanced against the combined contributions of the non-SDSs to lateral color; and
(iii) each of the SDSs has a clear aperture and within said clear aperture comprises N concentric planar steps orthogonal to the system's optical axis which define a non-planar base curve, said steps satisfying the relationship:

$|d_i|\backslash|d_{i+1}|<2.0$, for i=1 to N−2, where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step.

45. The optical system of claim 39 wherein the system comprises at least two optical materials with different dispersive properties which contribute to the correction of lateral color.

46. The optical system of claim 39 wherein the SDS's contribution to lateral color is determined using an equation which describes diffraction by a grating, said equation being used to trace rays through individual steps of the SDS.

47. An optical system having an optical axis and comprising:
(a) a stepped diffractive surface (SDS) which has a clear aperture and within said clear aperture comprises N concentric planar steps orthogonal to the systems's optical axis which define a non-planar base curve, said steps satisfying the relationship:

$$|d_i|\backslash|d_{i+1}|<2.0, \text{ for } i=1 \text{ to } N-2$$

where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step; and
(b) an optical surface which has optical power and is not an SDS (non-SDS);
wherein the SDS makes an optically significant contribution to the correction of the optical system's astigmatism.

48. The optical system of claim 47 wherein the SDS has a vertex and removal of the SDS and its replacement with a planar surface at the vertex results in an optically significant increase in the optical system's astigmatism.

49. The optical system of claim 47 wherein the SDS's contribution to astigmatism is substantially balanced against the non-SDS's contribution to astigmatism.

50. The optical system of claim 47 wherein the system comprises a plurality of non-SDSs and the SDS's contribution to astigmatism is substantially balanced against the combined contributions of the non-SDSs to astigmatism.

51. The optical system of claim 47 wherein:
(i) the system comprises a plurality of SDSs;
(ii) the combined contributions of the SDSs to astigmatism is substantially balanced against the contribution of the non-SDS to astigmatism; and
(iii) each of the SDSs has a clear aperture and within said clear aperture comprises N concentric planar steps orthogonal to the system's optical axis which define a non-planar base curve, said steps satisfying the relationship:

$$|d_i|\backslash|d_{i+1}|<2.0, \text{ for } i=1 \text{ to } N-2$$

where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step.

52. The optical system of claim 47 wherein:
(i) the system comprises a plurality of SDSs and a plurality of non-SDSs;
(ii) the combined contributions of the SDSs to astigmatism is substantially balanced against the combined contribution of the non-SDS to astigmatism; and
(iii) each of the SDSs has a clear aperture and within said clear aperture comprises N concentric planar steps orthogonal to the system's optical axis which define a non-planar base curve, said steps satisfying the relationship:

$$|d_i|\backslash|d_{i+1}|<2.0, \text{ for } i=1 \text{ to } N-2$$

where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step.

53. The optical system of claim 47 wherein the SDS's contribution to astigmatism is determined using an equation which describes diffraction by a grating, said equation being used to trace rays through individual steps of the SDS.

54. An optical system having an optical axis and comprising:
(a) a stepped diffractive surface (SDS) which has a clear aperture and within said clear aperture comprises N concentric planar steps orthogonal to the system's optical axis which define a non-planar base curve, said steps satisfying the relationship:

$$|d_i|\backslash|d_{i+1}|<2.0, \text{ for } i=1 \text{ to } N-2$$

where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step; and
(b) an optical surface which has optical power and is not an SDS (non-SDS);
wherein the SDS makes an optically significant contribution to the correction of the optical system's coma.

55. The optical system of claim 54 wherein the SDS has a vertex and removal of the SDS and its replacement with a planar surface at the vertex results in an optically significant increase in the optical system's coma.

56. The optical system of claim 54 wherein the SDS's contribution to coma is substantially balanced against the non-SDS's contribution to coma.

57. The optical system of claim 54 wherein the system comprises a plurality of non-SDSs and the SDS's contribution to coma is substantially balanced against the combined contributions of the non-SDSs to coma.

58. An optical system of claim 54 wherein:
(i) the system comprises a plurality of SDSs;
(ii) the combined contributions of the SDSs to coma is substantially balanced against the contributions of the non-SDS to coma; and
(iii) each of the SDSs has a clear aperture and within said clear aperture comprises N concentric planar steps orthogonal to the system's optical axis which define a non-planar base curve, said steps satisfying the relationship:

$$|d_i|\backslash|d_{i+1}|<2.0, \text{ for } i=1 \text{ to } N-2$$

where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step.

59. The optical system of claim 54 wherein:
(i) the system comprises a plurality of SDSs and a plurality of non-SDSs;
(ii) the combined contributions of the SDSs to coma is substantially balanced against the combined contribution of the non-SDS to coma; and
(iii) each of the SDSs has a clear aperture and within said clear aperture comprises N concentric planar steps orthogonal to the system's optical axis which define a non-planar base curve, said steps satisfying the relationship:

$$|d_i|\backslash|d_{i+1}|<2.0, \text{ for } i=1 \text{ to } N-2$$

where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step.

60. The optical system of claim 54 wherein the SDS's contribution to coma is determined using an equation which describes diffraction by a grating, said equation being used to trace rays through individual steps of the SDS.

61. An optical system having an optical axis and comprising:
   (a) a stepped diffractive surface (SDS) which has a clear aperture and within said clear aperture comprises N concentric planar steps orthogonal to the system's optical axis which define a non-planar base curve, said steps satisfying the relationship:

$$|d_i|\backslash|d_{i+1}|<2.0, \text{ for } i=1 \text{ to } N-2$$

where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step; and
   (b) an optical surface which has optical power and is not an SDS (non-SDS);
wherein the SDS makes an optically significant contribution to the correction of the optical system's distortion.

62. The optical system of claim 61 wherein the SDS has a vertex and removal of the SDS and its replacement with a planar surface at the vertex results in an optically significant increase in the optical system's distortion.

63. The optical system of claim 61 wherein the SDS's contribution to distortion is substantially balanced against the non-SDS's contribution to distortion.

64. The optical system of claim 61 wherein the system comprises a plurality of non-SDSs and the SDS's contribution to distortion is substantially balanced against the combined contributions of the non-SDSs to distortion.

65. The optical system of claim 61 wherein:
   (i) the system comprises a plurality of SDSs;
   (ii) the combined contributions of the SDSs to distortion is substantially balanced against the contribution of the non-SDS to distortion; and
   (iii) each of the SDSs has a clear aperture and within said clear aperture comprises N concentric planar steps orthogonal to the system's optical axis which define a non-planar base curve, said steps satisfying the relationship:

$$|d_i|\backslash|d_{i+1}|<2.0, \text{ for } i=1 \text{ to } N-2$$

where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step.

66. The optical system of claim 61 wherein:
   (a) the system comprises a plurality of SDSs and a plurality of non-SDSs;
   (ii) the combined contributions of the SDSs to distortion is substantially balanced against the combined contribution of the non-SDSs to distortion; and
   (iii) each of the SDSs has a clear aperture and within said clear aperture comprises N concentric planar steps orthogonal to the system's optical axis which define a non-planar base curve, said steps satisfying the relationship;

$$|d_i|\backslash|d_{i+1}|<2.0, \text{ for } i=1 \text{ to } N-2$$

where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step.

67. The optical system of claim 61, wherein the SDS's contribution to distortion is determined using an equation which describes diffraction by a grating, said equation being used to trace rays through individual steps of the SDS.

68. An optical system having an optical axis and comprising:
   (a) a stepped diffractive surface (SDS) which has a clear aperture and within said clear aperture comprises N concentric planar steps orthogonal to the system's optical axis which define a non-planar base curve, said steps satisfying the relationship:

$$|d_i|\backslash|d_{i+1}|<2.0, \text{ for } i=1 \text{ to } N-2$$

where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step; and
   (b) an optical surface which has optical power and is not an SDS (non-SDS);
wherein the SDS makes an optically significant contribution to the correction of the optical system's spherical aberration.

69. The optical system of claim 68 wherein the SDS has a vertex and removal of the SDS and its replacement with a planar surface at the vertex results in an optically significant increase in the optical system's spherical aberration.

70. The optical system of claim 68 wherein the SDS's contribution to spherical aberration is substantially balanced against the non-SDS's contribution to spherical aberration.

71. The optical system of claim 68 wherein the system comprises a plurality of non-SDSs and the SDS's contribution to spherical aberration is substantially balanced against the combined contributions of the non-SDSs to spherical aberration.

72. The optical system of claim 68 wherein:
   (i) the system comprises a plurality of SDSs;
   (ii) the combined contributions of the SDSs to spherical aberration is substantially balanced against the contribution of the non-SDS to spherical aberration; and
   (iii) each of the SDSs has a clear aperture and within said clear aperture comprises N concentric planar steps orthogonal to the system's optical axis which define a non-planar base curve, said steps satisfying the relationship:

$$|d_i|\backslash|d_{i+1}|<2.0, \text{ for } i=1 \text{ to } N-2$$

where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step.

73. The optical system of claim 68 wherein:
   (i) the system comprises a plurality of SDSs and a plurality of non-SDSs;

(ii) the combined contributions of the SDSs to spherically aberration is substantially balanced against the combined contribution of the non-SDSs to spherical aberration; and (iii) each of the SDSs has a clear aperture and within said clear aperture comprises N concentric planar steps orthogonal to the system's optical axis which define a non-planar base curve, said steps satisfying the relationship;

$$|d_i|\backslash|d_{i+1}|<2.0, \text{ for } i=1 \text{ to } N-2$$

where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step.

74. The optical system of claim 68, wherein the SDS's contribution to spherical aberration is determined using an equation which describes diffraction by a grating, said equation being used to trace rays through individual steps of the SDS.

75. An optical system having an optical axis and comprising:

(a) a stepped diffractive surface (SDS) which has a clear aperture and within said clear aperture comprises N concentric planar steps orthogonal to the system's optical axis which define a non-planar base curve, said steps satisfying the relationship:

$$|d_i|\backslash|d_{i+1}|<2.0, \text{ for } i=1 \text{ to } N-2$$

where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step; and (b) an optical surface which has optical power and is not an SDS (non-SDS);

wherein the SDS makes an optically significant contribution to the correction of two of the optical system's spherical aberration and:

(1) the SDS's non-planar base curve is defined by the equation $\phi(R,z)=0$, where R is a radial coordinate and z is an axial coordinate, and (2) the SDS has step widths $\lambda_i(R,d_i)$ given by the equation:

$$w_i(R, d_i) = d_i \left| \frac{\frac{\partial \varphi(R, z)}{\partial z}}{\frac{\partial (R, z)}{\partial R}} \right|.$$

76. The optical system of claim 75 wherein the two aberrations are primary aberrations.

77. The optical system of claim 75 wherein the two aberrations are chromatic aberrations.

78. The optical system of claim 77 wherein the two chromatic aberrations are primary chromatic aberrations.

79. The optical system of claim 75 wherein the two aberrations are monochromatic aberrations.

80. The optical system of claim 75 wherein one of the aberrations is a chromatic aberration and the other is a monochromatic aberration.

81. The optical system of claim 75 wherein the SDS has a vertex and removal of the SDS and its replacement with a planar surface at the vertex results in an optically significant increase in both of the aberrations.

82. The optical system of claim 75 wherein the SDS's contribution to each of the aberrations is substantially balanced against the non-SDS's contribution to each of the aberrations.

83. The optical system of claim 75 wherein the system comprises a plurality of non-SDSs and the SDS's contribution to each of the aberrations is substantially balanced against the combined contributions of the non-SDSs to each of the aberrations.

84. The optical system of claim 75 wherein:

(i) the system comprises a plurality of SDSs;

(ii) the combined contributions of the SDSs to each of the aberrations is substantially balanced against the contribution of the non-SDS to each of the aberrations; and (iii) each of the SDSs has a clear aperture and within said clear aperture comprises N concentric planar steps orthogonal to the system's optical axis which define a non-planar base curve, said steps satisfying the relationship:

$$|d_i|\backslash|d_{i+1}|<2.0, \text{ for } i=1 \text{ to } N-2$$

wherein $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step.

85. The optical system of claim 75 wherein:

(i) the system comprises a plurality of SDSs and a plurality of non-SDSs;

(ii) the combined contributions of the SDSs to each of the aberrations is substantially balanced against the combined contributions of the non-SDS to each of the aberrations; and (iii) each of the SDSs has a clear aperture and within said clear aperture comprises N concentric planar steps orthogonal to the system's optical axis which define a non-planar base curve, said steps satisfying the relationship:

$$|d_i|\backslash|d_{i+1}|<2.0, \text{ for } i=1 \text{ to } N-2$$

where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step.

86. The optical system of claim 75 wherein at least one of the aberrations is a chromatic aberration and the system comprises at least two optical materials with different dispersive properties which contribute to the correction of that aberration.

87. The optical system of claim 75 wherein the SDS's contributions to the aberrations are determined using an equation which describes diffraction by a grating, said equation being used to trace rays through individual steps of the SDS.

88. The optical system of claim 75 wherein a planar wavefront is incident on the SDS.

89. The optical system of claim 88 wherein the direction of propagation of the planar wavefront is along the optical axis.

90. The optical system of claim 88 wherein the direction of propagation of the planar wavefront is oriented at a non-zero angle to the optical axis.

91. The optical system of claim 75 wherein a non-planar wavefront is incident on the SDS.

92. The optical system of claim 75 wherein a converging beam is incident on the SDS.

93. The optical system of claim 75 wherein a diverging beam is incident on the SDS.

94. The optical system of claim 75 wherein the system has a field of view of at least five degrees.

95. The optical system of claim 75 wherein the SDS has a base curve which is an asphere.

96. The optical system of claim 75 wherein the SDS has a non-constant step height within a diffraction order.

97. The optical system of claim 75 wherein the SDS has a base curve which is an asphere and a non-constant step height within a diffraction order.

98. The optical system of claim 75 wherein the step depths are constant.

99. The optical system of claim 75 wherein the step depths are variable.

100. An optical system having an optical axis and comprising:

(a) a stepped diffractive surface (SDS) which has a clear aperture and within said clear aperture comprises N concentric planar steps orthogonal to the system's optical axis which define a non-planar base curve, said steps satisfying the relationship:

$|d_i|\backslash|d_{i+1}|<2.0$, for i=1 to N−2 where $d_i$ is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step; and (b) an optical surface which has optical power and is not an SDS (non-SDS);
wherein;
   (1) the optical system has a field view of view; and
   (2) the SDS has a constant step depth selected to increase the SDS's average diffraction efficiency over the field at $\lambda_0$.

101. An optical system having an optical axis and comprising:

(a) a stepped diffractive surface (SDS) which has a clear aperture and within said clear aperture comprises N concentric planar steps orthogonal to the system's optical axis which define a non-planar base curve, said steps satisfying the relationship;

$|d_i|\backslash|d_{i+1}|<2.0$, for i=1 to N−2 where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step; and (b) an optical surface which has optical power and is not an SDS (non-SDS);
wherein:
   (1) the optical system has a field view; and
   (2) the SDS has a constant step depth selected to that the maximum diffraction efficiency at $\lambda_0$ occurs at an intermediate field point within the field of view.

102. The optical system of claim 100 or 101 wherein:
   (1) the non-planar base curve is defined by the equation $\phi(R,z)=0$, where R is a radial coordinate and z is an axial coordinate, and
   (2) the SDS has step widths $\lambda_i(R,d_i)$ given by the equation:

$$w_i(R, d_i) = d_i \left| \frac{\frac{\partial \varphi(R, z)}{\partial z}}{\frac{\partial (R, z)}{\partial R}} \right|.$$

103. An optical system having an optical axis and comprising:

(a) a stepped diffractive surface (SDS) which has a clear aperture and within said clear aperture comprises N concentric planar steps orthogonal to the system's optical axis which define a non-planar base curve, said steps satisfying the relationship;

$|d_i|\backslash|d_{i+1}|<2.0$, for i=1 to N−2 where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step; and (b) an optical surface which has optical power and is not an SDS (non-SDS);
   wherein the diffraction efficiency of the SDS is optimized for a wavefront incident on the SDS which is non-planar.

104. The optical system of claim 103 wherein the wavefront is converging or diverging.

105. The optical system of claim 103 wherein the diffraction efficiency is optimized over a spectral range.

106. The optical system of claim 103 wherein the optical system has a finite field and the diffraction efficiency is optimized over that field.

107. The optical system of claim 106 wherein the diffraction efficiency is optimized over a spectral range.

108. An optical system having an optical axis and comprising:

a stepped diffractive surface (SDS) which has a clear aperture and within said clear aperture comprises N concentric planar steps orthogonal to the system's optical axis which define a non-planar base curve, said steps satisfying the relationship:

$|d_i|\backslash|d_{i+1}|<2.0$, for i=1 to N−2 where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step; and (b) an optical surface which has optical power and is not an SDS (non-SDS); 'wherein the diffraction efficiency of the SDS is optimized for a planar wavefront which, at the SDS, has a direction of propagation which is oriented at a non-zero angle to the optical axis.

109. The optical system of claim 108 wherein the diffraction efficiency is optimized over a spectral range.

110. The optical system of claim 108 wherein the optical system has a finite field and the diffraction efficiency is optimized over that field.

111. The optical system of claim 110 wherein the diffraction efficiency is optimized over a spectral range.

112. An optical system having an optical axis and comprising:

(a) stepped diffractive surface (SDS) which has a clear aperture and within said clear aperture comprises N concentric planar steps orthogonal to the system's optical axis which define a non-planar base curve, said steps satisfying the relationship:

$$|d_i|\backslash|d_{i+1}|<2.0, \text{ for } i=1 \text{ to } N-2$$

where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step; and (b) an optical surface which has optical power and is not an SDS (non-SDS);

wherein the diffraction efficiency of the SDS is optimized over a spectral range.

113. The optical system of claim 39, 47, 54, 61, 68, 103, 108, or 112 wherein:

(1) the non-planar base curve is defined by the equation $\phi(R,z)=0$, where R is a radial coordinate and z is an axial coordinate, and (2) the SDS has step widths $\lambda_i(R,d_i)$ given by the equation:

$$w_i(R, d_i) = d_i \left| \frac{\frac{\partial \varphi(R, z)}{\partial z}}{\frac{\partial (R, z)}{\partial R}} \right|.$$

114. The optical system of claim 113 wherein the step depths are constant.

115. The optical system of claim 114 wherein the step depths are variable.

116. A stepped diffractive surface having an optical axis and a clear aperture, said surface comprising, within said clear aperture, N concentric planar steps orthogonal to the optical axis which define a non-planar base curve defined by the equation $\phi(R,z)=0$, where R is a radial coordinate and z is an axial coordinate, said steps satisfying the relationship:

$$|d_i|\backslash|d_{i+1}|<2.0, \text{ for } i=1 \text{ to } N-2$$

where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step; and wherein:

(A) the stepped diffractive surface has step width $\lambda_i(R,d_i)$ given by the equation:

$$w_i(R, d_i) = d_i \left| \frac{\frac{\partial \varphi(R, z)}{\partial z}}{\frac{\partial (R, z)}{\partial R}} \right|; \text{ and}$$

(B) the step depths are not all equal within a diffraction order.

117. A stepped diffractive surface having an optical axis and a clear aperture, said surface comprising, within said clear aperture, N concentric planar steps orthogonal to the optical axis which define a non-planar, aspheric base curve defined by the equation $\phi(R,z)=0$, where R is a radial coordinate and z is an axial coordinate, said steps satisfying the relationship:

$$|d_i|\backslash|d_{i+1}|<2.0, \text{ for } i=1 \text{ to } N-2$$

where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step;

wherein (A) the stepped diffractive surface has step widths $\lambda_i(R,d_i)$ given by the equation:

$$w_i(R, d_i) = d_i \left| \frac{\frac{\partial \varphi(R, z)}{\partial z}}{\frac{\partial (R, z)}{\partial R}} \right|; \text{ and}$$

(B) the step depths are not all equal within the diffraction order.

118. A method for reducing at least one aberration of an optical system which has an optical axis and comprises:

(i) a stepped diffractive surface (SDS) which has a clear aperture and within said clear aperture comprises N concentric planar steps orthogonal to the system's optical axis which define a non-planar base curve, said steps satisfying the relationship:

$$|d_i|\backslash|d_{i+1}|<2.0, \text{ for } i=1 \text{ to } N-2$$

where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step; and (ii) an optical surface which has optical power and is not a stepped diffractive surface (non-SDS);

said method comprising:

(a) tracing rays through the system by representing the SDS by an equation which describes diffraction by a grating; and (b) using the rays traced in step (a) to select one or more parameters of the system which reduce said at least one aberration;

wherein in step (a), rays are traced through individual steps of the SDS using the equation which describes diffraction by a grating.

119. A method for reducing at least one aberration of an optical system which has an optical axis and comprises at least one optical element, said method comprising:

(a) incorporating an additional optical element in the system which comprises a stepped diffractive surface (SDS) which has a clear aperture and within said clear aperture comprises N concentric planar steps orthogonal to the system's optical axis which define a non-planar base curve, said steps satisfying the relationship:

$$|d_i|\backslash|d_{i+1}|<2.0, \text{ for } i=1 \text{ to } N-2$$

where $d_i$ (the step depth) is the displacement along the optical axis between step i and step i+1 and where the optical path difference for each step is at least $j_i\lambda_0$, where $\lambda_0$ is the nominal wavelength of the optical system and $j_i$ is the diffractive order of the $i^{th}$ step; and (b) selecting the spacing between the SDS and the at least one optical element;

wherein step (b) is performed by tracing rays through the system by representing the SDS by an equation which describes diffraction by a grating, said equation being used to trace rays through individual steps of the SDS.

* * * * *